(12) United States Patent
Mihara

(10) Patent No.: US 8,018,659 B2
(45) Date of Patent: Sep. 13, 2011

(54) IMAGE FORMING OPTICAL SYSTEM AND ELECTRONIC IMAGE PICKUP APPARATUS EQUIPPED WITH SAME

(75) Inventor: Shinichi Mihara, Tokyo (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 12/925,841

(22) Filed: Oct. 28, 2010

(65) Prior Publication Data

US 2011/0043664 A1    Feb. 24, 2011

Related U.S. Application Data

(63) Continuation of application No. PCT/JP2009/055754, filed on Mar. 24, 2009.

(30) Foreign Application Priority Data

Apr. 30, 2008   (JP) .................................. 2008-118199
Apr. 30, 2008   (JP) .................................. 2008-118245
Apr. 30, 2008   (JP) .................................. 2008-118346

(51) Int. Cl.
  *G02B 15/14*   (2006.01)
  *H04N 5/262*   (2006.01)
(52) U.S. Cl. ...................... 359/683; 359/676; 348/240.3
(58) Field of Classification Search ............... 348/240.3; 359/432, 676, 680, 683, 684
  See application file for complete search history.

(56) References Cited

U.S. PATENT DOCUMENTS

| | | |
|---|---|---|
| 2004/0051960 A1 | 3/2004 | Mihara |
| 2005/0248669 A1 | 11/2005 | Iwasawa |
| 2005/0259329 A1 | 11/2005 | Yagyu et al. |
| 2005/0275948 A1 | 12/2005 | Sueyoshi |
| 2006/0055815 A1 | 3/2006 | Nanjo et al. |
| 2006/0056044 A1 | 3/2006 | Iwasawa |
| 2006/0274426 A1* | 12/2006 | Sueyoshi .................... 359/676 |
| 2006/0279853 A1* | 12/2006 | Morooka et al. ............. 359/687 |
| 2007/0014032 A1 | 1/2007 | Otake |
| 2008/0094709 A1 | 4/2008 | Iwasawa |

FOREIGN PATENT DOCUMENTS

| | | |
|---|---|---|
| JP | 11-133303 | 5/1999 |
| JP | 2003-255228 | 9/2003 |
| JP | 2003-302576 | 10/2003 |
| JP | 2004-093649 | 3/2004 |
| JP | 2004-264343 | 9/2004 |
| JP | 2004-272187 | 9/2004 |

(Continued)

OTHER PUBLICATIONS

English-Translation, International Search Report (PCT/ISA/210) for PCT/JP2009/055754 (May 11, 2009).*

(Continued)

*Primary Examiner* — David N Spector

(74) *Attorney, Agent, or Firm* — Kenyon & Kenyon LLP

(57) ABSTRACT

An image forming optical system comprising, in order from the object side: a first lens group G1 that is fixed during zooming and includes a reflecting optical element for bending an optical path; a second lens group G2 having a negative refracting power and movable during zooming; a third lens group G3 having a positive refracting power; a fourth lens group G4 having a positive refracting power; and a rearmost lens group GR, wherein during zooming from the wide angle end to the telephoto end, the third lens group G3 moves on the optical axis toward the object side, characterized in that the rearmost lens group GR satisfies the following condition: $0.95<\beta Rw<2.5 \ldots (1\text{-}1)$.

5 Claims, 57 Drawing Sheets

FOREIGN PATENT DOCUMENTS

| | | |
|---|---|---|
| JP | 2004-354869 | 12/2004 |
| JP | 2005-091465 | 4/2005 |
| JP | 2005-128065 | 5/2005 |
| JP | 2005-321545 | 11/2005 |
| JP | 2005-338143 | 12/2005 |
| JP | 2005-352347 | 12/2005 |
| JP | 2006-071993 | 3/2006 |
| JP | 2006-171492 | 6/2006 |
| JP | 2006-209100 | 8/2006 |
| JP | 2006-330341 | 12/2006 |
| JP | 2007-108703 | 4/2007 |
| JP | 2007-108710 | 4/2007 |
| JP | 2007-304195 | 11/2007 |

OTHER PUBLICATIONS

English-Translation, International Preliminary Report on Patentability (PCT/IB/373) for PCT/JP2009/055754 (Dec. 13, 2010).*
JPO Abstract (Translation) JP_2007_304195A (Nov. 22, 2007).*
JPO Abstract (Translation) JP_2006_171492A (Jun. 29, 2006).*
JPO Abstract (Translation) JP_2006_071993A (Mar. 16, 2006).*
JPO Abstract (Translation) JP_2005_352347A (Dec. 22, 2005).*
JPO Abstract (Translation) JP_2005_338143A (Dec. 8, 2005).*
JPO Abstract (Translation) JP_2005_321545A (Dec. 16, 2004).*
JPO Abstract (Translation) JP_2005_128065A (May 19, 2005).*
JPO Abstract (Translation) JP_2005_091465A (May 7, 2005).*
JPO Abstract (Translation) JP_2004_354869A (Dec. 16, 2004).*
JPO Abstract (Translation) JP_2004_093649A (Mar. 25, 2004).*
International Search Report, issued in corresponding International Application No. PCT/JP2009/055754, (Jun. 30, 2009).
International Preliminary Report on Patentability, issued in corresponding International Application No. PCI7JP2009/0055754, (Dec. 13, 2010).

* cited by examiner 404.66
435.84
486.13
656.27
587.56

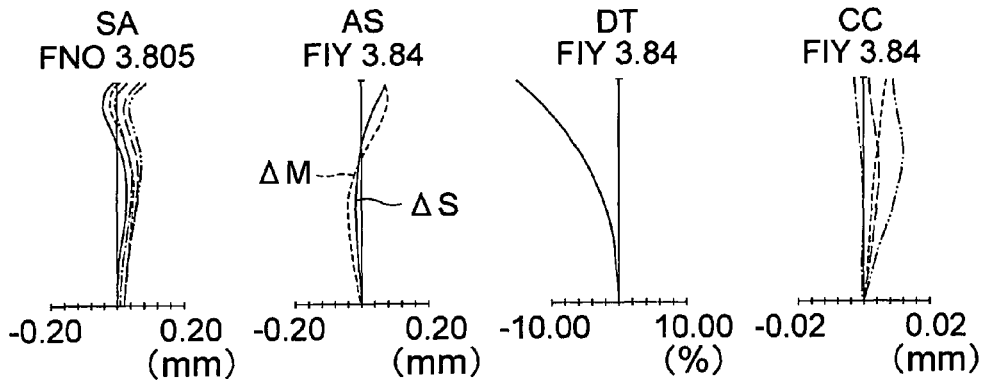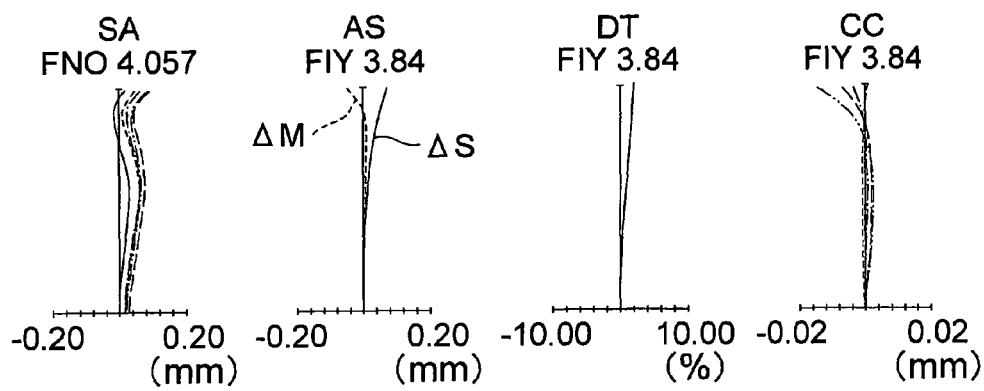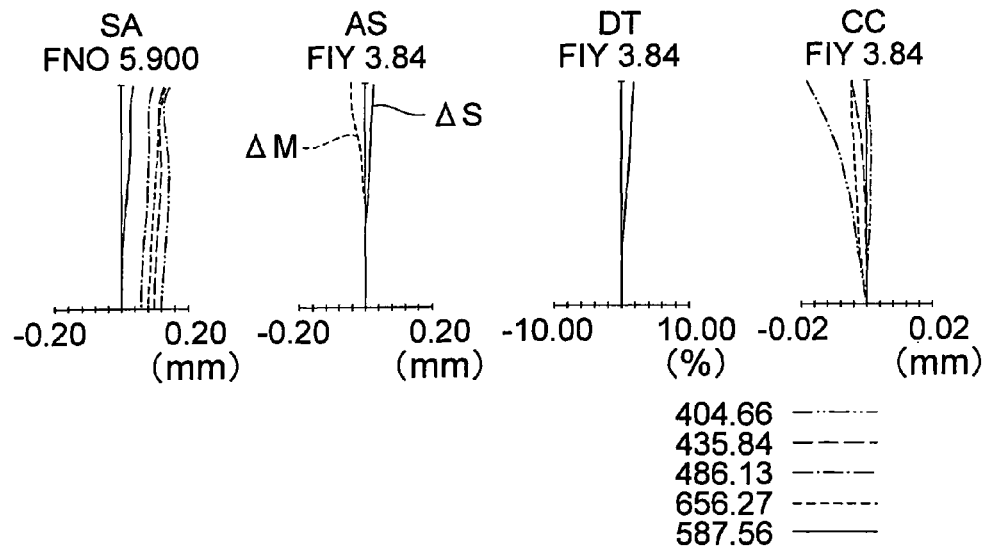

FIG.57A
FIG.57B
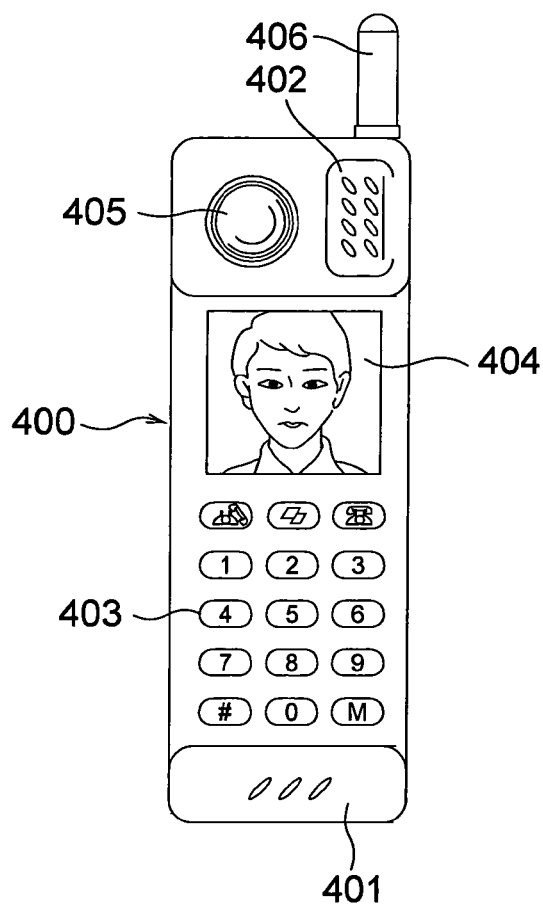
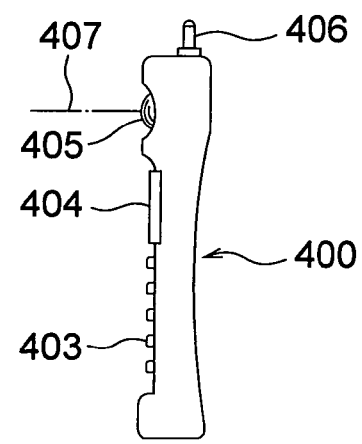
FIG.57C
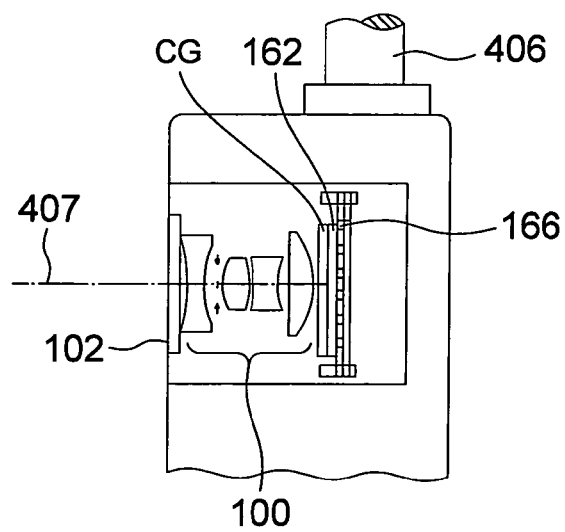

IMAGE FORMING OPTICAL SYSTEM AND
ELECTRONIC IMAGE PICKUP APPARATUS
EQUIPPED WITH SAME

CROSS-REFERENCE TO RELATED APPLICATION

The present application is a continuation of and claims priority under 35 U.S.C. §120 from International Application PCT/JP2009/055754 filed on Mar. 24, 2009 and designating the United States, which in turn is based upon and claims the benefit of priority under 35 U.S.C. §119 from the prior Japanese Patent Application Nos. 2008-118199 filed on April 30, 2008, 2008-118245 filed on Apr. 30, 2008 and 2008-118346 filed on Apr. 30, 2008; the entire contents of which are incorporated herein by reference.

TECHNICAL FIELD

The present invention relates to an image forming optical system (or zoom optical system) for use in an image pickup module and an electronic image pickup apparatus equipped with such an image forming optical system.

BACKGROUND ART

Digital cameras have reached practical levels in terms of high number of pixels (high image quality), compactness, and slimness and replaced 35 mm film cameras from the view points of the function and market. As one aspect of further evolution, a further increase in the number of pixels is strongly desired to be achieved along with an increase in the zoom ratio and an increase in the angle of view while keeping the smallness and slimness.

Image forming optical systems that have been used for their advantage in slimming of the optical system include, for example, optical systems having a reflecting optical element that bends the optical path provided in the first lens group counted from the object side. The use of such an image forming optical system allows to make the depth or thickness of the camera body very small (patent documents 1 and 2).

In the optical systems disclosed in patent documents 1 and 2, a reflecting optical element in the first lens group is adapted to surely bend the path of beams having a certain angle of view. In this case, in order to surely provide a reflecting surface having an area needed for the angle of view, the equivalent air thickness of the first lens group G1 along the optical axis is necessitated to be large. Especially when the angle of view is increased, an increase in the equivalent air thickness of this part becomes notable. On the other hand, the larger the aforementioned equivalent air thickness is, the larger the area of the reflecting surface is needed to be. Therefore, in such optical systems, a negative refracting power is provided immediately before the reflecting surface and a positive refracting power is provided immediately after the reflecting surface to decrease the area of the reflecting surface and also decrease the equivalent air thickness to some extent.

Examples of optical systems having a high magnification are disclosed in Japanese Patent Application Laid-Open No. 2006-71993 and Japanese Patent Application Laid-Open No. 2006-209100.

For image forming optical systems in which a high zoom ratio and a wide angle of view can be achieved at the same time, a configuration in which the lens group closest to the object side (i.e. the first lens group) has a positive refracting power, and a lens group that moves along the optical axis during zooming is suitable (patent document 5). However, this lens configuration has a disadvantage that the diameter of the first lens group tends to be large and providing an adequate edge thickness necessitates a large lens thickness along the optical axis. To reduce the diameter of the first lens group, the position of the entrance pupil at the wide angle end may be made closer to the object side.

One method to achieve this is to configure the first lens group in such a way that the position of the principal point of the first lens group is located as close to the image side as possible. Specifically, in the first lens group, a lens component having a negative refracting power is arranged on the object side and a lens component having a positive refracting power is arranged on the image side. In addition, it is preferred that lens components be arranged with large distances therebetween to an acceptable extent and have strong powers (patent document 6). This allows to achieve a wide angle of view. However, telephoto lenses and zoom lenses set to a telephoto zoom position having the above-described configuration suffer from a problem that even when spherical aberration is excellently corrected with respect to the d-line, large negative spherical aberration occurs with respect to the g-line and the h-line.

Image forming optical systems that have been used heretofore for their advantage in sliming of the optical system include, for example, a system in which a reflecting optical element that bends the optical path is provided in the lens group closest to the object side (or the first lens group) (patent documents 1 and 2). However, increasing the zoom ratio while maintaining the slimness will make the entrance pupil farer from the object side. In addition, increasing the angle of view will make it difficult to ensure bending of the beams needed for imaging at all the angle of views. Therefore, it is necessary to make the entrance pupil closer to the object side.

Patent Document 1: Japanese Patent Application Laid-Open No. 2003-302576
Patent Document 2: Japanese Patent Application Laid-Open No. 2004-264343
Patent Document 3: Japanese Patent Application Laid-Open No. 2006-71993
Patent Document 4: Japanese Patent Application Laid-Open No. 2006-209100
Patent Document 5: Japanese Patent Application Laid-Open No. 2003-255228
Patent Document 6: Japanese Patent Application Laid-Open No. 11-133303

SUMMARY OF THE INVENTION

Problem to be Solved by the Invention

However, in the optical systems disclosed in patent documents 1 and 2, the first lens group G1 necessarily includes a reducing afocal converter. This increases the combined focal length of the optical system constituted by the afocal converter and the optical components subsequent thereto. In consequence, the entire optical system will be an image forming optical system having a large entire length.

To achieve compactness with respect to the entire length and thickness in the above state, the positive refracting power and the negative refracting power provided before and after the reflecting surface both need to be strong. This will consequently lead to generation of a large amount of secondary spectrum and chromatic spherical aberration.

They will become outstanding particularly when the magnification is high. In the optical systems disclosed in patent documents 3 and 4, chromatic aberration and curvature of field are corrected insufficiently.

To make the entrance pupil closer to the object side in the configurations disclosed in patent documents 1 and 2 according to the idea taught by patent document 6, it is necessary to increase the refracting powers of the lens components in the first lens group. This leads to significantly outstanding undercorrection of spherical aberration in the short wavelength range at telephoto focal lengths.

An object of the present invention is to provide an image forming optical system (or zoom optical system) that is slim in depth and short in overall length and have high optical specifications and high performance in which curvature of field is corrected excellently, and to provide an electronic image pickup apparatus equipped with such an image forming optical system.

Another object of the present invention is to provide an image forming optical system that is slim in depth and short in overall length while having high optical specifications and high performance with e.g. excellently corrected chromatic aberrations, and to provide an electronic image pickup apparatus equipped with such an image forming optical system.

Means for Solving the Problem

To achieve the above object, an image forming optical system according to a first aspect of the present invention comprises, in order from the object side: a first lens group G1 that is fixed during zooming and includes a reflecting optical element for bending an optical path; a second lens group G2 having a negative refracting power and movable during zooming; a third lens group G3 having a positive refracting power; a fourth lens group G4 having a positive refracting power; and a rearmost lens group GR, wherein during zooming from the wide angle end to the telephoto end, the third lens group G3 moves on the optical axis toward the object side, and the image forming optical system is characterized in that the rearmost lens group GR satisfies the following condition:

$$0.95 < \beta Rw < 2.5 \quad (1\text{-}1),$$

where $\beta Rw$ is the imaging magnification of the rearmost lens group GR in a state in which the image forming optical system is focused on a certain object point for which the imaging magnification of the entire image forming optical system is equal to or lower than 0.01 at the wide angle end.

To achieve the above object, an image forming optical system according to a second aspect of the present invention comprises a first lens group G1 that has a positive refracting power and is disposed closest to the object side, and the image forming optical system is characterized in that the first lens group G1 comprises a reflecting optical element and a lens component C1p having a positive refracting power disposed on the image side of the reflecting optical element, the lens component C1p is made up of a negative lens LA and a positive lens LB that are cemented together with the cemented surface being an aspheric surface, and the image forming optical system satisfies the following conditional expression (2-1):

$$0.4 < E/f12 < 2.0 \quad (2\text{-}1),$$

where E is the equivalent air distance between a vertex Ct1 and a vertex Ct2 along the optical axis, the vertex Ct1 is the vertex of the surface having the highest negative refracting power among the refractive surfaces located closer to the object side than the reflecting surface of the reflecting optical element, the vertex Ct2 is the vertex of the cemented surface of the lens component C1p, and f12 is the combined focal length of all the lenses, among the lenses constituting the first lens group G1, that are located closer to the image side than the reflecting optical element. In this connection, if the reflecting optical element has an exit surface having a refracting power, this exit surface is taken into account for the combined focal length.

To achieve the above object, an image forming optical system according to a third aspect of the present invention comprises a lens group G1 having a positive refracting power and a magnification changing portion GV consisting of a plurality of lens groups, and the image forming optical system is characterized in that the lens group G1 is located closest to the object side and includes a sub lens group G11 having a negative refracting power and a sub lens group G12 having a positive refracting power, relative distances between adjacent lens groups among the plurality of lens groups change during zooming or focusing, the sub lens group G12 includes a lens component C1p having a positive refracting power, the lens component C1p having a positive refracting power is a cemented lens made up of a negative lens LA and a positive lens LB that are cemented together with the cemented surface being an aspheric surface, and the image forming optical system satisfies the following conditional expression (3-1):

$$0.50 < D11/SD1 < 0.95 \quad (3\text{-}1),$$

where D11 is the distance measured along the optical axis from the vertex of the lens surface closest to the image side in the sub lens group G11 to the vertex of the lens surface closest to the object side in the sub lens group G12, and SD1 is the distance measured along the optical axis from the vertex of the lens surface closest to the object side in the lens group G1 to the vertex of the lens surface closest to the image side in the lens group G1.

An electronic image pickup apparatus according to the present invention is characterized by comprising: an image forming optical system as described above; an electronic image pickup element; and an image processing unit that processes image data obtained by picking up an image formed through the image forming optical system by the electronic image pickup element and outputs image data representing the image having a changed shape, wherein the image forming optical system is a zoom lens, and the zoom lens satisfies the following conditional expression (3-22) when the zoom lens is focused on an object point at infinity:

$$0.7 < y07/(fW \cdot \tan \omega 07w) < 0.96 \quad (3\text{-}22),$$

where y07 is expressed by equation y07=0.7y10, y10 being a distance from the center of an effective image pickup area (i.e. an area in which images can be picked up) of the electronic image pickup element to a point farthest from the center within the effective image pickup area (or a maximum image height), and $\omega 07w$ is the angle of the direction toward an object point corresponding to an image point formed at a position at distance y07 from the center of the image pickup surface at the wide angle end with respect to the optical axis.

The present invention can provide an image forming optical system (or zoom optical system) that is slim in depth and short in overall length and have high optical specifications and high performance in which curvature of field is corrected excellently, and provide an electronic image pickup apparatus equipped with such an image forming optical system.

BRIEF DESCRIPTION OF THE DRAWINGS

FIG. 1A is for the wide angle end, FIG. 1B is for the intermediate focal length, and FIG. 1C is for the telephoto end;

FIG. 4A is for the wide angle end, FIG. 4B is for the intermediate focal length, and FIG. 4C is for the telephoto end;

FIG. 6A is for the wide angle end, FIG. 6B is for the intermediate focal length, and FIG. 6C is for the telephoto end;

FIG. 8A is for the wide angle end, FIG. 8B is for the intermediate focal length, and FIG. 8C is for the telephoto end;

FIG. 10A is for the wide angle end, FIG. 10B is for the intermediate focal length, and FIG. 10C is for the telephoto end;

FIG. 12A is for the wide angle end, FIG. 12B is for the intermediate focal length, and FIG. 12C is for the telephoto end;

FIG. 14A is for the wide angle end, FIG. 14B is for the intermediate focal length, and FIG. 14C is for the telephoto end;

FIG. 16A is for the wide angle end, FIG. 16B is for the intermediate focal length, and FIG. 16C is for the telephoto end;

FIG. 18A is for the wide angle end, FIG. 18B is for the intermediate focal length, and FIG. 18C is for the telephoto end;

FIG. 20A is for the wide angle end, FIG. 20B is for the intermediate focal length, and FIG. 20C is for the telephoto end;

FIG. 22A is for the wide angle end, FIG. 22B is for the intermediate focal length, and FIG. 22C is for the telephoto end;

FIG. 24A is for the wide angle end, FIG. 24B is for the intermediate focal length, and FIG. 24C is for the telephoto end;

FIG. 26A is for the wide angle end, FIG. 26B is for the intermediate focal length, and FIG. 26C is for the telephoto end;

FIG. 28A is for the wide angle end, FIG. 28B is for the intermediate focal length, and FIG. 28C is for the telephoto end;

FIG. 30A is for the wide angle end, FIG. 30B is for the intermediate focal length, and FIG. 30C is for the telephoto end;

FIG. 32A is for the wide angle end, FIG. 32B is for the intermediate focal length, and FIG. 32C is for the telephoto end;

FIG. 34A is for the wide angle end, FIG. 34B is for the intermediate focal length, and FIG. 34C is for the telephoto end;

FIG. 36A is for the wide angle end, FIG. 36B is for the intermediate focal length, and FIG. 36C is for the telephoto end;

FIG. 38A is for the wide angle end, FIG. 38B is for the intermediate focal length, and FIG. 38C is for the telephoto end;

FIG. 40A is for the wide angle end, FIG. 40B is for the intermediate focal length, and FIG. 40C is for the telephoto end;

FIG. 42A is for the wide angle end, FIG. 42B is for the intermediate focal length, and FIG. 42C is for the telephoto end;

FIG. 44A is for the wide angle end, FIG. 44B is for the intermediate focal length, and FIG. 44C is for the telephoto end;

FIGS. 46A, 46B, and 46C are diagrams showing spherical aberration, astigmatism, distortion, and chromatic aberration of magnification of the zoom lens according to embodiment 23 in the state in which the zoom lens is focused on an object point at infinity, where FIG. 46A is for the wide angle end, FIG. 46B is for the intermediate focal length, and FIG. 46C is for the telephoto end;

FIG. 48A is for the wide angle end, FIG. 48B is for the intermediate focal length, and FIG. 48C is for the telephoto end;

FIG. 50A is for the wide angle end, FIG. 50B is for the intermediate focal length, and FIG. 50C is for the telephoto end;

FIGS. 57A, 57B, and 57C show a cellular phone 400 as an example of an information processing apparatus in which a zoom optical system according to the present invention is provided as a taking optical system, where FIG. 57A is a front view of the cellular phone 400, FIG. 57B is a side view of the cellular phone, and FIG. 57C is a cross sectional view of the image taking optical system 405.

Figure 1A:
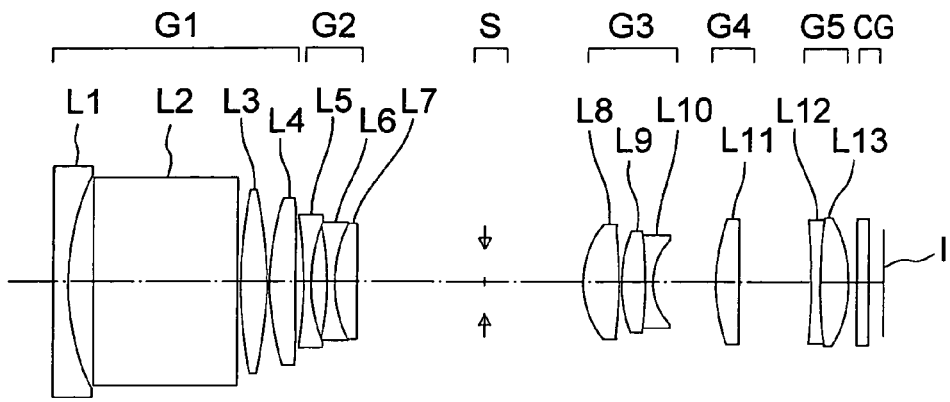
FIGS. 1A, 1B, and 1C are cross sectional views taken along the optical axis showing the optical configuration of a zoom lens according to embodiment 1 of the present invention in the state in which the zoom lens is focused on an object point at infinity, respectively at the wide angle end, at an intermediate focal length, and at the telephoto end.

| DESCRIPTION OF REFERENCE SIGNS | |
|---|---|
| G1: | first lens group |
| G2: | second lens group |
| G3: | third lens group |
| G4: | fourth lens group |
| G5: | fifth lens group |
| L1 to L13: | lens |
| LPF: | low pass filter |
| CG: | cover glass |
| I: | image pickup surface |
| E: | viewer's eye |
| 40: | digital camera |
| 41: | taking optical system |
| 42: | taking optical path |
| 43: | finder optical system |
| 44: | optical path for finder |
| 45: | shutter |
| 46: | flash |
| 47: | liquid crystal display monitor |
| 48: | zoom lens |
| 49: | CCD |
| 50: | image pickup surface |
| 51: | processing unit |
| 53: | objective optical system for finder |
| 55: | Porro prism |
| 57: | field frame |
| 59: | eyepiece optical system |
| 66: | focusing lens |
| 67: | image plane |
| 100: | objective optical system |
| 102: | cover glass |
| 162: | electronic image pickup element chip |
| 166: | terminal |
| 300: | personal computer |
| 301: | keyboard |
| 302: | monitor |
| 303: | taking optical system |
| 304: | taking optical path |
| 305: | image |
| 400: | cellular phone |
| 401: | microphone portion |
| 402: | speaker portion |
| 403: | input dial |
| 404: | monitor |
| 405: | taking optical system |
| 406: | antenna |
| 407: | taking optical path |

DETAILED DESCRIPTION OF THE INVENTION

Prior to the description of embodiments, operations and effects of an image forming optical system according to one mode will be described. In the following description, a "positive lens (or lens having a positive refracting power)" and a "negative lens (or lens having a negative refracting power)" will refer to lenses having paraxial focal lengths of positive and negative values respectively.

The image forming optical system according to this mode includes, in order from the object side, a first lens group G1 that includes a reflecting optical element for bending the optical path and is fixed during zooming, a second lens group G2 having a negative refracting power that is movable during zooming, a third lens group G3 having a positive refracting power, a fourth lens group G4 having a positive refracting power, and a rearmost lens group GR, wherein during zooming from the wide angle end to the telephoto end, the third lens group G3 moves toward the object side along the optical axis. The relative position of the third lens group G3 and the fourth lens group G4 changes during zooming.

In the image forming optical system according to this mode, a reflecting optical element for bending the optical path is provided in the frontmost lens group (first lens group G1). When this arrangement is adopted, the overall length of the optical system tends to become long. This tendency will apparently appear particularly when the optical system has a high magnification, a wide angle of view, and a large diameter.

In view of this, in the imaging optical system according to this mode, the rearmost lens group GR satisfies the following condition:

$$0.95 < \beta Rw < 2.5 \quad (1\text{-}1),$$

where βRw is the imaging magnification of the rearmost lens group GR in a state in which the image forming optical system is focused on a certain object point for which the imaging magnification of the entire image forming optical system is equal to or lower than 0.01 at the wide angle end.

If the lower limit of conditional expression (1-1) is exceeded, it will be difficult to achieve a high magnification, a wide angle of view, and a large diameter together while reducing the overall length. If the upper limit of conditional expression (1-1) is exceeded, the Petzval sum will have a large negative value, resulting in strong curvature of field.

It is preferred that the following conditional expression (1-1') be satisfied instead of the above conditional expression (1-1):

$$1.05 < \beta Rw < 2.4 \quad (1\text{-}1').$$

It is most preferred that the following conditional expression (1-1") be satisfied instead of the above conditional expression (1-1):

$$1.15 < \beta Rw < 2.3 \quad (1\text{-}1'').$$

It is preferred that the lens groups arranged subsequent to the fourth lens group G4 include only the rearmost lens group GR. If this is the case, the entire optical system consists of only five lens groups. This enables a reduction in the overall length of the optical system. In this case, the rearmost lens group GR is constituted by the fifth lens group G5.

In the image forming optical system according to this mode, the Petzval sum tends to have a large negative value. In view of this, in the image forming optical system according to this mode, it is preferred that the rearmost lens group GR consist of a lens component that is at a substantially constant distance from the image plane during zooming, and the following condition be satisfied:

$$0.30 < NRn - NRp < 0.90 \quad (1\text{-}2),$$

where NRp and NRn are the refractive indices for the d-line of the materials of which a positive (convex) lens and a negative (concave) lens in the rearmost lens group GR are made respectively.

Conditional expression (1-2) is a condition for improving correction of curvature of field without detrimentally affecting other aberrations. If the lower limit of conditional expression (1-2) is exceeded, the Petzval sum will have a large negative value, resulting in strong curvature of field. If the upper limit of conditional expression (1-2) is exceeded, the amount of ghost images and veiling glare generated by a cemented surface(s) will increase.

It is preferred that the following conditional expression (1-2') be satisfied instead of the above conditional expression (1-2):

$$0.35 < NRn - NRp < 0.85 \quad (1\text{-}2').$$

It is most preferred that the following conditional expression (1-2") be satisfied instead of the above conditional expression (1-2):

$$0.40 < NRn - NRp < 0.80 \quad (1\text{-}2'').$$

As described above, in the image forming optical system according to this mode, the reflecting optical element is inserted in the first lens group G1. In consequence, the portion (or lens component) having a negative refracting power and the portion (or lens component) having a positive refracting power are separated from each other in the first lens group G1. In particular, if a high dispersion material is used for the portion having a negative refracting power located in the object side portion of the first lens group G1 for the purpose of correcting axial chromatic aberration, insufficient correction of chromatic aberration of magnification will result.

Therefore, in the image forming optical system according to this mode, it is preferred that the rearmost lens group GR consist only of a lens component that is at a substantially constant distance from the image plane during zooming, and the following condition be satisfied:

$$10 < \nu Rp - \nu Rn < 90 \quad (1\text{-}3),$$

where νRp and νRn are the Abbe constants for the d-line of the materials of which a positive (convex) lens and a negative (concave) lens in the rearmost lens group GR are made respectively.

If the lower limit of conditional expression (1-3) is exceeded, it will tend to become difficult to prevent undercorrection of chromatic aberration of magnification. On the other hand, if the upper limit of conditional expression (1-3) is exceeded, overcorrection of chromatic aberration of magnification will tend to occur.

It is preferred that the following conditional expression (1-3') be satisfied instead of the above conditional expression (1-3):

$$15 < \nu Rp - \nu Rn < 85 \quad (1\text{-}3').$$

It is most preferred that the following conditional expression (1-3") be satisfied instead of the above conditional expression (1-3):

$$20 < \nu Rp - \nu Rn < 80 \quad (1\text{-}3'').$$

It is more preferred that the image forming optical system according to this mode satisfy both of conditional expressions (1-2) and (1-3).

In the image forming optical system according to this mode, it is also preferred that the rearmost lens group GR consists of a lens component made up of a positive (convex) lens and a negative (concave) lens that are cemented together.

In this instance, in the image forming optical system according to this mode, it is also preferred that the rearmost lens group GR satisfy the following conditions:

$$1/R_{GRF} > 1/R_{GRR} \quad (1\text{-}4), \text{ and}$$

$$-0.5 < (R_{GRF} + R_{GRR})/(R_{GRF} - R_{GRR}) < 6.5 \quad (1\text{-}5),$$

where $R_{GRF}$ is the paraxial radius of curvature of the surface closest to the object side in the rearmost lens group GR, and $R_{GRR}$ is the paraxial radius of curvature of the surface closest to the image side in the rearmost lens group GR.

If the lower limit of conditional expression (1-5) is exceeded, strong barrel distortion will tend to appear at the wide angle end. On the other hand, if the upper limit of conditional expression (1-5) is exceeded, a large dead space will be left in the image forming optical system. This is not desirable for compactness.

Conditional expression (1-4) expresses that the cemented lens component has a convex lens shape while satisfying conditional expression (1-1). In the case where conditional expression (1-2) is satisfied, it is preferred that the shape of the cemented lens component satisfy the above conditional expression (1-5).

It is preferred that the following conditional expression (1-5') be satisfied instead of the above conditional expression (1-5):

$$0.5<(R_{GRF}+R_{GRR})/(R_{GRF}-R_{GRR})<5.5 \qquad (1\text{-}5').$$

It is most preferred that the following conditional expression (1-5") be satisfied instead of the above conditional expression (1-5):

$$1.5<(R_{GRF}+R_{GRR})/(R_{GRF}-R_{GRR})<4.5 \qquad (1\text{-}5").$$

In the image forming optical system according to this mode, focusing on a closer object can be performed by advancing the fourth lens group G4 toward the object side. In addition, during zooming from the wide angle end to the telephoto end, the fourth lens group G4 moves in such a way that it is located relatively closer to the rearmost lens group GR at the telephoto end than at the wide angle end. This movement occurs in a state in which the image forming optical system is focused on a certain object point for which the absolute value of the imaging magnification of the entire image forming optical system is equal to or lower than 0.01 at the wide angle end.

It is preferred that the image forming optical system according to this mode satisfy the following conditions:

$$-1.2 \leq \beta 2w \leq -0.40 \qquad (1\text{-}6), \text{ and}$$

$$-1.8 \leq \beta 3w \leq -0.40 \qquad (1\text{-}7),$$

where β2w is the imaging magnification of the second lens group G2, and β3w is the imaging magnification of the third lens group G3, in a state in which the image forming optical system is focused on a certain object point for which the imaging magnification of the entire image forming optical system is equal to or lower than 0.01, at the wide angle end.

If the lower limit of conditional expression (1-6) is exceeded, the magnification change ratio achieved by the movement of the third lens group G3 will tend to be small. On the other hand, if the upper limit of conditional expression (1-6) is exceeded, the magnification change ratio achieved by the movement of the second lens group G2 will tend to be small.

It is preferred that the following conditional expression (1-6') be satisfied instead of the above conditional expression (1-6):

$$-1.2 \leq \beta 2w \leq -0.50 \qquad (1\text{-}6').$$

It is most preferred that the following conditional expression (1-6") be satisfied instead of the above conditional expression (1-6):

$$-1.2 \leq \beta 2w \leq -0.60 \qquad (1\text{-}6").$$

It is preferred that the following conditional expression (1-7') be satisfied instead of the above conditional expression (1-7):

$$-1.6 \leq \beta 3w \leq -0.40 \qquad (1\text{-}7').$$

It is most preferred that the following conditional expression (1-7") be satisfied instead of the above conditional expression (1-7):

$$-1.4 \leq \beta 3w \leq -0.40 \qquad (1\text{-}7").$$

In the image forming optical system according to this mode, the fourth lens group G4 may consist of one lens component. If this is the case, it is preferred that the third lens group G3 move toward the object side during zooming from the wide angle end to the telephoto end.

In cases where the third and subsequent lens groups serve as what is called a master lens system, it is preferred, as one means for reducing the overall length, that the master lens system be configured in such a way that the position of the principal point of the master lens system is made closer to the object side. To this end, it is preferred that the a positive lens component be provided closest to the object side in the third lens group G3, and a negative lens component be provided closest to the image side in the third lens group G3. In addition, it is preferred that the surface closest to the image side in the third lens group G3 be a concave surface. This is preferable because the third lens group G3 can provide a larger magnification change ratio relative to the amount of movement thereof (i.e. the magnification change ratio can be made large with a small amount of movement of the third lens group G3).

It is also preferred that the negative lens component in the third lens group G3 be a cemented lens C3 including a positive lens located closest to the object side and a negative lens located closest to the image side. This is advantageous in correcting spherical aberration and chromatic aberration. When the overall length of the optical system is to be made shorter, the tolerance for the thickness of the negative lens component in the third lens group G3 is very small. This is because the error sensitivity to the relative positional relationship between the surface closest to the object side and the surface closest to the image side in this lens component is high. The smaller the overall thickness of the third lens group G3 is, the smaller the tolerance is.

In the lens component with such a small tolerance, it is preferred that the negative lens component be a cemented lens made up of three lens elements, and an energy curable (e.g. ultraviolet curable) resin be used as the material for the center lens element LA3. When cemented, the relative positional relationship (with respect to the thickness and decentering) between the surface closest to the object side and the surface closest to the image side in this lens component is adjusted exactly. Specifically, firstly, the positional relationship between the lens having the surface closest to the object side and the lens having the surface closest to the image side is exactly adjusted. After this has been done, the lens component may be produced by curing the center lens element LA3. The relative positional relationship relates to, for example, thickness and decentering.

To allow good correction of chromatic aberration, it is necessary that there is a freedom of design in terms of correction of chromatic aberration. Therefore, in the image forming optical system according to this mode, it is preferred that the material that constitutes the center lens element LA3 satisfy the following conditional expression (1-8):

$$\nu d(LA3) \leq 27 \qquad (1\text{-}8),$$

where νd(LA3) is the Abbe constant for the d-line, which is represented by (nd−1)/(nF−nC).

If the upper limit of conditional expression (1-8) is exceeded, there cannot be provided a freedom of design in terms of correction of chromatic aberration.

It is preferred that the following conditional expression (1-8') be satisfied instead of the above conditional expression (1-8):

$$vd(LA3) \leq 25 \quad (1\text{-}8').$$

It is most preferred that the following conditional expression (1-8") be satisfied instead of the above conditional expression (1-8):

$$vd(LA3) \leq 23.5 \quad (1\text{-}8").$$

In the image forming optical system according to this mode, it is also preferred that the center lens element LA3 be a negative (concave) lens, and assuming a straight line given by the equation $\theta gF = \alpha \times vd + \beta'(LA3)$ (where $\alpha = -0.00163$) in an orthogonal coordinate system having a horizontal axis representing vd and a vertical axis representing $\theta gF$, the value of $\theta gF$ and vd of the center lens element LA3 falls within the area bounded by the straight line given by the equation into which the lowest value in the range defined by the following conditional expression (1-9) is substituted and the straight line given by the equation into which the highest value in the range defined by the following conditional expression (1-9) is substituted:

$$0.2500 < \beta'(LA3) < 0.6450 \quad (1\text{-}9),$$

where $\theta gF$ is the relative partial dispersion (ng−nF)/(nF−nC) of the material, where nd, nC, nF, and ng are refractive indices for the d-line, C-line, F-line, and g-line respectively.

If the upper limit or the lower limit of conditional expression (1-9) is exceeded, correction of axial chromatic aberration and chromatic aberration of magnification by secondary spectrum, specifically, correction of axial chromatic aberration and chromatic aberration of magnification with respect to the g-line while achromatism is achieved with respect to the F-line and the C-line will be insufficient. Therefore, it will be difficult to achieve sharpness in picked up images.

It is preferred that the following conditional expression (1-9') be satisfied instead of the above conditional expression (1-9):

$$0.4700 < \beta'(LA3) < 0.6350 \quad (1\text{-}9').$$

It is most preferred that the following conditional expression (1-9") be satisfied instead of the above conditional expression (1-9):

$$0.5700 < \beta'(LA3) < 0.6250 \quad (1\text{-}9").$$

In cases where a cemented lens made up of three lenses is used as the negative lens component in the third lens group G3, it is preferred that the center lens element LA3 (concave lens) be made of an energy curable resin. In the manufacturing of the cemented lens, firstly, the relative positional relationship between the other two lens elements is exactly adjusted. Thereafter, the center lens element LA3 may be cured while in close contact therewith. Here, the lens element closest to the image side is also a negative lens (concave lens). Therefore, an energy curable resin may be used for the lens element closest to the image side instead of the center lens element LA3 (concave lens). Then, the other two lens elements may be cemented, and thereafter the lens element closest to the image side may be cured while in close contact therewith so that the relative positional relationship is exactly adjusted. In this case, the lens element closest to the image side may satisfy the above-mentioned condition as with the center lens element LA3.

In the configuration of first lens group G1 including a reflecting optical element, normally, a lens component having a negative refracting power is arranged on the object side of the reflecting optical element, and a lens component having a positive refracting power is arranged on the image side of the reflecting optical element. To achieve a high zoom ratio, a wide angle of view, and a large diameter, while keeping the depth of the image forming optical system small, it is preferred that any one of the following configuration be adopted.

A: The first lens group G1 includes, in order from the object side, a negative lens component having a concave image side surface, a reflecting optical element, and one or two positive lens components.

B: The first lens group G1 includes, in order from the object side, a prism element having a concave entrance surface, a reflecting surface, and an exit surface, and one or two positive lens components.

C: The first lens group G1 includes, in order from the object side, a negative lens component having a concave image side surface, a prism element having a concave entrance surface, a reflecting surface, and an exit surface, and two positive lens components.

D: The first lens group G1 includes, in order from the object side, only a negative lens component having a concave image side surface, a reflecting optical element having an entrance surface, a reflecting surface, and a convex exit surface, and a positive lens component.

In particular, in the case of configuration C, it is possible to make the depth small while achieving both a high magnification and a wide angle of view at the same time. In the case of configuration D, a high magnification can be achieved.

In the configuration like this in which a lens component having a negative refracting power, a reflecting optical element, and a lens component having a positive refracting power are arranged in order from the object side, the lens component having a negative refracting power and the lens component having a positive refracting power have a large equivalent air thickness. Consequently, there is a large difference between the axial ray height in the lens component having a negative refracting power and the lens component having a positive refracting power. Achieving a reduction in the overall length and a reduction in the depth in this state will involve an increase in the refracting powers of the respective lens components. In consequence, spherochromatism generated in the lens component having a positive refracting power cannot be corrected by the lens component having a negative refracting power. In particular, in image forming optical systems having a high zoom ratio, this tendency prominently appears at the telephoto end.

In this case, it is preferred that one of the aforementioned configurations A to D be adopted, and one positive lens component in the first lens group G1 be a cemented lens component C1 made up of a positive lens and a negative lens that are cemented together. This allows improvement of spherochromatism at the telephoto end. Furthermore, if an aspheric surface design is used in the cemented surface of the cemented lens C1, spherochromatism at the telephoto end can be corrected substantially satisfactorily.

In the image forming optical system according to this mode, it is preferred that the Abbe constant of the positive lens in the cemented lens C1 is larger than the Abbe constant of the negative lens, and the following conditional expression (1-10) be satisfied:

$$7 \leq \Delta vd(C1) \quad (1\text{-}10),$$

where $\Delta vd(C1)$ is the difference in the Abbe constant between the positive lens and the negative lens in the cemented lens component C1.

If the lower limit of conditional expression (1-10) is exceeded, it will become difficult to correct spherochromatism at the telephoto end satisfactorily. Even if an aspheric surface design is used in the cemented surface, the effect of correcting spherochromatism at the telephoto end will become small.

It is preferred that the following conditional expression (1-10') be satisfied instead of the above conditional expression (1-10):

$$12 \leq \Delta vd(C1) \tag{1-10'}$$

It is most preferred that the following conditional expression (1-10") be satisfied instead of the above conditional expression (1-10):

$$17 \leq \Delta vd(C1) \tag{1-10"}$$

In the image forming optical system according to this mode, it is also preferred that the positive lens and the negative lens in the cemented lens C1 satisfy the following conditional expression (11):

$$-0.2 \leq \Delta nd(C1) \leq 0.4 \tag{1-11}$$

where $\Delta nd(C1)$ is the difference in the refractive index between the positive lens and the negative lens in the cemented lens C1, that is, the refractive index of the positive lens minus the refractive index of the negative lens.

If the lower limit of conditional expression (1-11) is exceeded, the Petzval sum will be apt to have a large negative value. If the upper limit of conditional expression (1-11) is exceeded, the use of an aspheric cemented surface intended to correct higher order components of chromatic aberration of magnification and spherochromatism will detrimentally affect correction of other aberrations.

It is preferred that the following conditional expression (1-11') be satisfied instead of the above conditional expression (1-11):

$$-0.15 \leq \Delta nd(C1) \leq 0.35 \tag{1-11'}$$

It is most preferred that the following conditional expression (1-11") be satisfied instead of the above conditional expression (1-11):

$$-0.1 \leq \Delta nd(C1) \leq 0.3 \tag{1-11"}$$

In the image forming optical system according to this mode, it is also preferred that assuming a straight line given by the equation $\theta gF = \alpha \times vd + \beta'(LA1)$ (where $\alpha = -0.00163$) in an orthogonal coordinate system having a horizontal axis representing vd and a vertical axis representing $\theta gF$, the value of $\theta gF$ and the value of vd of at least one negative lens LA1 included in the cemented lens C1 fall within both of the area bounded by the straight line given by the equation into which the lowest value in the range defined by the following conditional expression (1-12) is substituted and the straight line given by the equation into which the highest value in the range defined by the following conditional expression (1-12) is substituted and the area defined by the following conditional expression (1-13):

$$0.4500 < \beta'(LA1) < 0.7100 \tag{1-12}$$

$$3 < vd(LA1) < 30 \tag{1-13}$$

where $\theta gF$ is the relative partial dispersion (ng−nF)/(nF−nC), and vd is the Abbe constant (nd−1)/(nF−nC), where nd, nC, nF, and ng are refractive indices for the d-line, C-line, F-line, and g-line respectively.

If the upper limit of conditional expression (1-12) is exceeded, correction of axial chromatic aberration and chromatic aberration of magnification by secondary spectrum, specifically, correction of axial chromatic aberration and chromatic aberration of magnification with respect to the g-line while achromatism is achieved with respect to the F-line and the C-line will be insufficient at the telephoto end of the image forming optical system. Therefore, it will be difficult to achieve sharpness over the entire picture area in images picked up at telephoto focal lengths particularly. If the lower limit of conditional expression (1-12) is exceeded, correction of chromatic aberration of magnification by secondary spectrum, specifically, correction of chromatic aberration of magnification with respect to the g-line while achromatism is achieved with respect to the F-line and the C-line will be insufficient at the wide angle end of the image forming optical system. Therefore, it will be difficult to achieve sharpness in the peripheral region of images picked up at wide angle focal lengths.

If the upper limit of conditional expression (1-13) is exceeded, even achromatism with respect to F-line and the C-line will be difficult. If the lower limit of conditional expression (1-13) is exceeded, effect of correction of five Seidel aberrations will become smaller even if achromatism with respect to F-line and the C-line can be achieved.

In the image forming optical system according to this mode, it is also preferred that assuming a straight line given by the equation $\theta hg = \alpha hg \times vd + \beta hg'(LA1)$ (where $\alpha hg = -0.00225$) in an orthogonal coordinate system having a horizontal axis representing vd and a vertical axis representing $\theta hg$ that is different from the aforementioned orthogonal coordinate system, the value of $\theta hg$ and the value of vd of at least one negative lens LA1 included in the cemented lens C1 fall within both of the area bounded by the straight line given by the equation into which the lowest value in the range defined by the following conditional expression (1-14) is substituted and the straight line given by the equation into which the highest value in the range defined by the following conditional expression (1-14) is substituted and the area defined by the following conditional expression (1-13):

$$0.4000 < \beta hg'(LA1) < 0.6800 \tag{1-14}$$

$$3 < vd < 30 \tag{1-13}$$

where $\theta hg$ is the relative partial dispersion (nh−ng)/(nF−nC), and nh is the refractive index for the h-line.

If the upper limit of conditional expression (1-14) is exceeded, correction of axial chromatic aberration and chromatic aberration of magnification by secondary spectrum, specifically, correction of axial chromatic aberration and chromatic aberration of magnification with respect to the h-line while achromatism is achieved with respect to the F-line and the C-line will be insufficient at the telephoto end of the image forming optical system. Therefore, purple color flare and color blur will be apt to appear over the entire picture area in images picked up at telephoto focal lengths particularly. If the lower limit of conditional expression (1-14) is exceeded, correction of chromatic aberration of magnification by secondary spectrum, specifically, correction of chromatic aberration of magnification with respect to the h-line while achromatism is achieved with respect to the F-line and the C-line will be insufficient at the wide angle end of the image forming optical system. Therefore, purple color flare and color blur will be apt to appear in the peripheral region of images picked up at wide angle focal lengths.

In the image forming optical system according to this mode, it is also preferred that assuming a straight line given by the equation $\theta gF = \alpha \times vd + \beta'(LB1)$ (where $\alpha = -0.00163$) in an orthogonal coordinate system having a horizontal axis representing vd and a vertical axis representing $\theta gF$, the value of $\theta gF$ and the value of vd of a specific lens fall within both of the area bounded by the straight line given by the equation into which the lowest value in the range defined by the following conditional expression (1-15) is substituted and the straight line given by the equation into which the highest value in the range defined by the following conditional expression (1-15) is substituted and the area defined by the following conditional expression (1-16):

$$0.6200 < \beta'(LB1) < 0.8500 \text{ and}$$

$$\theta gF > 0.5500 \tag{1-15},$$

$$35 < \nu d < 120 \tag{1-16},$$

where the specific lens is at least one positive lens LB1 included in the cemented lens C1 or another positive lens element LO in the lens group G1, θgF is the relative partial dispersion (ng−nF)/(nF−nC), and νd is the Abbe constant (nd−1)/(nF−nC), where nd, nC, nF, and ng are refractive indices for the d-line, C-line, F-line, and g-line respectively. Here, the suffix "LB1" may be replaced by "LO".

If the upper limit of conditional expression (1-15) is exceeded, correction of chromatic aberration of magnification by secondary spectrum, specifically, correction of chromatic aberration of magnification with respect to the g-line while achromatism is achieved with respect to the F-line and the C-line will be insufficient at the wide angle end of the image forming optical system. Therefore, it will be difficult to achieve sharpness in the peripheral region of images picked up at wide angle focal lengths. If the lower limit of conditional expression (1-15) is exceeded, correction of axial chromatic aberration and chromatic aberration of magnification by secondary spectrum, specifically, correction of axial chromatic aberration and chromatic aberration of magnification with respect to the g-line while achromatism is achieved with respect to the F-line and the C-line will be insufficient at the telephoto end of the image forming optical system. Therefore, it will be difficult to achieve sharpness over the entire picture area in images picked up at telephoto focal lengths particularly.

If the upper limit of conditional expression (1-16) is exceeded, effect of correction of five Seidel aberrations will become smaller even if achromatism with respect to F-line and the C-line can be achieved. If the lower limit of conditional expression (1-16) is exceeded, even achromatism with respect to F-line and the C-line will be difficult.

In the image forming optical system according to this mode, it is also preferred that assuming a straight line given by the equation θhg=αhg×νd+βhg'(LB1) (where αhg=−0.00225) in the aforementioned orthogonal coordinate system having a horizontal axis representing νd and a vertical axis representing θhg, the value of θhg and the value of νd of a specific lens fall within both of the area bounded by the straight line given by the equation into which the lowest value in the range defined by the following conditional expression (1-17) is substituted and the straight line given by the equation into which the highest value in the range defined by the following conditional expression (1-17) is substituted and the area defined by the following conditional expression (1-16):

$$0.5400 < \beta hg'(LB1) < 0.8700 \text{ and}$$

$$\theta hg > 0.4500 \tag{1-17},$$

$$35 < \nu d < 120 \tag{1-16},$$

where the specific lens is at least one positive lens LB1 included in the cemented lens C1 or another positive lens element LO in the lens group G1, θhg is the relative partial dispersion (nh−ng)/(nF−nC), and nh is the refractive index for the h-line. Here, the suffix "LB1" may be replaced by "LO".

If the upper limit of conditional expression (1-17) is exceeded, correction of chromatic aberration of magnification by secondary spectrum, specifically, correction of chromatic aberration of magnification with respect to the h-line while achromatism is achieved with respect to the F-line and the C-line will be insufficient at the wide angle end of the image forming optical system. Therefore, purple color flare and color blur will be apt to appear in the peripheral region of images picked up at wide angle focal lengths. If the lower limit of conditional expression (1-17) is exceeded, correction of axial chromatic aberration and chromatic aberration of magnification by secondary spectrum, specifically, correction of axial chromatic aberration and chromatic aberration of magnification with respect to the h-line while achromatism is achieved with respect to the F-line and the C-line will be insufficient at the telephoto end of the image forming optical system. Therefore, purple color flare and color blur will be apt to appear over the entire picture area in images picked up at telephoto focal lengths particularly.

Next, the second lens group G2 will be described. In optical systems that are designed to have a reduced overall length and a wide angle of view, higher order chromatic aberration of magnification with respect to the image height tends to occur at wide angle focal lengths. This is also the case with the image forming optical system according to this mode. In view of this, in the image forming optical system according to this mode, a cemented lens C2 made up of a plurality of lenses that are cemented together is provided in the second lens group G2, and one cemented surface thereof is an aspheric surface. The cemented lens C2 is made up of a positive lens and a negative lens that are cemented together.

In the image forming optical system according to this mode, it is preferred that the Abbe constant of the negative lens in the cemented lens C2 be larger than the Abbe constant of the positive lens in the cemented lens C2, and the following conditional expression (1-18) be satisfied:

$$12 \leq \Delta \nu d(C2) \tag{1-18},$$

where Δνd(C2) is the difference between the Abbe constant of the negative lens in the cemented lens C2 and the Abbe constant of the positive lens in the cemented lens C2.

If the lower limit of conditional expression (1-18) is exceeded, the effect of providing a cemented surface and the effect of making the cemented surface aspheric will become small.

It is preferred that the following conditional expression (1-18') be satisfied instead of the above conditional expression (1-18):

$$17 \leq \Delta \nu d(C2) \tag{1-18'}.$$

It is most preferred that the following conditional expression (1-18") be satisfied instead of the above conditional expression (1-18):

$$22 \leq \Delta \nu d(C2) \tag{1-18"}.$$

In the image forming optical system according to this mode, it is preferred that the positive lens and the negative lens in the cemented lens C2 also satisfy the following conditional expression (1-19):

$$-0.7 \leq \Delta nd(C2) \leq 0.2 \tag{1-19},$$

where Δnd(C2) is the difference between the refractive index of the negative lens in the cemented lens C2 and the refractive index of the positive lens in the cemented lens C2.

If the lower limit of conditional expression (1-19) is exceeded, the Petzval sum will be apt to have a large negative value. If the upper limit of conditional expression (1-19) is exceeded, the use of an aspheric cemented surface intended to correct higher order components of chromatic aberration of magnification and spherochromatism will detrimentally affect correction of other aberrations.

It is preferred that the following conditional expression (1-19') be satisfied instead of the above conditional expression (1-19):

$$-0.6 \leq \Delta nd(C2) \leq 0.1 \qquad (1\text{-}19').$$

It is most preferred that the following conditional expression (1-19") be satisfied instead of the above conditional expression (1-19):

$$-0.5 \leq \Delta nd(C2) \leq 0.0 \qquad (1\text{-}19'').$$

Chromatic aberration of magnification includes, in addition to higher order terms related to the image height, higher order terms related to the wavelength including axial chromatic aberration, namely residual chromatic aberration by secondary spectrum. Since aspheric cemented surface is not effective in correcting residual chromatic aberration by secondary spectrum, an only solution is to change partial dispersion characteristics of the materials of the lenses.

Therefore, in the image forming optical system according to this mode, it is preferred that assuming a straight line given by the equation $\theta gF = \alpha \times vd + \beta'(LA2)$ (where $\alpha = -0.00163$) in an orthogonal coordinate system having a horizontal axis representing vd and a vertical axis representing $\theta gF$, the value of $\theta gF$ and the value of vd of at least one lens LA2 included in the cemented lens C2 fall within both of the area bounded by the straight line given by the equation into which the lowest value in the range defined by the following conditional expression (1-20) is substituted and the straight line given by the equation into which the highest value in the range defined by the following conditional expression (1-20) is substituted and the area defined by the following conditional expression (1-21):

$$0.6400 < \beta'(LA2) < 0.9000 \qquad (1\text{-}20),$$

$$3 < vd < 50 \qquad (1\text{-}21),$$

where $\theta gF$ is the relative partial dispersion $(ng-nF)/(nF-nC)$, and vd is the Abbe constant $(nd-1)/(nF-nC)$, where nd, nC, nF, and ng are refractive indices for the d-line, C-line, F-line, and g-line respectively.

If the upper limit of conditional expression (1-20) is exceeded, correction of chromatic aberration of magnification by secondary spectrum, specifically, correction of chromatic aberration of magnification with respect to the g-line while achromatism is achieved with respect to the F-line and the C-line will be insufficient at the wide angle end of the image forming optical system. Therefore, it will be difficult to achieve sharpness in the peripheral region of images picked up at the wide angle end. If the lower limit of conditional expression (1-20) is exceeded, correction of axial chromatic aberration by secondary spectrum, specifically, correction of axial chromatic aberration with respect to the g-line while achromatism is achieved with respect to the F-line and the C-line will be insufficient at the telephoto end of the image forming optical system. Therefore, it will be difficult to achieve sharpness over the entire picture area in images picked up at telephoto focal lengths particularly.

If the upper limit of conditional expression (1-21) is exceeded, even achromatism with respect to F-line and the C-line will be difficult. If the lower limit of conditional expression (1-21) is exceeded, effect of correction of five Seidel aberrations will become smaller even if achromatism with respect to F-line and the C-line can be achieved.

It is more preferred that the following conditional expression (1-20') be satisfied instead of the above conditional expression (1-20):

$$0.6600 < \beta'(LA2) < 0.9000 \qquad (1\text{-}20').$$

It is still more preferred that the following conditional expression (1-20") be satisfied instead of the above conditional expression (1-20):

$$0.6800 < \beta'(LA2) < 0.7850 \qquad (1\text{-}20'').$$

It is more preferred that the following conditional expression (1-21') be satisfied instead of the above conditional expression (1-21):

$$3 < vd < 30 \qquad (1\text{-}21').$$

It is still more preferred that the following conditional expression (1-21") be satisfied instead of the above conditional expression (1-21):

$$3 < vd < 17.4 \qquad (1\text{-}21'').$$

In the image forming optical system according to this mode, it is also preferred that assuming a straight line given by the equation $\theta hg = \alpha hg \times vd + \beta hg'(LA2)$ (where $\alpha hg = -0.00225$) in the orthogonal coordinate system having a horizontal axis representing vd and a vertical axis representing $\theta hg$, the value of $\theta hg$ and the value of vd of at least one lens LA2 included in the cemented lens C2 fall within both of the area bounded by the straight line given by the equation into which the lowest value in the range defined by the following conditional expression (1-22) is substituted and the straight line given by the equation into which the highest value in the range defined by the following conditional expression (1-22) is substituted and the area defined by the following conditional expression (1-21):

$$0.6200 < \beta hg'(LA2) < 0.9000 \qquad (1\text{-}22),$$

$$3 < vd < 50 \qquad (1\text{-}21),$$

where $\theta hg$ is the relative partial dispersion $(nh-ng)/(nF-nC)$, and nh is the refractive index for the h-line.

If the upper limit of conditional expression (1-22) is exceeded, correction of chromatic aberration of magnification by secondary spectrum, specifically, correction of chromatic aberration of magnification with respect to the h-line while achromatism is achieved with respect to the F-line and the C-line will be insufficient at the wide angle end of the image forming optical system. Therefore, purple color flare and color blur will be apt to appear in the peripheral region of images picked up at the wide angle end. If the lower limit of conditional expression (1-22) is exceeded, correction of axial chromatic aberration by secondary spectrum, specifically, correction of axial chromatic aberration with respect to the h-line while achromatism is achieved with respect to the F-line and the C-line will be insufficient at the telephoto end of the image forming optical system. Therefore, purple color flare and color blur will be apt to appear over the entire picture area in images picked up at telephoto focal lengths particularly.

It is preferred that the lens LA2 be a positive lens. It is preferred that the other lens to which the lens LA is cemented be a negative lens.

It is also preferred that the cemented lenses comprise a first lens having a small center thickness on the optical axis and a second lens. Such cemented lenses include the cemented lens C1 in the first lens group G1, the cemented lens C2 in the second lens group G2, and the cemented lens C3 in the third lens group G3.

If one of the positive lens components in the first lens group G1 is a cemented lens, it is preferred that the first lens be a negative lens, the second lens be a positive lens, and conditional expressions (1-10) to (1-17) be satisfied.

If a cemented lens is provided in the second lens group G2, it is preferred that the first lens be a positive lens, the second lens be a negative lens, and conditional expressions (1-18) to (1-22) be satisfied.

If a cemented lens is provided in the third lens group G3, it is preferred that the cemented lens be made up of three lenses that are cemented together. In addition, it is preferred that the first lens be the center lens element, the second lens be one of the lenses on both sides, and the first lens satisfy the conditional expression (1-8) and (1-9). If the above is the case, improvement in the effect of correction of aberrations (chromatic aberration in particular) and further slimming of the lens group can be expected.

It is also preferred that the cemented lens C1, C2, C3 consist of a compound lens. The compound lens can be made by closely attaching a resin on a surface of the second lens and curing it to form the first lens. Use of a compound lens as the cemented lens can improve manufacturing precision. One method of manufacturing compound lenses is molding. In a molding composition, a first lens material (e.g. energy curable transparent resin) of the first lens is brought into contact with the second lens to directly attach the first lens material to the second lens. This composition is very effective in making the lens element thin and in producing aspheric cemented surface. An example of the energy curable transparent resin is an ultraviolet curable resin. Surface processing such as coating may be applied on the second lens in advance.

When a compound lens is produced as the cemented lens, a glass may be attached to a surface of the second lens and hardened to form the first lens. Glasses are advantageous over resins in terms of resistance properties such as light resistance and resistance to chemicals. In this case, it is necessary for the material of the first lens, characteristically, has a melting point and a transition point that are lower than those of the material of the second lens. One method of manufacturing compound lenses is molding. In a molding composition, a first lens material is brought into contact with the second lens to directly attach the first lens material to the second lens. This composition is very effective in making the lens element thin. Surface processing such as coating may be applied on the second lens in advance.

The image forming optical system according to this mode will be described taking a zoom optical system as an example. The zoom optical system of this mode consists of five lens groups including, in order from the object side, a positive first lens group G1, a negative second lens group G2, a positive third lens group G3, a positive fourth lens group G4, and a negative lens group G5. The negative second lens group G2, the positive third lens group G3, the positive fourth lens group G4 are adapted to move during zooming while changing the distances therebetween. An aperture stop is located between the negative second lens group G2 and the positive third lens group G3 with its distance from the image plane being kept substantially constant. Alternatively, the positive third lens group G3 may move integrally with the positive third lens group G3.

The positive first lens group G1 has one of the following configurations, wherein the components are arranged in order from the object side:

one negative lens component, a prism, and one or two positive lens components;

a prism having a concave entrance surface and one or two positive lens components;

one negative lens component, a prism having a convex exit surface, and one positive lens component;

one negative lens component, a prism having a concave entrance surface, and two lens components.

It is preferred that one or some of the positive lens components mentioned above be a cemented lens component(s) satisfying conditional expressions (1-10) to (1-17).

The negative second lens group G2 includes one lens component. This lens component may consist of a cemented lens made up of a positive lens and a negative lens. It is preferred that it satisfy conditional expressions (1-18) to (1-22).

The positive third lens group G3 includes a positive lens component located closest to the object side and a negative lens component located closest to the image side. The surface closest to the image side in the positive third lens group G3 is a concave surface. It is preferred that the negative lens component, in particular, be composed of a plurality of lenses that are cemented together. If this is the case, it is preferred that the lens element located closest to object side be a positive lens, and the lens element located closest to the image side be a negative lens. It is also preferred that the negative lens component be a cemented lens component made up of three lens elements. The positive third lens group G3 may consist only of two lens components including, in order from the object side, a positive lens component and a negative lens component. In addition, it is preferred that the center lens element in the negative lens component satisfy conditional expressions (1-8) and (1-9). The lens element located closest to the image side in the negative lens component may satisfy conditional expressions (1-8) and (1-9).

The positive fourth lens group G4 includes one lens component. The positive fourth lens group G4 can move for focusing. The one lens component may be a single lens.

The positive fifth lens component G5 includes one lens component. The one lens component may be composed of a positive lens and a negative lens that are cemented together. It is preferred that the negative lens and the positive lens thus cemented are arranged in this order from the object side.

As described before, if distortion generated in the image forming optical system is corrected by an image processing function of an electronic image pickup apparatus, other aberrations can also be corrected excellently.

It is assumed that the electronic image pickup apparatus is equipped with the above-described image pickup optical system, an electronic image pickup element, and an image processing unit. The image processing unit can process image data and output image data representing an image having a changed shape. An image of an object is picked up using such an electronic image pickup apparatus. The image data obtained by the image pickup is color-separated by the image processing unit into image data of respective colors. Then, the shape (the size of the object image) is changed in each image data, and thereafter image data of respective colors are combined. By this process, deterioration in sharpness in the peripheral region of the image due to chromatic aberration of magnification and color blur can be prevented. This method is effective particularly for electronic image pickup apparatuses having an electronic image pickup element provided with a mosaic filter for color separation. In the case of an electronic image pickup apparatus having a plurality of image pickup elements (for respective colors), it is not necessary to perform color separation for the obtained image data.

When the image forming optical system according to this mode satisfies the above described conditional expressions or has the above described configurational features individually, size reduction and slimming of the image forming optical system can both be achieved, and in addition good correction of aberrations can be achieved. The image forming optical system according to this mode may be provided with (or satisfy) the above-described conditional expression and configurational features in combination. If this is the case, further size reduction and slimming of the image forming optical system or better aberration correction or wider angle of view can be achieved. In the electronic image pickup apparatus equipped with the image forming optical system according to this mode, sharpness and prevention of color blur in picked up images can be achieved by virtue of the above-described image forming optical system.

Prior to the description of embodiments, operations and effects of an image forming optical system according to another mode will be described. In the following description, "a positive lens (or a lens having a positive refracting power)" and "a negative lens (or a lens having a negative refracting power)" will refer to lenses having paraxial focal lengths of positive and negative values respectively.

The image forming optical system according to this mode is an image forming optical system comprising a first lens group G1 having a positive refracting power, wherein the first lens group G1 including a reflecting optical element and a lens component C1$p$ disposed on the image side of the reflecting optical element and having a positive refracting power, the lens component C1$p$ is made up of a negative lens LA and a positive lens LB that are cemented together, the cemented surface thereof is aspheric, and the following conditional expression (2-1) is satisfied:

$$0.40 < E/f12 < 2.0 \qquad (2\text{-}1),$$

where E is the equivalent air distance between a vertex Ct1 and a vertex Ct2 along the optical axis, the vertex Ct1 is the vertex of the surface having the highest negative refracting power among the refractive surfaces located closer to the object side than the reflecting surface of the reflecting optical element, the vertex Ct2 is the vertex of the cemented surface of the lens component C1$p$, and f12 is the combined focal length of all the lenses, among the lenses constituting the first lens group G1, that are located closer to the image side than the reflecting optical element. If the reflecting optical element has an exit surface having a refracting power, this exit surface is taken into account for the combined focal length.

If the upper limit of conditional expression (2-1) is exceeded, slimming of the image forming optical system and reduction of the overall length of the image forming optical system will tend to become difficult. If the lower limit of conditional expression (2-1) is exceeded, a large mechanical vignetting will occur in regard to rays (beams) that contribute to imaging, and a sufficient light quantity is not achieved in the peripheral region of the picture area.

It is more preferred that the following conditional expression (2-1') be satisfied instead of the above conditional expression (2-1):

$$0.45 < E/f12 < 1.7 \qquad (2\text{-}1').$$

It is most preferred that the following conditional expression (2-1'') be satisfied instead of the above conditional expression (2-1):

$$0.50 < E/f12 < 1.5 \qquad (2\text{-}1'').$$

In the image forming optical system according to this mode, it is preferred that the material of the negative lens LA be an energy curable resin. In addition, it is preferred that the lens component C1$p$ be produced by forming the negative lens LA directly on the positive lens LB.

As described above, the cemented surface of the lens component C1$p$ is an aspheric surface. The lens component C1$p$ as such can be produced by attaching a resin to an aspheric surface of the positive lens LB and then curing the resin. In this case, the resin constitutes the negative lens LA. As the resin, an energy curable transparent resin may be used, for example. It is preferred that the resin used have high dispersion optical characteristics, particularly. Attaching and thereafter curing a resin in this way is very effective method in making a lens element thin.

An example of the energy curable transparent resin is an ultraviolet curable resin. A surface processing (e.g. coating, application etc.) may be performed on the surface of the positive lens LB in advance. The material used in the surface processing is different from the material of which the positive lens LB is made.

The positive lens LB may be made of an inorganic material such as a glass. Nevertheless, since the negative lens LA is made of a resin, it is more preferred that the positive lens LB be made of a resin-based material as with the negative lens LA in view of the stability of optical performance against environmental changes.

As another composition of the lens component C1$p$, an optical material other than resins may be attached to a surface of the positive lent LB and thereafter cured. In this case, this optical material constitutes the negative lens LA. When attached, the optical material has a temperature higher than the transition point. It is preferred that the optical material be a material, that is advantageous in terms of resistance properties such as light resistance and resistance to chemicals, such as a glass. It is necessary for the material for the negative lens LA to have a melting point and transition point that are lower than those of the material for the positive lens LB. Attaching and thereafter curing an optical material in this way is very effective method in making a lens element thin.

In this method also, a surface processing (e.g. coating, application etc.) may be performed on the positive lens LB in advance. The material used for the surface processing is different from the material of which the positive lens LB is made.

In the image forming optical system according to this mode, a mirror or a prism may be used as the reflecting optical element. In this connection, the prism is advantageous over the mirror in reducing the size of the optical system. Therefore, it is preferred that a prism be used as the reflecting optical element. A prism made of a material having a higher refractive index is more preferable. In particular, it is preferred that the prism have a refractive index of 1.8 or higher.

In the image forming optical system according to this mode, it is preferred that the following conditional expression (2-2) be satisfied:

$$1.60 nd(LB) < 2.4 \qquad (2\text{-}2),$$

where nd(LB) is the refractive index of the positive lens LB for the d-line.

If the lower limit of conditional expression (2-2) is exceeded, reduction of the size of the image forming optical system will tend to become difficult. On the other hand, if the upper limit of conditional expression (2-2) is exceeded, it will be difficult prevent reflection on the refractive surface.

It is more preferred that the following conditional expression (2-2') be satisfied instead of the above conditional expression (2-2):

$$1.65 nd(LB) < 2.3 \qquad (2\text{-}2').$$

It is most preferred that the following conditional expression (2-2'') be satisfied instead of the above conditional expression (2-2):

$$1.69 nd(LB) < 2.2 \qquad (2\text{-}2'').$$

In the image forming optical system according to this mode, it is preferred that the following conditional expression (2-3) be satisfied:

$$3 < vd(LA) < 35 \quad (2\text{-}3)$$

where vd(LA) is the Abbe constant of the negative lens LA for the d-line.

If the lower limit of conditional expression (2-3) is exceeded, variations in chromatic aberration caused by surface precision errors and/or decentering cannot be neglected. In addition, manufacturing will tend to become difficult. On the other hand, if the upper limit of conditional expression (2-3) is exceeded, achromatism with respect to C-line and the F-line will become difficult.

It is more preferred that the following conditional expression (2-3') be satisfied instead of the above conditional expression (2-3):

$$6 < vd(LA) < 30 \quad (2\text{-}3')$$

It is most preferred that the following conditional expression (2-3") be satisfied instead of the above conditional expression (2-3):

$$10 < vd(LA) < 25 \quad (2\text{-}3'')$$

In the image forming optical system according to this mode, the lens group located closest to the object side, namely the first lens group G1 has a positive refracting power. To reduce the overall length of the image forming optical system having this configuration, it is necessary that the refracting power of the first lens group G1, in particular the refracting power of the lens component C1P be increased. To increase the refracting power of the lens component C1p, the refracting power of the positive lens LB is to be increased. Therefore, it is preferred that an optical material having a high refractive index that satisfies at least one of conditional expressions (2-2), (2-2'), and (2-2") be used for the positive lens LB.

However, increasing the refracting power of the positive lens LB tends to lead to insufficient correction of axial chromatic aberration in the short wavelength range and spherical aberration in the short wavelength range caused by the positive lens LB. In view of this, the negative lens LA having a high dispersion that satisfies at least one of conditional expressions (2-3), (2-3'), and (2-3") is used in the lens component C1p. The negative lens LA is cemented to the positive lens LB to form the lens component C1p, by which axial chromatic aberration in the short wavelength range is corrected.

In the image forming optical system according to this mode, if the shape of an aspheric surface is expressed by the following equation (2-4) with a coordinate axis z taken along the optical axis and a coordinate axis h taken along a direction perpendicular to the optical axis:

$$z = h^2/R[1+\{1-(1+K)h^2/R^2\}^{1/2}] + A_4 h^4 + A_6 h^6 + A_8 h^8 + A_{10} h^{10} + \ldots \quad (2\text{-}4)$$

where R is the radius of curvature of a spherical component on the optical axis, k is a conic constant, $A_4, A_6, A_8, A_{10}, \ldots$ are aspheric coefficients, and the deviation is expressed by the following equation (2-5):

$$\Delta z = z - h^2/R[1+\{1-h^2/R^2\}^{1/2}] \quad (2\text{-}5)$$

then it is preferred that the following conditional expression (2-6a) or (2-6b) be satisfied:
when $R_c \leq 0$, $$\Delta z_C(h) < (\Delta z_A(h) + \Delta z_B(h))/2 \text{ (where } h=2.5a) \quad (2\text{-}6a),$$

when $R_c \geq 0$, $$\Delta z_C(h) > (\Delta z_A(h) + \Delta z_B(h))/2 \text{ (where } h=2.5a) \quad (2\text{-}6b),$$

where $z_A$ expresses the shape of the air contact surface of the negative lens LA according to equation (2-4), $z_B$ expresses the shape of the air contact surface of the positive lens LB according to equation (2-4), $z_C$ expresses the shape of the cemented surface according to equation (2-4), $\Delta z_A$ is the deviation of the air contact surface of the negative lens LA according to equation (2-5), $\Delta z_B$ is the deviation of the air contact surface of the positive lens LB according to equation (2-5), $\Delta z_C$ is the deviation of the cemented surface according to equation (2-5), $R_c$ is the paraxial radius of curvature of the cemented surface, and a is a value expressed by the following equation (2-7):

$$a = (y_{10})^2 \cdot \log_{10} \gamma / f w \quad (2\text{-}7),$$

where $y_{10}$ is the maximum image height, fw is the focal length of the entire image forming optical system at the wide angle end, and γ is the zoom ratio (i.e. {the focal length of the entire system at the telephoto end}/{the focal length of the entire system at the wide angle end}) of the image forming optical system. Since the point of origin is set at the vertex of each surface, z(0)=0 holds in all the surfaces.

If conditional expression (2-6a) or (2-6b) is not satisfied, sufficient correction of spherical aberration cannot be achieved in the short wavelength range.

As to axial chromatic aberration and chromatic aberration of magnification, it is not sufficient to achieve achromatism only for the C-line and the F-line. It is also required to achieve achromatism also for the g-line and the h-line. If correction of chromatic aberration with respect to the g-line and the h-line is not sufficient, sharpness and contrast of images will be deteriorated. In addition, in the case of images including a portion having a large brightness difference (i.e. edge portion), color blur will be apt to occur in the vicinity of this portion.

In view of this, in the image forming optical system according to this mode, it is preferred that assuming a straight line given by the equation $\theta gF = \alpha \times vd + \beta'$ (where $\alpha = -0.00163$) in an orthogonal coordinate system having a horizontal axis representing vd and a vertical axis representing θgF, the value of θgF and the value of vd of at least one negative lens LA included in the lens component C1p fall within both of the area bounded by the straight line given by the equation into which the lowest value in the range defined by the following conditional expression (2-8) is substituted and the straight line given by the equation into which the highest value in the range defined by the following conditional expression (2-8) is substituted and the area defined by conditional expression (2-3) presented above:

$$0.5000 < \beta' < 0.7250 \quad (2\text{-}8),$$

where θgF is the relative partial dispersion (ng−nF)/(nF−nC), and vd is the Abbe constant (nd−1)/(nF−nC), where nd, nC, nF, and ng are refractive indices for the d-line, C-line, F-line, and g-line respectively.

If the upper limit of conditional expression (2-8) is exceeded, correction of axial chromatic aberration by secondary spectrum, specifically, correction of axial chromatic aberration with respect to the g-line while achromatism is achieved with respect to the F-line and the C-line will be insufficient. Therefore, it will be difficult to achieve sharpness over the entire picture area in images picked up at telephoto focal lengths particularly. If the lower limit of conditional expression (2-8) is exceeded, correction of chromatic aberration of magnification by secondary spectrum, specifically, correction of chromatic aberration of magnification with respect to the g-line while achromatism is achieved with respect to the F-line and the C-line will be insufficient. Therefore, it will be difficult to achieve sharpness in the peripheral region of picked-up images.

It is more preferred that the following conditional expression (2-8') be satisfied instead of the above conditional expression (2-8):

$$0.5900 < \beta' < 0.6600 \tag{2-8'}$$

It is still more preferred that the following conditional expression (2-8") be satisfied instead of the above conditional expression (2-8):

$$0.6100 < \beta' < 0.6600 \tag{2-8''}$$

In the image forming optical system according to this mode, it is also preferred that assuming a straight line given by the equation $\theta hg = \alpha hg \times vd + \beta hg'$ (where $\alpha hg = -0.00225$) in an orthogonal coordinate system having a horizontal axis representing vd and a vertical axis representing $\theta hg$ that is different from the aforementioned orthogonal coordinate system, the value of $\theta hg$ and the value of vd of at least one negative lens LA included in the lens component C1p fall within both of the area bounded by the straight line given by the equation into which the lowest value in the range defined by the following conditional expression (2-9) is substituted and the straight line given by the equation into which the highest value in the range defined by the following conditional expression (2-9) is substituted and the area defined by conditional expression (2-3) presented above:

$$0.4000 < \beta hg' < 0.7000 \tag{2-9}$$

where $\theta hg$ is the relative partial dispersion $(nh-ng)/(nF-nC)$, and nh is the refractive index for the h-line.

If the upper limit of conditional expression (2-9) is exceeded, correction of axial chromatic aberration by secondary spectrum, specifically, correction of axial chromatic aberration with respect to the h-line while achromatism is achieved with respect to the F-line and the C-line will be insufficient. Therefore, purple color flare and color blur will be apt to appear over the entire picture area in images picked up at telephoto focal lengths particularly. If the lower limit of conditional expression (2-9) is exceeded, correction of chromatic aberration of magnification by secondary spectrum, specifically, correction of chromatic aberration of magnification with respect to the h-line while achromatism is achieved with respect to the F-line and the C-line will be insufficient. Therefore, purple color flare and color blur will be apt to appear in the peripheral region of picked-up images.

It is more preferred that the following conditional expression (2-9') be satisfied instead of the above conditional expression (2-9):

$$0.4500 < \beta hg' < 0.6400 \tag{2-9'}$$

It is still more preferred that the following conditional expression (2-9") be satisfied instead of the above conditional expression (2-9):

$$0.5200 < \beta hg' < 0.5850 \tag{2-9''}$$

In the image forming optical system according to this mode, it is also preferred that assuming a straight line given by the equation $\theta gF = \alpha \times vd + \beta'$ (where $\alpha = -0.00163$) in the aforementioned orthogonal coordinate system having a horizontal axis representing vd and a vertical axis representing $\theta gF$, the value of $\theta gF$ and the value of vd of a specific lens fall within both of the area bounded by the straight line given by the equation into which the lowest value in the range defined by the following conditional expression (2-10) is substituted and the straight line given by the equation into which the highest value in the range defined by the following conditional expression (2-10) is substituted and the area defined by the following conditional expression (2-11):

$$0.6100 < \beta' < 0.9000 \tag{2-10}$$

$$27 < vd < 65 \tag{2-11}$$

where the specific lens is at least one positive lens LB included in the lens component C1p or another positive lens element in the lens group G1, $\theta gF$ is the relative partial dispersion $(ng-nF)/(nF-nC)$, and vd is the Abbe constant $(nd-1)/(nF-nC)$, where nd, nC, nF, and ng are refractive indices for the d-line, C-line, F-line, and g-line respectively.

If the upper limit of conditional expression (2-10) is exceeded, correction of chromatic aberration of magnification by secondary spectrum, specifically, correction of chromatic aberration of magnification with respect to the g-line while achromatism is achieved with respect to the F-line and the C-line will be insufficient. Therefore, it will be difficult to achieve sharpness in the peripheral region of picked-up images. If the lower limit of conditional expression (2-10) is exceeded, correction of axial chromatic aberration by secondary spectrum, specifically, correction of axial chromatic aberration with respect to the g-line while achromatism is achieved with respect to the F-line and the C-line will be insufficient. Therefore, it will be difficult to achieve sharpness over the entire picture area in images picked up at telephoto focal lengths particularly.

If the upper limit of conditional expression (2-11) is exceeded, effect of correction of five Seidel aberrations will become smaller even if achromatism with respect to F-line and the C-line can be achieved. If the lower limit of conditional expression (2-11) is exceeded, even achromatism with respect to F-line and the C-line will be difficult.

It is more preferred that the following conditional expression (2-10') be satisfied instead of the above conditional expression (2-10):

$$0.6200 < \beta' < 0.8500 \tag{2-10'}$$

It is still more preferred that the following conditional expression (2-10") be satisfied instead of the above conditional expression (2-10):

$$0.6250 < \beta' < 0.8000 \tag{2-10''}$$

It is more preferred that the following conditional expression (2-11') be satisfied instead of the above conditional expression (2-11):

$$30 < vd < 60 \tag{2-11'}$$

It is still more preferred that the following conditional expression (2-11") be satisfied instead of the above conditional expression (2-11):

$$35 < vd < 55 \tag{2-11''}$$

In the image forming optical system according to this mode, it is also preferred that assuming a straight line given by the equation $\theta hg = \alpha hg \times vd + \beta hg'$ (where $\alpha hg = -0.00225$) in the aforementioned orthogonal coordinate system having a horizontal axis representing vd and a vertical axis representing $\theta hg$, the value of $\theta hg$ and the value of vd of a specific lens fall within both of the area bounded by the straight line given by the equation into which the lowest value in the range defined by the following conditional expression (2-12) is substituted and the straight line given by the equation into which the highest value in the range defined by the following conditional expression (2-12) is substituted and the area defined by the following conditional expression (2-11):

$$0.5000 < \beta hg' < 0.9000 \quad (2\text{-}12),$$

$$27 < \nu d < 65 \quad (2\text{-}11),$$

where the specific lens is at least one positive lens LB included in the lens component C1p or another positive lens element in the lens group G1, θhg is the relative partial dispersion (nh−ng)/(nF−nC), and nh is the refractive index for the h-line.

If the upper limit of conditional expression (2-12) is exceeded, correction of chromatic aberration of magnification by secondary spectrum, specifically, correction of chromatic aberration of magnification with respect to the h-line while achromatism is achieved with respect to the F-line and the C-line will be insufficient. Therefore, purple color flare and color blur will be apt to appear in the peripheral region of picked-up images. If the lower limit of conditional expression (2-12) is exceeded, correction of axial chromatic aberration by secondary spectrum, specifically, correction of axial chromatic aberration with respect to the h-line while achromatism is achieved with respect to the F-line and the C-line will be insufficient. Therefore, purple color flare and color blur will be apt to appear over the entire picture area in images picked up at telephoto focal lengths particularly.

It is more preferred that the following conditional expression (2-12') be satisfied instead of the above conditional expression (2-12):

$$0.5500 < \beta hg' < 0.8700 \quad (2\text{-}12').$$

It is still more preferred that the following conditional expression (2-12") be satisfied instead of the above conditional expression (2-12):

$$0.5600 < \beta hg' < 0.8500 \quad (2\text{-}12'').$$

In the image forming optical system according to this mode, it is also preferred that the following conditional expression (2-13) be satisfied:

$$-0.06 \leq \theta gF(LA) - \theta gF(LB) \leq 0.18 \quad (2\text{-}13),$$

where θgF(LA) is the relative partial dispersion (ng−nF)/(nF−nC) of the negative lens LA, and θgF(LB) is the relative partial dispersion (ng−nF)/(nF−nC) of the positive lens LB.

In this case, since a negative lens (i.e. negative lens LA) and a positive lens (i.e. positive lens LB) are used in combination, good correction of chromatic aberration can be achieved. In particular, if the above condition is satisfied in this combination, the correction effect for secondary spectrum (chromatic aberration) will be large. In consequence, sharpness of picked-up images will be improved.

It is more preferred that the following conditional expression (2-13') be satisfied instead of the above conditional expression (2-13):

$$-0.03 \leq \theta gF(LA) - \theta gF(LB) \leq 0.14 \quad (2\text{-}13').$$

It is most preferred that the following conditional expression (2-13") be satisfied instead of the above conditional expression (2-13):

$$0.00 \leq \theta gF(LA) - \theta gF(LB) \leq 0.10 \quad (2\text{-}13'').$$

In the image forming optical system according to this mode, it is also preferred that the following conditional expression (2-13) be satisfied:

$$-0.10 \leq \theta hg(LA) - \theta hg(LB) \leq 0.24 \quad (2\text{-}14),$$

where θhg(LA) is the relative partial dispersion (nh−ng)/(nF−nC) of the negative lens LA, and θhg (LB) is the relative partial dispersion (nh−ng)/(nF−nC) of the positive lens LB.

In this case, since a negative lens (i.e. negative lens LA) and a positive lens (i.e. positive lens LB) are used in combination, good correction of chromatic aberration can be achieved. In particular, if the above condition is satisfied in this combination, the color flare and color blur can be decreased in picked-up images.

It is more preferred that the following conditional expression (2-14') be satisfied instead of the above conditional expression (2-14):

$$-0.05 \leq \theta hg(LA) - \theta hg(LB) \leq 0.19 \quad (2\text{-}14').$$

It is most preferred that the following conditional expression (2-14") be satisfied instead of the above conditional expression (2-14):

$$0.00 \leq \theta hg(LA) - \theta hg(LB) \leq 0.14 \quad (2\text{-}14'').$$

In the image pickup apparatus according to this mode, it is preferred that the following conditional expression (2-15) be satisfied:

$$\nu d(LA) - \nu d(LB) \leq -5 \quad (2\text{-}15),$$

where νd(LA) is the Abbe constant (nd−1)/(nF−nC) of the negative lens LA, and νd(LB) is the Abbe constant (nd−1)/(nF−nC) of the positive lens LB.

In this case, since a negative lens (i.e. negative lens LA) and a positive lens (i.e. positive lens LB) are used in combination, good correction of chromatic aberration can be achieved. In particular, if the above condition is satisfied in this combination, achromatism for axial chromatic aberration and chromatic aberration of magnification with respect to the C-line and the F-line can easily be achieved.

It is more preferred that the following conditional expression (2-15') be satisfied instead of the above conditional expression (2-15):

$$\nu d(LA) - \nu d(LB) \leq -10 \quad (2\text{-}15').$$

It is most preferred that the following conditional expression (2-15") be satisfied instead of the above conditional expression (2-15):

$$\nu d(LA) - \nu d(LB) \leq -15 \quad (2\text{-}15'').$$

If the lens component C1p consists of three or more lenses, the negative lens having the smallest relative partial dispersion θgF among the negative lenses is regarded as the negative lens LA, and the positive lens having the largest relative partial dispersion θgF among the positive lenses is regarded as the positive lens LB.

The "lens materials" refer to the materials of lenses, such as glasses and resins. In cemented lenses (including the lens component C1p), lenses made of materials appropriately selected from such lens materials are used.

Next, a image forming optical system according to this mode will be described.

The image forming optical system according to this mode consists of five or six lens groups. The refracting power arrangements in image forming optical systems consisting of five or six lens groups in which the lens group G1 closest to the object side has a positive refracting power include the following three cases: positive-negative-(positive)-positive-negative-positive, positive-negative-(positive)-positive-positive, and positive-negative-(positive)-positive-positive-negative.

Optical systems consisting of six lens groups have the parenthesized lens group "(positive)", and optical systems consisting of five lens groups do not have the parenthesized lens group "(positive)". An aperture stop is disposed in any one of the air gaps between the image side surface of the second lens group counted from the object side and the object side surface of the fourth lens group counted from the object side. The aperture stop is independent from the lens groups in some cases and not independent from the lens groups in other cases.

It can be said that the image forming optical system according to this mode has, as the basic structure, a positive-negative-positive-positive refracting power arrangement or a positive-negative-positive-negative refracting power arrangement. For example, an image forming optical system consisting of five lens groups can be regarded as a modification of an image forming optical system consisting of four lens groups having a positive-negative-positive-positive or positive-negative-positive-negative configuration. Specifically, it can be regarded as an optical system in which a positive or negative lens group is added on the image side of an image forming optical system consisting of four lens groups with a positive-negative-positive-positive configuration or a positive lens group is added on the image side of an image forming optical system consisting of four lens groups with a positive-negative-positive-negative configuration. Furthermore, an image forming optical system consisting of six lens groups can be regarded as an optical system in which a positive lens group is added between the first negative lens group and the second positive lens group counted from the object side in an image forming optical system consisting of five lens groups.

In the case of the base configuration having a positive-negative-positive-positive refracting power arrangement, a first lens group G1 having a positive refracting power is disposed closest to the object side. In this configuration, the lens component C1$p$ is provided in the first lens group G1. In addition, conditional expression (2-1), (2-1'), or (2-1") is satisfied.

A negative lens LA is used in this lens component C1$p$. The negative lens LA is a lens having a relative partial dispersion θgF and an Abbe constant νd that fall within both the area bounded by the straight line given by the equation into which the lowest value in the range defined by conditional expression (2-8) is substituted and the straight line given by the equation into which the highest value in the range defined by conditional expression (2-8) is substituted and the area defined by conditional expression (2-3). The negative lens LA may be a lens having a relative partial dispersion θgF and an Abbe constant νd that fall within the area defined by conditional expression (2-3') and conditional expression (2-8') or within the area defined by conditional expression (2-3") and conditional expression (2-8").

In the lens component C1$p$, the positive lens LB is cemented to the negative lens LA. The positive lens LB is a lens that satisfies conditional expression (2-2), (2-2'), or (2-2").

It is preferred that the lens component C1$p$ has a positive refracting power. It is also preferred that each of the surfaces (air contact surfaces and cemented surface) of the lens component C1$p$ satisfy conditional expression (2-6a) or (2-6b).

A reflecting optical element is provided along the optical axis on the object side of the lens component C1$p$. It is preferred that this reflecting optical element be a prism that has, in order from the object side, an entrance surface, a reflecting surface, and an exit surface. It is preferred that a surface having a negative refracting power be provided immediately on the object side of the entrance surface of the prism. Alternatively, the entrance surface of the prism itself may have a negative refracting power. If this is the case, the surface having a negative refracting power need not be provided on the object side of the entrance surface of the prism. It is also preferred that at least one of the entrance surface and the exit surface of the prism be a planar surface.

It is also preferred that the image forming optical system according to this mode have a second lens group G2 having a negative refracting power that can move during zooming, and the following conditional expression (2-16) be satisfied:

$$-1.2 < \beta_{2w} < -0.3 \tag{2-16},$$

where $\beta_{2w}$ is the imaging magnification of the second lens group G2 in a state in which the image forming optical system is focused on a certain object point for which the absolute value of the imaging magnification of the entire image forming optical system is equal to or lower than 0.01, at the wide angle end. The second lens group G2 is the second lens group counted from the object side.

If the lower limit of conditional expression (2-16) is exceeded, it will be difficult to enhance the magnification changing efficiency even if a lens group other than the second lens group G2 is adapted to contribute to the magnification change. Consequently, it will be difficult to achieve size reduction of the optical system. If the upper limit of conditional expression (2-16) is exceeded, the magnification changing efficiency with respect to the movement of the second lens group G2 itself will be deteriorated. In this case also, it will be difficult to achieve size reduction of the optical system. Here, the magnification changing efficiency is represented by the ratio of the amount of movement of a lens group and the magnification change. For example, if a large magnification change is caused by a small amount of movement of a lens group, the magnification changing efficiency is high.

It is more preferred that the following conditional expression (2-16') be satisfied instead of the above conditional expression (2-16):

$$-1.1 < \beta_{2w} < -0.4 \tag{2-16'}.$$

It is most preferred that the following conditional expression (2-16") be satisfied instead of the above conditional expression (2-16):

$$-1.0 < \beta_{2w} < -0.5 \tag{2-16"}.$$

The image forming optical system according to this mode has a third lens group G3 having a positive refracting power and a fourth lens group G4 having a positive refracting power that are arranged subsequent to the second lens group G2, and it is preferred that the following conditional expression (2-17) be satisfied:

$$-1.8 < \beta_{34w} < -0.3 \tag{2-17},$$

where $\beta_{34w}$ is the imaging magnification of the combined system composed of the third lens group G3 and the fourth lens group G4 in a state in which the image forming optical system is focused on a certain object point for which the absolute value of the imaging magnification of the entire image forming optical system is equal to or lower than 0.01, at the wide angle end.

In the image forming optical system consisting of five lens groups, the third lens group G3 is the third lens group counted from the object side. The third lens group G3 is the second positive lens group counted from the object side among the positive lens groups. The fourth lens group G4 is the fourth lens group counted from the object side. The fourth lens group G4 is the third positive lens group counted from the object side among the positive lens groups.

If the lower limit of conditional expression (2-17) is exceeded, it will be difficult to enhance the magnification changing efficiency even if the second lens group G2 is adapted to contribute to the magnification changing effect. Consequently, it will be difficult to achieve size reduction of the optical system. If the upper limit of conditional expression (2-17) is exceeded, the magnification changing efficiency with respect to the movement of the third lens group G3 and the fourth lens group G4 themselves will be deteriorated. In this case also, it will be difficult to achieve size reduction of the optical system.

It is more preferred that the following conditional expression (2-17') be satisfied instead of the above conditional expression (2-17):

$$-1.8 < \beta_{34w}' < -0.4 \quad (2\text{-}17').$$

It is most preferred that the following conditional expression (2-17") be satisfied instead of the above conditional expression (2-17):

$$-1.8 < \beta_{34w}' < -0.5 \quad (2\text{-}17'').$$

Another lens group G31 having a positive refracting power may be provided between the second lens group G2 and the third lens group G3. Thus, the image forming optical system can be modified into an optical system consisting of six lens groups. When having this configuration, it is preferred that the image forming optical system according to this mode satisfy the following conditional expression (2-17-1):

$$-1.8 < \beta_{34w}' < -0.3 \quad (2\text{-}17\text{-}1),$$

where $\beta_{34w}'$ is the imaging magnification of the combined system composed of the another lens group G31, the third lens group G3, and the fourth lens group G4 in a state in which the image forming optical system is focused on a certain object point for which the absolute value of the imaging magnification of the entire image forming optical system is equal to or lower than 0.01, at the wide angle end.

It is more preferred that the following conditional expression (2-17'-1) be satisfied instead of the above conditional expression (2-17-1):

$$-1.8 < \beta_{34w}' < -0.4 \quad (2\text{-}17'\text{-}1).$$

It is most preferred that the following conditional expression (2-17"-2) be satisfied instead of the above conditional expression (2-17-1):

$$-1.8 < \beta_{34w}' < -0.5 \quad (2\text{-}17''\text{-}2).$$

The image forming optical system according to this mode has a fifth lens group G5 arranged closest to the image side. The fifth lens group G5 consists only of a lens component that is at a substantially constant distance from the image plane during zooming. During zooming, the relative distance between the fifth lens group G5 and the lens group adjacent to the fifth lens group G5 changes. When having this configuration, it is preferred that the image forming optical system according to this mode satisfy the following conditional expression (2-18):

$$0.95 < \beta_{5w} < 2.5 \quad (2\text{-}18),$$

where $\beta_{5w}$ is the imaging magnification of the fifth lens group G5 in a state in which the image forming optical system is focused on a certain object point for which the absolute value of the imaging magnification of the entire image forming optical system is equal to or lower than 0.01, at the wide angle end.

If the fifth lens group G5 has a negative refracting power (while the magnification of the lens group itself is large), it will be easy to achieve size reduction of the optical system. On the other hand, if the fifth lens group G5 has a positive refracting power (while the magnification of the lens group itself is small), it will be easy to correct aberrations. Therefore, the refracting power of the fifth lens group G5 may be either positive or negative.

If the lower limit of conditional expression (2-18) is exceeded, it will be difficult to achieve a high magnification, a wide angle of view, and a large diameter together while reducing the overall length. If the upper limit of conditional expression (2-18) is exceeded, the Petzval sum will have a large negative value, resulting in strong curvature of field.

It is more preferred that the following conditional expression (2-18') be satisfied instead of the above conditional expression (2-18):

$$1.00 < \beta_{5w} < 2.2 \quad (2\text{-}18').$$

It is most preferred that the following conditional expression (2-18") be satisfied instead of the above conditional expression (2-18):

$$1.05 < \beta_{5w} < 2.0 \quad (2\text{-}18'').$$

In the image forming optical system according to this mode, the fifth lens group G5 may include one convex lens and one concave lens. When having this configuration, it is preferred that the image forming optical system according to this mode satisfy the following conditional expression (2-19):

$$0.35 < N_{5n} - N_{5p} < 0.95 \quad (2\text{-}19),$$

where $N_{5p}$ is the refractive index of the material of which the convex lens in the fifth lens group G5 is made for the d-line, and $N_{5n}$ is the refractive index of the material of which the concave lens in the fifth lens group G5 is made for the d-line.

If the lower limit of conditional expression (2-19) is exceeded, the Petzval sum will be apt to have a large negative value, resulting in insufficient correction of curvature of field or astigmatism. If the upper limit of conditional expression (2-19) is exceeded, negative coma will tend to occur.

It is more preferred that the following conditional expression (2-19') be satisfied instead of the above conditional expression (2-19):

$$0.40 < N_{5n} - N_{5p} < 0.85 \quad (2\text{-}19').$$

It is most preferred that the following conditional expression (2-19") be satisfied instead of the above conditional expression (2-19):

$$0.45 < N_{5n} - N_{5p} < 0.75 \quad (2\text{-}19'').$$

In the image forming optical system according to this mode, it is preferred that the following conditional expression (2-20) be satisfied:

$$0 < \nu_{5n} - \nu_{5p} < 80 \quad (2\text{-}20),$$

where $\nu_{5p}$ is the Abbe constant of the material of which the convex lens in the fifth lens group G5 is made for the d-line, and $\nu_{5n}$ is the Abbe constant of the material of which the concave lens in the fifth lens group G5 is made for the d-line.

When a reflecting optical element for bending the optical axis is inserted in the first lens group G1 in particular, chromatic aberration of magnification is apt to occur. Conditional expression (2-20) is a condition for correcting chromatic aberration of magnification. If the upper limit or the lower limit of conditional expression (2-20) is exceeded, it will be difficult to correct chromatic aberration of magnification.

It is more preferred that the following conditional expression (2-20') be satisfied instead of the above conditional expression (2-20):

$$5 < \nu_{5n} - \nu_{5p} < 70 \quad (2\text{-}20').$$

It is most preferred that the following conditional expression (2-20") be satisfied instead of the above conditional expression (2-20):

$$10 < v_{5n} - v_{5p} < 60 \tag{2-20"}$$

In the image forming optical system according to this mode, the convex lens and the concave lens in the fifth lens group G5 are cemented to each other. With this configuration, it is preferred that the image forming optical system according to this mode satisfy the following conditional expressions (2-21) and (2-22):

$$1/R_{G5F} > 1/R_{G5R} \tag{2-21}$$

$$0 < (R_{G5F} - R_{G5R})/(R_{G5F} - R_{G5R}) < 5.00 \tag{2-22},$$

where $R_{G5F}$ is the paraxial radius of curvature of the surface closest to the object side in the fifth lens group G5, and $R_{G5R}$ is the paraxial radius of curvature of the surface closest to the image side in the fifth lens group G5.

If conditional expression (2-21) is not satisfied, coma and astigmatism are apt to occur. Conditional expression (2-22) specifies the reciprocal of what is called a shape factor. If the upper limit of conditional expression (2-22) is exceeded, the dead space that cannot be used for movement of a lens group during zooming will increase. This will tend to lead to an increase in the overall length. On the other hand, if the lower limit of conditional expression (2-22) is exceeded, coma and barrel distortion will be apt to occur.

It is more preferred that the following conditional expressions (2-21') and (2-22') be satisfied instead of the above conditional expressions (2-21) and (2-22):

$$1/R_{G5F} > 1/R_{G5R} \tag{2-21'}, and$$

$$0 < (R_{G5F} - R_{G5R})/(R_{G5F} + R_{G5R}) < 1.50 \tag{2-22'}.$$

It is most preferred that the following conditional expression (2-21") and (2-22") be satisfied instead of the above conditional expression (2-21) and (2-22):

$$1/R_{G5F} > 1/R_{G5R} \tag{2-21"}, and$$

$$0 < (R_{G5F} - R_{G5R})/(R_{G5F} + R_{G5R}) < 1.00 \tag{2-22"}$$

Embodiments of the image forming optical system include image forming optical systems consisting of five lens groups and image forming optical systems consisting of six lens groups. The imaging optical system having a five-group configuration consists of five lens groups including, in order from the object side, a first lens group G1 having a positive refracting power, a second lens group G2 having a negative refracting power, an aperture stop, a third lens group G3 having a positive refracting power, a fourth lens group G4 having a positive refracting power, and a fifth lens group G5 having a positive or negative refracting power.

The imaging optical system having a six-group configuration consists of six lens groups including, in order from the object side, a first lens group G1 having a positive refracting power, a second lens group G2 having a negative refracting power, a third lens group G31 having a positive refracting power, a fourth lens group G3 having a positive refracting power, a fifth lens group G4 having a positive refracting power, and a sixth lens group G5 having a positive or negative refracting power. The third lens group G31 may be configured to be integral with an aperture stop.

The first lens group G1 includes, as its components, two to four lens components and a reflecting optical element. It is preferred that these components be arranged in the order of at most one lens component, the reflecting optical element, and one or two positive lens components, from the object side.

The one or two positive lens components include the lens component C1p. In particular, an arrangement including, in order from the object side, a negative lens component having a concave image side surface, a reflecting optical element, and one or two positive lens components is preferred. It is preferred that the reflecting optical element be a prism.

The detailed configuration of the first lens group G1 may be as follows.

(A) The first lens group G1 includes, in order from the object side, a negative lens component having a concave image side surface, a reflecting optical element, and one or two positive lens components, wherein the reflecting optical element is a prism having an entrance surface, a reflecting surface, and an exit surface that are all planar surfaces.

(B) The first lens group G1 includes, in order from the object side, a reflecting optical element and one or two positive lens components, wherein the reflecting optical element is a prism having a concave entrance surface, a reflecting surface, and an exit surface, and the reflecting surface and the exit surface are both planar surfaces.

(C) The first lens group G1 includes, in order from the object side, a negative lens component having a concave image side surface, a reflecting optical element, and two positive lens components, wherein the reflecting optical element is a prism having a concave entrance surface, a reflecting surface, and an exit surface, and the reflecting surface and the exit surface are both planar surfaces.

(D) The first lens group G1 includes, in order from the object side, a negative lens component having a concave image side surface, a reflecting optical element, and a positive lens component only, wherein the reflecting optical element is a prism having an entrance surface, a reflecting surface, and a convex exit surface, and the entrance surface and the reflecting surface are both planar surfaces.

As above, it is preferred that the first lens group G1 have anyone of the above-described arrangements of components. The prism is a reflecting optical element for bending the optical path. If the material of the prism (reflecting optical element) has a refractive index of 1.8 or higher, conditional expression (2-1) can be readily satisfied. This is preferred.

One of the positive lens components is the lens component C1p. A negative lens LA is used in this lens component C1p. This negative lens LA is a lens having a relative partial dispersion θgF and an Abbe constant vd that fall within both the area bounded by the straight line given by the equation into which the lowest value in the range defined by conditional expression (2-8) is substituted and the straight line given by the equation into which the highest value in the range defined by conditional expression (2-8) is substituted and the area defined by conditional expression (2-3). The negative lens LA may be a lens having a relative partial dispersion θgF and an Abbe constant vd that fall within the area defined by conditional expression (2-3') and conditional expression (2-8') or within the area defined by conditional expression (2-3") and conditional expression (2-8").

In the lens component C1p, the negative lens LA is cemented to a positive lens LB. This positive lens LB is a lens having a relative partial dispersion AgF and an Abbe constant vd that fall within both the area bounded by the straight line given by the equation into which the lowest value in the range defined by conditional expression (2-10) is substituted and the straight line given by the equation into which the highest value in the range defined by conditional expression (2-10) is substituted and the area defined by conditional expression (2-11). The positive lens LB may be a lens having a relative partial dispersion θgF and an Abbe constant vd that fall within the area defined by conditional expression (2-10') and conditional expression (2-11') or within the area defined by conditional expression (2-10") and conditional expression (2-11").

The second lens group G2 includes two or more lens components. One of the lens components is a cemented lens component made up of a positive lens and a negative lens. The second lens group G2 may include one or more negative lens components in addition to the cemented lens component. An arrangement including, in order from the object side, a negative lens component, the cemented lens component, and other lens component(s) is desirable.

In cases where the image forming optical system consists of five lens groups, the third lens group G3 includes a cemented lens. The third lens group G3 may include a positive lens component in addition to the cemented lens component. It is preferred that the lens located closest to the image side in the third lens group G3 be a negative lens. This negative lens may have a higher curvature in the image side surface. In cases where the image forming optical system consists of six lens groups, one lens group is added between the second lens group G2 and the third lens group G3. Namely, the added one group serves as the third lens group G3 if the image forming optical system consists of six lens groups. Accordingly, the third lens group G3 in the five lens groups serves as the fourth lens group G4 if the image forming optical system consists of six lens groups. Similarly, the fourth lens group G4 and the fifth lens group G5 in the five lens groups serves as the fifth lens group G5 and sixth lens group G6 respectively if the image forming optical system consists of six lens groups.

The fourth lens group G4 includes one lens component. The fourth lens group G4 is a lens group arranged subsequent to the third lens group G3. The refracting power of the fourth lens group G4 may be either positive or negative. This lens component may be a single lens. While the fourth lens group G4 having a negative refracting power facilitates size reduction, the fourth lens group G4 having a positive refracting power facilitates aberration correction. As mentioned above, the fourth lens group G4 in the five lens groups serves as the fifth lens group G5 if the image forming optical system consists of six lens groups.

The fifth lens group G4 includes one lens component. This lens component may be a single lens. The refracting power of the fifth lens group G5 may be either positive or negative. While the fifth lens group G5 having a negative refracting power facilitates size reduction, the fifth lens group G5 having a positive refracting power facilitates aberration correction. As mentioned above, the fifth lens group G5 in the five lens groups serves as the sixth lens group G6 if the image forming optical system consists of six lens groups.

In cases where the image forming optical system consists of six lens groups, another lens group G31 having a positive refracting power is provided between the second lens group G2 and the third lens group G3. The another lens group G31 consists of a single lens and may be configured to be integral with the aperture stop. In cases where the image forming optical system consists of six lens groups, the another lens group G31 serves as the third lens group G31.

If distortion generated by the image forming optical system is corrected by an image processing function of an electronic image pickup apparatus, more excellent correction of other aberrations can be achieved, and a further widening of the angle of view can be achieved.

When a negative lens LA is used in the lens component C1$p$, the negative lens LA is cemented to a positive lens LB. It is preferred that the center thickness of the negative lens LA on the optical axis be smaller than that of the positive lens LB.

In the image forming optical system according to this mode, it is preferred that the center thickness t1 of the negative lens LA on the optical axis satisfy the following conditional expression (2-23):

$$0.01 < t1 < 0.6 \quad (2\text{-}23).$$

It is more preferred that the following conditional expression (2-23') be satisfied instead of the above conditional expression (2-23):

$$0.01 < t1 < 0.4 \quad (2\text{-}23').$$

It is still more preferred that the following conditional expression (2-23") be satisfied instead of the above conditional expression (2-23):

$$0.01 < t1 < 0.2 \quad (2\text{-}23").$$

In the image forming optical system according to this mode, it is preferred that the negative lens LA satisfy the following conditional expression (2-27):

$$1.58 < nd < 1.95 \quad (2\text{-}27),$$

where nd is the refractive index of the material of the negative lens LA.

If conditional expression (2-27) is satisfied, good correction of spherical aberration and astigmatism can be achieved.

It is more preferred that the following conditional expression (2-27') be satisfied instead of the above conditional expression (2-27):

$$1.60 < nd < 1.90 \quad (2\text{-}27').$$

It is still more preferred that the following conditional expression (2-27") be satisfied instead of the above conditional expression (2-27):

$$1.62 < nd < 1.85 \quad (2\text{-}27").$$

When the image forming optical system according to the present invention satisfies the above described conditional expressions or has the above described configurational features individually, size reduction and slimming of the image forming optical system can both be achieved, and in addition good correction of aberrations can be achieved. The image forming optical system according to the present invention may be provided with (or satisfy) the above-described conditional expression and configurational features in combination. If this is the case, further size reduction and slimming of the image forming optical system or better aberration correction can be achieved.

In the electronic image pickup apparatus equipped with the image forming optical system according to the present invention, sharpness and prevention of color blur in picked up images can be achieved by virtue of the above-described image forming optical system Prior to the description of embodiments, operations and effects of an image forming optical system according to one mode will be described. In the following description, "a positive lens (or a lens having a positive refracting power)" and "a negative lens (or a lens having a negative refracting power)" will refer to lenses having paraxial focal lengths of positive and negative values respectively.

The image forming optical system according to this mode consists of a lens group G1 having a positive refracting power and a magnification changing portion GV consisting of a plurality of lens groups. The lens group G1 includes a sub lens group G11 located closest to the object side and having a negative refracting power and a sub lens group G12 having a positive refracting power. In the aforementioned plurality of lens groups, relative distances between adjacent lens groups change during zooming or focusing. The sub lens group G12 has a lens component C1p having a positive refracting power. This lens component C1p having a positive refracting power is a cemented lens in which the negative lens LA and the positive lens LB are cemented together, and its cemented surface is an aspheric surface. With the above configuration, good correction of, in particular, chromatic spherical aberration is achieved in the image forming optical system according to this mode.

The image forming optical system according to this mode is characterized by satisfying the following conditional expression (3-1):

$$0.50 < D_{11}/SD_1 < 0.95 \qquad (3\text{-}1),$$

where $D_{11}$ is the distance measured along the optical axis from the vertex of the lens surface closest to the image side in the sub lens group G11 to the vertex of the lens surface closest to the object side in the sub lens group G12, and $SD_1$ is the distance measured along the optical axis from the vertex of the lens surface closest to the object side in the lens group G1 to the vertex of the lens surface closest to the image side in the lens group G1.

In some cases, an optical element (e.g. a plane parallel plate or prism) having a planar entrance surface and a planar exit surface is provided between the sub lens group G11 and the sub lens group G12. In such cases, it is regarded that such an optical element is included in neither the sub lens group G11 nor the sub lens group G12.

In the range below the lower limit of conditional expression (3-1), spherical aberration is basically small. Therefore, chromatic spherical aberration will not become worse. However, if the lower limit of conditional expression (3-1) is exceeded, the position of the entrance pupil at the wide angle end tend to become far from the object side. If this is the case, when a certain angle of view, such as a wide angle of view, is to be achieved, the required diameter of the lens group G1 tends to become large, resulting in an increase in the size. If the position of the entrance pupil is made closer to the object side unreasonably, coma and distortion will become worse. On the other hand, if the upper limit of conditional expression (3-1) is exceeded, it will be difficult to make chromatic spherical aberration small, even if spherical surface design is used in the cemented surface of the lens component C1p.

It is more preferred that the following conditional expression (3-1') be satisfied instead of the above conditional expression (3-1):

$$0.60 < D_{11}/SD_1 < 0.90 \qquad (3\text{-}1').$$

It is most preferred that the following conditional expression (3-1") be satisfied instead of the above conditional expression (3-1):

$$0.67 < D_{11}/SD_1 < 0.85 \qquad (3\text{-}1").$$

Even if chromatic spherical aberration is corrected, sharpness and contrast of images will be deteriorated if there remain axial chromatic aberration and chromatic aberration of magnification. Furthermore, in images containing a portion having a large brightness difference (i.e. edge portion), color blur will be apt to occur in the vicinity of this portion. Still further, as to axial chromatic aberration and chromatic aberration of magnification, it is insufficient to achieve achromatism only for the C-line and the F-line. Namely, it is necessary to achieve achromatism also for the g-line and the h-line. In particular, if there remains chromatic aberration with respect to the g-line, sharpness and contrast of images will be deteriorated. Furthermore, if there remains chromatic aberration with respect to the h-line, color blur will be apt to occur in images containing a portion having a large brightness difference (i.e. edge portion) in the vicinity of this portion.

In view of this, in the image forming optical system according to this mode, it is preferred that assuming a straight line given by the equation $\theta gF = \alpha \times vd + \beta'$ (where $\alpha = -0.00163$) in an orthogonal coordinate system having a horizontal axis representing vd and a vertical axis representing $\theta gF$, the value of $\theta gF$ and the value of vd of at least one negative lens LA included in the lens component C1p fall within both of the area bounded by the straight line given by the equation into which the lowest value in the range defined by the following conditional expression (3-2) is substituted and the straight line given by the equation into which the highest value in the range defined by the following conditional expression (3-2) is substituted and the area defined by the following conditional expression (3-3):

$$0.5000 < \beta' < 0.7250 \qquad (3\text{-}2),$$

$$3 < vd < 35 \qquad (3\text{-}3),$$

where $\theta gF$ is the relative partial dispersion $(ng-nF)/(nF-nC)$, and vd is the Abbe constant $(nd-1)/(nF-nC)$, where nd, nC, nF, and ng are refractive indices for the d-line, C-line, F-line, and g-line respectively.

If the upper limit of conditional expression (3-2) is exceeded, correction of axial chromatic aberration by secondary spectrum, specifically, correction of axial chromatic aberration with respect to the g-line while achromatism is achieved with respect to the F-line and the C-line will be insufficient. Therefore, it will be difficult to achieve sharpness over the entire picture area in images picked up at telephoto focal lengths particularly. If the lower limit of conditional expression (3-2) is exceeded, correction of chromatic aberration of magnification by secondary spectrum, specifically, correction of chromatic aberration of magnification with respect to the g-line while achromatism is achieved with respect to the F-line and the C-line will be insufficient. Therefore, it will be difficult to achieve sharpness in the peripheral region of picked-up images.

If the upper limit of conditional expression (3-3) is exceeded, even achromatism with respect to F-line and the C-line will be difficult. If the lower limit of conditional expression (3-3) is exceeded, effect of correction of five Seidel aberrations will become smaller even if achromatism with respect to F-line and the C-line can be achieved.

It is more preferred that the following conditional expression (3-2') be satisfied instead of the above conditional expression (3-2):

$$0.5300 < \beta' < 0.6860 \qquad (3\text{-}2').$$

It is still more preferred that the following conditional expression (3-2") be satisfied instead of the above conditional expression (3-2):

$$0.5600 < \beta' < 0.6350 \qquad (3\text{-}2").$$

It is more preferred that the following conditional expression (3-3') be satisfied instead of the above conditional expression (3-3):

$$6 < vd < 30 \qquad (3\text{-}3').$$

It is still more preferred that the following conditional expression (3-3") be satisfied instead of the above conditional expression (3-3):

$$10 < vd < 25 \qquad (3\text{-}3").$$

In the image forming optical system according to this mode, it is also preferred that assuming a straight line given by the equation $\theta hg = \alpha hg \times vd + \beta hg'$ (where $\alpha hg = -0.00225$)

in an orthogonal coordinate system having a horizontal axis representing νd and a vertical axis representing θhg that is different from the aforementioned orthogonal coordinate system, the value of θhg and the value of νd of at least one negative lens LA included in the lens component C1p fall within both of the area bounded by the straight line given by the equation into which the lowest value in the range defined by the following conditional expression (3-4) is substituted and the straight line given by the equation into which the highest value in the range defined by the following conditional expression (3-4) is substituted and the area defined by the following conditional expression (3-3):

$$0.4000 < \beta hg' < 0.7100 \quad (3\text{-}4),$$

$$3 < \nu d < 35 \quad (3\text{-}3),$$

where θhg is the relative partial dispersion (nh−ng)/(nF−nC), and nh is the refractive index for the h-line.

If the upper limit of conditional expression (3-4) is exceeded, correction of axial chromatic aberration by secondary spectrum, specifically, correction of axial chromatic aberration with respect to the h-line while achromatism is achieved with respect to the F-line and the C-line will be insufficient. Therefore, purple color flare and color blur will be apt to appear over the entire picture area in images picked up at telephoto focal lengths particularly. If the lower limit of conditional expression (3-4) is exceeded, correction of chromatic aberration of magnification by secondary spectrum, specifically, correction of chromatic aberration of magnification with respect to the h-line while achromatism is achieved with respect to the F-line and the C-line will be insufficient. Therefore, purple color flare and color blur will be apt to appear in the peripheral region of picked-up images.

It is more preferred that the following conditional expression (3-4') be satisfied instead of the above conditional expression (3-4):

$$0.4500 < \beta hg' < 0.6550 \quad (3\text{-}4').$$

It is still more preferred that the following conditional expression (3-4") be satisfied instead of the above conditional expression (3-4):

$$0.5000 < \beta hg' < 0.5800 \quad (3\text{-}4'').$$

In the image forming optical system according to this mode, it is also preferred that assuming a straight line given by the equation θgF=α×νd+β' (where α=−0.00163) in the aforementioned orthogonal coordinate system having a horizontal axis representing νd and a vertical axis representing θgF, the value of θgF and the value of νd of a specific lens fall within both of the area bounded by the straight line given by the equation into which the lowest value in the range defined by the following conditional expression (3-5) is substituted and the straight line given by the equation into which the highest value in the range defined by the following conditional expression (3-5) is substituted and the area defined by the following conditional expression (3-6):

$$0.6200 < \beta' < 0.9000 \quad (3\text{-}5),$$

$$27 < \nu d < 65 \quad (3\text{-}6),$$

where the specific lens is at least one positive lens LB included in the lens component C1p or another positive lens element LO in the lens group G1, θgF is the relative partial dispersion (ng−nF)/(nF−nC), and νd is the Abbe constant (nd−1)/(nF−nC), where nd, nC, nF, and ng are refractive indices for the d-line, C-line, F-line, and g-line respectively.

If the upper limit of conditional expression (3-5) is exceeded, correction of chromatic aberration of magnification by secondary spectrum, specifically, correction of chromatic aberration of magnification with respect to the g-line while achromatism is achieved with respect to the F-line and the C-line will be insufficient. Therefore, it will be difficult to achieve sharpness in the peripheral region of picked-up images. If the lower limit of conditional expression (3-5) is exceeded, correction of axial chromatic aberration by secondary spectrum, specifically, correction of axial chromatic aberration with respect to the g-line while achromatism is achieved with respect to the F-line and the C-line will be insufficient. Therefore, it will be difficult to achieve sharpness over the entire picture area in images picked up at telephoto focal lengths particularly.

If the upper limit of conditional expression (3-6) is exceeded, effect of correction of five Seidel aberrations will become smaller even if achromatism with respect to F-line and the C-line can be achieved. If the lower limit of conditional expression (3-6) is exceeded, even achromatism with respect to F-line and the C-line will be difficult.

It is more preferred that the following conditional expression (3-5') be satisfied instead of the above conditional expression (3-5):

$$0.6250 < \beta' < 0.8500 \quad (3\text{-}5').$$

It is still more preferred that the following conditional expression (3-5") be satisfied instead of the above conditional expression (3-5):

$$0.6300 < \beta' < 0.8000 \quad (3\text{-}5'').$$

It is more preferred that the following conditional expression (3-6') be satisfied instead of the above conditional expression (3-6):

$$30 < \nu d < 60 \quad (3\text{-}6').$$

It is still more preferred that the following conditional expression (3-6") be satisfied instead of the above conditional expression (3-6):

$$35 < \nu d < 55 \quad (3\text{-}6'').$$

In the image forming optical system according to this mode, it is also preferred that assuming a straight line given by the equation θhg=αhg×νd+βhg' (where αhg=−0.00225) in the aforementioned orthogonal coordinate system having a horizontal axis representing νd and a vertical axis representing θhg, the value of θhg and the value of νd of a specific lens fall within both of the area bounded by the straight line given by the equation into which the lowest value in the range defined by the following conditional expression (3-7) is substituted and the straight line given by the equation into which the highest value in the range defined by the following conditional expression (3-7) is substituted and the area defined by the following conditional expression (3-6):

$$0.5500 < \beta hg' < 0.9000 \quad (3\text{-}7),$$

$$27 < \nu d < 65 \quad (3\text{-}6),$$

where the specific lens is at least one positive lens LB included in the lens component C1p or another positive lens element LO in the lens group G1, θhg is the relative partial dispersion (nh−ng)/(nF−nC), and nh is the refractive index for the h-line.

If the upper limit of conditional expression (3-7) is exceeded, correction of chromatic aberration of magnification by secondary spectrum, specifically, correction of chromatic aberration of magnification with respect to the h-line while achromatism is achieved with respect to the F-line and the C-line will be insufficient. Therefore, purple color flare and color blur will be apt to appear in the peripheral region of picked-up images. If the lower limit of conditional expression (3-7) is exceeded, correction of axial chromatic aberration by secondary spectrum, specifically, correction of axial chromatic aberration with respect to the h-line while achromatism is achieved with respect to the F-line and the C-line will be insufficient. Therefore, purple color flare and color blur will be apt to appear over the entire picture area in images picked up at telephoto focal lengths particularly.

It is more preferred that the following conditional expression (3-7') be satisfied instead of the above conditional expression (3-7):

$$0.5600 < \beta hg' < 0.8700 \quad (3\text{-}7').$$

It is still more preferred that the following conditional expression (3-7") be satisfied instead of the above conditional expression (3-7):

$$0.5700 < \beta hg' < 0.8500 \quad (3\text{-}7'').$$

In the image forming optical system according to this mode, it is also preferred that the following conditional expression (3-8) be satisfied:

$$-0.06 \leq \theta gF(LA) - \theta gF(LB) \leq 0.18 \quad (3\text{-}8),$$

where θgF (LA) is the relative partial dispersion (ng−nF)/(nF−nC) of the negative lens LA, and θgF (LB) is the relative partial dispersion (ng−nF)/(nF−nC) of the positive lens LB.

In this case, since a negative lens (i.e. negative lens LA) and a positive lens (i.e. positive lens LB) are used in combination, good correction of chromatic aberration can be achieved. In particular, if the above condition is satisfied in this combination, the correction effect for secondary spectrum (chromatic aberration) will be large. In consequence, sharpness of picked-up images will be improved.

It is more preferred that the following conditional expression (3-8') be satisfied instead of the above conditional expression (3-8):

$$-0.03 \leq \theta gF(LA) - \theta gF(LB) \leq 0.14 \quad (3\text{-}8').$$

It is most preferred that the following conditional expression (3-8") be satisfied instead of the above conditional expression (3-8):

$$0.00 \leq \theta gF(LA) - \theta gF(LB) \leq 0.10 \quad (3\text{-}8'').$$

In the image forming optical system according to this mode, it is also preferred that the following conditional expression (3-9) be satisfied:

$$-0.10 \leq \theta hg(LA) - \theta hg(LB) \leq 0.24 \quad (3\text{-}9),$$

where θhg(LA) is the relative partial dispersion (nh−ng)/(nF−nC) of the negative lens LA, and θhg(LB) is the relative partial dispersion (nh−ng)/(nF−nC) of the positive lens LB.

In this case, since a negative lens (i.e. negative lens LA) and a positive lens (i.e. positive lens LB) are used in combination, good correction of chromatic aberration can be achieved. In particular, if the above condition is satisfied in this combination, the color flare and color blur can be decreased in picked-up images.

It is more preferred that the following conditional expression (3-9') be satisfied instead of the above conditional expression (3-9):

$$-0.05 \leq \theta hg(LA) - \theta hg(LB) \leq 0.19 \quad (3\text{-}9').$$

It is most preferred that the following conditional expression (3-9") be satisfied instead of the above conditional expression (3-9):

$$0.00 \leq \theta hg(LA) - \theta hg(LB) \leq 0.14 \quad (3\text{-}9'').$$

In the image pickup apparatus according to this mode, it is preferred that the following conditional expression (3-10) be satisfied:

$$vd(LA) - vd(LB) \leq -5 \quad (3\text{-}10),$$

where νd(LA) is the Abbe constant (nd−1)/(nF−nC) of the negative lens LA, and νd(LB) is the Abbe constant (nd−1)/(nF−nC) of the positive lens LB.

In this case, since a negative lens (i.e. negative lens LA) and a positive lens (i.e. positive lens LB) are used in combination, good correction of chromatic aberration can be achieved. In particular, if the above condition is satisfied in this combination, achromatism for axial chromatic aberration and chromatic aberration of magnification with respect to the C-line and the F-line can easily be achieved.

It is more preferred that the following conditional expression (3-10') be satisfied instead of the above conditional expression (3-10):

$$vd(LA) - vd(LB) \leq -10 \quad (3\text{-}10').$$

It is most preferred that the following conditional expression (3-10") be satisfied instead of the above conditional expression (3-10):

$$vd(LA) - vd(LB) \leq -15 \quad (3\text{-}10'').$$

If the lens component C1p consists of three or more lenses, the negative lens having the smallest relative partial dispersion θgF among the negative lenses is regarded as the negative lens LA, and the positive lens having the largest relative partial dispersion θgF among the positive lenses is regarded as the positive lens LB.

The "lens materials" refer to the materials of lenses, such as glasses and resins. In cemented lenses (including the lens component C1p), lenses made of materials appropriately selected from such lens materials are used.

It is preferred that the cemented lens have a first lens (LA) having a small center thickness on the optical axis and a second lens (LB), and the first lens (LA) satisfy conditional expressions (3-2) and (3-3) or conditional expressions (3-4) and (3-3). If this is the case, further improvement in the effect of correcting aberrations and further slimming of the lens group can be expected. It is also preferred that the second lens (LB) satisfy conditional expressions (3-5) and (3-6) or conditional expressions (3-7) and (3-6). If this is the case, further improvement in the effect of correcting aberrations and further slimming of the lens group can be expected.

It is also preferred that the cemented lens consist of a compound lens. The compound lens can be made by closely attaching a resin on a surface of the second lens and curing it to form the first lens. Use of a compound lens as the cemented lens can improve manufacturing precision. One method of manufacturing compound lenses is molding. In a method of molding, a first lens material (e.g. energy curable transparent resin) of the first lens is brought into contact with the second lens to directly attach the first lens material to the second lens. This method is very effective in making the lens element thin. An example of the energy curable transparent resin is an ultraviolet curable resin. Surface processing such as coating may be applied on the second lens in advance. The second lens may be made of an inorganic material such as a glass. Nevertheless, since the first lens cemented thereto is made of a resin, it is more preferred that the second lens be made of a resin-based material as with the first lens in view of the stability of optical performance against environmental changes.

When a compound lens is produced as the cemented lens, a glass may be attached to a surface of the second lens and hardened to form the first lens. Glasses are advantageous over resins in terms of resistance properties such as light resistance and resistance to chemicals. In this case, it is necessary for the material of the first lens, characteristically, has a melting point and a transition point that are lower than those of the material of the second lens. One method of manufacturing compound lenses is molding. In a method of molding, a first lens material is brought into contact with the second lens to directly attach the first lens material to the second lens. This method is very effective in making the lens element thin. Surface processing such as coating may be applied on the second lens in advance.

As described above, in the image forming optical system according to this mode, the lens group G1 having a positive refracting power is composed of the sub lens group G11 having a negative refracting power and the sub lens group G12 having a positive refracting power. In this configuration, the overall refracting power of the sub lens group G11 and a portion of the refracting power of the sub lens group G12 constitute a reducing afocal converter. In this case, the remaining refracting power of the sub lens group G12 and the refracting power of the magnification changing portion GV constitute an optical system, the focal length of which tends to be large. This tendency becomes pronounced particularly when the optical system is designed to have a high magnification (or high zoom ratio).

To prevent this, the magnification changing portion GV is divided into two groups or a lens group GVF and a lens group GVR that are arranged in order from the object side. The remaining refracting power of the sub lens group G12 and the refracting power of the lens group GVF constitute a magnification changing portion having a positive short focal length. In the image forming optical system according to this mode, it is preferred that the lens group GVR be configured in such a way that the following conditional expression (3-11) is satisfied:

$$0.93 < \beta_{RW} < 2.50 \quad (3\text{-}11),$$

where $\beta_{RW}$ is the imaging magnification of the lens group GVR in a state in which the image forming optical system is focused on a certain object point for which the absolute value of the imaging magnification of the entire image forming optical system is equal to or lower than 0.01, at the wide angle end.

If the lower limit of conditional expression (3-11) is exceeded, it will be difficult to achieve a high magnification, a wide angle of view, and a large diameter together while reducing the overall length. If the upper limit of conditional expression (3-11) is exceeded, the Petzval sum will have a large negative value, resulting in strong curvature of field.

The lens group GVR consists of a plurality of lens groups, and relative distances between adjacent lens groups change during zooming or focusing. Relative distances between lens elements included in the lens group GVR do not change for zooming or focusing.

It is more preferred that the following conditional expression (3-11') be satisfied instead of the above conditional expression (3-11):

$$1.03 < \beta_{RW} < 2.25 \quad (3\text{-}11').$$

It is most preferred that the following conditional expression (3-11'') be satisfied instead of the above conditional expression (3-11):

$$1.13 < \beta_{RW} < 2.00 \quad (3\text{-}11'').$$

In the image forming optical system according to this embodiment, the lens group GVR has one positive (convex) lens and one negative (concave) lens, and it is preferred that the following conditional expression (3-12) be satisfied:

$$0.35 < N_{Rn} - N_{Rp} \quad (3\text{-}12),$$

where $N_{Rp}$ is the refractive index of the material of which the positive (convex) lens in the lens group GVR is made for the d-line, and $N_{Rn}$ is the refractive index of the material of which the negative (concave) lens in the lens group GVR is made for the d-line.

If the lower limit of conditional expression (3-12) is exceeded, the Petzval sum will be apt to have a large negative value, resulting in insufficient correction of curvature of field or astigmatism.

It is more preferred that the following conditional expression (3-12') be satisfied instead of the above conditional expression (3-12):

$$0.45 < N_{Rn} - N_{Rp} \quad (3\text{-}12').$$

It is most preferred that the following conditional expression (3-12'') be satisfied instead of the above conditional expression (3-12):

$$0.55 < N_{Rn} - N_{Rp} \quad (3\text{-}12'').$$

In the image forming optical system according to this mode, it is preferred that the lens group GVR satisfy the following conditional expression:

$$10 < \nu_{Rn} - \nu_{Rp} < 80 \quad (3\text{-}13),$$

where $\nu_{Rp}$ is the Abbe constant of the material of which the positive (convex) lens in the lens group GVR is made for the d-line, and $\nu_{Rn}$ is the Abbe constant of the material of which the negative (concave) lens in the lens group GVR is made for the d-line.

Conditional expression (3-13) is a condition for correcting chromatic aberration of magnification. Chromatic aberration of magnification is apt to occur when a reflecting optical element for bending the optical path is inserted in the lens group G1. Therefore, when a reflecting optical element for bending the optical path is provided in the lens group G1, it is preferred that conditional expression (3-13) be satisfied. If the upper limit or the lower limit of conditional expression (3-13) is exceeded, it will be difficult to correct chromatic aberration of magnification.

It is more preferred that the following conditional expression (3-13') be satisfied instead of the above conditional expression (3-13):

$$15 < \nu_{Rn} - \nu_{Rp} < 70 \quad (3\text{-}13').$$

It is most preferred that the following conditional expression (3-13'') be satisfied instead of the above conditional expression (3-13):

$$20 < \nu_{Rn} - \nu_{Rp} < 60 \quad (3\text{-}13'').$$

In the image forming optical system according to this mode, the positive (convex) lens and the negative (concave) lens in the lens group GVR are cemented to each other, and it is preferred that the following conditions be satisfied:

$$1/R_{GRF} > 1/R_{GRR} \quad (3\text{-}14), \text{ and}$$

$$1.0 < (R_{GRF} - R_{GRR})/(R_{GRF} - R_{GRR}) < 50 \quad (3\text{-}15),$$

where $R_{GRF}$ is the paraxial radius of curvature of the surface closest to the object side in the lens group GVR, and $R_{GRR}$ is the paraxial radius of curvature of the surface closest to the image side in the lens group GVR.

In the range in which conditional expression (3-14) is not satisfied, coma and astigmatism are apt to occur. If the upper limit of conditional expression (3-15) is exceeded, the dead space that cannot be used for movement of a lens group during zooming will increase. This will tend to lead to an increase in the overall length. If the lower limit of conditional expression (3-15) is exceeded, coma and barrel distortion will be apt to occur.

It is more preferred that the following conditional expressions (3-14') and (3-15') be satisfied instead of the above conditional expressions (3-14) and (3-15):

$$1/R_{GRF} > 1/R_{GRR} \quad (3\text{-}14'), \text{ and}$$

$$1.5 < (R_{GRF} + R_{GRR})/(R_{GRF} - R_{GRR}) < 35 \quad (3\text{-}15').$$

It is most preferred that the following conditional expression (3-14") and (3-15") be satisfied instead of the above conditional expression (3-14) and (3-15):

$$1/R_{GRF} > 1/R_{GRR} \quad (3\text{-}14''), \text{ and}$$

$$2.0 < (R_{GRR} + R_{GRR})/(R_{GRF} - R_{GRR}) < 25 \quad (3\text{-}15'').$$

Now, a supplemental description will be made of the aforementioned lens group GVR. The lens group closest to the object side in the lens group GVF is lens group G2 (which is the second lens group counted from the object side in the entire image forming optical system). This lens group G2 has a negative refracting power. The relative distance between this lens group G2 and the lens group G1 closest to the object side changes during zooming.

In the image forming optical system according to this mode having this configuration, it is preferred that the following conditional expression (3-16) be satisfied:

$$-1.4 < \beta_{2w} < -0.4 \quad (3\text{-}16),$$

where $\beta_{2w}$ is the imaging magnification of the lens group G2 in a state in which the image forming optical system is focused on a certain object point for which the absolute value of the imaging magnification of the entire image forming optical system is equal to or lower than 0.01, at the wide angle end.

If the lower limit of conditional expression (3-16) is exceeded, it will be difficult to enhance the magnification changing efficiency even if a lens group other than the lens group G2 is adapted to contribute to the magnification change. Consequently, it will be difficult to achieve size reduction of the optical system. If the upper limit of conditional expression (3-16) is exceeded, the magnification changing efficiency with respect to the movement of the lens group G2 itself will be deteriorated. In this case also, it will be difficult to achieve size reduction of the optical system. Here, the magnification changing efficiency is represented by the ratio of the amount of movement of a lens group and the magnification change. For example, if a large magnification change is caused by a small amount of movement of a lens group, the magnification changing efficiency is high.

It is more preferred that the following conditional expression (3-16') be satisfied instead of the above conditional expression (3-16):

$$-1.3 < \beta_{2w} < -0.5 \quad (3\text{-}16').$$

It is most preferred that the following conditional expression (3-16") be satisfied instead of the above conditional expression (3-16):

$$-1.2 < \beta_{2w} < -0.6 \quad (3\text{-}16'').$$

The lens group GVR includes a lens group G3 and a lens group G4 in addition to the lens group G2. The relative distances between the lens groups change during zooming. The lens group G3 is the third lens group counted from the object side in the entire image forming optical system and has a positive refracting power. The lens group G3 is the second lens group counted from the object side among the positive lens groups. The lens group G4 is the fourth lens group counted from the object side in the entire image forming optical system and has a positive refracting power. The lens group G4 is the third lens group counted from the object side among the positive lens groups.

In the image forming optical system according to this mode having this configuration, it is preferred that the following conditional expression (3-17) be satisfied:

$$-1.8 < \beta_{34w} < -0.2 \quad (3\text{-}17),$$

where $\beta_{34w}$ is the combined imaging magnification of the lens groups G3 and G4 in a state in which the image forming optical system is focused on a certain object point for which the absolute value of the imaging magnification of the entire image forming optical system is equal to or lower than 0.01, at the wide angle end.

If the lower limit of conditional expression (3-17) is exceeded, it will be difficult to enhance the magnification changing efficiency even if a lens group other than the lens group G3 and the lens group G4 is adapted to contribute to the magnification change. Consequently, it will be difficult to achieve size reduction of the optical system. If the upper limit of conditional expression (3-17) is exceeded, the magnification changing efficiency with respect to the movement of the lens group G3 or the lens group G4 themselves will be deteriorated. In this case also, it will be difficult to achieve size reduction of the optical system.

It is more preferred that the following conditional expression (3-17') be satisfied instead of the above conditional expression (3-17):

$$-1.6 < \beta_{34w} < -0.3 \quad (3\text{-}17').$$

It is most preferred that the following conditional expression (3-17") be satisfied instead of the above conditional expression (3-17):

$$-1.4 < \beta_{34w} < -0.4 \quad (3\text{-}17'').$$

It is preferred that the lens group GVR consist only of a lens group G5. If this is the case, the lens group G5 is the fifth lens group counted from the object side in the entire image forming optical system.

Another lens group G31 may be provided between the lens group G2 and the lens group G3 in the lens group GVF. The another lens group G31 is a lens group whose distance from the image plane is constant during zooming. When the another lens group G31 is provided, the combined imaging magnification $\beta_{34w}$ in conditional expression (3-17) represents the combined imaging magnification of the lens group G3, the another lens group G31, and the lens group G4 in a state in which the image forming optical system is focused on a certain object point for which the absolute value of the imaging magnification of the entire image forming optical system is equal to or lower than 0.01, at the wide angle end.

Next, an image forming optical system according to this mode will be described.

The image forming optical system according to this mode consists of five or six lens groups. The refracting power arrangements in image forming optical systems consisting of five or six lens groups in which the lens group G1 closest to the object side has a positive refracting power include the following three cases: positive-negative-(positive)-positive-negative-positive, positive-negative-(positive)-positive-positive-positive, and positive-negative-(positive)-positive-positive-negative.

Optical systems consisting of six lens groups have the parenthesized lens group "(positive)", and optical systems consisting of five lens groups do not have the parenthesized lens group "(positive)". An aperture stop is disposed in any one of the air gaps between the image side surface of the second lens group counted from the object side and the object side surface of the fourth lens group counted from the object side. The aperture stop is independent from the lens groups in some cases and not independent from the lens groups in other cases.

It can be said that the image forming optical system according to this mode has, as the basic structure, a positive-negative-positive-positive refracting power arrangement or a positive-negative-positive-negative refracting power arrangement. For example, an image forming optical system consisting of five lens groups can be regarded as a modification of an image forming optical system consisting of four lens groups having a positive-negative-positive-positive or positive-negative-positive-negative configuration. Specifically, it can be regarded as an optical system in which a positive or negative lens group is added on the image side of an image forming optical system consisting of four lens groups with a positive-negative-positive-positive configuration or a positive lens group is added on the image side of an image forming optical system consisting of four lens groups with a positive-negative-positive-negative configuration. Furthermore, an image forming optical system consisting of six lens groups can be regarded as an optical system in which a positive lens group is added between the first negative lens group and the second positive lens group counted from the object side in an image forming optical system consisting of five lens groups.

In the case of the base configuration having a positive-negative-positive-positive refracting power arrangement, a lens group G1 having a positive refracting power is disposed closest to the object side. In this configuration, the lens component C1$p$ is provided in the lens group G1 having a positive refracting power disposed closest to the object side. In addition, conditional expression (3-1), (3-1'), or (3-1") is satisfied.

A negative lens LA is used in this lens component C1$p$. The negative lens LA is a lens having a relative partial dispersion θgF and an Abbe constant νd that fall within both the area bounded by the straight line given by the equation into which the lowest value in the range defined by conditional expression (3-2) is substituted and the straight line given by the equation into which the highest value in the range defined by conditional expression (3-2) is substituted and the area defined by conditional expression (3-3). The negative lens LA may be a lens having a relative partial dispersion θgF and an Abbe constant νd that fall within the area defined by conditional expression (3-2') and conditional expression (3-3') or within the area defined by conditional expression (3-2") and conditional expression (3-3"). It is preferred that the lens component C1$p$ have a positive refracting power.

It is preferred that a prism that has, in order from the object side, an entrance surface, a reflecting surface, and an exit surface be provided along the optical axis on the object side of the lens component C1$p$. It is preferred that a surface disposed immediately on the object side of the entrance surface have a negative refracting power. This surface is a lens surface other than the surfaces of the prism. The prism is a reflecting optical element for bending rays that contribute to imaging.

In the image forming optical system according to this mode, it is preferred that the following conditional expression (3-18) be satisfied:

$$E/f12<1.5 \quad (3\text{-}18),$$

where E is the equivalent air distance between a vertex Ct1 and a vertex Ct2 along the optical axis, the vertex Ct1 is the vertex of the surface having the highest negative refracting power among the refractive surfaces located closer to the object side than the reflecting surface of the reflecting optical element, the vertex Ct2 is the vertex of the cemented surface of the lens component C1$p$, and f12 is the combined focal length of all the lenses, among the lenses constituting the first lens group G1, that are located closer to the image side than the reflecting optical element. If the reflecting optical element has an exit surface having a refracting power, this exit surface is taken into account for the combined focal length.

If the upper limit of conditional expression (3-18) is exceeded, slimming of the image forming optical system and reduction of the overall length of the image forming optical system will tend to become difficult. If the lower limit of conditional expression (3-18) is exceeded, a large mechanical vignetting will occur in regard to rays (beams) that contribute to imaging, and a sufficient light quantity is not achieved in the peripheral region of the picture area.

It is more preferred that the following conditional expression (3-18') be satisfied instead of the above conditional expression (3-18):

$$E/f12<1.2 \quad (3\text{-}18').$$

It is most preferred that the following conditional expression (3-18") be satisfied instead of the above conditional expression (3-18):

$$E/f12<1.0 \quad (3\text{-}18").$$

Embodiments of the image forming optical system include image forming optical systems consisting of five lens groups and image forming optical systems consisting of six lens groups. The imaging optical system having a five-group configuration consists of five lens groups including, in order from the object side, a first lens group G1 having a positive refracting power, a second lens group G2 having a negative refracting power, an aperture stop, a third lens group G3 having a positive refracting power, a fourth lens group G4 having a positive refracting power, and a fifth lens group G5 having a positive or negative refracting power.

The imaging optical system having a six-group configuration consists of six lens groups including, in order from the object side, a first lens group G1 having a positive refracting power, a second lens group G2 having a negative refracting power, a third lens group G31 having a positive refracting power integral with the aperture stop, a fourth lens group G3 having a positive refracting power, a fifth lens group G4 having a positive refracting power, and a sixth lens group G5 having a positive or negative refracting power. The third lens group G31 may be configured to be integral with an aperture stop.

The first lens group G1 includes, as its components, two to four lens components and a reflecting optical element. It is preferred that these components be arranged in the order of at most one lens component, the reflecting optical element, and one or two positive lens components, from the object side. The one or two positive lens components include the lens component C1$p$. In particular, an arrangement including, in order from the object side, a negative lens component having a concave image side surface, a reflecting optical element, and one or two positive lens components is preferred. It is preferred that the reflecting optical element be a prism. The prism is a reflecting optical element for bending the optical path. If the material of the prism (reflecting optical element) has a refractive index of 1.8 or higher, reduction of the overall length can be facilitated.

One of the positive lens components is the lens component C1$p$. A negative lens LA is used in this lens component C1$p$. This negative lens LA is a lens having a relative partial dispersion θgF and an Abbe constant νd that fall within both the area bounded by the straight line given by the equation into which the lowest value in the range defined by conditional expression (3-2) is substituted and the straight line given by the equation into which the highest value in the range defined by conditional expression (3-2) is substituted and the area defined by conditional expression (3-3). The negative lens LA may be a lens having a relative partial dispersion θgF and an Abbe constant νd that fall within the area defined by conditional expression (3-2') and conditional expression (3-3') or within the area defined by conditional expression (3-2") and conditional expression (3-3").

In the lens component C1$p$, the negative lens LA is cemented to a positive lens LB. This positive lens LB is a lens having a relative partial dispersion θgF and an Abbe constant νd that fall within both the area bounded by the straight line given by the equation into which the lowest value in the range defined by conditional expression (3-5) is substituted and the straight line given by the equation into which the highest value in the range defined by conditional expression (3-5) is substituted and the area defined by conditional expression (3-6). The positive lens LB may be a lens having a relative partial dispersion θgF and an Abbe constant νd that fall within the area defined by conditional expression (3-5') and conditional expression (3-6') or within the area defined by conditional expression (3-5") and conditional expression (3-6") instead of conditional expression (3-5).

The second lens group G2 includes two or more lens components. One of the lens components is a cemented lens component made up of a positive lens and a negative lens. The second lens group G2 may include one negative lens component in addition to the cemented lens component. It is desirable that they are arranged in the order of the negative lens component and the cemented lens component, from the object side.

In cases where the image forming optical system consists of five lens groups, the third lens group G3 includes a cemented lens. The third lens group G3 may include a positive lens component in addition to the cemented lens component. It is preferred that the lens located closest to the image side in the third lens group G3 be a negative lens. This negative lens may have a higher curvature in the image side surface. In cases where the image forming optical system consists of six lens groups, the third lens group G3 serves as the fourth lens group G3.

The fourth lens group G4 includes one lens component. The fourth lens group G4 is a lens group arranged subsequent to the third lens group G3. The refracting power of the fourth lens group G4 may be either positive or negative. This lens component may be a single lens. While the fourth lens group G4 having a negative refracting power facilitates size reduction, the fourth lens group G4 having a positive refracting power facilitates aberration correction. In cases where the image forming optical system consists of six lens groups, the fourth lens group G4 serves as the fifth lens group G4.

The fifth lens group G5 includes one lens component. This lens component may be a single lens. The refracting power of the fifth lens group G5 may be either positive or negative. While the fifth lens group G5 having a negative refracting power facilitates size reduction, the fifth lens group G5 having a positive refracting power facilitates aberration correction. As mentioned above, the fifth lens group G5 in the five lens groups serves as the sixth lens group G6 if the image forming optical system consists of six lens groups.

In cases where the image forming optical system consists of six lens groups, another lens group G31 having a positive refracting power is provided between the second lens group G2 and the third lens group G3. The another lens group G31 consists of a single lens and may be configured to be integral with the aperture stop. In cases where the image forming optical system consists of six lens groups, the another lens group G31 serves as the third lens group G31.

If distortion generated by the image forming optical system is corrected by an image processing function of an electronic image pickup apparatus, more excellent correction of other aberrations can be achieved, and a further widening of the angle of view can be achieved.

When a negative lens LA is used in the lens component C1$p$, the negative lens LA is cemented to a positive lens LB. It is preferred that the center thickness of the negative lens LA on the optical axis be smaller than that of the positive lens LB.

In the image forming optical system according to this mode, it is preferred that the center thickness t1 of the negative lens LA on the optical axis satisfy the following conditional expression (3-19):

$$0.01 < t1 < 0.6 \quad (3\text{-}19).$$

It is more preferred that the following conditional expression (3-19') be satisfied instead of the above conditional expression (3-19):

$$0.01 < t1 < 0.4 \quad (3\text{-}19').$$

It is still more preferred that the following conditional expression (3-19") be satisfied instead of the above conditional expression (3-19):

$$0.01 < t1 < 0.2 \quad (3\text{-}19").$$

Suppose that an image of an object at infinity is formed by an optical system free from distortion. In this case, the image has no distortion, and the following equation holds:

$$f = y/\tan\omega \quad (3\text{-}20).$$

Here, y is the height of the image point from the optical axis, f is the focal length of the imaging optical system, ω is the angle of direction toward an object point corresponding to an image point formed at a position at distance y from the center of the image pickup surface with respect to the optical axis.

On the other hand, in the case of an optical system having barrel distortion, the following inequality holds:

$$f > y/\tan\omega \quad (3\text{-}21).$$

This means that if $f$ and $y$ are constant values, ω has a large value.

In view of this, in the image pickup apparatus, it is preferred to intentionally use an optical system having a large barrel distortion particularly at focal lengths near the wide angle end. If this is the case, the angle of view of the optical system can be widened, because correction of distortion is not required.

However, an image of an object formed on the electronic image pickup element has a barrel distortion. So the electronic image pickup apparatus is adapted to process image data obtained through the electronic image pickup element by image processing. In this processing, the image data (or the shape of the image) is transformed in such a way as to correct barrel distortion.

Thus, image data finally obtained will be image data having a shape substantially similar to the object. Therefore, an image of the object based on this image data may be output to a CRT or a printer.

The electronic image pickup apparatus according to this mode has an electronic image pickup element and an image processing unit that processes image data obtained by picking up an image formed through an image forming optical system, which is a zoom lens, by the electronic image pickup element and outputs image data representing an image having a transformed shape, and it is preferred that the zoom lens satisfy the following conditional expression (3-22) when it is focused on an object point substantially at infinity:

$$0.70 < y_{07}/(f_W \cdot \tan \omega_{07w}) < 0.96 \quad (3\text{-}22),$$

where $y_{07}$ is expressed by equation $y_{07} = 0.7 y_{10}$, $y_{10}$ being the maximum image height, and $\omega_{07w}$ is the angle of the direction toward an object point corresponding to an image point formed at a position at distance $y_{07}$ from the center of the image pickup surface at the wide angle end with respect to the optical axis. In the case of the electronic image pickup apparatus according to this mode, the maximum image height is equal to the distance from the center of the effective image pickup area (i.e. the area in which images can be picked up) of the electronic image pickup element to the point farthest from the center within the effective image pickup area. Therefore, $y_{10}$ also is the distance from the center of the effective image pickup area (i.e. an area in which images can be picked up) of the electronic image pickup element to the point farthest from the center within the effective image pickup area.

The above conditional expression (3-22) specifies the degree of barrel distortion at the wide angle end zoom position. If conditional expression (3-22) is satisfied, information over the wide angle view can be taken without an increase in the size of the optical system. An image having barrel distortion is photo-electrically converted by the image pickup element into image data having barrel distortion.

In the image processing unit, which is a signal processing system of the electronic image pickup apparatus, the image data having barrel distortion is subject to the electrical processing of changing the shape of the image. Thus, when the image data finally output from the image processing unit is reproduced on a display apparatus, distortion has been corrected, and an image substantially similar to the shape of the object.

If the term in conditional expression (3-22) has a value larger than the upper limit of conditional expression (3-22), in particular if it has a value close to 1, an image that is excellently corrected optically in terms of distortion can be obtained. Therefore, correction made by the image processing unit may be small. However, it will be difficult to widen the angle of view of the optical system while maintaining compactness of the optical system.

On the other hand, if the lower limit of conditional expression (3-22) is exceeded, when image distortion caused by distortion of the optical system is corrected by the image processing unit, the extension ratio in radial directions will become unduly high in the peripheral region of the angle of view. In consequence, deterioration of sharpness in the peripheral region of picked-up images will become conspicuous.

As described above, if conditional expression (3-22) is satisfied, compactness of the optical system and a wide angle of view (i.e. an angle of view of 38° or higher with respect to the vertical direction with distortion) can be achieved.

It is more preferred that the following conditional expression (3-22') be satisfied instead of the above conditional expression (3-22):

$$0.75 < y_{07}/(f_W \cdot \tan \omega_{07w}) < 0.95 \quad (3\text{-}22').$$

It is still more preferred that the following conditional expression (3-22") be satisfied instead of the above conditional expression (3-22):

$$0.80 < y_{07}/(f_W \cdot \tan \omega_{07w}) < 0.94 \quad (3\text{-}22").$$

It is more preferred that the following conditional expression (3-22''') be satisfied instead of the above conditional expression (3-22):

$$0.70 < y_{07}/(f_W \cdot \tan \omega_{07w}) < 0.94 \quad (3\text{-}22''').$$

It is still more preferred that the following conditional expression (3-22'''') be satisfied instead of the above conditional expression (3-22):

$$0.75 < y_{07}/(f_W \cdot \tan \omega_{07w}) < 0.92 \quad (3\text{-}22'''').$$

It is more preferred that the following conditional expression (3-22''''') be satisfied instead of the above conditional expression (3-22):

$$0.75 < y_{07}/(f_W \cdot \tan \omega_{07w}) < 0.955 \quad (3\text{-}22''''').$$

It is still more preferred that the following conditional expression (3-22'''''') be satisfied instead of the above conditional expression (3-22):

$$0.80 < y_{07}/(f_W \cdot \tan \omega_{07w}) < 0.95 \quad (3\text{-}22'''''').$$

In the image forming optical system according to this mode, it is preferred that the negative lens LA satisfy the following conditional expression (3-23):

$$1.58 < nd(LA) < 1.85 \quad (3\text{-}23),$$

where nd is the refractive index of the material of the negative lens LA.

If the lower limit of conditional expression (3-23) is exceeded, correction of spherical aberration will be difficult. On the other hand, if the upper limit of conditional expression (3-23) is exceeded, it will be difficult to prevent reflection, though there is little demerit in terms of correction of aberrations.

It is more preferred that the following conditional expression (3-23') be satisfied:

$$1.60 < nd(LA) < 1.80 \quad (3\text{-}23').$$

It is still more preferred that the following conditional expression (3-23") be satisfied:

$$1.62 < nd(LA) < 1.75 \quad (3\text{-}23").$$

In the image forming optical system according to this mode, it is also preferred that the positive lens LB satisfy the following conditional expression (3-24):

$$1.68 < nd(LB) < 2.40 \quad (3\text{-}24),$$

where nd(LB) is the refractive index of the material of the positive lens LB.

If the lower limit of conditional expression (3-24) is exceeded, it will be difficult to achieve size reduction and correction of spherical aberration and astigmatism at the same time. If the upper limit of conditional expression (3-24) is exceeded, it will be difficult to prevent reflection.

It is more preferred that the following conditional expression (3-24') be satisfied:

$$1.74 < nd(LB) < 2.30 \quad (3\text{-}24').$$

It is still more preferred that the following conditional expression (3-24") be satisfied:

$$1.80 < nd(LB) < 2.20 \quad (3\text{-}24").$$

When the image forming optical system according to the present invention satisfies the above described conditional expressions or has the above described configurational features individually, size reduction and slimming of the image forming optical system can both be achieved, and in addition good correction of aberrations can be achieved. The image forming optical system according to the present invention may be provided with (or satisfy) the above-described conditional expression and configurational features in combination. If this is the case, further size reduction and slimming of the image forming optical system or better aberration correction can be achieved. In the electronic image pickup apparatus equipped with the image forming optical system according to this mode, sharpness and prevention of color blur in picked up images can be achieved by virtue of the above-described image forming optical system.

When the image forming optical system according to the present invention satisfies the above described conditional expressions or has the above described configurational features individually, size reduction and slimming of the image forming optical system can both be achieved, and in addition good correction of aberrations can be achieved. The image forming optical system according to the present invention may be provided with (or satisfy) the above-described conditional expression and configurational features in combination. If this is the case, further size reduction and slimming of the image forming optical system or better aberration correction can be achieved.

In the electronic image pickup apparatus equipped with the image forming optical system according to this mode, sharpness and prevention of color blur in picked up images can be achieved by virtue of the above-described image forming optical system.

In the following, embodiments of the image forming optical system (which will be referred to as the "zoom lens" where appropriate) and the image pickup apparatus according to the present invention will be described in detail with reference to the drawings. The present invention is not limited by the embodiments.

Figure 1B:
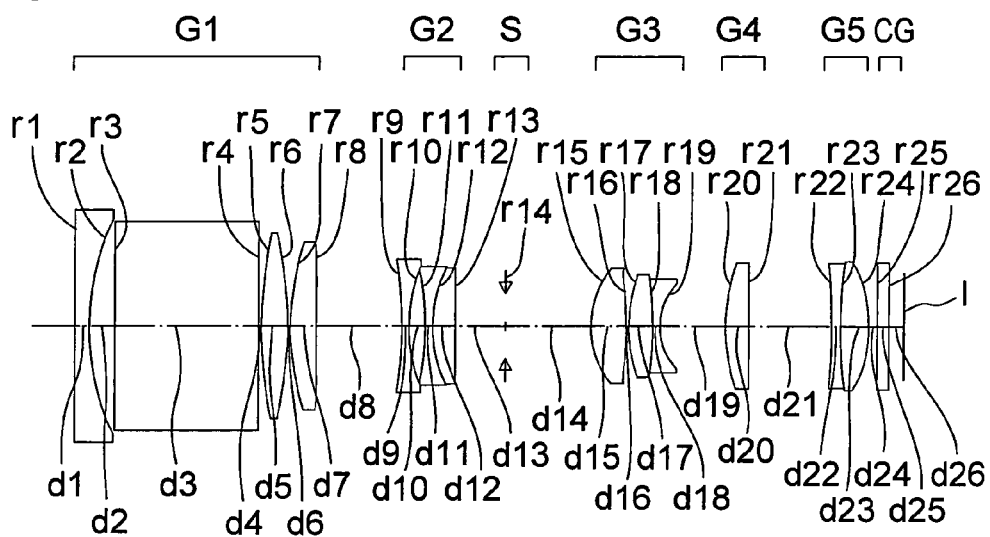
Figure 1C:
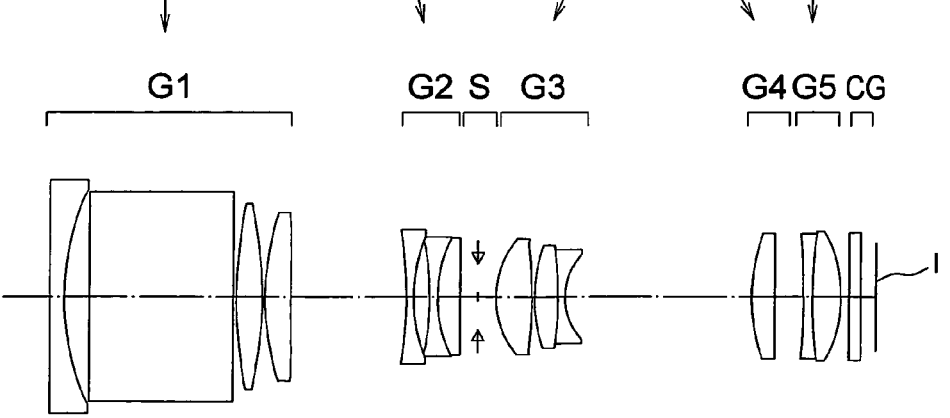

Now, a zoom lens according to embodiment 1 of the present invention will be described. FIGS. 1A, 1B, and 1C are cross sectional views taken along the optical axis showing the optical configuration of the zoom lens according to embodiment 1 of the present invention in the state in which the zoom lens is focused on an object point at infinity, where FIG. 1A is a cross sectional view of the zoom lens at the wide angle end, FIG. 1B is a cross sectional view of the zoom lens in an intermediate focal length state, and FIG. 1C is a cross sectional view of the zoom lens at the telephoto end.

Figure 2A:
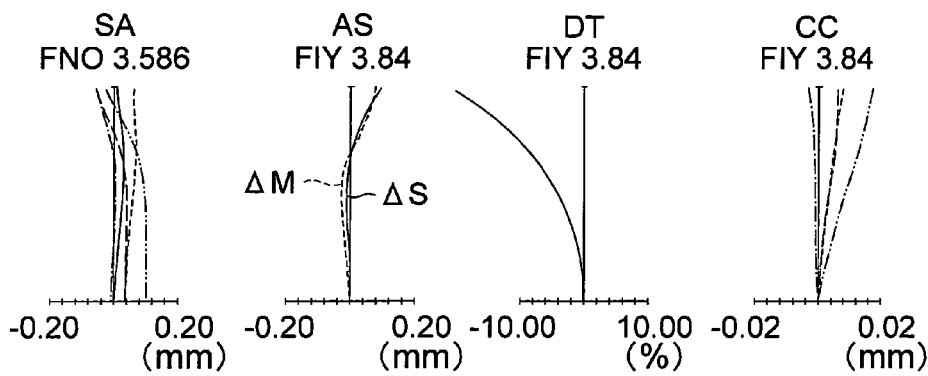
FIGS. 2A, 2B, and 2C are diagrams showing spherical aberration, astigmatism, distortion, and chromatic aberration of magnification of the zoom lens according to embodiment 1 in the state in which the zoom lens is focused on an object point at infinity, where
Figure 2B:
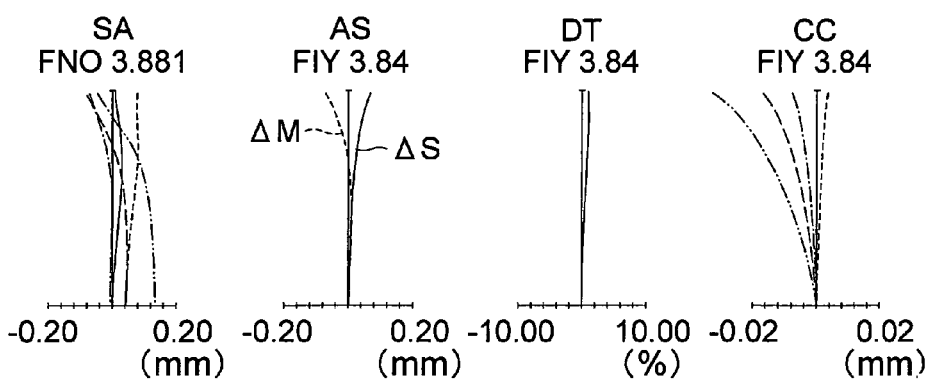
Figure 2C:
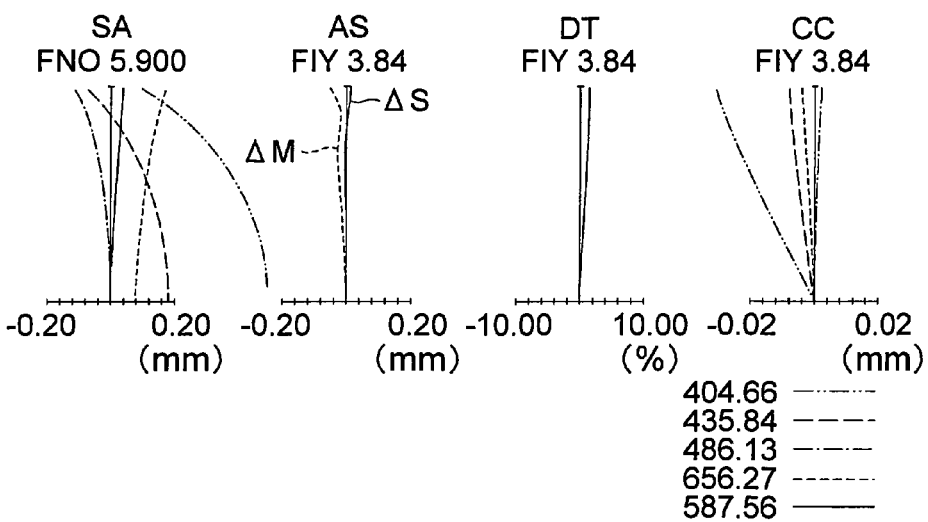

FIGS. 2A, 2B, and 2C are diagrams showing spherical aberration (SA), astigmatism (AS), distortion (DT), and chromatic aberration of magnification (CC) of the zoom lens according to embodiment 1 in the state in which the zoom lens is focused on an object point at infinity, where FIG. 1A is for the wide angle end, FIG. 1B is for the intermediate focal length state, and FIG. 1C is for the telephoto end. Sign "FIY" represents the image height. The signs in the aberration diagrams are commonly used also in the embodiments described in the following.

As shown in FIGS. 1A, 1B, and 1C, the zoom lens according to embodiment 1 includes a first lens group G1 having a positive refracting power, a second lens group G2 having a negative refracting power, an aperture stop S, a third lens group G3 having a positive refracting power, a fourth lens group G4 having a positive refracting power, and a fifth lens group G5 having a positive refracting power, which are arranged in order from the object side.

The first lens group G1 is composed of a plano-concave lens L1 having a concave surface directed toward the image side, a prism L2 whose object side surface and image side surface are both planar, a biconvex positive lens L3, and a biconvex positive lens L4, and has a positive refracting power as a whole.

The second lens group G2 is composed of a biconcave negative lens L5, and a cemented lens made up of a biconcave negative lens L6 and a positive meniscus lens L7 having a convex surface directed to the object side, and has a negative refracting power as a whole.

The third lens group G3 is composed of a biconvex positive lens L8, and a cemented lens made up of a biconvex positive lens L9 and a biconcave negative lens L10, and has a positive refracting power as a whole.

The fourth lens group G4 is composed of a biconvex positive lens L11 and has a positive refracting power.

The fifth lens group G5 is composed of a cemented lens made up of a biconcave negative lens L12 and a biconvex positive lens L13, and has a positive refracting power as a whole.

During zooming from the wide angle end to the telephoto end, the first lens group G1 is fixed, the second lens group G2 moves toward the image side, the third lens group G3 is kept nearly stationary during zooming from the wide angle end to an intermediate focal length position and moves toward the object side during zooming from the intermediate focal length position to the telephoto end, the fourth lens group G4 is kept nearly stationary during zooming from the wide angle end to the intermediate focal length position and moves toward the image side during zooming from the intermediate focal length position to the telephoto end, and the fifth lens group G5 is fixed. The position of the aperture stop S is fixed. The light quantity is controlled by varying the aperture size.

There are six aspheric surfaces in total, which include the object side surface of the object side biconvex positive lens L3 in the first lens group G1, the image side surface of the object side biconcave negative lens L5 in the second lens group G2, both surfaces of the object side biconvex positive lens L8 in the third lens group G3, the object side surface of the biconvex positive lens L11 in the fourth lens group G4, and the object side surface of the biconcave negative lens L12 in the fifth lens group G5.

Figure 3A:
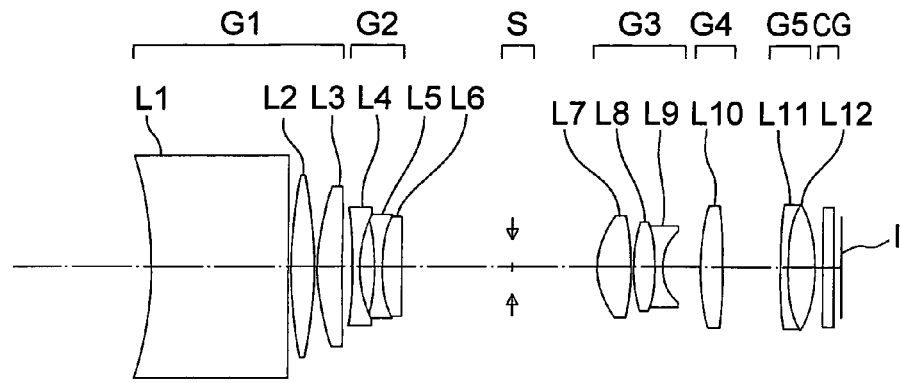
FIGS. 3A, 3B, and 3C are cross sectional views taken along the optical axis showing the optical configuration of a zoom lens according to embodiment 2 of the present invention in the state in which the zoom lens is focused on an object point at infinity, respectively at the wide angle end, at an intermediate focal length, and at the telephoto end.
Figure 3B:
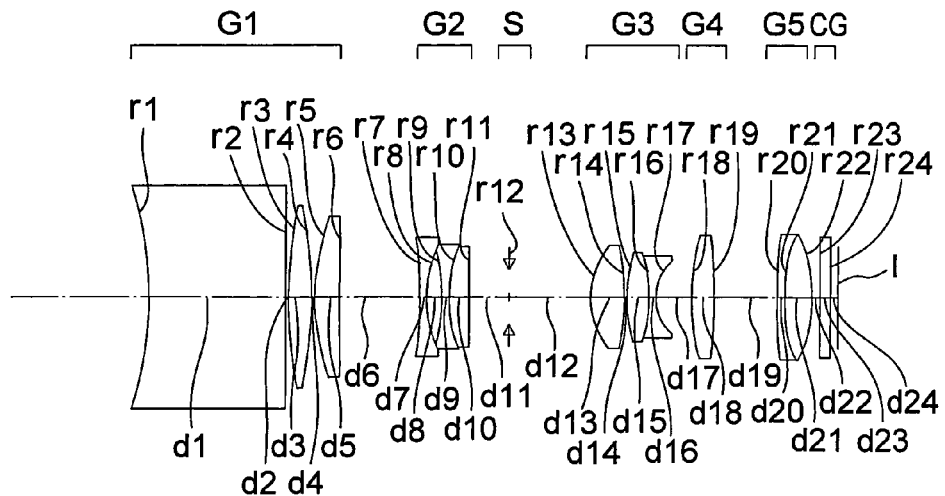
Figure 3C:
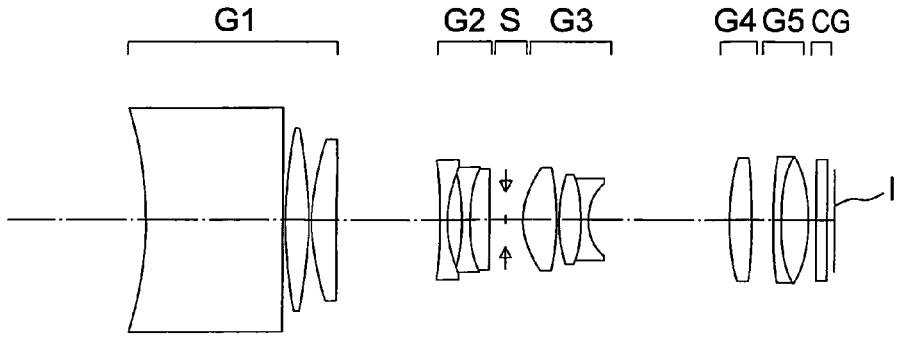

Next, a zoom lens according to embodiment 2 of the present invention will be described. FIGS. 3A, 3B, and 3C are cross sectional views taken along the optical axis showing the optical configuration of the zoom lens according to embodiment 2 of the present invention in the state in which the zoom lens is focused on an object point at infinity, where FIG. 3A is a cross sectional view of the zoom lens at the wide angle end, FIG. 3B is a cross sectional view of the zoom lens in an intermediate focal length state, and FIG. 3C is a cross sectional view of the zoom lens at the telephoto end.

Figure 4A:
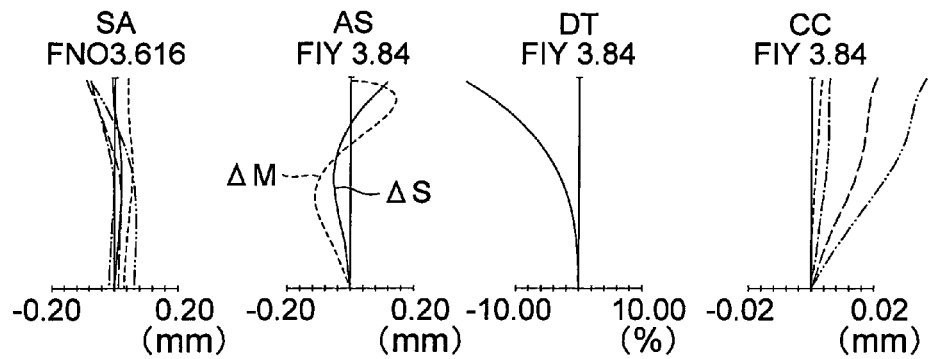
FIGS. 4A, 4B, and 4C are diagrams showing spherical aberration, astigmatism, distortion, and chromatic aberration of magnification of the zoom lens according to embodiment 2 in the state in which the zoom lens is focused on an object point at infinity, where
Figure 4B:
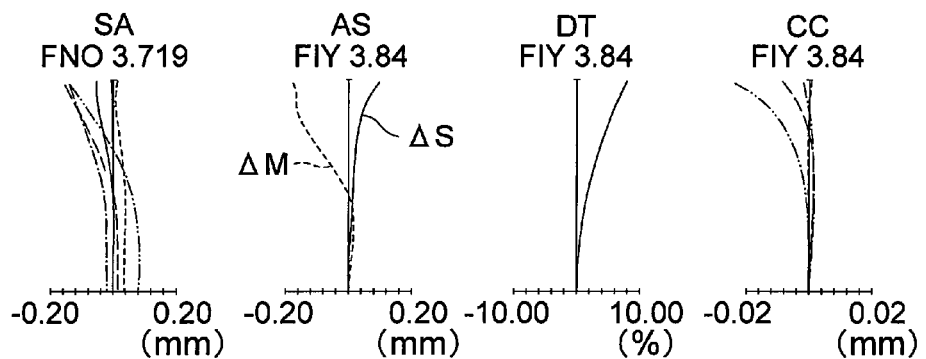
Figure 4C:
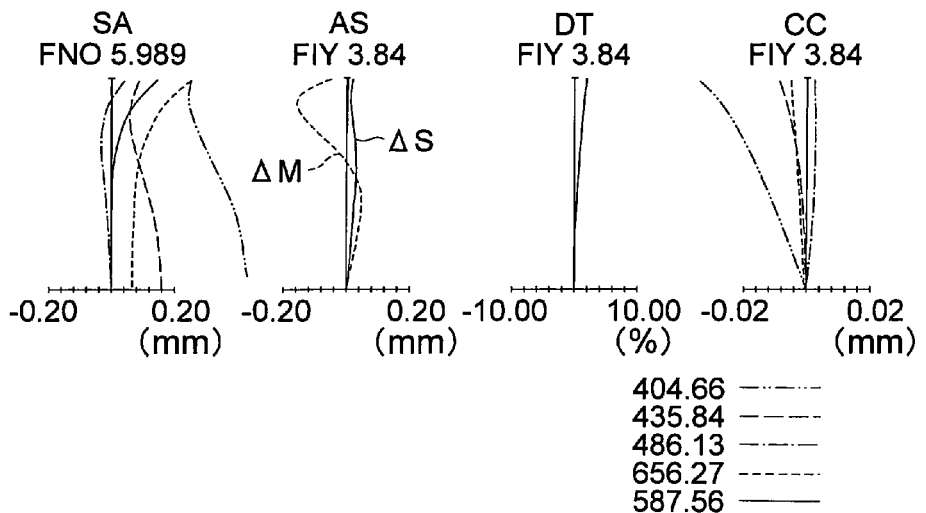

FIGS. 4A, 4B, and 4C are diagrams showing spherical aberration, astigmatism, distortion, and chromatic aberration of magnification of the zoom lens according to embodiment 2 in the state in which the zoom lens is focused on an object point at infinity, where FIG. 4A is for the wide angle end, FIG. 4B is for the intermediate focal length state, and FIG. 4C is for the telephoto end.

As shown in FIGS. 3A, 3B, and 3C, the zoom lens according to embodiment 2 includes a first lens group G1 having a positive refracting power, a second lens group G2 having a negative refracting power, an aperture stop S, a third lens group G3 having a positive refracting power, a fourth lens group G4 having a positive refracting power, and a fifth lens group G5 having a positive refracting power, which are arranged in order from the object side.

The first lens group G1 is composed of a prism L1 whose object side surface is concave and whose image side surface is planar, a biconvex positive lens L2, and a positive meniscus lens L3 having a convex surface directed toward the object side, and has a positive refracting power as a whole.

The second lens group G2 is composed of a biconcave negative lens L4, and a cemented lens made up of a biconcave negative lens L5 and a positive meniscus lens L6 having a convex surface directed to the object side, and has a negative refracting power as a whole.

The third lens group G3 is composed of a biconvex positive lens L7, and a cemented lens made up of a biconvex positive lens L8 and a biconcave negative lens L9, and has a positive refracting power as a whole.

The fourth lens group G4 is composed of a biconvex positive lens L10 and has a positive refracting power.

The fifth lens group G5 is composed of a cemented lens made up of a negative meniscus lens L11 having a convex surface directed toward the object side and a biconvex positive lens L12, and has a positive refracting power as a whole.

During zooming from the wide angle end to the telephoto end, the first lens group G1 is fixed, the second lens group G2 moves toward the image side, the third lens group G3 is kept nearly stationary during zooming from the wide angle end to an intermediate focal length position and moves toward the object side during zooming from the intermediate focal length position to the telephoto end, the fourth lens group G4 is kept nearly stationary during zooming from the wide angle end to the intermediate focal length position and moves toward the image side during zooming from the intermediate focal length position to the telephoto end, and the fifth lens group G5 is fixed. The position of the aperture stop S is fixed. The light quantity is controlled by varying the aperture size.

There are six aspheric surfaces in total, which include the object side surface of the prism L1 in the first lens group G1, the object side surface of the positive meniscus lens L3 having a convex surface directed toward the object side in the first lens group L1, the image side surface of the object side biconcave negative lens L4 in the second lens group G2, both surfaces of the object side biconvex positive lens L7 in the third lens group G3, and the object side surface of the biconvex positive lens L10 in the fourth lens group G4.

Figure 5A:
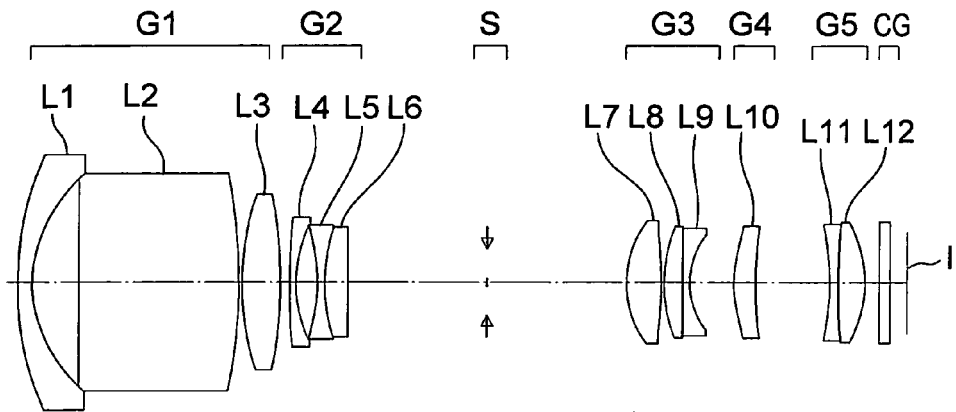
FIGS. 5A, 5B, and 5C are cross sectional views taken along the optical axis showing the optical configuration of a zoom lens according to embodiment 3 of the present invention in the state in which the zoom lens is focused on an object point at infinity, respectively at the wide angle end, at an intermediate focal length, and at the telephoto end.
Figure 5B:
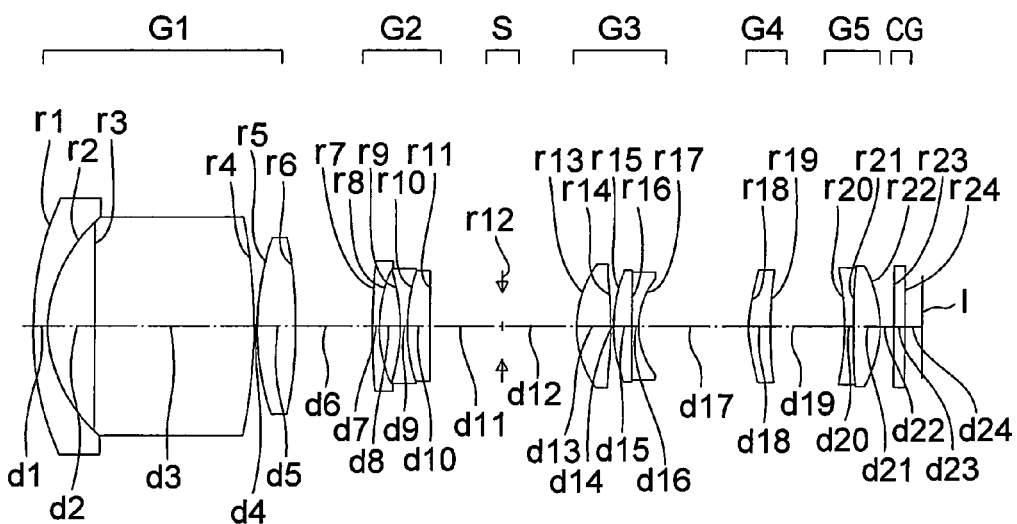
Figure 5C:
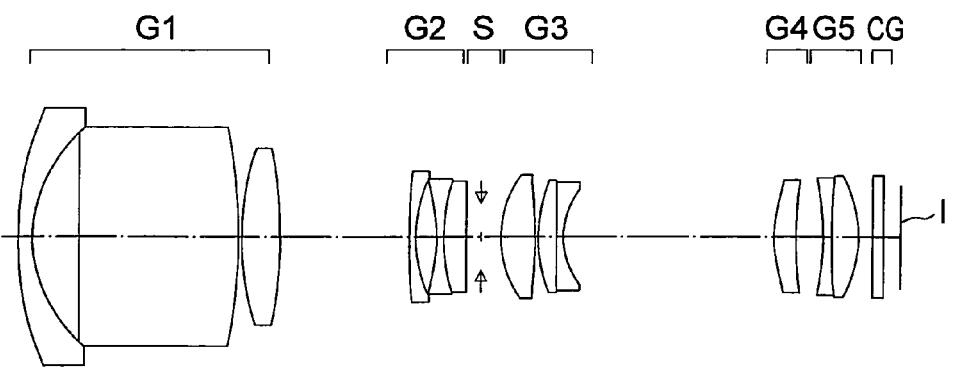

Next, a zoom lens according to embodiment 3 of the present invention will be described. FIGS. 5A, 5B, and 5C are cross sectional views taken along the optical axis showing the optical configuration of the zoom lens according to embodiment 3 of the present invention in the state in which the zoom lens is focused on an object point at infinity, where FIG. 5A is a cross sectional view of the zoom lens at the wide angle end, FIG. 5B is a cross sectional view of the zoom lens in an intermediate focal length state, and FIG. 5C is a cross sectional view of the zoom lens at the telephoto end.

Figure 6A:
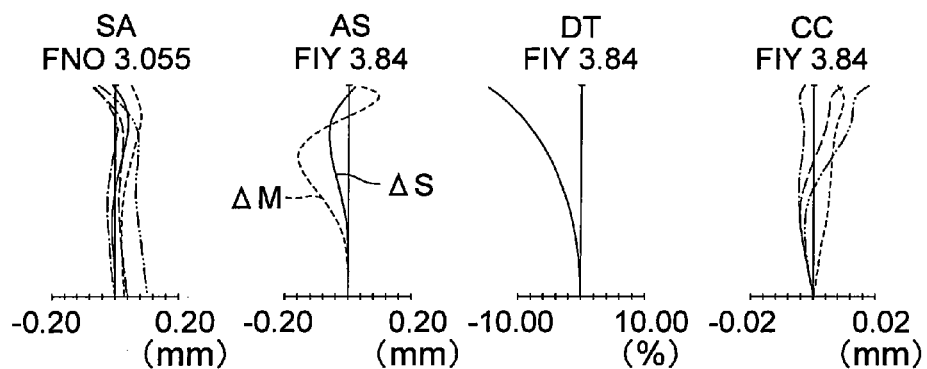
FIGS. 6A, 6B, and 6C are diagrams showing spherical aberration, astigmatism, distortion, and chromatic aberration of magnification of the zoom lens according to embodiment 3 in the state in which the zoom lens is focused on an object point at infinity, where
Figure 6B:
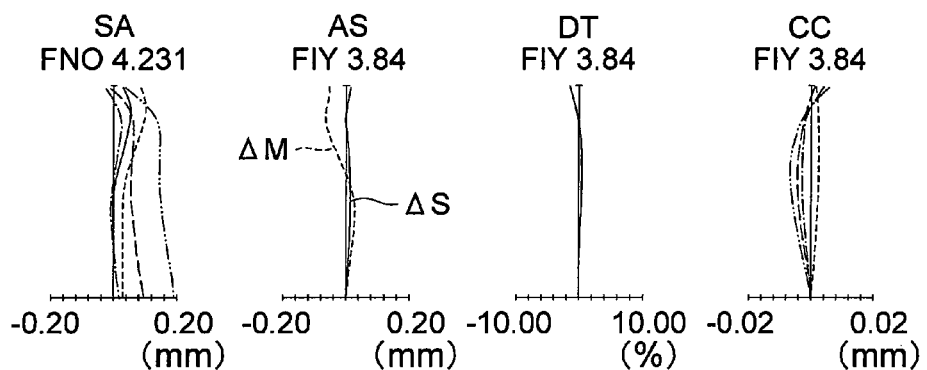
Figure 6C:
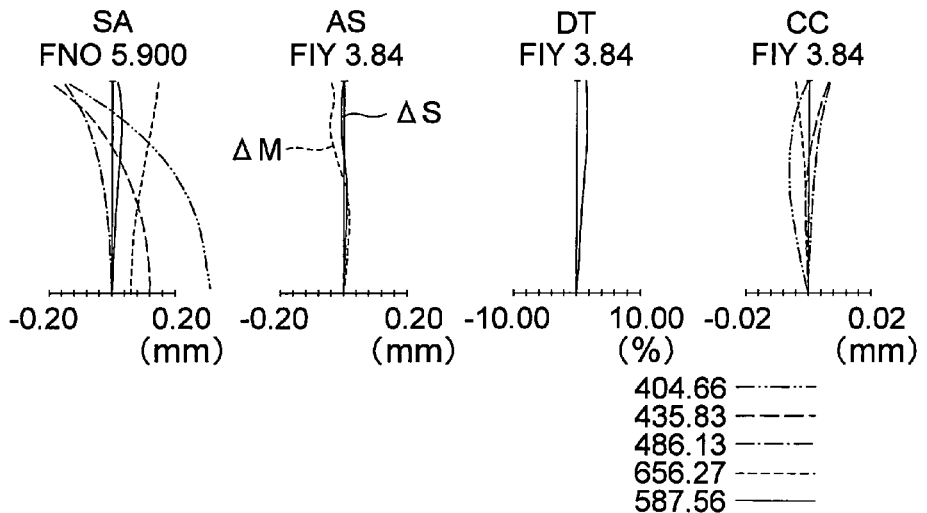

FIGS. 6A, 6B, and 6C are diagrams showing spherical aberration, astigmatism, distortion, and chromatic aberration of magnification of the zoom lens according to embodiment 3 in the state in which the zoom lens is focused on an object point at infinity, where FIG. 6A is for the wide angle end, FIG. 6B is for the intermediate focal length state, and FIG. 6C is for the telephoto end.

As shown in FIGS. 5A, 5B, and 5C, the zoom lens according to embodiment 3 includes a first lens group G1 having a positive refracting power, a second lens group G2 having a negative refracting power, an aperture stop S, a third lens group G3 having a positive refracting power, a fourth lens group G4 having a positive refracting power, and a fifth lens group G5 having a negative refracting power, which are arranged in order from the object side.

The first lens group G1 is composed of a negative meniscus lens L1 having a convex surface directed toward the object side, a biconvex positive lens L2, and a positive meniscus lens L3 having a convex surface directed toward the object side, and has a positive refracting power as a whole.

The second lens group G2 is composed of a negative meniscus lens L4 having a convex surface directed toward the object side, and a cemented lens made up of a biconcave negative lens L5 and a biconvex positive lens L6, and has a negative refracting power as a whole.

The third lens group G3 is composed of a biconvex positive lens L7, and a cemented lens made up of a biconvex positive lens L8 and a biconcave negative lens L9, and has a positive refracting power as a whole.

The fourth lens group G4 is composed of a positive meniscus lens L10 having a convex surface directed toward the object side and has a positive refracting power.

The fifth lens group G5 is composed of a cemented lens made up of a biconcave negative lens L11 and a biconvex positive lens L12, and has a negative refracting power as a whole.

During zooming from the wide angle end to the telephoto end, the first lens group G1 is fixed, the second lens group G2 moves toward the image side, the third lens group G3 moves toward the object side, the fourth lens group G4 is kept nearly stationary during zooming from the wide angle end to an intermediate focal length position and moves toward the image side during zooming from the intermediate focal length position to the telephoto end, and the fifth lens group G5 is fixed. The position of the aperture stop S is fixed. The light quantity is controlled by varying the aperture size.

There are six aspheric surfaces in total, which include the object side surface of the biconvex positive lens L3 in the first lens group G1, the image side surface of the negative meniscus lens L4 having a convex surface directed toward the object side in the second lens group G2, both surfaces of the object side biconvex positive lens L7 in the third lens group G3, the object side surface of the positive meniscus lens L10 having a convex surface directed toward the object side in the fourth lens group G4, and the object side surface of the biconcave negative lens L11 in the fifth lens group G5.

Figure 7A:
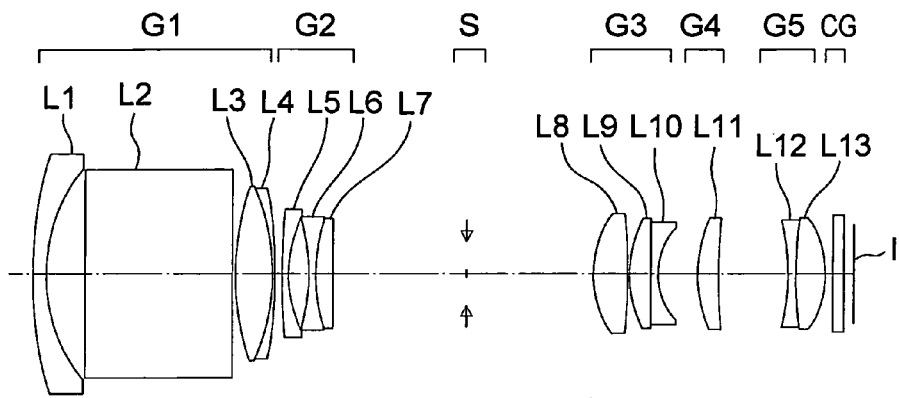
FIGS. 7A, 7B, and 7C are cross sectional views taken along the optical axis showing the optical configuration of a zoom lens according to embodiment 4 of the present invention in the state in which the zoom lens is focused on an object point at infinity, respectively at the wide angle end, at an intermediate focal length, and at the telephoto end.
Figure 7B:
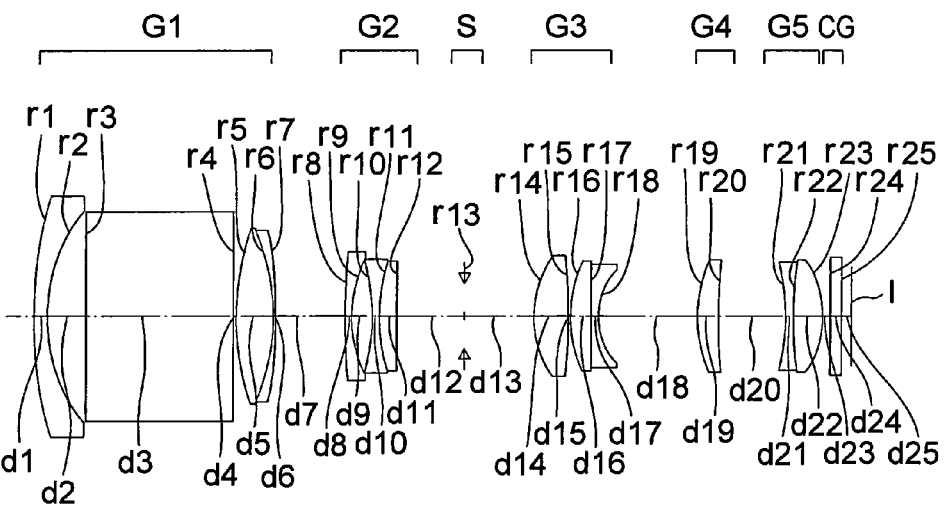
Figure 7C:
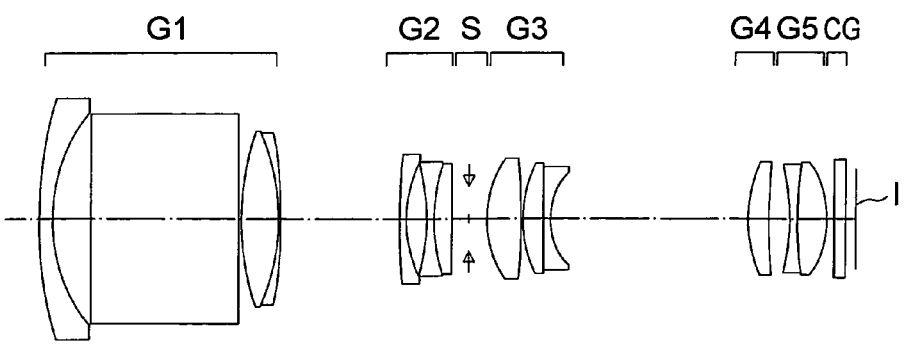

Next, a zoom lens according to embodiment 4 of the present invention will be described. FIGS. 7A, 7B, and 7C are cross sectional views taken along the optical axis showing the optical configuration of the zoom lens according to embodiment 4 of the present invention in the state in which the zoom lens is focused on an object point at infinity, where FIG. 7A is a cross sectional view of the zoom lens at the wide angle end, FIG. 7B is a cross sectional view of the zoom lens in an intermediate focal length state, and FIG. 7C is a cross sectional view of the zoom lens at the telephoto end.

Figure 8A:
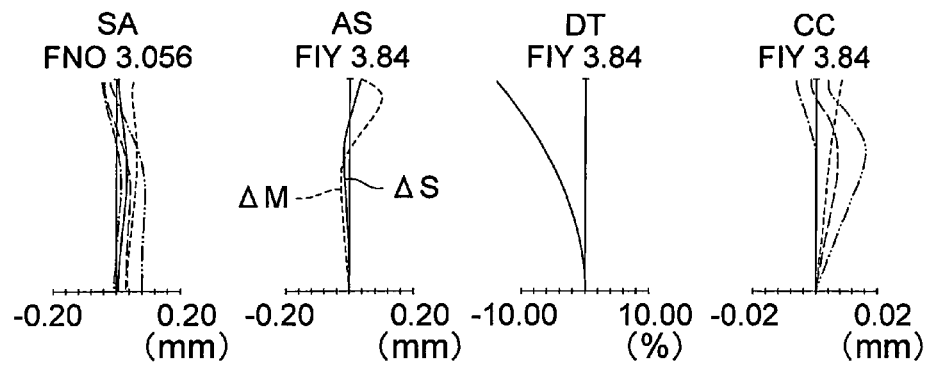
FIGS. 8A, 8B, and 8C are diagrams showing spherical aberration, astigmatism, distortion, and chromatic aberration of magnification of the zoom lens according to embodiment 4 in the state in which the zoom lens is focused on an object point at infinity, where
Figure 8B:
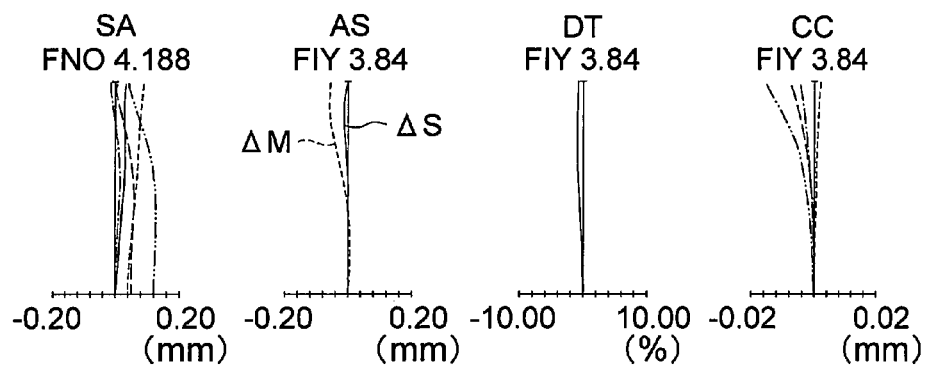
Figure 8C:
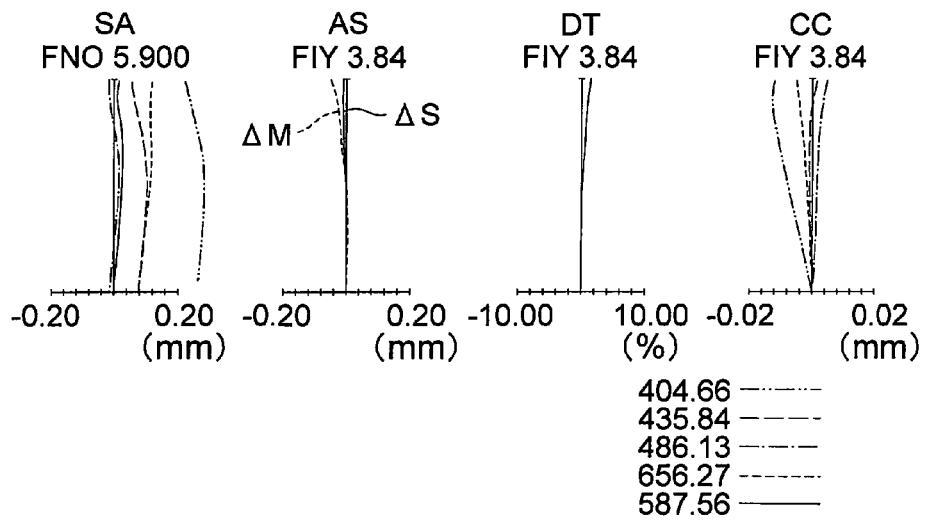

FIGS. 8A, 8B, and 8C are diagrams showing spherical aberration, astigmatism, distortion, and chromatic aberration of magnification of the zoom lens according to embodiment 4 in the state in which the zoom lens is focused on an object point at infinity, where FIG. 8A is for the wide angle end, FIG. 8B is for the intermediate focal length state, and FIG. 8C is for the telephoto end.

As shown in FIGS. 7A, 7B, and 7C, the zoom lens according to embodiment 4 includes a first lens group G1 having a positive refracting power, a second lens group G2 having a negative refracting power, an aperture stop S, a third lens group G3 having a positive refracting power, a fourth lens group G4 having a positive refracting power, and a fifth lens group G5 having a negative refracting power, which are arranged in order from the object side.

The first lens group G1 is composed of a negative meniscus lens L1 having a convex surface directed toward the object side, a prism L2 whose object side surface and image side surface are both planar, and a cemented lens made up of a biconvex positive lens L3 and a negative meniscus lens L4 having a convex surface directed toward the image side, and has a positive refracting power as a whole.

The second lens group G2 is composed of a negative meniscus lens L5 having a convex surface directed toward the object side, and a cemented lens made up of a biconcave negative lens L6 and a biconvex positive lens L7, and has a negative refracting power as a whole.

The third lens group G3 is composed of a biconvex positive lens L8, and a cemented lens made up of a biconvex positive lens L9 and a biconcave negative lens L10, and has a positive refracting power as a whole.

The fourth lens group G4 is composed of a positive meniscus lens L11 having a convex surface directed toward the object side and has a positive refracting power.

The fifth lens group G5 is composed of a cemented lens made up of a biconcave negative lens L12 and a biconvex positive lens L13, and has a negative refracting power as a whole.

During zooming from the wide angle end to the telephoto end, the first lens group G1 is fixed, the second lens group G2 moves toward the image side, the third lens group G3 moves toward the object side, the fourth lens group G4 is kept nearly stationary during zooming from the wide angle end to an intermediate focal length position and moves toward the image side during zooming from the intermediate focal length position to the telephoto end, and the fifth lens group G5 is fixed. The position of the aperture stop S is fixed. The light quantity is controlled by varying the aperture size.

There are eight aspheric surfaces in total, which include both surfaces of a biconvex positive lens L3 in the first lens group G1, the image side surface of the negative meniscus lens L4 having a convex surface directed toward the image side in the first lens group G1, the image side surface of the negative meniscus lens L5 having a convex surface directed toward the object side in the second lens group G2, both surfaces of the object side biconvex positive lens L8 in the third lens group G3, the object side surface of the positive meniscus lens L11 having a convex surface directed toward the object side in the fourth lens group G4, and the object side surface of the biconcave negative lens L12 in the fifth lens group G5.

Figure 9A:
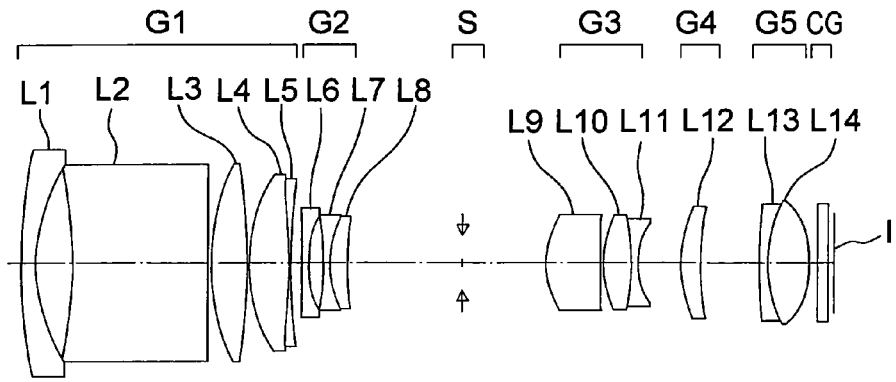
FIGS. 9A, 9B, and 9C are cross sectional views taken along the optical axis showing the optical configuration of a zoom lens according to embodiment 5 of the present invention in the state in which the zoom lens is focused on an object point at infinity, respectively at the wide angle end, at an intermediate focal length, and at the telephoto end.
Figure 9B:
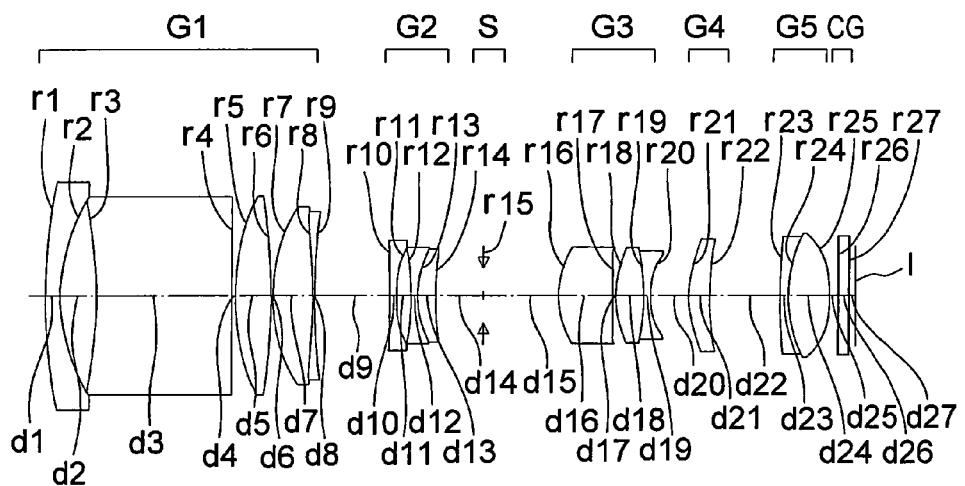
Figure 9C:
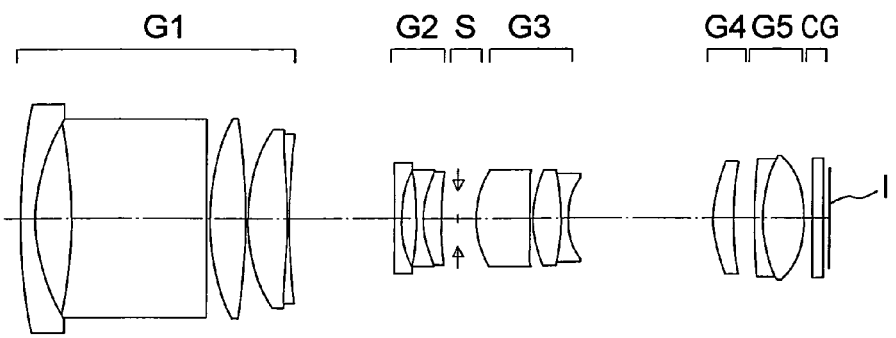

Next, a zoom lens according to embodiment 5 of the present invention will be described. FIGS. 9A, 9B, and 9C are cross sectional views taken along the optical axis showing the optical configuration of the zoom lens according to embodiment 5 of the present invention in the state in which the zoom lens is focused on an object point at infinity, where FIG. 9A is a cross sectional view of the zoom lens at the wide angle end, FIG. 9B is a cross sectional view of the zoom lens in an intermediate focal length state, and FIG. 9C is a cross sectional view of the zoom lens at the telephoto end.

Figure 10A:
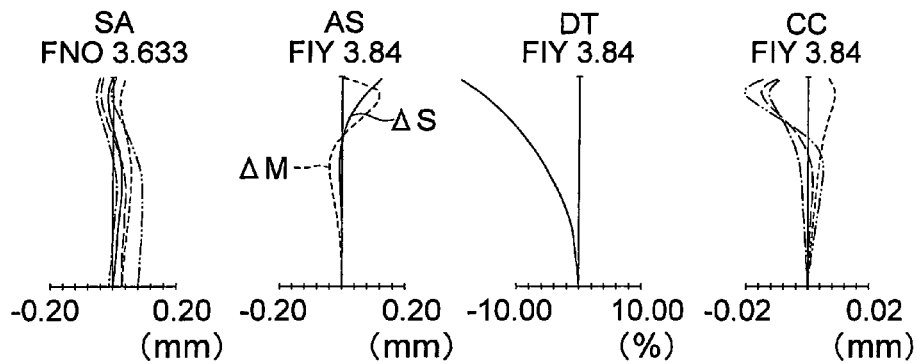
FIGS. 10A, 10B, and 10C are diagrams showing spherical aberration, astigmatism, distortion, and chromatic aberration of magnification of the zoom lens according to embodiment 5 in the state in which the zoom lens is focused on an object point at infinity, where
Figure 10B:
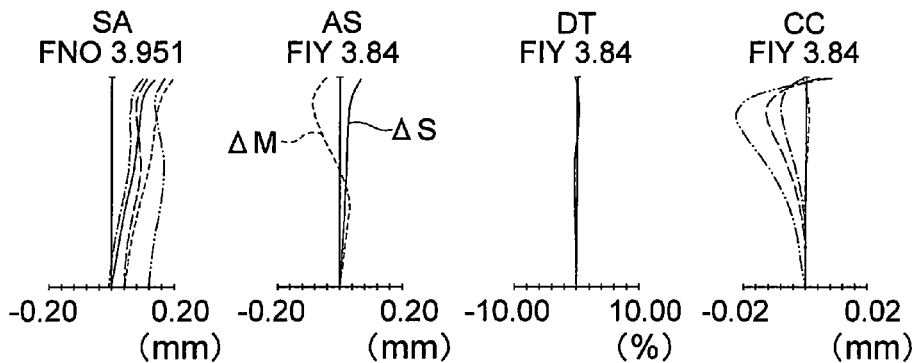
Figure 10C:
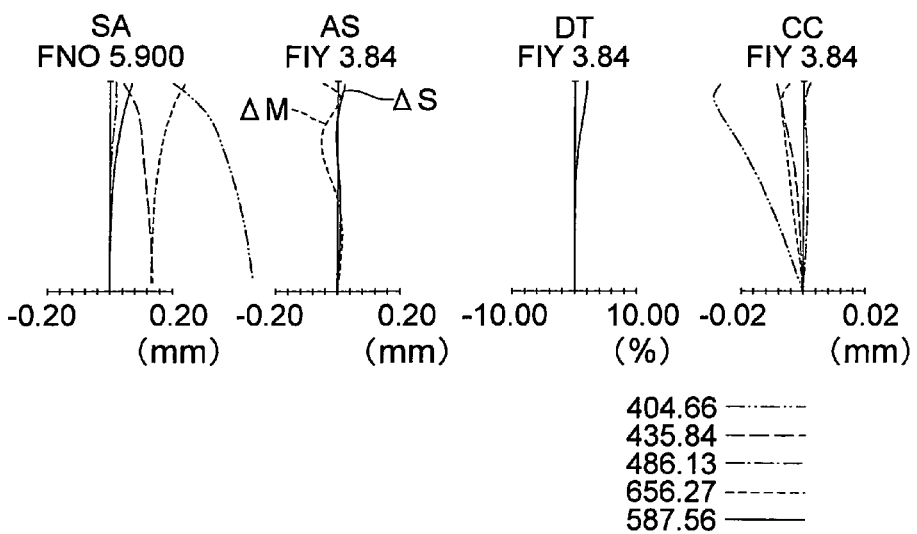

FIGS. 10A, 10B, and 100 are diagrams showing spherical aberration, astigmatism, distortion, and chromatic aberration of magnification of the zoom lens according to embodiment 5 in the state in which the zoom lens is focused on an object point at infinity, where FIG. 10A is for the wide angle end, FIG. 10B is for the intermediate focal length state, and FIG. 100 is for the telephoto end.

As shown in FIGS. 9A, 9B, and 9C, the zoom lens according to embodiment 5 includes a first lens group G1 having a positive refracting power, a second lens group G2 having a negative refracting power, an aperture stop S, a third lens group G3 having a positive refracting power, a fourth lens group G4 having a positive refracting power, and a fifth lens group G5 having a positive refracting power, which are arranged in order from the object side.

The first lens group G1 is composed of a negative meniscus lens L1 having a convex surface directed toward the object side, a prism L2 whose object side surface is a concave and whose image side surface is planar, an object side biconvex positive lens L3, and a cemented lens made up of a biconvex positive lens L4 and a biconcave negative lens L5, and has a positive refracting power as a whole.

The second lens group G2 is composed of an object side biconcave negative lens L6, and a cemented lens made up of a biconcave negative lens L7 and a positive meniscus lens L8 having a convex surface directed to the object side, and has a negative refracting power as a whole.

The third lens group G3 is composed of an object side biconvex positive lens L9, and a cemented lens made up of a biconvex positive lens L10 and a biconcave negative lens L11, and has a positive refracting power as a whole.

The fourth lens group G4 is composed of a positive meniscus lens L12 having a convex surface directed toward the object side and has a positive refracting power.

The fifth lens group G5 is composed of a cemented lens made up of a negative meniscus lens L13 having a convex surface directed toward the object side and a biconvex positive lens L14, and has a positive refracting power as a whole.

During zooming from the wide angle end to the telephoto end, the first lens group G1 is fixed, the second lens group G2 moves toward the image side, the third lens group G3 is kept nearly stationary during zooming from the wide angle end to an intermediate focal length position and moves toward the object side during zooming from the intermediate focal length position to the telephoto end, the fourth lens group G4 is kept nearly stationary during zooming from the wide angle end to the intermediate focal length position and moves toward the image side during zooming from the intermediate focal length position to the telephoto end, and the fifth lens group G5 is fixed. The position of the aperture stop S is fixed. The light quantity is controlled by varying the aperture size.

There are nine aspheric surfaces in total, which include the image side surface of the negative meniscus lens L1 having a convex surface directed toward the object side in the first lens group G1, both surfaces of the image side biconvex positive lens L4 in the first lens group G1, the image side surface of the biconcave negative lens L5 in the first lens group G1, the image side surface of the object side biconcave negative lens L6 in the second lens group G2, both surfaces of the object side biconvex positive lens L9 in the third lens group G3, the object side surface of the positive meniscus lens L12 having a convex surface directed toward the object side in the fourth lens group G4, and the image side surface of the biconvex positive lens L14 in the fifth lens group G5.

Figure 11A:
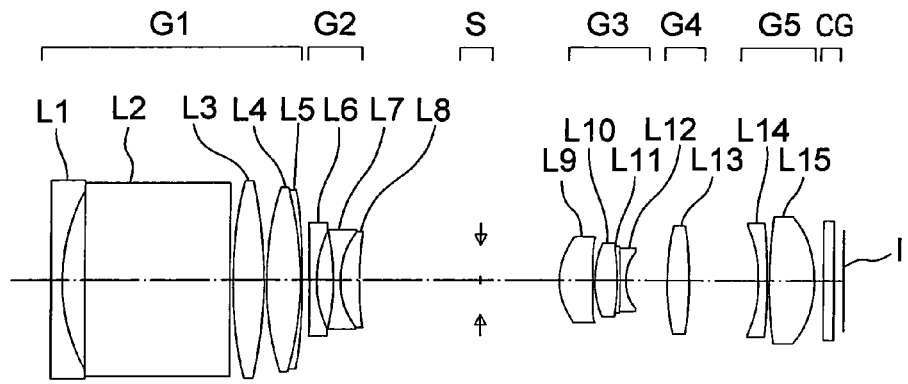
FIGS. 11A, 11B, and 11C are cross sectional views taken along the optical axis showing the optical configuration of a zoom lens according to embodiment 6 of the present invention in the state in which the zoom lens is focused on an object point at infinity, respectively at the wide angle end, at an intermediate focal length, and at the telephoto end.
Figure 11B:
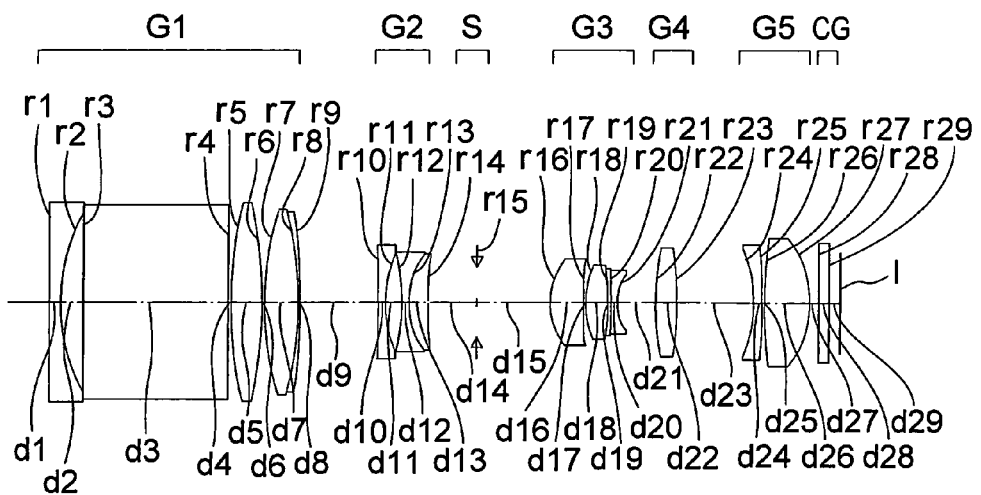
Figure 11C:
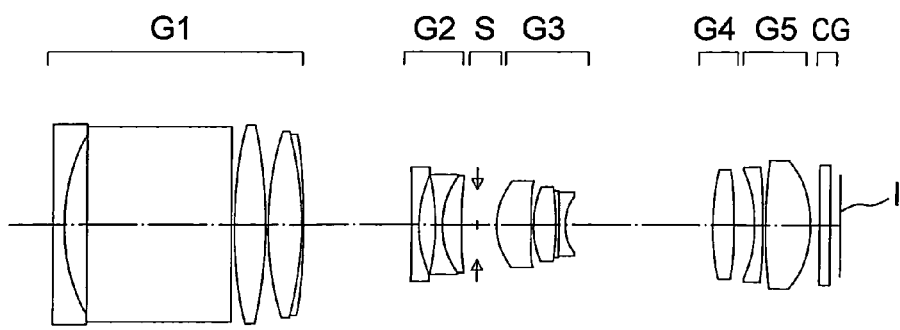

Next, a zoom lens according to embodiment 6 of the present invention will be described. FIGS. 11A, 11B, and 11C are cross sectional views taken along the optical axis showing the optical configuration of the zoom lens according to embodiment 6 of the present invention in the state in which the zoom lens is focused on an object point at infinity, where FIG. 11A is a cross sectional view of the zoom lens at the wide angle end, FIG. 11B is a cross sectional view of the zoom lens in an intermediate focal length state, and FIG. 11C is a cross sectional view of the zoom lens at the telephoto end.

Figure 12A:
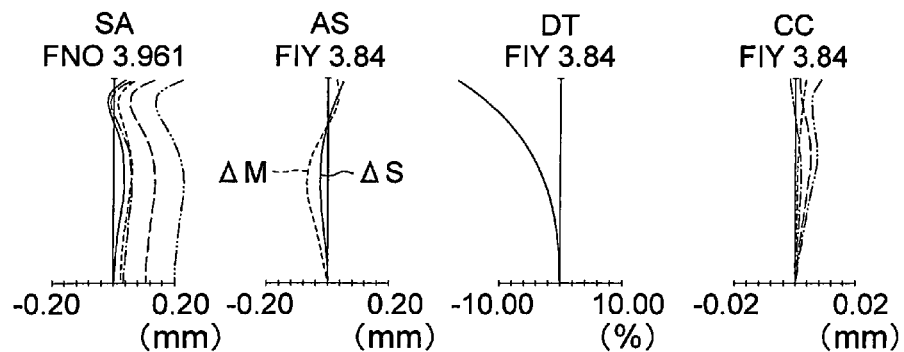
FIGS. 12A, 12B, and 12C are diagrams showing spherical aberration, astigmatism, distortion, and chromatic aberration of magnification of the zoom lens according to embodiment 6 in the state in which the zoom lens is focused on an object point at infinity, where
Figure 12B:
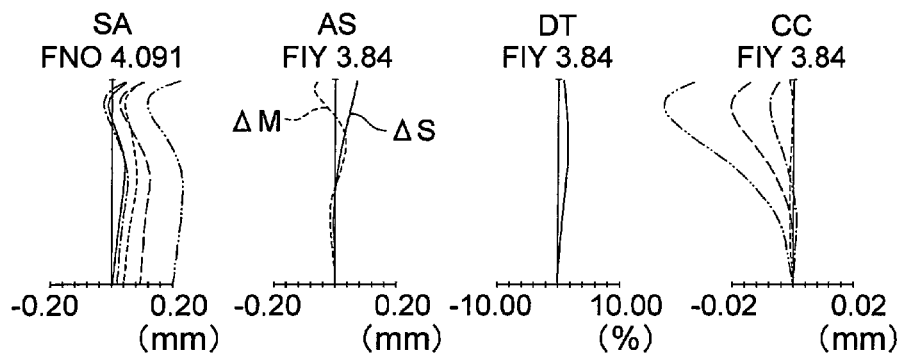
Figure 12C:
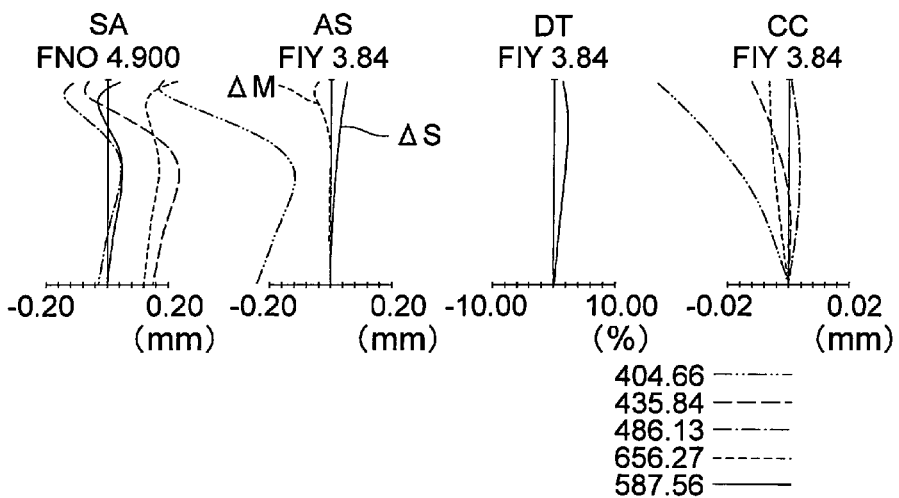

FIGS. 12A, 12B, and 12C are diagrams showing spherical aberration, astigmatism, distortion, and chromatic aberration of magnification of the zoom lens according to embodiment 6 in the state in which the zoom lens is focused on an object point at infinity, where FIG. 12A is for the wide angle end, FIG. 12B is for the intermediate focal length state, and FIG. 12C is for the telephoto end.

As shown in FIGS. 11A, 11B, and 11C, the zoom lens according to embodiment 6 includes a first lens group G1 having a positive refracting power, a second lens group G2 having a negative refracting power, an aperture stop S, a third lens group G3 having a positive refracting power, a fourth lens group G4 having a positive refracting power, and a fifth lens group G5 having a positive refracting power, which are arranged in order from the object side.

The first lens group G1 is composed of a biconcave negative lens L1, a prism L2 whose object side surface and image side surface are both planar, an object side biconvex positive lens L3, and a cemented lens made up of a biconvex positive lens L4 and a negative meniscus lens L5 having a convex surface directed toward the image side, and has a positive refracting power as a whole.

The second lens group G2 is composed of an object side biconcave negative lens L6, and a cemented lens made up of a biconcave negative lens L7 and a positive meniscus lens L8 having a convex surface directed to the object side, and has a negative refracting power as a whole.

The third lens group G3 is composed of an object side biconvex positive lens L9, and a cemented lens made up of a biconvex positive lens L10, a negative meniscus lens L11 having a convex surface directed toward the image side, and a biconcave negative lens L12, and has a positive refracting power as a whole.

The fourth lens group G4 is composed of a biconvex positive lens L13 and has a positive refracting power.

The fifth lens group G5 is composed of a negative meniscus lens L14 having a convex surface directed toward the image side, and a biconvex positive lens L15, and has a positive refracting power as a whole.

During zooming from the wide angle end to the telephoto end, the first lens group G1 is fixed, the second lens group G2 moves toward the image side, the third lens group G3 is kept nearly stationary during zooming from the wide angle end to an intermediate focal length position and moves toward the object side during zooming from the intermediate focal length position to the telephoto end, the fourth lens group G4 is kept nearly stationary during zooming from the wide angle end to the intermediate focal length position and moves toward the image side during zooming from the intermediate focal length position to the telephoto end, and the fifth lens group G5 is fixed. The position of the aperture stop S is fixed. The light quantity is controlled by varying the aperture size.

There are eight aspheric surfaces in total, which include both surfaces of the image side biconvex positive lens L4 in the first lens group G1, the image side surface of a negative meniscus lens L5 having a convex surface directed toward the image side in the first lens group G1, the image side surface of the object side biconcave negative lens L6 in the second lens group G2, both surfaces of the object side biconvex positive lens L9 in the third lens group G3, the object side surface of the biconvex positive lens L13 in the fourth lens group G4, and the image side surface of the biconvex positive lens L15 in the fifth lens group G5.

Figure 13A:
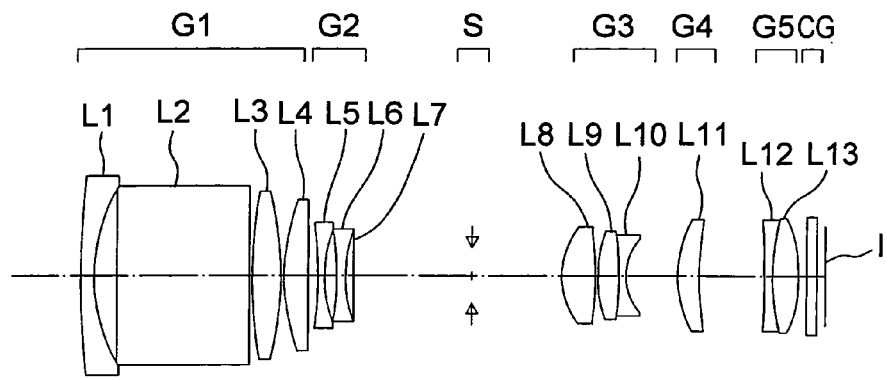
FIGS. 13A, 13B, and 13C are cross sectional views taken along the optical axis showing the optical configuration of a zoom lens according to embodiment 7 of the present invention in the state in which the zoom lens is focused on an object point at infinity, respectively at the wide angle end, at an intermediate focal length, and at the telephoto end.
Figure 13B:
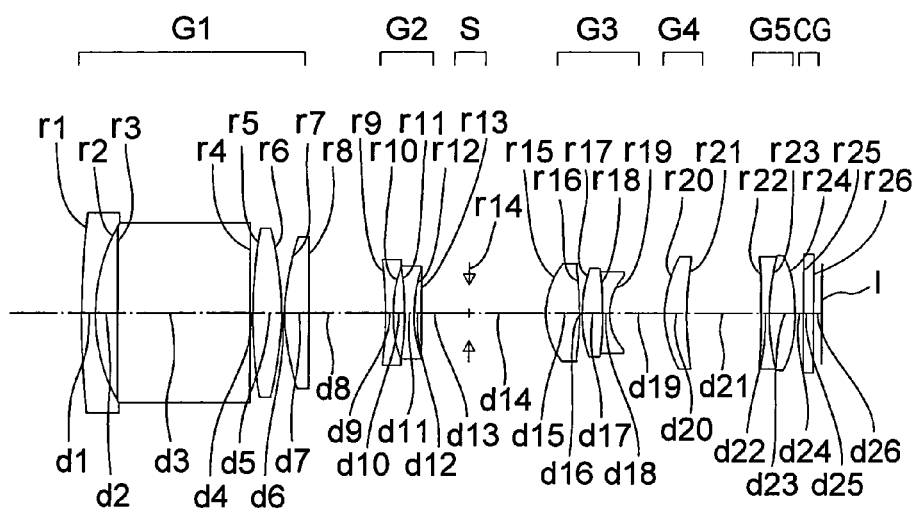
Figure 13C:
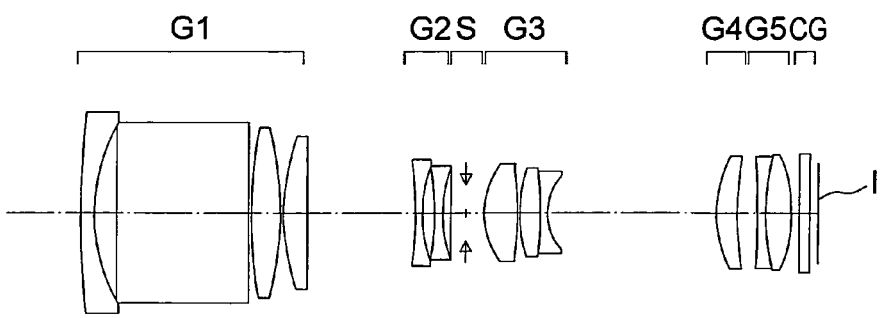

Next, a zoom lens according to embodiment 7 of the present invention will be described. FIGS. 13A, 13B, and 13C are cross sectional views taken along the optical axis showing the optical configuration of the zoom lens according to embodiment 7 of the present invention in the state in which the zoom lens is focused on an object point at infinity, where FIG. 13A is a cross sectional view of the zoom lens at the wide angle end, FIG. 13B is a cross sectional view of the zoom lens in an intermediate focal length state, and FIG. 13C is a cross sectional view of the zoom lens at the telephoto end.

Figure 14A:
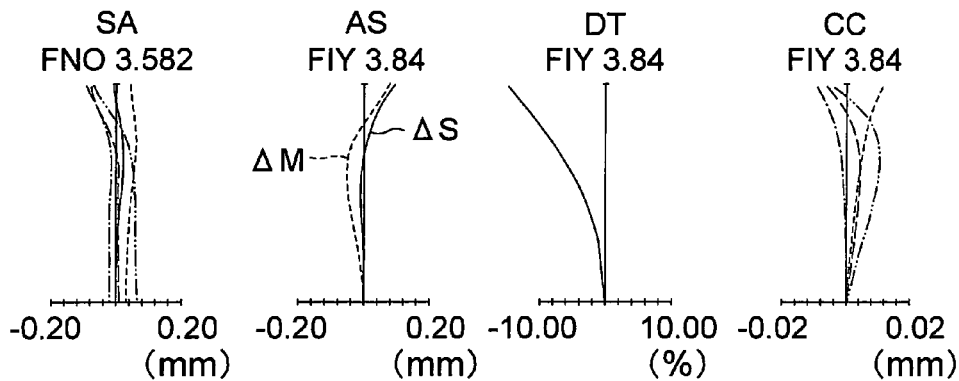
FIGS. 14A, 14B, and 14C are diagrams showing spherical aberration, astigmatism, distortion, and chromatic aberration of magnification of the zoom lens according to embodiment 7 in the state in which the zoom lens is focused on an object point at infinity, where
Figure 14B:
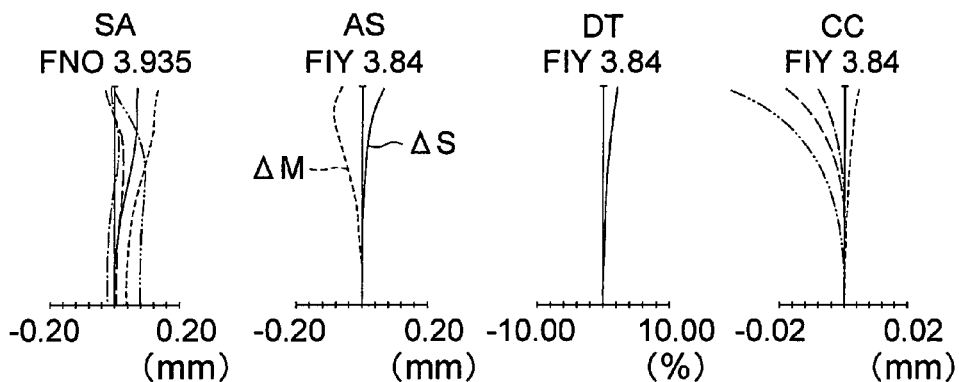
Figure 14C:
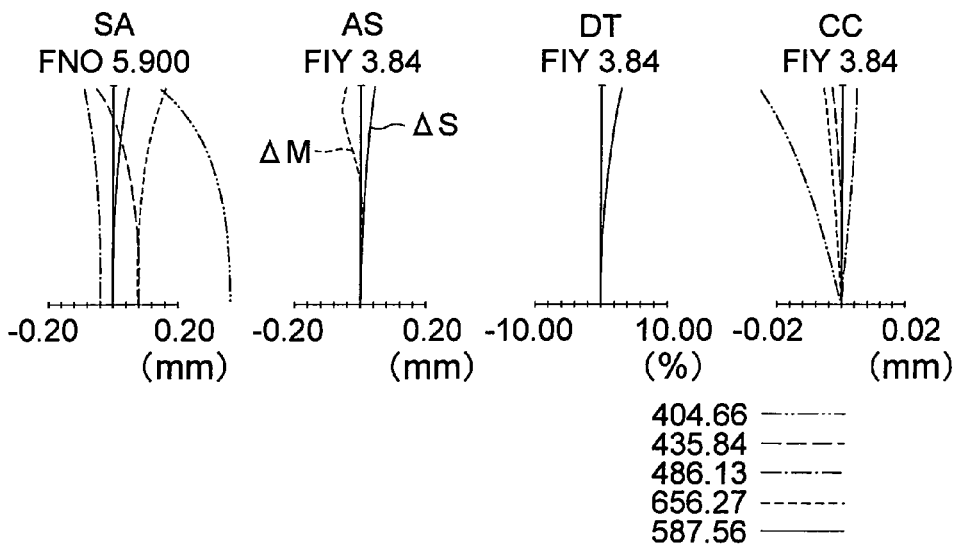

FIGS. 14A, 14B, and 14C are diagrams showing spherical aberration, astigmatism, distortion, and chromatic aberration of magnification of the zoom lens according to embodiment 7 in the state in which the zoom lens is focused on an object point at infinity, where FIG. 14A is for the wide angle end, FIG. 14B is for the intermediate focal length state, and FIG. 14C is for the telephoto end.

As shown in FIGS. 13A, 13B, and 13C, the zoom lens according to embodiment 7 includes a first lens group G1 having a positive refracting power, a second lens group G2 having a negative refracting power, an aperture stop S, a third lens group G3 having a positive refracting power, a fourth lens group G4 having a positive refracting power, and a fifth lens group G5 having a positive refracting power, which are arranged in order from the object side.

The first lens group G1 is composed of a negative meniscus lens L1 having a convex surface directed toward the object side, a prism L2 whose object side surface and image side surface are both planar, an object side biconvex positive lens L3, and a biconvex positive lens L4, and has a positive refracting power as a whole.

The second lens group G2 is composed of an object side biconcave negative lens L5, and a cemented lens made up of a biconcave negative lens L6 and a positive meniscus lens L7 having a convex surface directed to the object side, and has a negative refracting power as a whole.

The third lens group G3 is composed of an object side biconvex positive lens L8, and a cemented lens made up of a biconvex positive lens L9 and a biconcave negative lens L10, and has a positive refracting power as a whole.

The fourth lens group G4 is composed of a positive meniscus lens L11 having a convex surface directed toward the object side and has a positive refracting power.

The fifth lens group G5 is composed of a cemented lens made up of a biconcave negative lens L12 and a biconvex positive lens L13, and has a positive refracting power as a whole.

During zooming from the wide angle end to the telephoto end, the first lens group G1 is fixed, the second lens group G2 moves toward the image side, the third lens group G3 is kept nearly stationary during zooming from the wide angle end to an intermediate focal length position and moves toward the object side during zooming from the intermediate focal length position to the telephoto end, the fourth lens group G4 is kept nearly stationary during zooming from the wide angle end to the intermediate focal length position and moves toward the image side during zooming from the intermediate focal length position to the telephoto end, and the fifth lens group G5 is fixed. The position of the aperture stop S is fixed. The light quantity is controlled by varying the aperture size.

There are seven aspheric surfaces in total, which include the object side surface of the object side biconvex positive lens L3 in the first lens group G1, both surfaces of an image side biconcave negative lens L6 in the second lens group G2, the image side surface of the positive meniscus lens L7 having a convex surface, directed toward the object side in the second lens group G2, both surfaces of the object side biconvex positive lens L8 in the third lens group G3, and the object side surface of the positive meniscus lens L11 having a convex surface directed toward the object side in the fourth lens group G4.

Figure 15A:
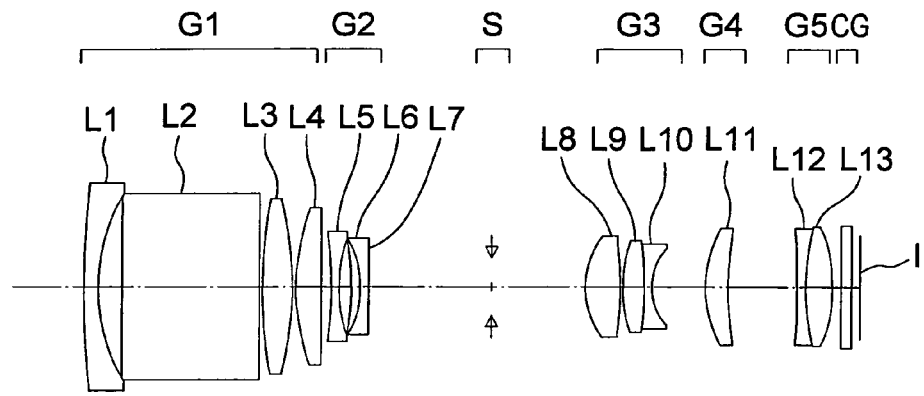
FIGS. 15A, 15B, and 15C are cross sectional views taken along the optical axis showing the optical configuration of a zoom lens according to embodiment 8 of the present invention in the state in which the zoom lens is focused on an object point at infinity, respectively at the wide angle end, at an intermediate focal length, and at the telephoto end.
Figure 15B:
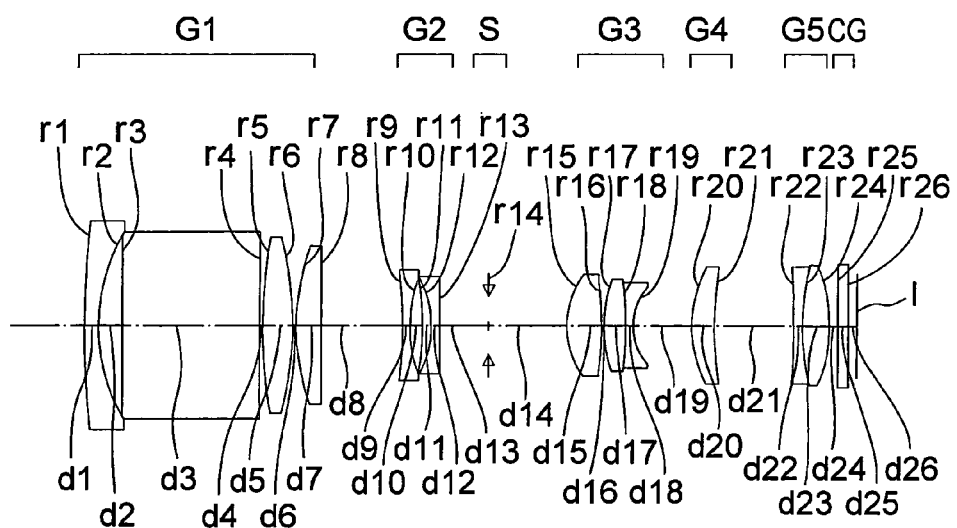
Figure 15C:
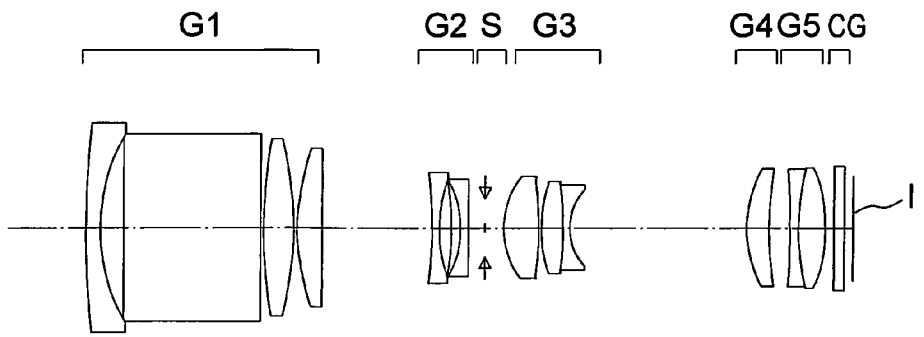

Next, a zoom lens according to embodiment 8 of the present invention will be described. FIGS. 15A, 15B, and 15C are cross sectional views taken along the optical axis showing the optical configuration of the zoom lens according to embodiment 8 of the present invention in the state in which the zoom lens is focused on an object point at infinity, where FIG. 15A is a cross sectional view of the zoom lens at the wide angle end, FIG. 15B is a cross sectional view of the zoom lens in an intermediate focal length state, and FIG. 15C is a cross sectional view of the zoom lens at the telephoto end.

Figure 16A:
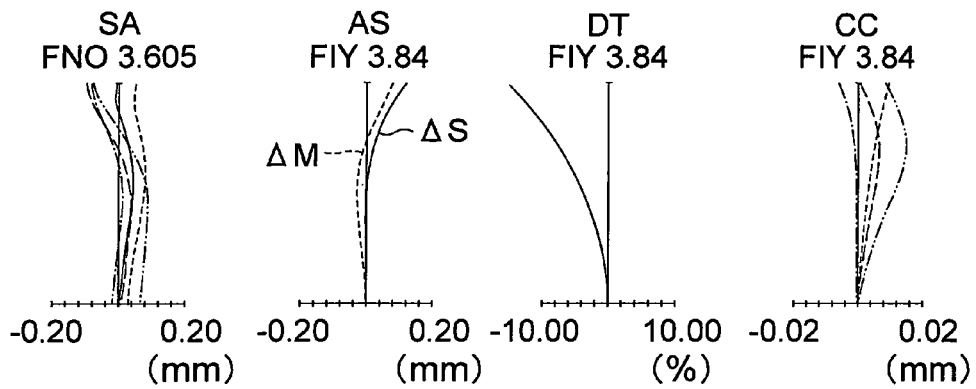
FIGS. 16A, 16B, and 16C are diagrams showing spherical aberration, astigmatism, distortion, and chromatic aberration of magnification of the zoom lens according to embodiment 8 in the state in which the zoom lens is focused on an object point at infinity, where
Figure 16B:
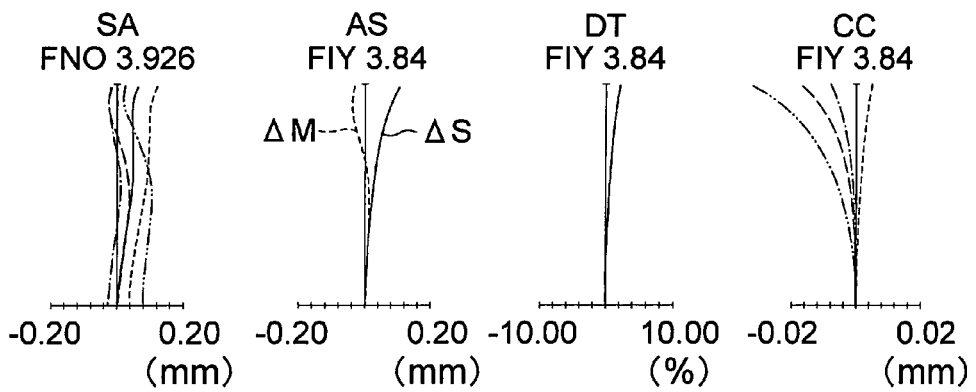
Figure 16C:
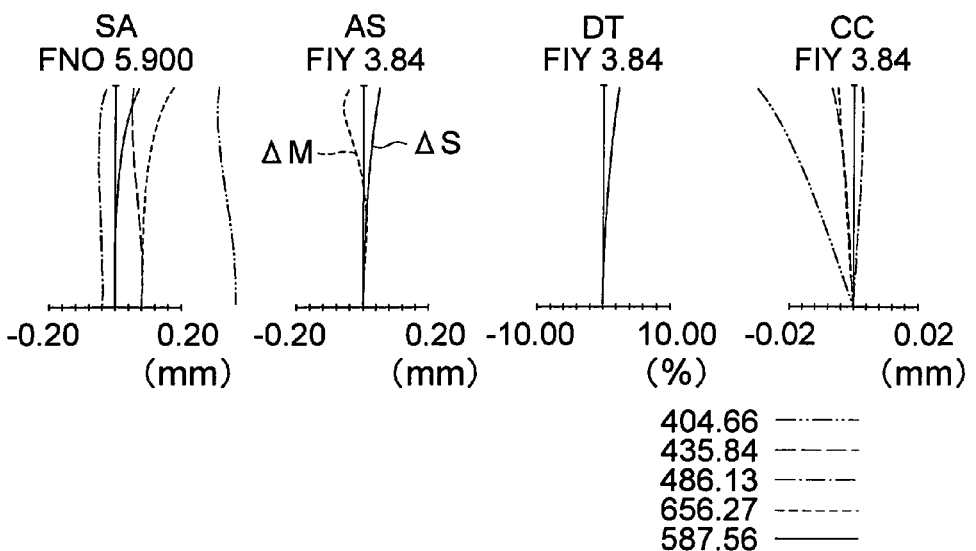

FIGS. 16A, 16B, and 16C are diagrams showing spherical aberration, astigmatism, distortion, and chromatic aberration of magnification of the zoom lens according to embodiment 8 in the state in which the zoom lens is focused on an object point at infinity, where FIG. 16A is for the wide angle end, FIG. 16B is for the intermediate focal length state, and FIG. 16C is for the telephoto end.

As shown in FIGS. 15A, 15B, and 15C, the zoom lens according to embodiment 8 includes a first lens group G1 having a positive refracting power, a second lens group G2 having a negative refracting power, an aperture stop S, a third lens group G3 having a positive refracting power, a fourth lens group G4 having a positive refracting power, and a fifth lens group G5 having a negative refracting power, which are arranged in order from the object side.

The first lens group G1 is composed of a negative meniscus lens L1 having a convex surface directed toward the object side, a prism L2 whose object side surface and image side surface are both planar, an object side biconvex positive lens L3, and a biconvex positive lens L4, and has a positive refracting power as a whole.

The second lens group G2 is composed of an object side biconcave negative lens L5, and a cemented lens made up of a positive meniscus lens L6 having a convex surface directed to the image side and a biconcave negative lens L7, and has a negative refracting power as a whole.

The third lens group G3 is composed of an object side biconvex positive lens L8, and a cemented lens made up of a biconvex positive lens L9 and a biconcave negative lens L10, and has a positive refracting power as a whole.

The fourth lens group G4 is composed of a positive meniscus lens L11 having a convex surface directed toward the object side and has a positive refracting power.

The fifth lens group G5 is composed of a cemented lens made up of a biconcave negative lens L12 and a biconvex positive lens L13, and has a negative refracting power as a whole.

During zooming from the wide angle end to the telephoto end, the first lens group G1 is fixed, the second lens group G2 moves toward the image side, the third lens group G3 is kept nearly stationary during zooming from the wide angle end to an intermediate focal length position and moves toward the object side during zooming from the intermediate focal length position to the telephoto end, the fourth lens group G4 is kept nearly stationary during zooming from the wide angle end to the intermediate focal length position and moves toward the image side during zooming from the intermediate focal length position to the telephoto end, and the fifth lens group G5 is fixed. The position of the aperture stop S is fixed. The light quantity is controlled by varying the aperture size.

There are six aspheric surfaces in total, which include the object side surface of the object side biconvex positive lens L3 in the first lens group G1, both surfaces of a negative meniscus lens L6 having a convex surface directed toward the image side in the second lens group G2, both surfaces of the object side biconvex positive lens L8 in the third lens group G3, and the object side surface of a positive meniscus lens L11 having a convex surface directed toward the object side in the fourth lens group G4.

Figure 17A:
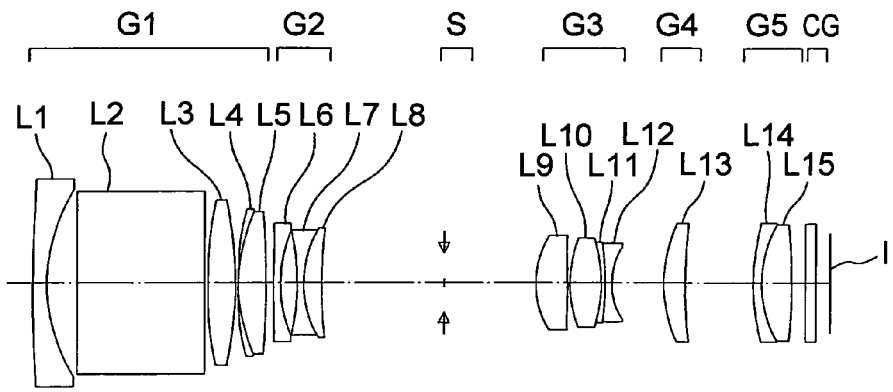
FIGS. 17A, 17B, and 17C are cross sectional views taken along the optical axis showing the optical configuration of a zoom lens according to embodiment 9 of the present invention in the state in which the zoom lens is focused on an object point at infinity, respectively at the wide angle end, at an intermediate focal length, and at the telephoto end.
Figure 17B:
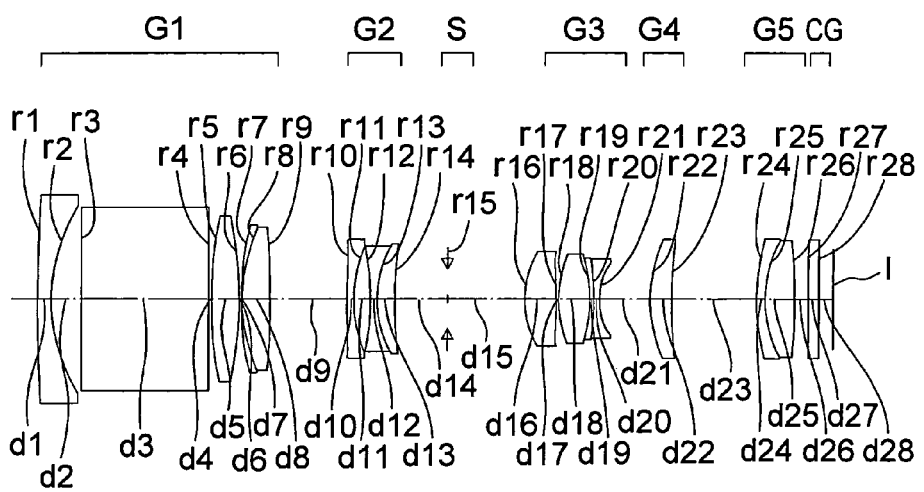
Figure 17C:
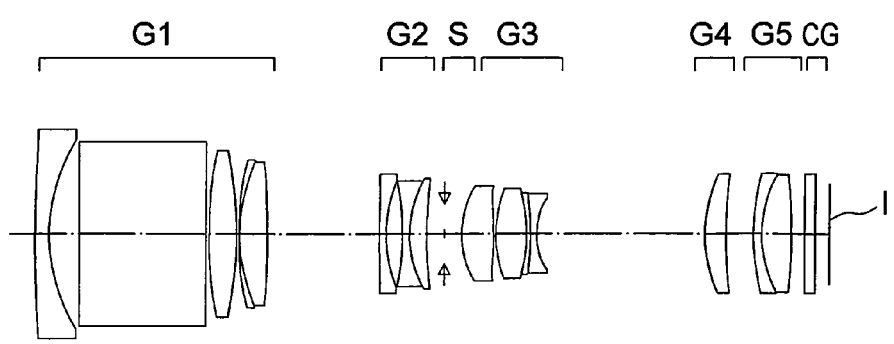

Next, a zoom lens according to embodiment 9 of the present invention will be described. FIGS. 17A, 17B, and 17C are cross sectional views taken along the optical axis showing the optical configuration of the zoom lens according to embodiment 9 of the present invention in the state in which the zoom lens is focused on an object point at infinity, where FIG. 17A is a cross sectional view of the zoom lens at the wide angle end, FIG. 17B is a cross sectional view of the zoom lens in an intermediate focal length state, and FIG. 17C is a cross sectional view of the zoom lens at the telephoto end.

Figure 18A:
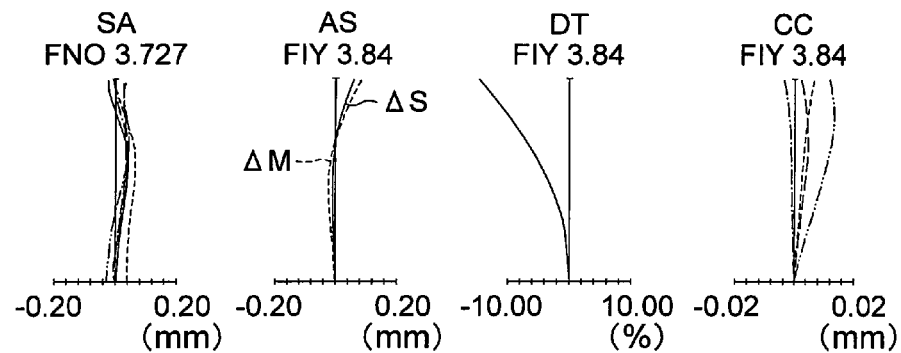
FIGS. 18A, 18B, and 18C are diagrams showing spherical aberration, astigmatism, distortion, and chromatic aberration of magnification of the zoom lens according to embodiment 9 in the state in which the zoom lens is focused on an object point at infinity, where
Figure 18B:
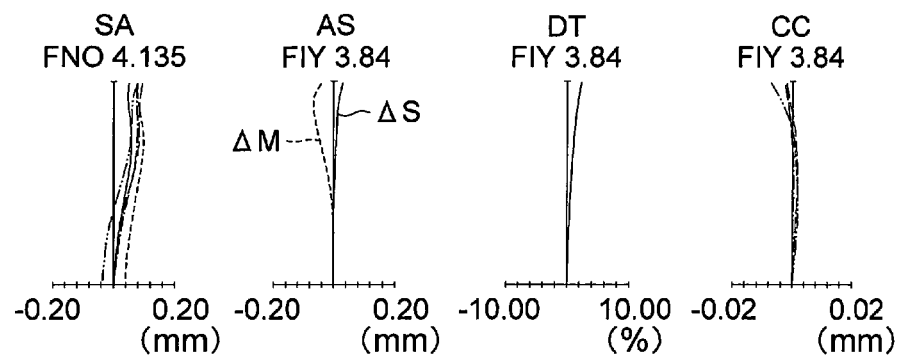
Figure 18C:
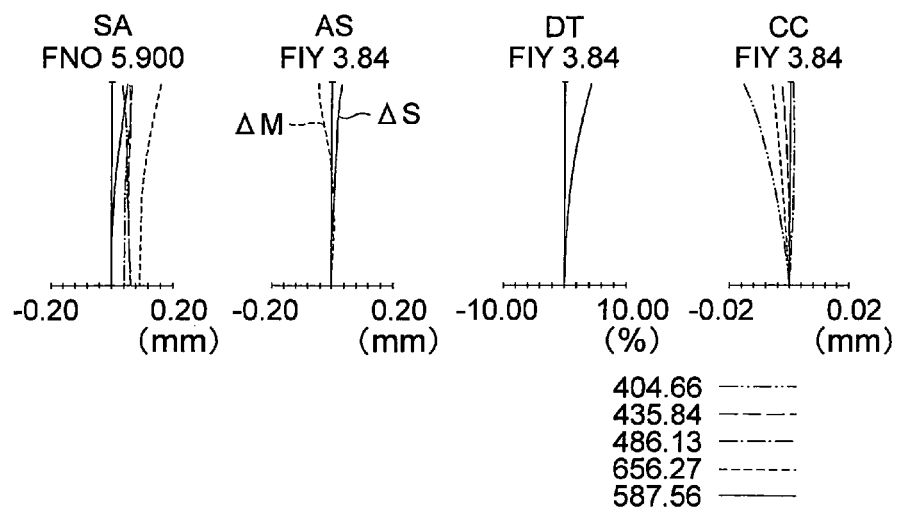

FIGS. 18A, 18B, and 18C are diagrams showing spherical aberration, astigmatism, distortion, and chromatic aberration of magnification of the zoom lens according to embodiment 9 in the state in which the zoom lens is focused on an object point at infinity, where FIG. 18A is for the wide angle end, FIG. 18B is for the intermediate focal length state, and FIG. 18C is for the telephoto end.

As shown in FIGS. 17A, 17B, and 17C, the zoom lens according to embodiment 9 includes a first lens group G1 having a positive refracting power, a second lens group G2 having a negative refracting power, an aperture stop S, a third lens group G3 having a positive refracting power, a fourth lens group G4 having a positive refracting power, and a fifth lens group G5 having a positive refracting power, which are arranged in order from the object side.

The first lens group G1 is composed of a negative meniscus lens L1 having a convex surface directed toward the object side, a prism L2 whose object side surface and image side surface are both planar, an object side biconvex positive lens L3, and a cemented lens made up of a negative meniscus lens L4 having a convex surface directed toward the object side and a biconvex positive lens L5, and has a positive refracting power as a whole.

The second lens group G2 is composed of an object side biconcave negative lens L6, and a cemented lens made up of a biconcave negative lens L7 and a positive meniscus lens L8 having a convex surface directed to the object side, and has a negative refracting power as a whole.

The third lens group G3 is composed of an object side biconvex positive lens L9, and a cemented lens made up of a biconvex positive lens L10, a negative meniscus lens L11 having a convex surface directed toward the image side, and a biconcave negative lens L12, and has a positive refracting power as a whole.

The fourth lens group G4 is composed of a biconvex positive lens L13 and has a positive refracting power.

The fifth lens group G5 is composed of a cemented lens made up of a negative meniscus lens L14 having a convex surface directed toward the object side and a biconvex positive lens L15, and has a positive refracting power as a whole.

During zooming from the wide angle end to the telephoto end, the first lens group G1 is fixed, the second lens group G2 moves toward the image side, the third lens group G3 is kept nearly stationary during zooming from the wide angle end to an intermediate focal length position and moves toward the object side during zooming from the intermediate focal length position to the telephoto end, the fourth lens group G4 is kept nearly stationary during zooming from the wide angle end to the intermediate focal length position and moves toward the image side during zooming from the intermediate focal length position to the telephoto end, and the fifth lens group G5 is fixed. The position of the aperture stop S is fixed. The light quantity is controlled by varying the aperture size.

There are five aspheric surfaces in total, which include the object side surface of a negative meniscus lens L4 having a convex surface directed toward the object side in the first lens group G1, the image side surface of a biconcave negative lens L6 in the second lens group G2, both surfaces of the object side biconvex positive lens L9 in the third lens group G3, and the object side surface of the positive meniscus lens L13 having a convex surface directed toward the object side in the fourth lens group G4.

Figure 19A:
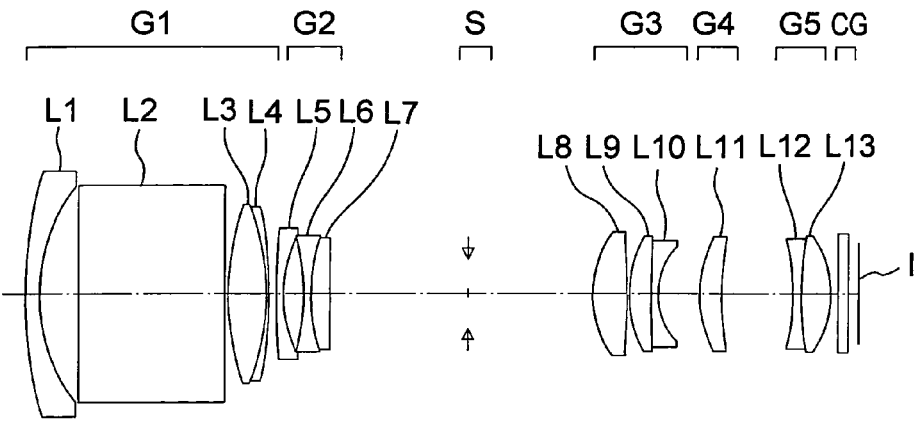
FIGS. 19A, 19B, and 19C are cross sectional views taken along the optical axis showing the optical configuration of a zoom lens according to embodiment 10 of the present invention in the state in which the zoom lens is focused on an object point at infinity, respectively at the wide angle end, at an intermediate focal length, and at the telephoto end.
Figure 19B:
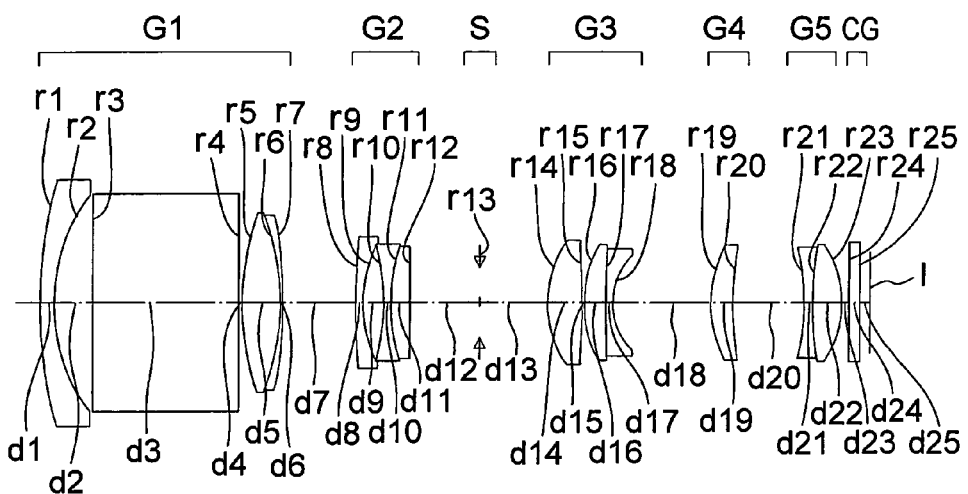
Figure 19C:
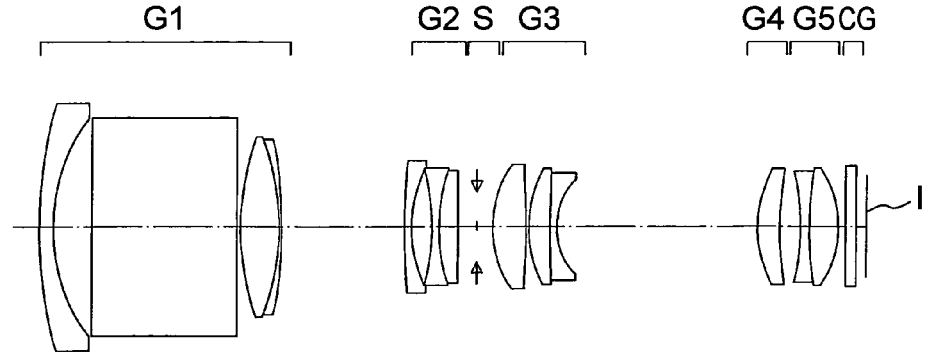

Next, a zoom lens according to embodiment 10 of the present invention will be described. FIGS. 19A, 19B, and 19C are cross sectional views taken along the optical axis showing the optical configuration of the zoom lens according to embodiment 1 of the present invention in the state in which the zoom lens is focused on an object point at infinity, where FIG. 19A is a cross sectional view of the zoom lens at the wide angle end, FIG. 19B is a cross sectional view of the zoom lens in an intermediate focal length state, and FIG. 19C is a cross sectional view of the zoom lens at the telephoto end.

Figure 20A:
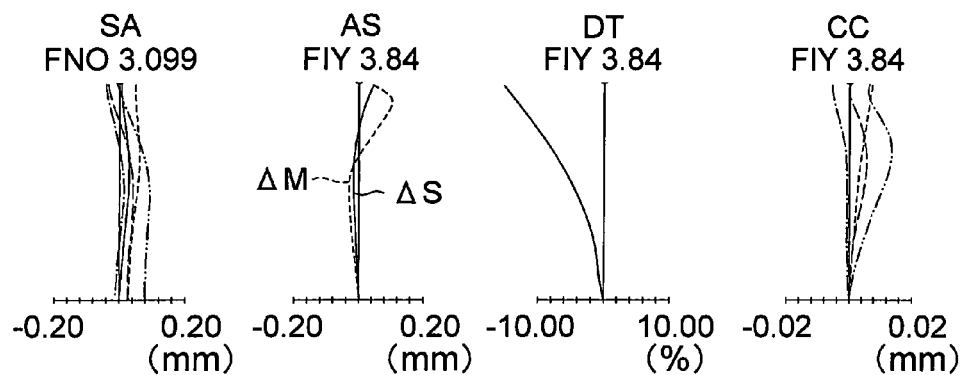
FIGS. 20A, 20B, and 20C are diagrams showing spherical aberration, astigmatism, distortion, and chromatic aberration of magnification of the zoom lens according to embodiment 10 in the state in which the zoom lens is focused on an object point at infinity, where
Figure 20B:
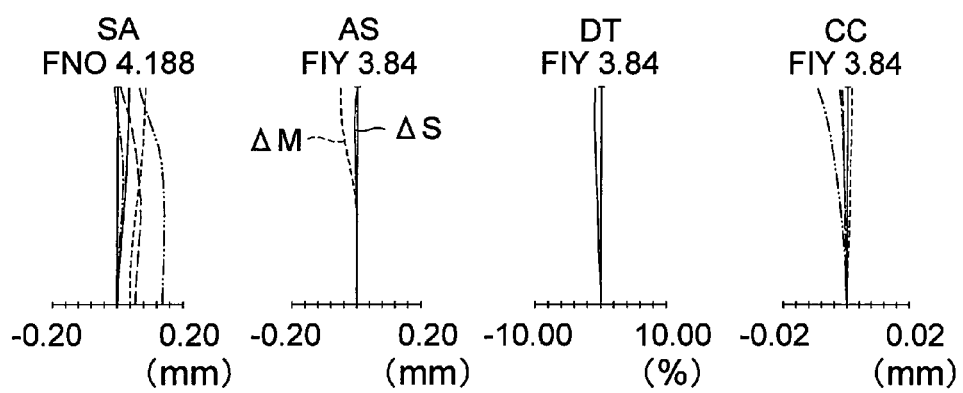
Figure 20C:
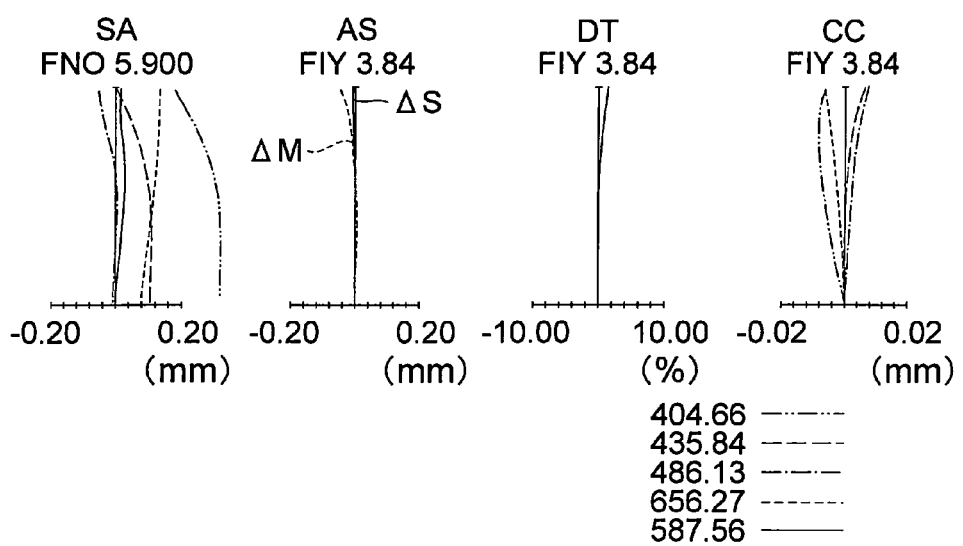

FIGS. 20A, 20B, and 20C are diagrams showing spherical aberration (SA), astigmatism (AS), distortion (DT), and chromatic aberration of magnification (CC) of the zoom lens according to embodiment 10 in the state in which the zoom lens is focused on an object point at infinity, where FIG. 20A is for the wide angle end, FIG. 203 is for the intermediate focal length state, and FIG. 20C is for the telephoto end. Sign "FIY" represents the image height. The signs in the aberration diagrams are commonly used also in the embodiments described in the following.

As shown in FIGS. 19A, 19B, and 19C, the zoom lens according to embodiment 10 includes a first lens group G1 having a positive refracting power, a second lens group G2 having a negative refracting power, an aperture stop S, a third lens group G3 having a positive refracting power, a fourth lens group G4 having a positive refracting power, and a fifth lens group G5 having a negative refracting power, which are arranged in order from the object side. In the cross sectional views of the zoom lenses according to this and following embodiments, sign "LPF" denotes a low pass filter, sign "CG" denotes a cover glass, and sign "I" denotes an image pickup surface of an electronic image pickup element.

The first lens group G1 is composed of a negative meniscus lens L1 having a convex surface directed toward the object side, a prism L2 whose object side surface and image side surface are both planar, and a cemented lens (or lens component C1p) made up of a biconvex positive lens L3 and a negative meniscus lens L4 having a convex surface directed toward the image side, and has a positive refracting power as a whole.

In this embodiment, what is referred to as "f12" is the combined focal length of lens L3 and lens L4. What is referred to as "the vertex Ct1" is the vertex of the image side surface of lens L1, and what is referred to as "the vertex Ct2" is the vertex of the cemented surface of the cemented lens (lens L3 and lens L4).

The second lens group G2 is composed of a negative meniscus lens L5 having a convex surface directed toward the object side, and a cemented lens made up of a biconcave negative lens L6 and a biconvex positive lens L7, and has a negative refracting power as a whole.

The third lens group G3 is composed of an object side biconvex positive lens L8, and a cemented lens made up of a biconvex positive lens L9 and a biconcave negative lens L10, and has a positive refracting power as a whole.

The fourth lens group G4 is composed of a positive meniscus lens L11 having a convex surface directed toward the object side and has a positive refracting power.

The fifth lens group G5 is composed of a cemented lens made up of a biconcave negative lens L12 and a biconvex positive lens L13, and has a negative refracting power as a whole.

During zooming from the wide angle end to the telephoto end, the first lens group G1 is fixed, the second lens group G2 moves toward the image side, the third lens group G3 moves toward the object side, the fourth lens group G4 is kept nearly stationary during zooming from the wide angle end to an intermediate focal length position and moves toward the image side during zooming from the intermediate focal length position to the telephoto end, and the fifth lens group G5 is fixed. The position of the aperture stop S is fixed. The light quantity is controlled by varying the aperture size of the aperture stop S.

There are eight aspheric surfaces in total, which include both surfaces of the biconvex positive lens L3 in the first lens group G1, the image side surface of the negative meniscus lens L4 having a convex surface directed toward the image side in the first lens group G1, the image side surface of the negative meniscus lens L5 having a convex surface directed toward the object side in the second lens group G2, both surfaces of the object side biconvex positive lens L8 in the third lens group G3, the object side surface of the positive meniscus lens L11 having a convex surface directed toward the object side in the fourth lens group G4, and the object side surface of the biconcave negative lens L12 in the fifth lens group G5.

Figure 21A:
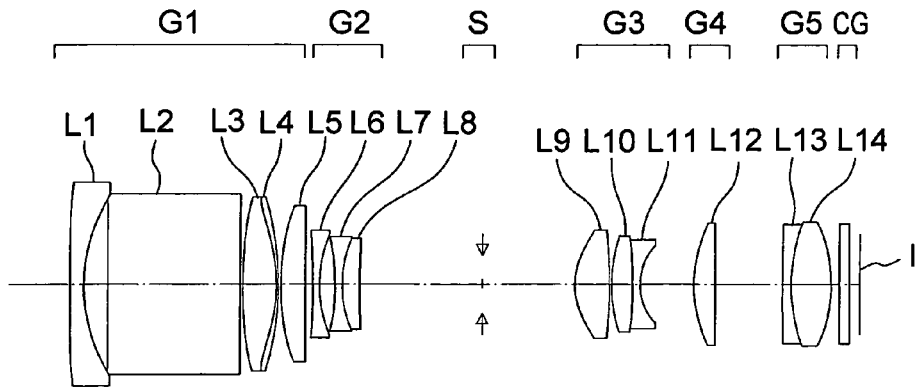
FIGS. 21A, 21B, and 21C are cross sectional views taken along the optical axis showing the optical configuration of a zoom lens according to embodiment 11 of the present invention in the state in which the zoom lens is focused on an object point at infinity, respectively at the wide angle end, at an intermediate focal length, and at the telephoto end.
Figure 21B:
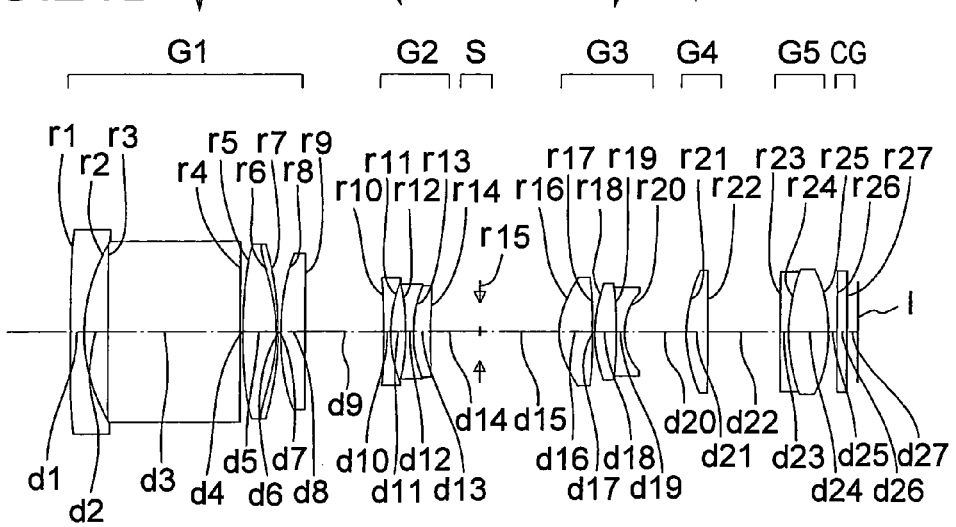
Figure 21C:
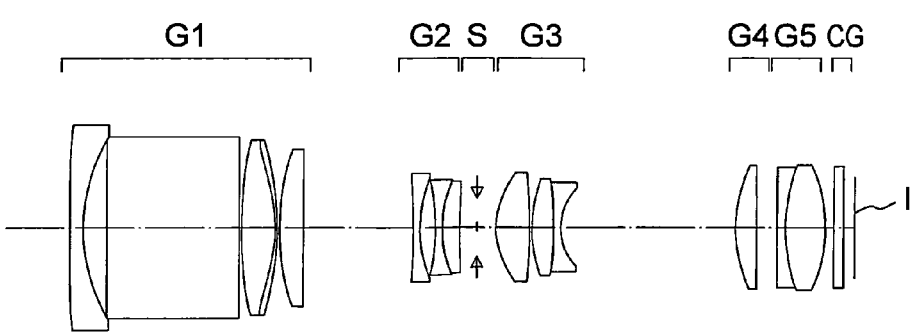

Next, a zoom lens according to embodiment 11 of the present invention will be described. FIGS. 21A, 21B, and 21C are cross sectional views taken along the optical axis showing the optical configuration of the zoom lens according to embodiment 11 of the present invention in the state in which the zoom lens is focused on an object point at infinity, where FIG. 21A is a cross sectional view of the zoom lens at the wide angle end, FIG. 21B is a cross sectional view of the zoom lens in an intermediate focal length state, and FIG. 21C is a cross sectional view of the zoom lens at the telephoto end.

Figure 22A:
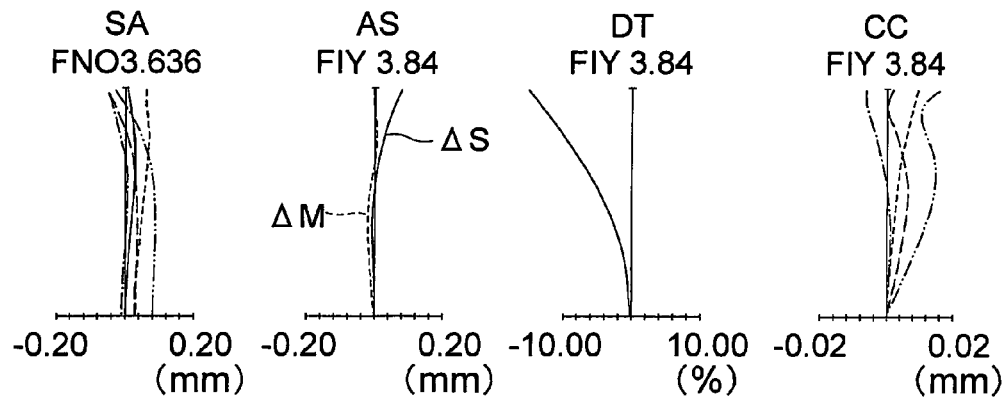
FIGS. 22A, 22B, and 22C are diagrams showing spherical aberration, astigmatism, distortion, and chromatic aberration of magnification of the zoom lens according to embodiment 11 in the state in which the zoom lens is focused on an object point at infinity, where
Figure 22B:
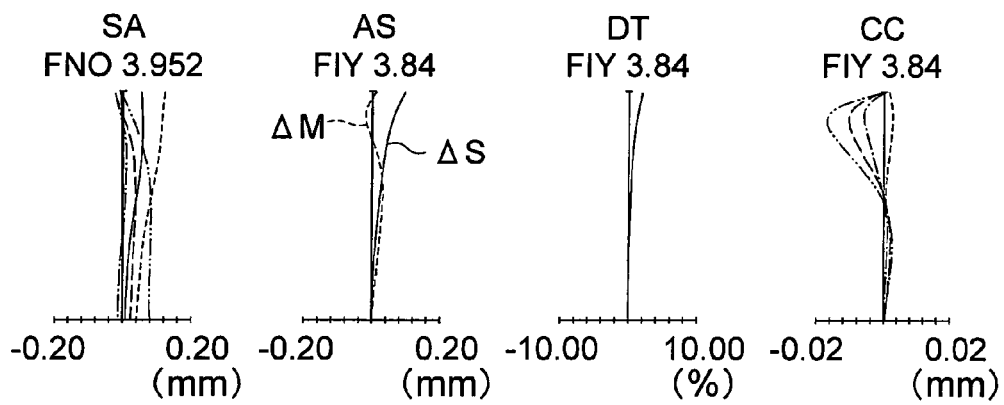
Figure 22C:
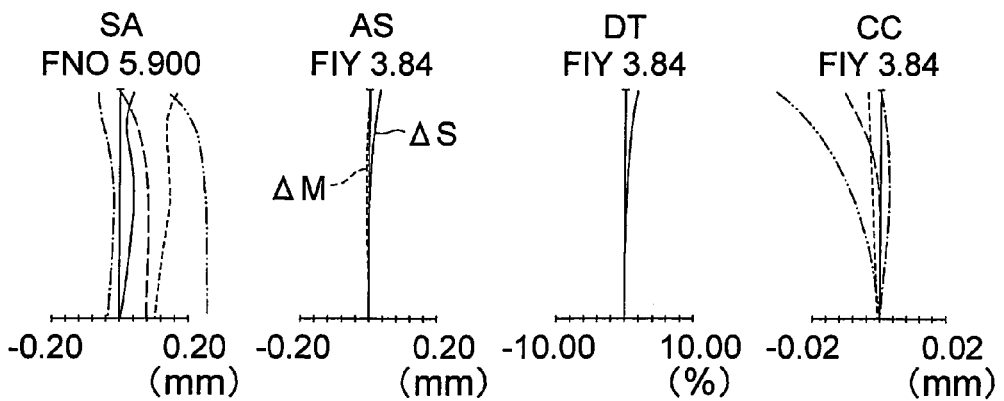

FIGS. 22A, 22B, and 22C are diagrams showing spherical aberration, astigmatism, distortion, and chromatic aberration of magnification of the zoom lens according to embodiment 11 in the state in which the zoom lens is focused on an object point at infinity, where FIG. 22A is for the wide angle end, FIG. 22B is for the intermediate focal length state, and FIG. 22C is for the telephoto end.

As shown in FIGS. 22A, 22B, and 22C, the zoom lens according to embodiment 11 includes a first lens group G1 having a positive refracting power, a second lens group G2 having a negative refracting power, an aperture stop S, a third lens group G3 having a positive refracting power, a fourth lens group G4 having a positive refracting power, and a fifth lens group G5 having a positive refracting power, which are arranged in order from the object side.

The first lens group G1 is composed of a negative meniscus lens L1 having a convex surface directed toward the object side, a prism L2 whose object side surface and image side surface are both planar, a cemented lens (or lens component C1p) made up of a biconvex positive lens L3 and a negative meniscus lens L4 having a convex surface directed toward the image side, and a biconvex positive lens L5, and has a positive refracting power as a whole.

In this embodiment, what is referred to as "f12" is the combined focal length of lens L3 and lens L4. What is referred to as "the vertex Ct1" is the vertex of the image side surface of lens L1. What is referred to as "the vertex Ct2" is the vertex of the cemented surface of the cemented lens (lens L3 and lens L4).

The second lens group G2 is composed of a biconcave negative lens L6, a cemented lens made up of a biconcave negative lens L7 and a positive meniscus lens L8 having a convex surface directed toward the object side, and has a negative refracting power as a whole.

The third lens group G3 is composed of a biconvex positive lens L9, and a cemented lens made up of a biconvex positive lens L10 and a biconcave negative lens L11, and has a positive refracting power as a whole.

The fourth lens group G4 is composed of a biconvex positive lens L12 and has a positive refracting power.

The fifth lens group G5 is composed of a cemented lens made up of a biconcave negative lens L13 and a biconvex positive lens L14, and has a positive refracting power as a whole.

During zooming from the wide angle end to the telephoto end, the first lens group G1 is fixed, the second lens group G2 moves toward the image side, the third lens group G3 moves toward the object side, the fourth lens group G4 is kept nearly stationary during zooming from the wide angle end to an intermediate focal length position and moves toward the image side during zooming from the intermediate focal length position to the telephoto end, and the fifth lens group G5 is fixed. The position of the aperture stop S is fixed. The light quantity is controlled by varying the aperture size of the aperture stop S.

There are seven aspheric surfaces in total, which include both surfaces of the biconvex positive lens L3 in the first lens group G1, the image side surface of the negative meniscus lens L4 having a convex surface directed toward the image side in the first lens group G1, the image side surface of the object side biconcave negative lens L6 in the second lens group G2, both surfaces of the object side biconvex positive lens L9 in the third lens group G3, and the object side surface of the biconvex positive lens L12 in the fourth lens group G4.

Figure 23A:
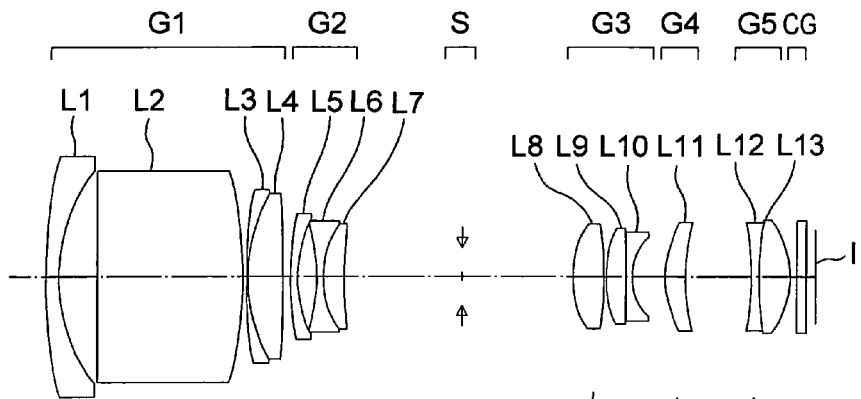
FIGS. 23A, 23B, and 23C are cross sectional views taken along the optical axis showing the optical configuration of a zoom lens according to embodiment 12 of the present invention in the state in which the zoom lens is focused on an object point at infinity, respectively at the wide angle end, at an intermediate focal length, and at the telephoto end.
Figure 23B:
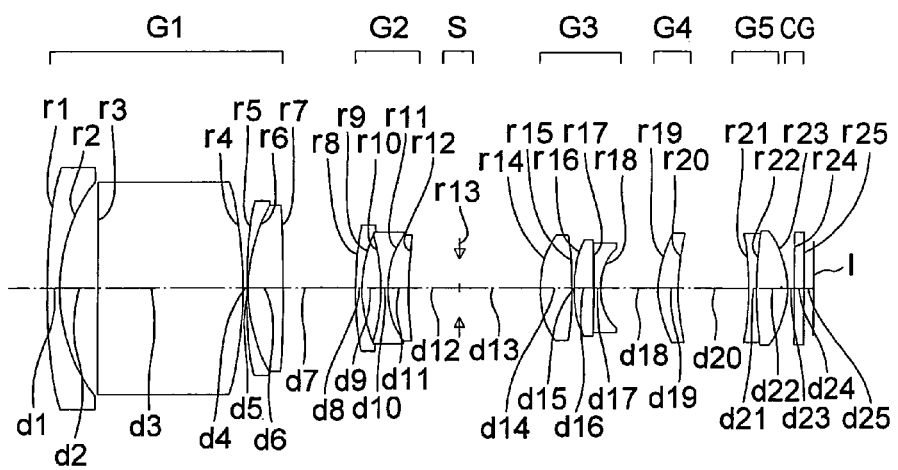
Figure 23C:
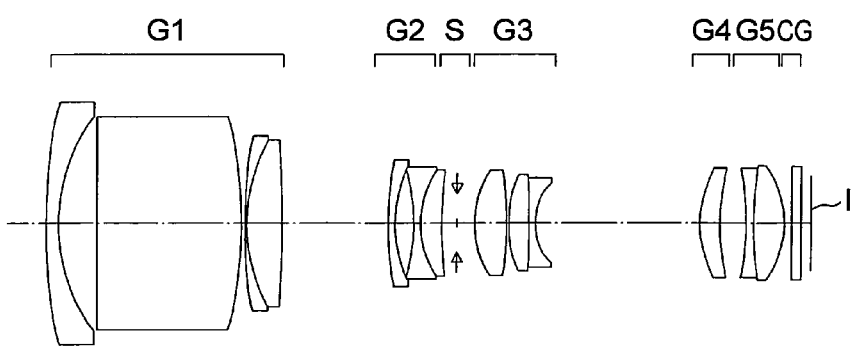

Next, a zoom lens according to embodiment 12 of the present invention will be described. FIGS. 23A, 23B, and 23C are cross sectional views taken along the optical axis showing the optical configuration of the zoom lens according to embodiment 12 of the present invention in the state in which the zoom lens is focused on an object point at infinity, where FIG. 23A is a cross sectional view of the zoom lens at the wide angle end, FIG. 23B is a cross sectional view of the zoom lens in an intermediate focal length state, and FIG. 23C is a cross sectional view of the zoom lens at the telephoto end.

Figure 24A:
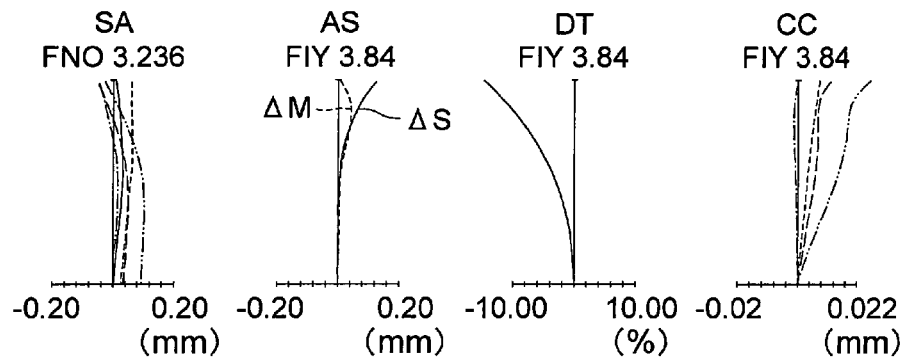
FIGS. 24A, 24B, and 24C are diagrams showing spherical aberration, astigmatism, distortion, and chromatic aberration of magnification of the zoom lens according to embodiment 12 in the state in which the zoom lens is focused on an object point at infinity, where
Figure 24B:
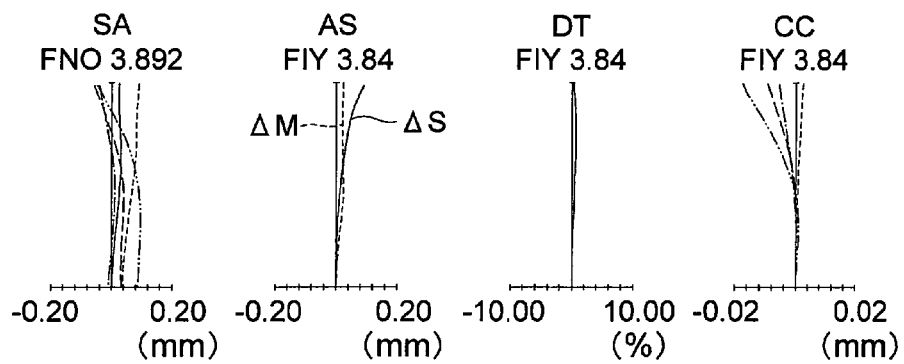
Figure 24C:
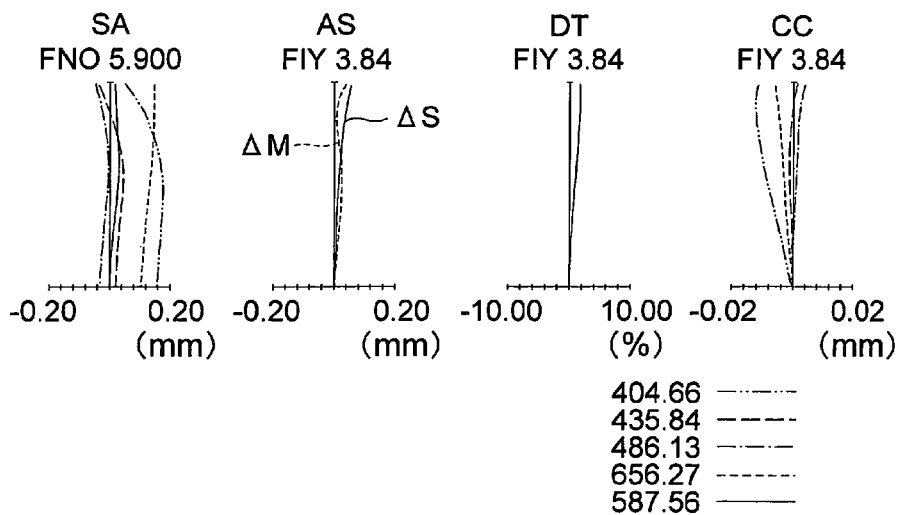

FIGS. 24A, 24B, and 24C are diagrams showing spherical aberration, astigmatism, distortion, and chromatic aberration of magnification of the zoom lens according to embodiment 12 in the state in which the zoom lens is focused on an object point at infinity, where FIG. 24A is for the wide angle end, FIG. 24B is for the intermediate focal length state, and FIG. 24C is for the telephoto end.

As shown in FIGS. 23A, 23B, and 23C, the zoom lens according to embodiment 12 includes a first lens group G1 having a positive refracting power, a second lens group G2 having a negative refracting power, an aperture stop S, a third lens group G3 having a positive refracting power, a fourth lens group G4 having a positive refracting power, and a fifth lens group G5 having a positive refracting power, which are arranged in order from the object side.

The first lens group G1 is composed of a negative meniscus lens L1 having a convex surface directed toward the object side, a prism L2 whose object side surface is planar and whose image side surface is convex, and a cemented lens (or lens component C1p) made up of a negative meniscus lens L3 having a convex surface directed toward the object side and biconvex positive lens L4, and has a positive refracting power as a whole.

In this embodiment, what is referred to as "f12" is the combined focal length of prism L2 (the image side surface of prism L2), lens L3, and lens L4. What is referred to as "the vertex Ct1" is the vertex of the image side surface of lens L1. What is referred to as "the vertex Ct2" is the vertex of the cemented surface of the cemented lens (lens L3 and lens L4).

The second lens group G2 is composed of a negative meniscus lens L5 having a convex surface directed toward the object side, and a cemented lens made up of a biconcave negative lens L6 and a positive meniscus lens L7 having a convex surface directed toward the object side, and has a negative refracting power as a whole.

The third lens group G3 is composed of a biconvex positive lens L8, and a cemented lens made up of a biconvex positive lens L9 and a biconcave negative lens L10, and has a positive refracting power as a whole.

The fourth lens group G4 is composed of a positive meniscus lens L11 having a convex surface directed toward the object side and has a positive refracting power.

The fifth lens group G5 is composed of a cemented lens made up of a biconcave negative lens L12 and a biconvex positive lens L13, and has a positive refracting power as a whole.

During zooming from the wide angle end to the telephoto end, the first lens group G1 is fixed, the second lens group G2 moves toward the image side, the third lens group G3 moves toward the object side, the fourth lens group G4 moves a little toward the object side during zooming from the wide angle end to an intermediate focal length position and moves toward the image side during zooming from the intermediate focal length position to the telephoto end, and the fifth lens group G5 is fixed. The position of the aperture stop S is fixed. The light quantity is controlled by varying the aperture size of the aperture stop S.

There are eight aspheric surfaces in total, which include both surfaces of the negative meniscus lens L3 having a convex surface directed toward the object side in the first lens group G1, the image side surface of the biconvex positive lens L4 in the first lens group G1, the image side surface of the negative meniscus lens L5 having a convex surface directed toward the object side in the second lens group G2, both surfaces of the biconvex positive lens L8 in the third lens group G3, the object side surface of the positive meniscus lens L11 having a convex surface directed toward the object side in the fourth lens group G4, and the image side surface of the biconvex positive lens L13 in the fifth lens group G5.

Figure 25A:
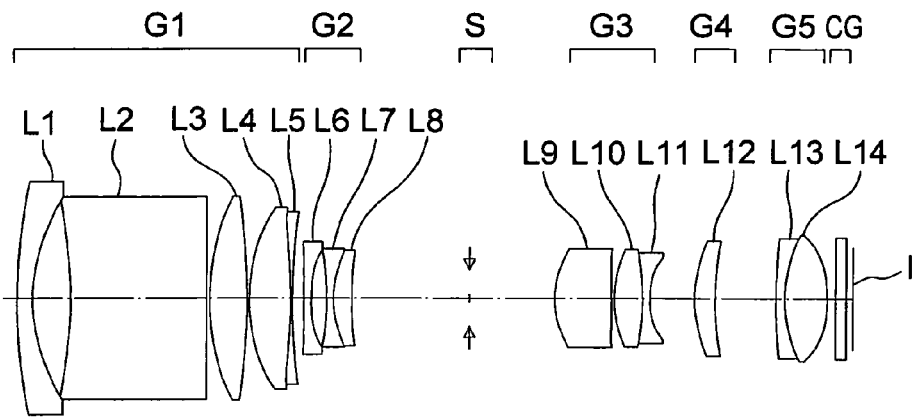
FIGS. 25A, 25B, and 25C are cross sectional views taken along the optical axis showing the optical configuration of a zoom lens according to embodiment 13 of the present invention in the state in which the zoom lens is focused on an object point at infinity, respectively at the wide angle end, at an intermediate focal length, and at the telephoto end.
Figure 25B:
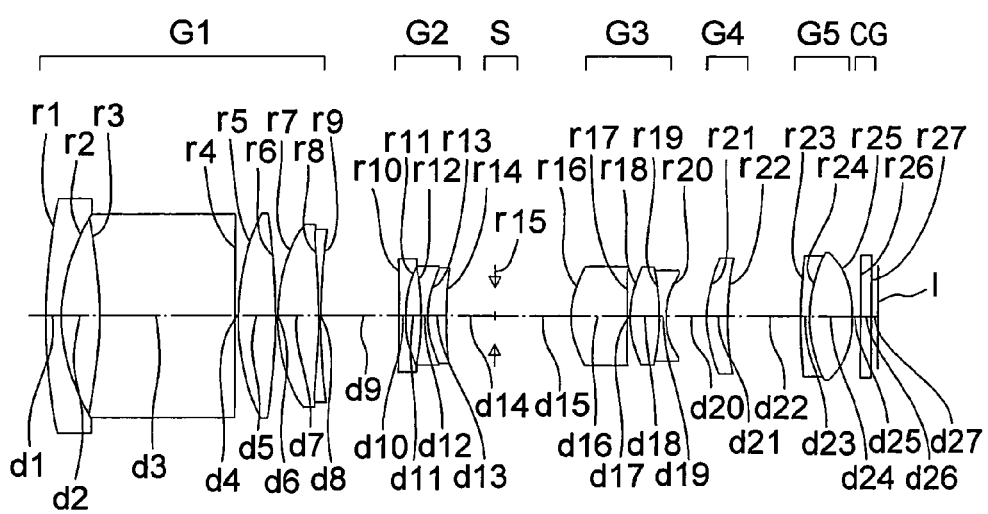
Figure 25C:
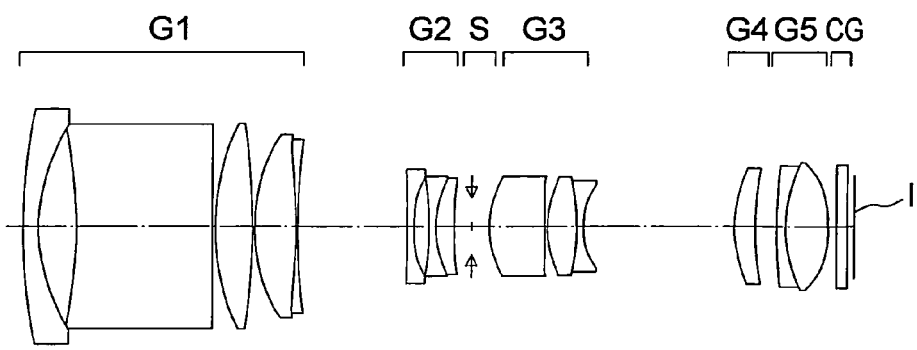

Next, a zoom lens according to embodiment 13 of the present invention will be described. FIGS. 25A, 25B, and 25C are cross sectional views taken along the optical axis showing the optical configuration of the zoom lens according to embodiment 13 of the present invention in the state in which the zoom lens is focused on an object point at infinity, where FIG. 25A is a cross sectional view of the zoom lens at the wide angle end, FIG. 25B is a cross sectional view of the zoom lens in an intermediate focal length state, and FIG. 25C is a cross sectional view of the zoom lens at the telephoto end.

Figure 26A:
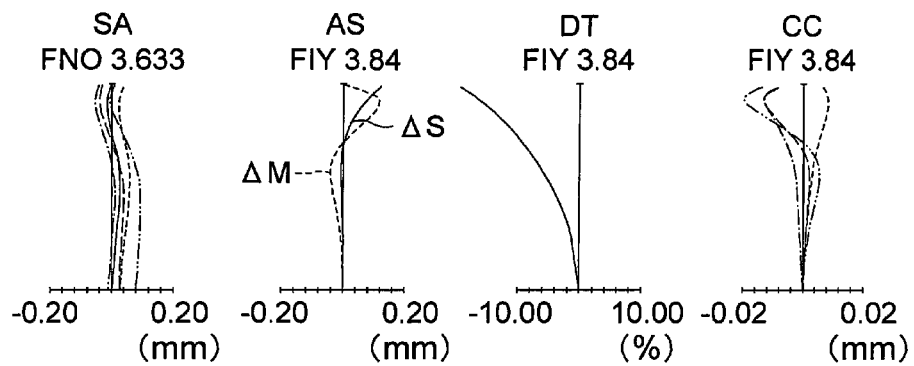
FIGS. 26A, 26B, and 26C are diagrams showing spherical aberration, astigmatism, distortion, and chromatic aberration of magnification of the zoom lens according to embodiment 13 in the state in which the zoom lens is focused on an object point at infinity, where
Figure 26B:
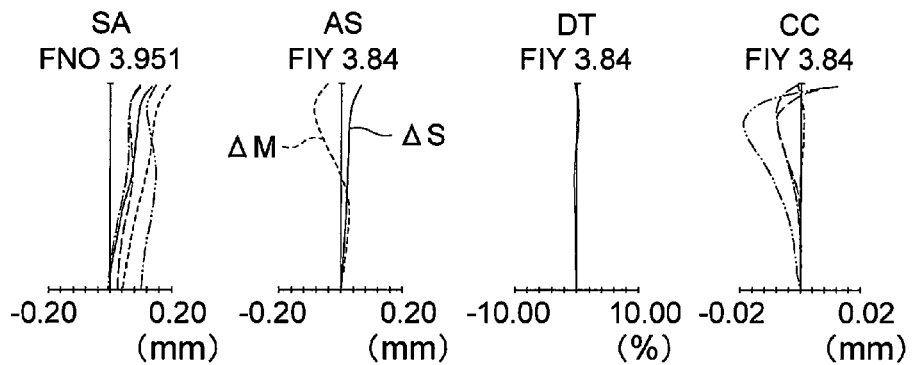
Figure 26C:
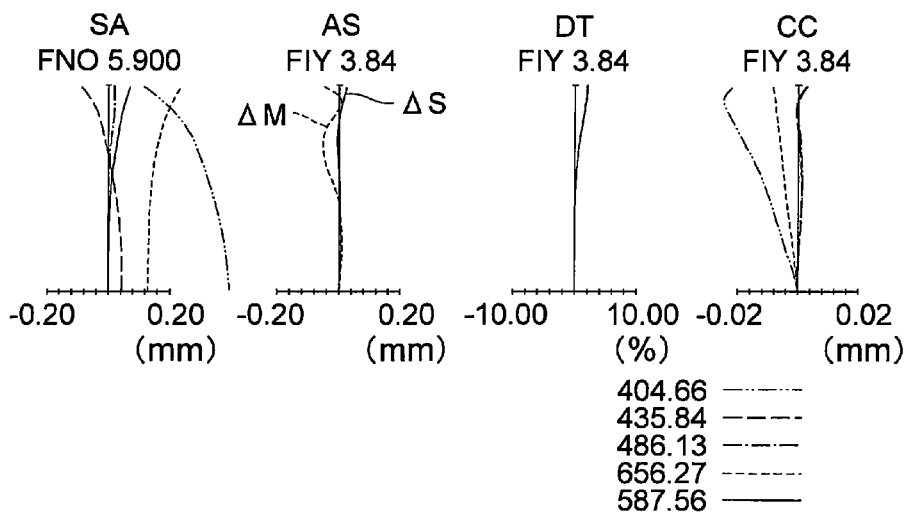

FIGS. 26A, 26B, and 26C are diagrams showing spherical aberration, astigmatism, distortion, and chromatic aberration of magnification of the zoom lens according to embodiment 13 in the state in which the zoom lens is focused on an object point at infinity, where FIG. 26A is for the wide angle end, FIG. 26B is for the intermediate focal length state, and FIG. 26C is for the telephoto end.

As shown in FIGS. 25A, 25B, and 25C, the zoom lens according to embodiment 13 includes a first lens group G1 having a positive refracting power, a second lens group G2 having a negative refracting power, an aperture stop S, a third lens group G3 having a positive refracting power, a fourth lens group G4 having a positive refracting power, and a fifth lens group G5 having a positive refracting power, which are arranged in order from the object side.

The first lens group G1 is composed of a negative meniscus lens L1 having a convex surface directed toward the object side, a prism L2 whose object side surface is concave and whose image side surface is planar, a biconvex positive lens L3, and a cemented lens (or lens component C1p) made up of a biconvex positive lens L4 and a biconcave negative lens L5, and has a positive refracting power as a whole.

In this embodiment, what is referred to as "f12" is the combined focal length of lens L3, lens L4, and lens L5. What is referred to as "the vertex Ct1" is the vertex of the image side surface of lens L1. What is referred to as "the vertex Ct2" is the vertex of the cemented surface of the cemented lens (lens L4 and lens L5).

The second lens group G2 is composed of a biconcave negative lens L6, and a cemented lens made up of a biconcave negative lens L7 and a positive meniscus lens L8 having a convex surface directed toward the object side, and has a negative refracting power as a whole.

The third lens group G3 is composed of a biconvex positive lens L9, and a cemented lens made up of a biconvex positive lens L10 and a biconcave negative lens L11, and has a positive refracting power as a whole.

The fourth lens group G4 is composed of a positive meniscus lens L12 having a convex surface directed toward the object side and has a positive refracting power.

The fifth lens group G5 is composed of a cemented lens made up of a negative meniscus lens L13 having a convex surface directed toward the object side and a biconvex positive lens L14, and has a positive refracting power as a whole.

During zooming from the wide angle end to the telephoto end, the first lens group G1 is fixed, the second lens group G2 moves toward the image side, the third lens group G3 moves toward the object side, the fourth lens group G4 moves a little toward the object side during zooming from the wide angle end to an intermediate focal length position and moves toward the image side during zooming from the intermediate focal length position to the telephoto end, and the fifth lens group G5 is fixed. The position of the aperture stop S is fixed. The light quantity is controlled by varying the aperture size of the aperture stop S.

There are nine aspheric surfaces in total, which include the image side surface of the negative meniscus lens L1 having a convex surface directed toward the object side in the first lens group G1, both surfaces of the biconvex positive lens L4 in the first lens group G1, the image side surface of the biconcave negative lens L5 in the first lens group G1, the image side surface of the object side biconcave negative lens L6 in the second lens group G2, both surfaces of the object side biconvex positive lens L9 in the third lens group G3, the object side surface of the positive meniscus lens L12 having a convex surface directed toward the object side in the fourth lens group G4, and the image side surface of the biconvex positive lens L14 in the fifth lens group G5.

Figure 27A:
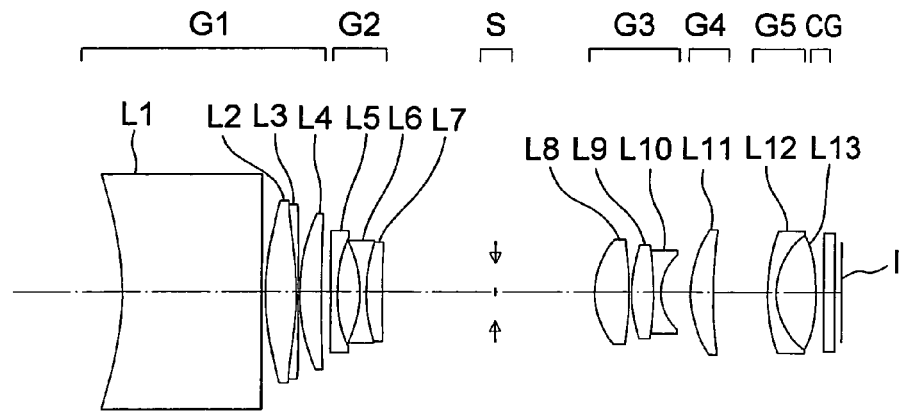
FIGS. 27A, 27B, and 27C are cross sectional views taken along the optical axis showing the optical configuration of a zoom lens according to embodiment 14 of the present invention in the state in which the zoom lens is focused on an object point at infinity, respectively at the wide angle end, at an intermediate focal length, and at the telephoto end.
Figure 27B:
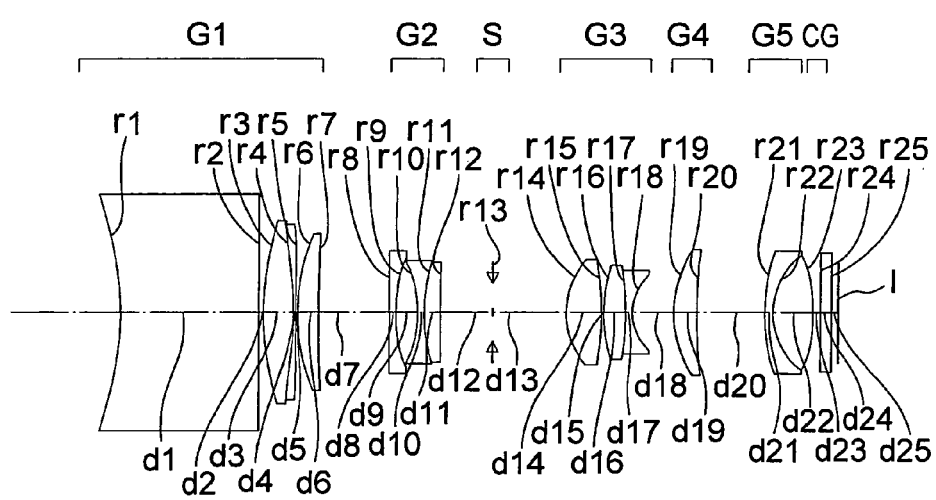
Figure 27C:
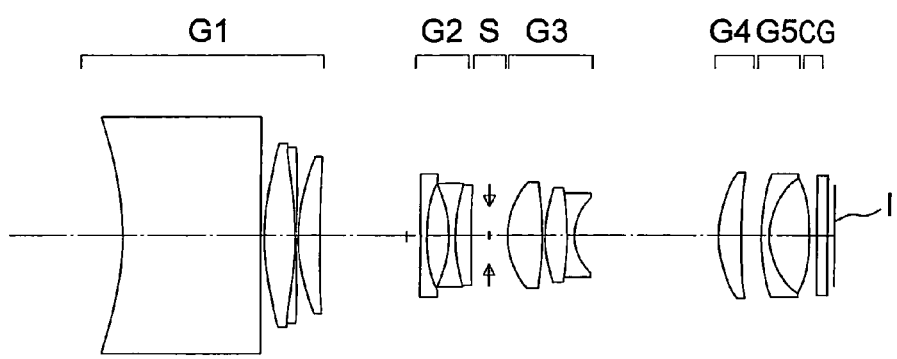

Next, a zoom lens according to embodiment 14 of the present invention will be described. FIGS. 27A, 27B, and 27C are cross sectional views taken along the optical axis showing the optical configuration of the zoom lens according to embodiment 14 of the present invention in the state in which the zoom lens is focused on an object point at infinity, where FIG. 27A is a cross sectional view of the zoom lens at the wide angle end, FIG. 27B is a cross sectional view of the zoom lens in an intermediate focal length state, and FIG. 27C is a cross sectional view of the zoom lens at the telephoto end.

Figure 28A:
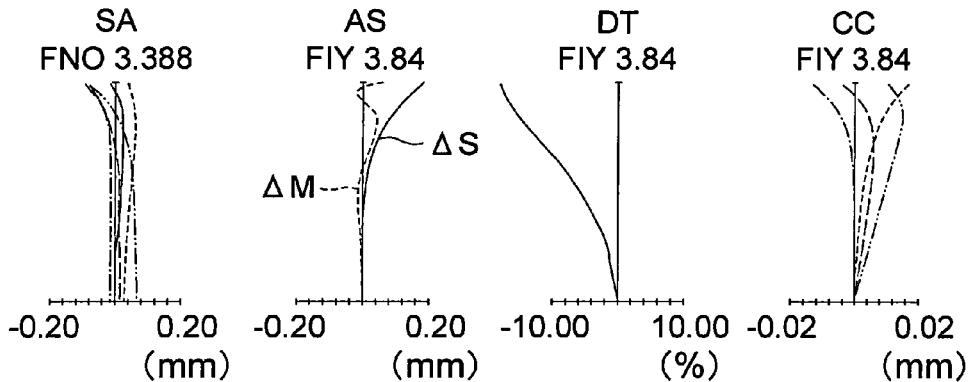
FIGS. 28A, 28B, and 28C are diagrams showing spherical aberration, astigmatism, distortion, and chromatic aberration of magnification of the zoom lens according to embodiment 14 in the state in which the zoom lens is focused on an object point at infinity, where
Figure 28B:
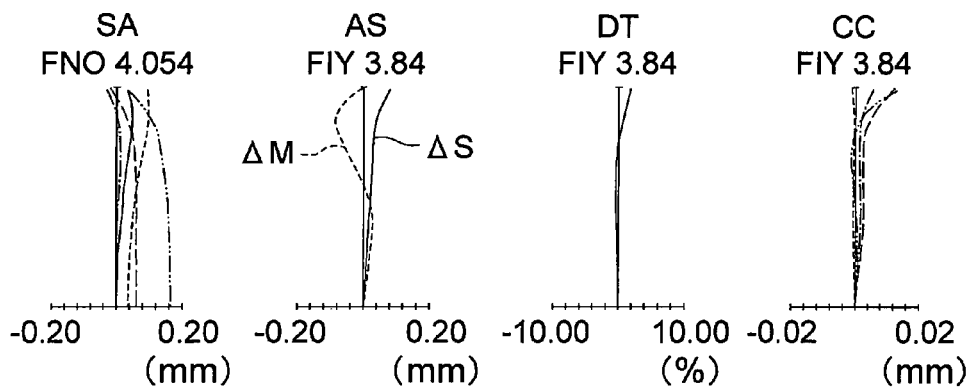
Figure 28C:
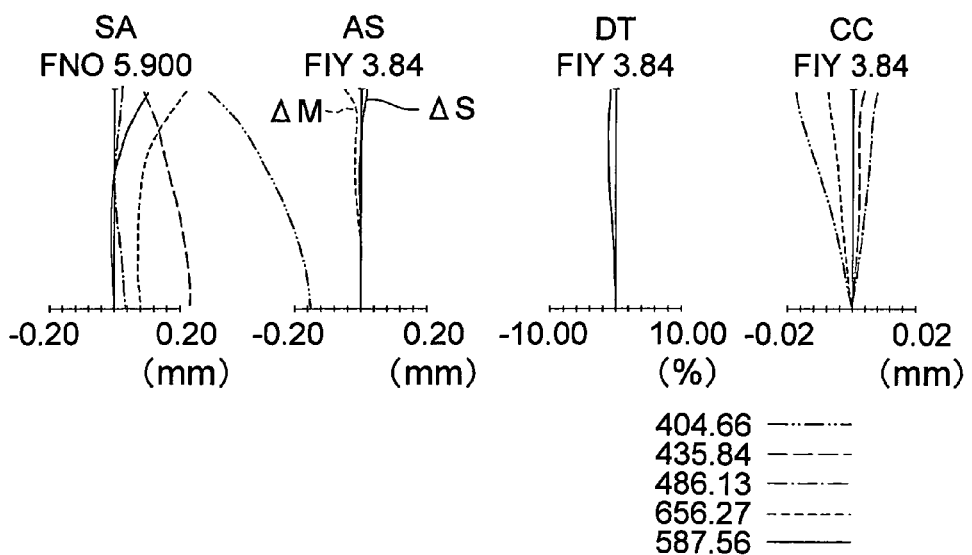

FIGS. 28A, 28B, and 28C are diagrams showing spherical aberration, astigmatism, distortion, and chromatic aberration of magnification of the zoom lens according to embodiment 14 in the state in which the zoom lens is focused on an object point at infinity, where FIG. 28A is for the wide angle end, FIG. 28B is for the intermediate focal length state, and FIG. 28C is for the telephoto end.

As shown in FIGS. 27A, 27B, and 27C, the zoom lens according to embodiment 14 includes a first lens group G1 having a positive refracting power, a second lens group G2 having a negative refracting power, an aperture stop S, a third lens group G3 having a positive refracting power, a fourth lens group G4 having a positive refracting power, and a fifth lens group G5 having a positive refracting power, which are arranged in order from the object side.

The first lens group G1 is composed of a prism L1 whose object side surface is concave and whose image side surface is planar, a cemented lens (or lens component C1p) made up of a biconvex positive lens L2 and a biconcave negative lens L3, and a positive meniscus lens L4 having a convex surface directed toward the object side, and has a positive refracting power as a whole.

In this embodiment, what is referred to as "f12" is the combined focal length of lens L2, lens L3, and lens L4. What is referred to as "the vertex Ct1" is the vertex of the object side surface of the prism L1. What is referred to as "the vertex Ct2" is the vertex of the cemented surface of the cemented lens (lens L2 and lens L3).

The second lens group G2 is composed of a biconcave negative lens L5, and a cemented lens made up of a biconcave negative lens L6 and a positive meniscus lens L7 having a convex surface directed toward the object side, and has a negative refracting power as a whole.

The third lens group G3 is composed of a biconvex positive lens L8, and a cemented lens made up of a biconvex positive lens L9 and a biconcave negative lens L10, and has a positive refracting power as a whole.

The fourth lens group G4 is composed of a positive meniscus lens L11 having a convex surface directed toward the object side and has a positive refracting power.

The fifth lens group G5 is composed of a cemented lens made up of a negative meniscus lens L12 having a convex surface directed toward the object side and a biconvex positive lens L13, and has a positive refracting power as a whole.

During zooming from the wide angle end to the telephoto end, the first lens group G1 is fixed, the second lens group G2 moves toward the image side, the third lens group G3 moves toward the object side, the fourth lens group G4 moves toward the image side, and the fifth lens group G5 is fixed. The position of the aperture stop S is fixed. The light quantity is controlled by varying the aperture size of the aperture stop S.

There are six aspheric surfaces in total, which include the object side surface of the prism L1 whose object side surface is concave and whose image side surface is planar in the first lens group G1, both surfaces of the biconvex positive lens L2 in the first lens group G1, both surfaces of the object side biconvex positive lens L8 in the third lens group G3, and the object side surface of the positive meniscus lens L11 having a convex surface directed toward the object side in the fourth lens group G4.

Figure 29A:
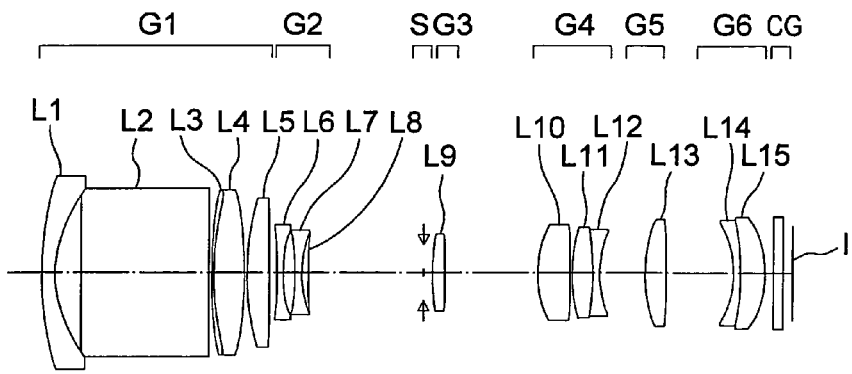
FIGS. 29A, 29B, and 29C are cross sectional views taken along the optical axis showing the optical configuration of a zoom lens according to embodiment 15 of the present invention in the state in which the zoom lens is focused on an object point at infinity, respectively at the wide angle end, at an intermediate focal length, and at the telephoto end.
Figure 29B:
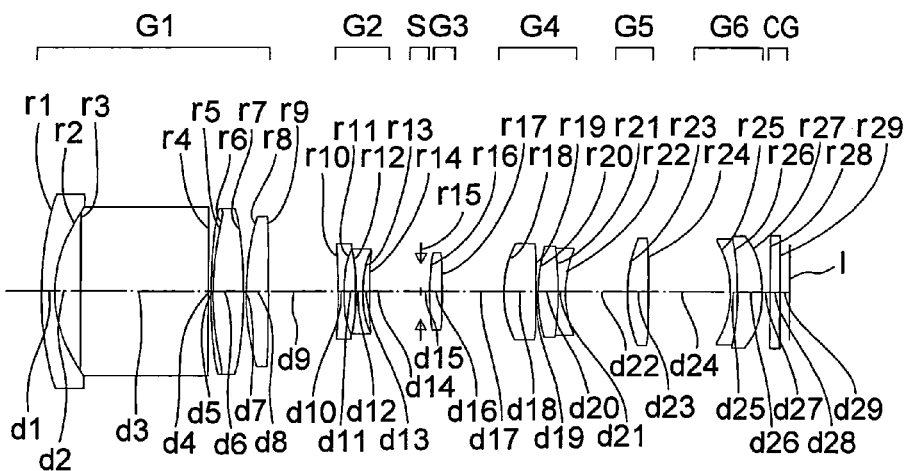
Figure 29C:
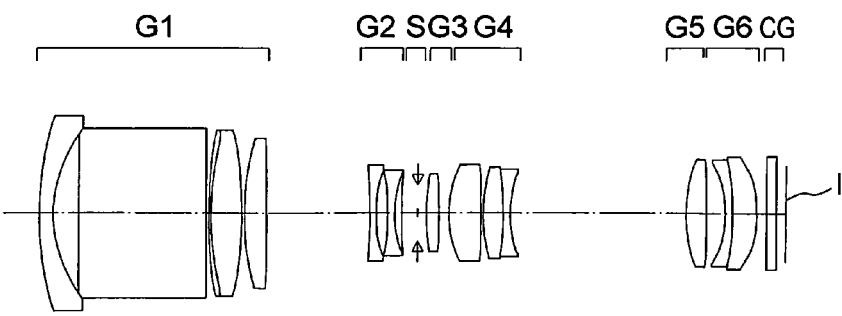

Next, a zoom lens according to embodiment 15 of the present invention will be described. FIGS. 29A, 29B, and 29C are cross sectional views taken along the optical axis showing the optical configuration of the zoom lens according to embodiment 15 of the present invention in the state in which the zoom lens is focused on an object point at infinity, where FIG. 29A is a cross sectional view of the zoom lens at the wide angle end, FIG. 29B is a cross sectional view of the zoom lens in an intermediate focal length state, and FIG. 29C is a cross sectional view of the zoom lens at the telephoto end.

Figure 30A:
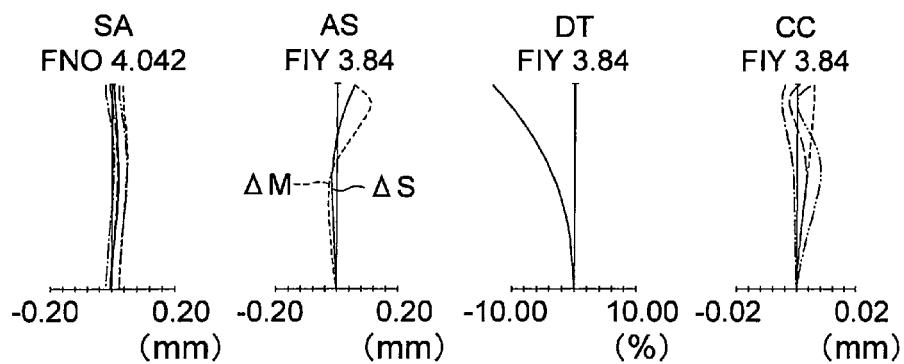
FIGS. 30A, 30B, and 30C are diagrams showing spherical aberration, astigmatism, distortion, and chromatic aberration of magnification of the zoom lens according to embodiment 15 in the state in which the zoom lens is focused on an object point at infinity, where
Figure 30B:
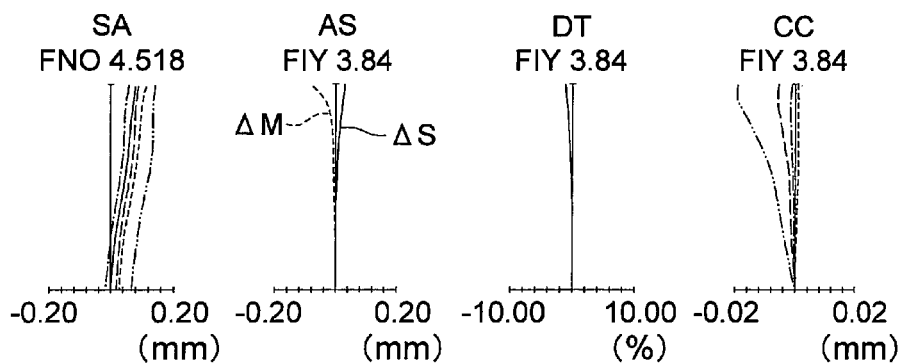
Figure 30C:
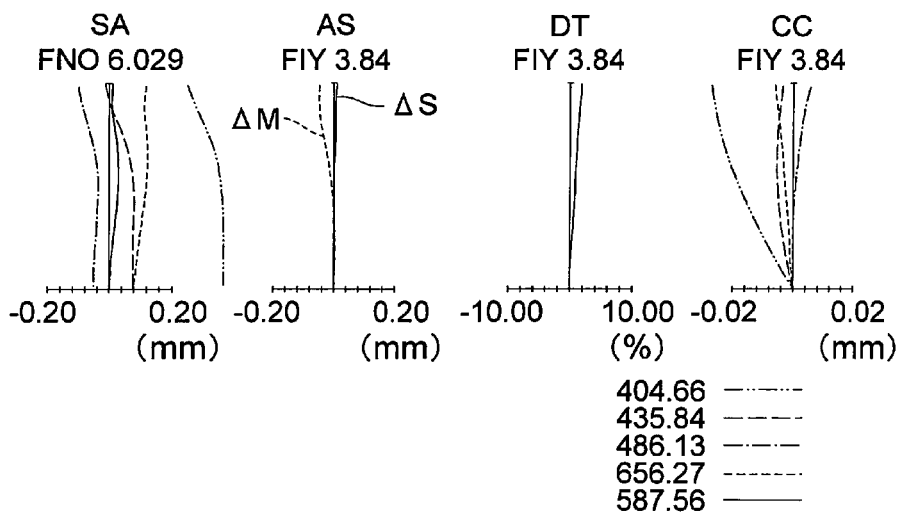

FIGS. 30A, 30B, and 30C are diagrams showing spherical aberration, astigmatism, distortion, and chromatic aberration of magnification of the zoom lens according to embodiment 15 in the state in which the zoom lens is focused on an object point at infinity, where FIG. 30A is for the wide angle end, FIG. 30B is for the intermediate focal length state, and FIG. 30C is for the telephoto end.

As shown in FIGS. 29A, 29B, and 29C, the zoom lens according to embodiment 15 includes a first lens group G1 having a positive refracting power, a second lens group G2 having a negative refracting power, an aperture stop S, a third lens group G3 having a positive refracting power, a fourth lens group G4 having a positive refracting power, a fifth lens group G5 having a positive refracting power, and a sixth lens group G6 having a negative refracting power, which are arranged in order from the object side.

The first lens group G1 is composed of a negative meniscus lens L1 having a convex surface directed toward the object side, a prism L2 whose object side surface and image side surface are both planar, a cemented lens (or lens component C1p) made up of a negative meniscus lens L3 having a convex surface directed toward the object side and a biconvex positive lens L4, and a biconvex positive lens L5, and has a positive refracting power as a whole.

In this embodiment, what is referred to as "f12" is the combined focal length of lens L3, lens 4, and lens L5. What is referred to as "the vertex Ct1" is the vertex of the image side surface of lens L1. What is referred to as "the vertex Ct2" is the vertex of the cemented surface of the cemented lens (lens L3 and lens L4).

The second lens group G2 is composed of a biconcave negative lens L6, and a cemented lens made up of a biconcave negative lens L7 and a positive meniscus lens L8 having a convex surface directed toward the object side, and has a negative refracting power as a whole.

The third lens group G3 is composed of a biconvex positive lens L9 and has a positive refracting power.

The fourth lens group G4 is composed of a biconvex positive lens L10, and a cemented lens made up of a biconvex positive lens L11 and a biconcave negative lens L12, and has a positive refracting power.

The fifth lens group G5 is composed of a biconvex positive lens L13 and has a positive refracting power.

The sixth lens group G6 is composed of a cemented lens made up of a negative meniscus lens L14 having a convex surface directed toward the image side and a positive meniscus lens L15 having a convex surface directed toward the image side, and has a negative refracting power.

During zooming from the wide angle end to the telephoto end, the first lens group G1 is fixed, the second lens group G2 moves toward the image side, the third lens group G3 is fixed, the fourth lens group G4 moves toward the object side, the fifth lens group G5 moves toward the object side and thereafter moves toward the image side, and the sixth lens group G6 is fixed. The position of the aperture stop S is fixed. The light quantity is controlled by varying the aperture size of the aperture stop S.

There are nine aspheric surfaces in total, which include the object side surface of the negative meniscus lens L3 having a convex surface directed toward the object side in the first lens group G1, both surfaces of the biconvex positive lens L4 in the first lens group G1, both surfaces of the image side biconcave negative lens L7 in the second lens group G2, the image side surface of the positive meniscus lens L8 having a convex surface directed toward the object side in the second lens group G2, both surfaces of the object side biconvex positive lens L10 in the fourth lens group G4, and the object side surface of the biconvex positive lens L13 in the fifth lens group G5.

Figure 31A:
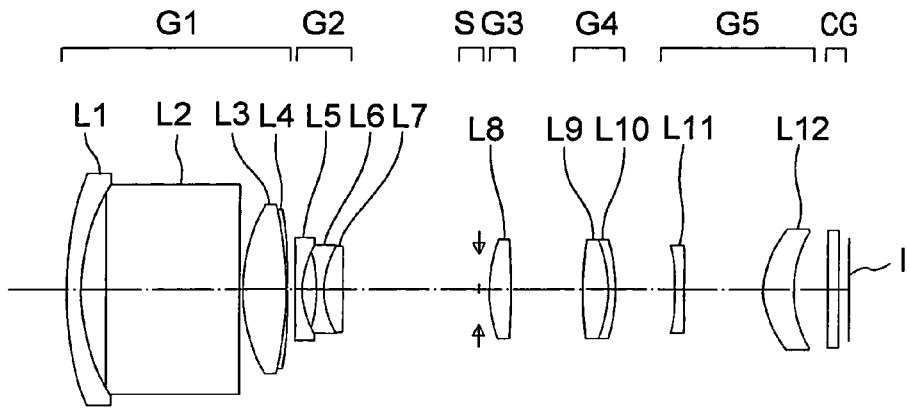
FIGS. 31A, 31B, and 31C are cross sectional views taken along the optical axis showing the optical configuration of a zoom lens according to embodiment 16 of the present invention in the state in which the zoom lens is focused on an object point at infinity, respectively at the wide angle end, at an intermediate focal length, and at the telephoto end.
Figure 31B:
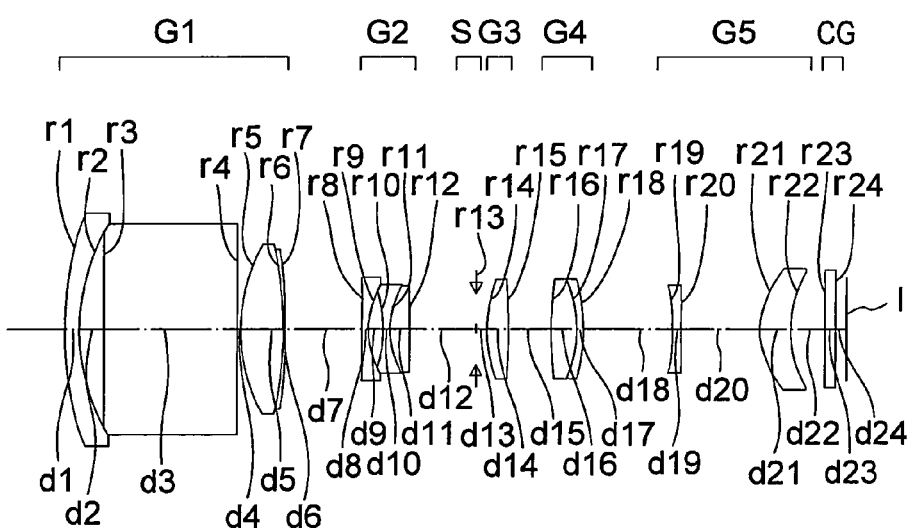
Figure 31C:
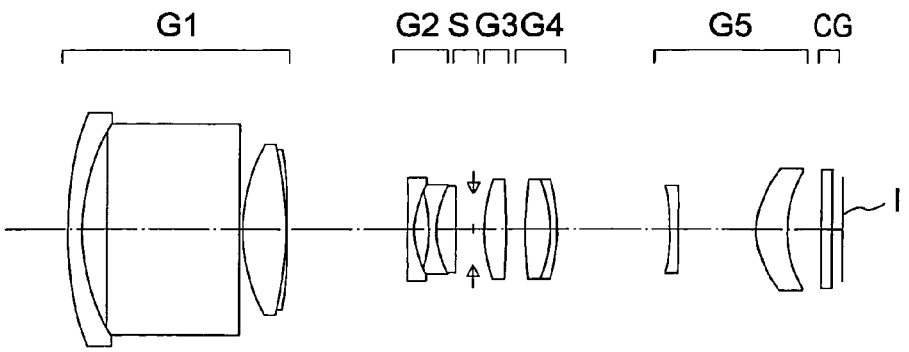

Next, a zoom lens according to embodiment 16 of the present invention will be described. FIGS. 31A, 31B, and 31C are cross sectional views taken along the optical axis showing the optical configuration of the zoom lens according to embodiment 16 of the present invention in the state in which the zoom lens is focused on an object point at infinity, where FIG. 31A is a cross sectional view of the zoom lens at the wide angle end, FIG. 31B is a cross sectional view of the zoom lens in an intermediate focal length state, and FIG. 31C is a cross sectional view of the zoom lens at the telephoto end.

Figure 32A:
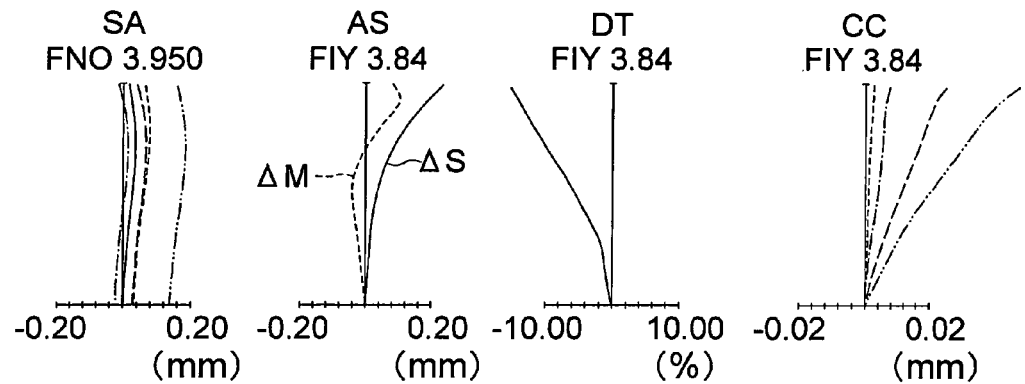
FIGS. 32A, 32B, and 32C are diagrams showing spherical aberration, astigmatism, distortion, and chromatic aberration of magnification of the zoom lens according to embodiment 16 in the state in which the zoom lens is focused on an object point at infinity, where
Figure 32B:
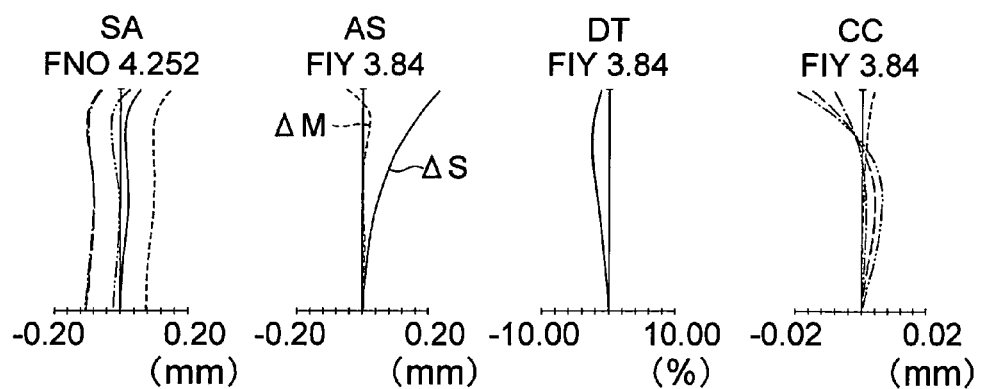
Figure 32C:
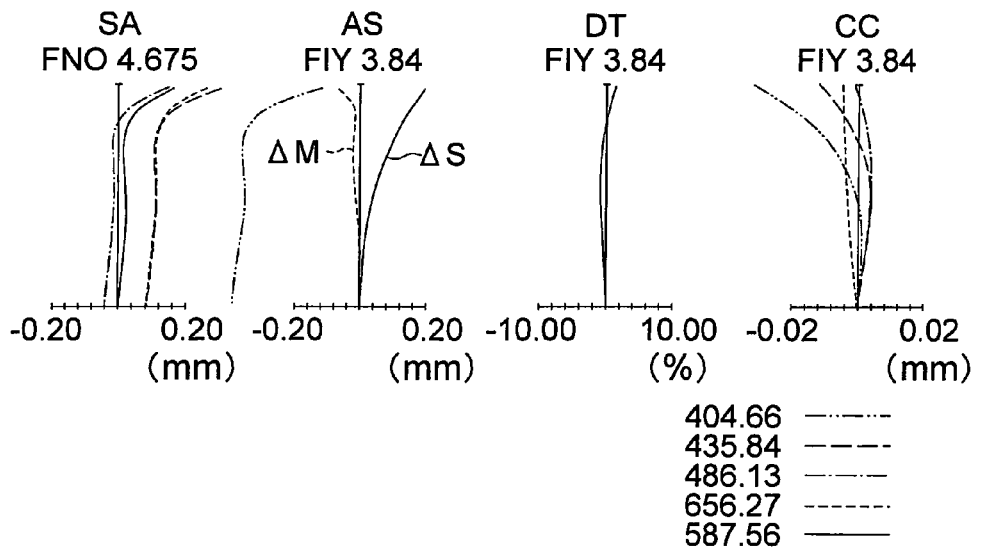

FIGS. 32A, 32B, and 32C are diagrams showing spherical aberration, astigmatism, distortion, and chromatic aberration of magnification of the zoom lens according to embodiment 16 in the state in which the zoom lens is focused on an object point at infinity, where FIG. 32A is for the wide angle end, FIG. 32B is for the intermediate focal length state, and FIG. 32C is for the telephoto end.

As shown in FIGS. 31A, 31B, and 31C, the zoom lens according to embodiment 16 includes a first lens group G1 having a positive refracting power, a second lens group G2 having a negative refracting power, an aperture stop S, a third lens group G3 having a positive refracting power, a fourth lens group G4 having a positive refracting power, and a fifth lens group G5 having a negative refracting power, which are arranged in order from the object side.

The first lens group G1 is composed of a negative meniscus lens L1 having a convex surface directed toward the object side, a prism L2 whose object side surface and image side surface are both planar, and a cemented lens (or lens component C1p) made up of a biconvex positive lens L3 and a negative meniscus lens L4 having a convex surface directed toward the image side, and has a positive refracting power as a whole.

In this embodiment, what is referred to as "f12" is the combined focal length of lens L3 and lens L4. What is referred to as "the vertex Ct1" is the vertex of the image side surface of lens L1. What is referred to as "the vertex Ct2" is the vertex of the cemented surface of the cemented lens (lens L3 and lens L4).

The second lens group G2 is composed of a biconcave negative lens L5, and a cemented lens made up of a biconcave negative lens L6 and a biconvex positive lens L7, and has a negative refracting power as a whole.

The third lens group G3 is composed of a biconvex positive lens L8 and has a positive refracting power.

The fourth lens group G4 is composed of a cemented lens made up of a biconvex positive lens L9 and a negative meniscus lens L10 having a convex surface directed toward the image side, and has a positive refracting power.

The fifth lens group G5 is composed of a biconcave negative lens L11, and a positive meniscus lens L12 having a convex surface directed toward the object side, and has a negative refracting power.

During zooming from the wide angle end to the telephoto end, the first lens group G1 is fixed, the second lens group G2 moves toward the image side, the third lens group G3 is fixed, the fourth lens group G4 moves toward the object side, and the fifth lens group G5 is fixed. The position of the aperture stop S is fixed. The light quantity is controlled by varying the aperture size of the aperture stop S.

There are six aspheric surfaces in total, which include both surfaces of the biconvex positive lens L3 in the first lens group G1, the object side surface of the biconvex positive lens L8 in the third lens group G3, the object side surface of the biconvex positive lens L9 in the fourth lens group G4, the object side surface of the biconcave negative lens L11 in the fifth lens group G5, and the object side surface of a positive meniscus lens L12 having a convex surface directed toward the object side in the fifth lens group G5.

Figure 33A:
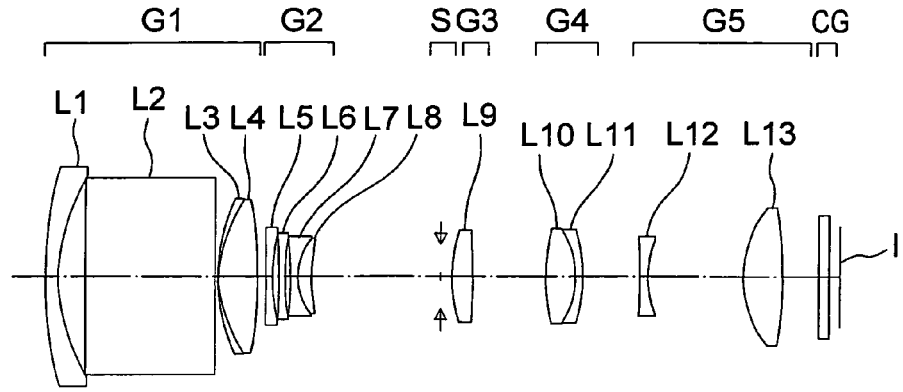
FIGS. 33A, 33B, and 33C are cross sectional views taken along the optical axis showing the optical configuration of a zoom lens according to embodiment 17 of the present invention in the state in which the zoom lens is focused on an object point at infinity, respectively at the wide angle end, at an intermediate focal length, and at the telephoto end.
Figure 33B:
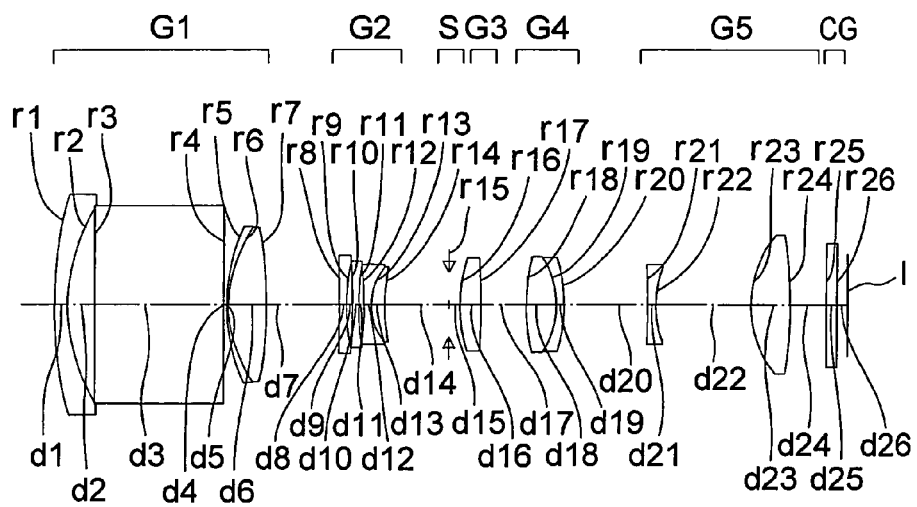
Figure 33C:
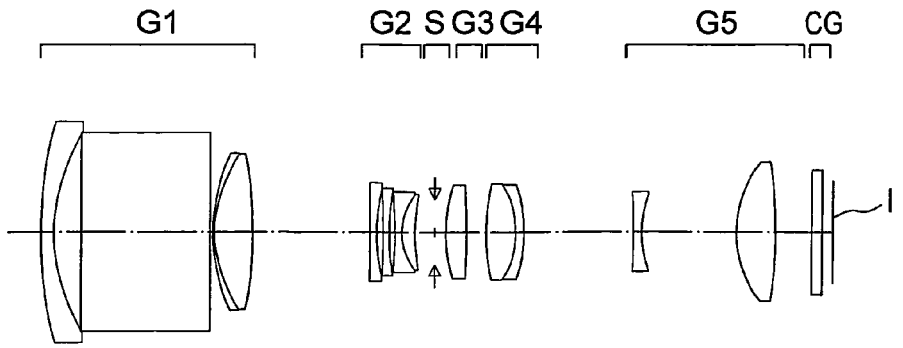

Next, a zoom lens according to embodiment 17 of the present invention will be described. FIGS. 33A, 33B, and 33C are cross sectional views taken along the optical axis showing the optical configuration of the zoom lens according to embodiment 17 of the present invention in the state in which the zoom lens is focused on an object point at infinity, where FIG. 33A is a cross sectional view of the zoom lens at the wide angle end, FIG. 33B is a cross sectional view of the zoom lens in an intermediate focal length state, and FIG. 33C is a cross sectional view of the zoom lens at the telephoto end.

Figure 34A:
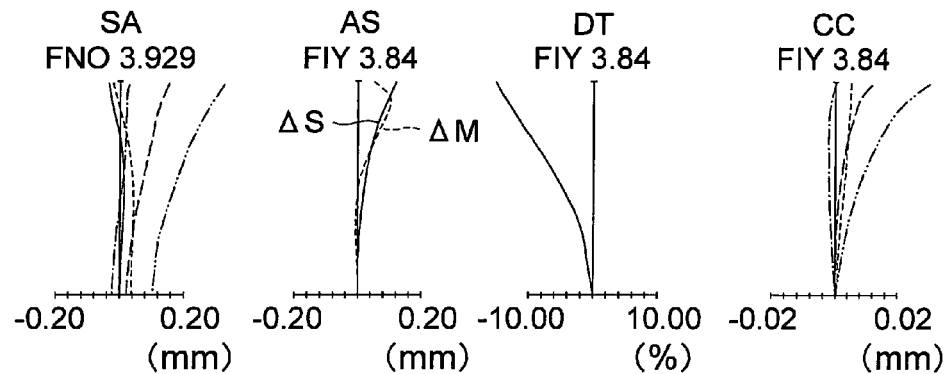
FIGS. 34A, 34B, and 34C are diagrams showing spherical aberration, astigmatism, distortion, and chromatic aberration of magnification of the zoom lens according to embodiment 17 in the state in which the zoom lens is focused on an object point at infinity, where
Figure 34B:
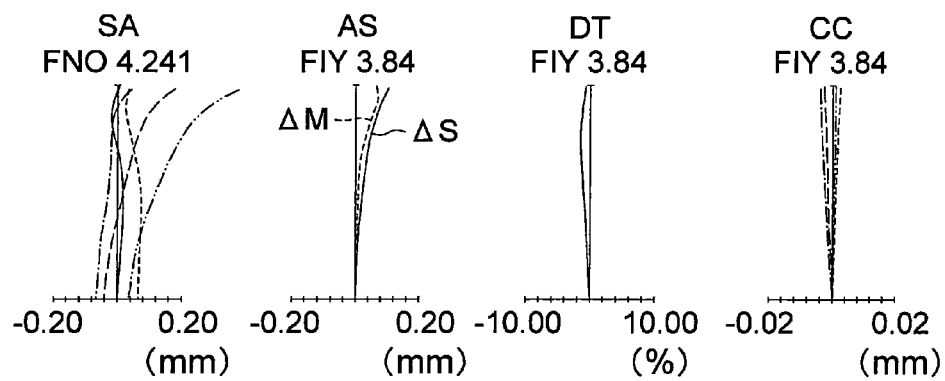
Figure 34C:
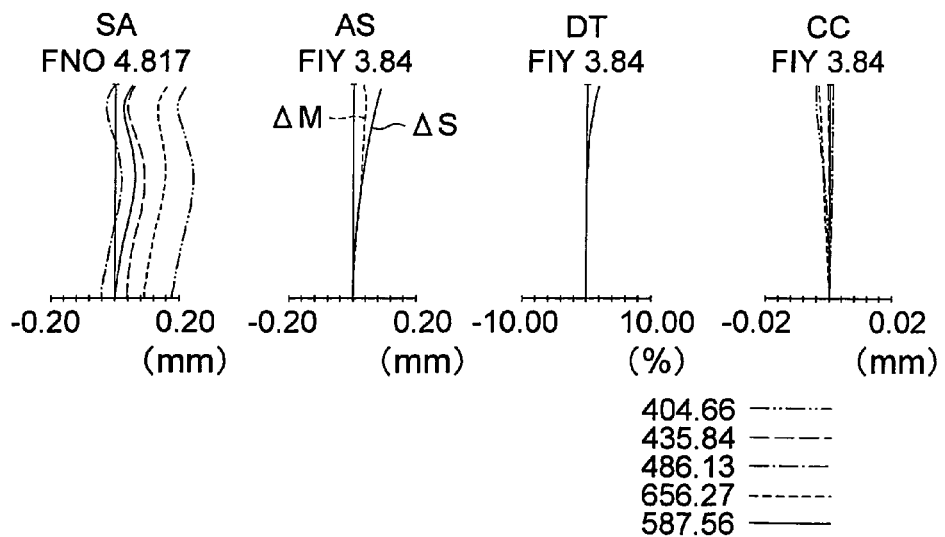

FIGS. 34A, 34B, and 34C are diagrams showing spherical aberration, astigmatism, distortion, and chromatic aberration of magnification of the zoom lens according to embodiment 17 in the state in which the zoom lens is focused on an object point at infinity, where FIG. 34A is for the wide angle end, FIG. 34B is for the intermediate focal length state, and FIG. 34C is for the telephoto end.

As shown in FIGS. 33A, 33B, and 33C, the zoom lens according to embodiment 17 includes a first lens group G1 having a positive refracting power, a second lens group G2 having a negative refracting power, an aperture stop S, a third lens group G3 having a positive refracting power, a fourth lens group G4 having a positive refracting power, and a fifth lens group G5 having a positive refracting power, which are arranged in order from the object side.

The first lens group G1 is composed of a negative meniscus lens L1 having a convex surface directed toward the object side, a prism L2 whose object side surface and image side surface are both planar, and a cemented lens (or lens component C1p) made up of a negative meniscus lens L3 having a convex surface directed toward the object side and a biconvex positive lens L4, and has a positive refracting power as a whole.

In this embodiment, what is referred to as "f12" is the combined focal length of lens L3 and lens L4. What is referred to as "the vertex Ct1" is the vertex of the image side surface of lens L1. What is referred to as "the vertex Ct2" is the vertex of the cemented surface of the cemented lens (lens L3 and lens L4).

The second lens group G2 is composed of a biconcave negative lens L5, a biconcave negative lens L6, and a cemented lens made up of a biconcave negative lens L7 and a positive meniscus lens L8 having a convex surface directed toward the object side, and has a negative refracting power as a whole.

The third lens group G3 is composed of a biconvex positive lens L9 and has a positive refracting power.

The fourth lens group G4 is composed of a cemented lens made up of a biconvex positive lens L10 and a negative meniscus lens L11 having a convex surface directed toward the image side, and has a positive refracting power.

The fifth lens group G5 is composed of a biconcave negative lens L12 and a biconvex positive lens L13, and has a positive refracting power.

During zooming from the wide angle end to the telephoto end, the first lens group G1 is fixed, the second lens group G2 moves toward the image side, the third lens group G3 is fixed, the fourth lens group G4 moves toward the object side, and the fifth lens group G5 is fixed. The position of the aperture stop S is fixed. The light quantity is controlled by varying the aperture size of the aperture stop S.

There are six aspheric surfaces in total, which include the object side surface of the negative meniscus lens L3 having a convex surface directed toward the object side in the first lens group G1, both surfaces of the biconvex positive lens L4 in the first lens group G1, the object side surface of the convex positive lens L9 in the third lens group G3, the object side surface of the biconvex positive lens L10 in the fourth lens group G4, and the object side surface of the biconvex positive lens L13 in the fifth lens group G5.

Figure 35A:
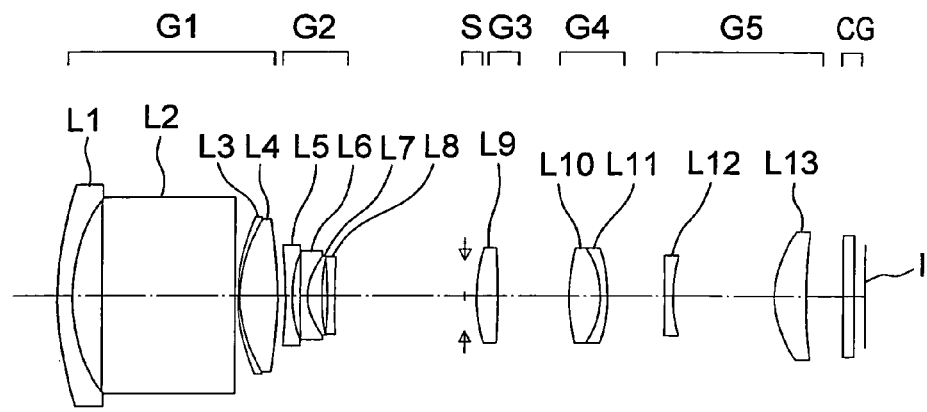
FIGS. 35A, 35B, and 35C are cross sectional views taken along the optical axis showing the optical configuration of a zoom lens according to embodiment 18 of the present invention in the state in which the zoom lens is focused on an object point at infinity, respectively at the wide angle end, at an intermediate focal length, and at the telephoto end.
Figure 35B:
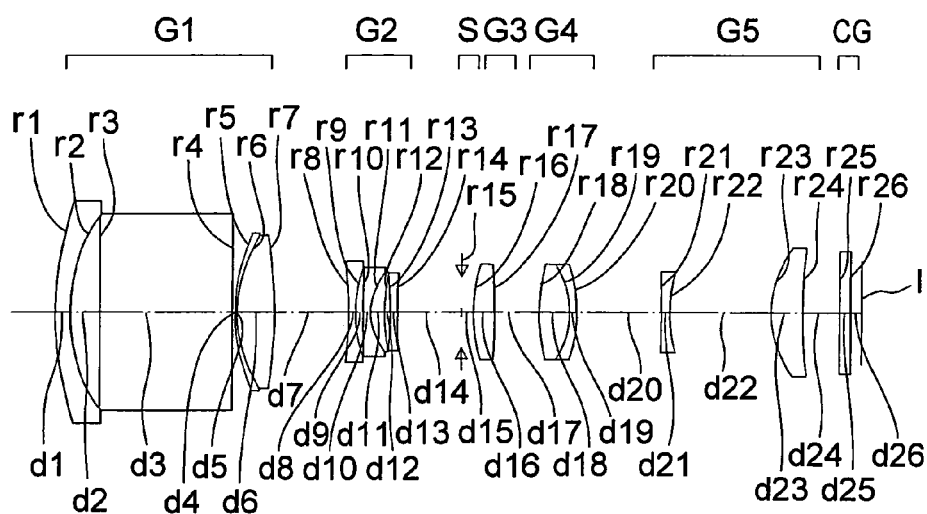
Figure 35C:
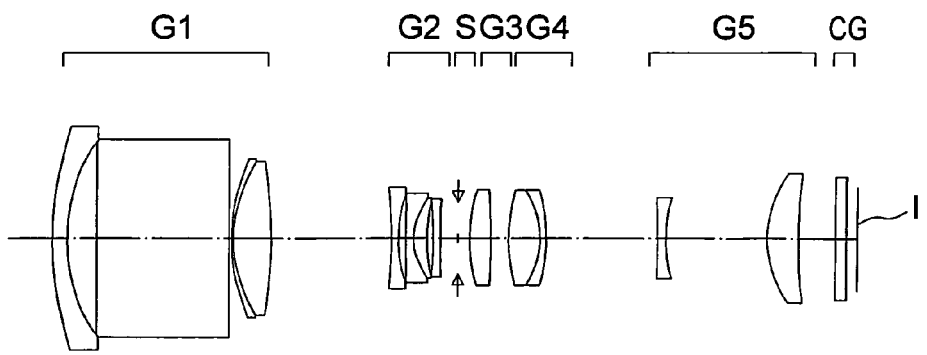

Next, a zoom lens according to embodiment 18 of the present invention will be described. FIGS. 35A, 35B, and 35C are cross sectional views taken along the optical axis showing the optical configuration of the zoom lens according to embodiment 18 of the present invention in the state in which the zoom lens is focused on an object point at infinity, where FIG. 35A is a cross sectional view of the zoom lens at the wide angle end, FIG. 35B is a cross sectional view of the zoom lens in an intermediate focal length state, and FIG. 35C is a cross sectional view of the zoom lens at the telephoto end.

Figure 36A:
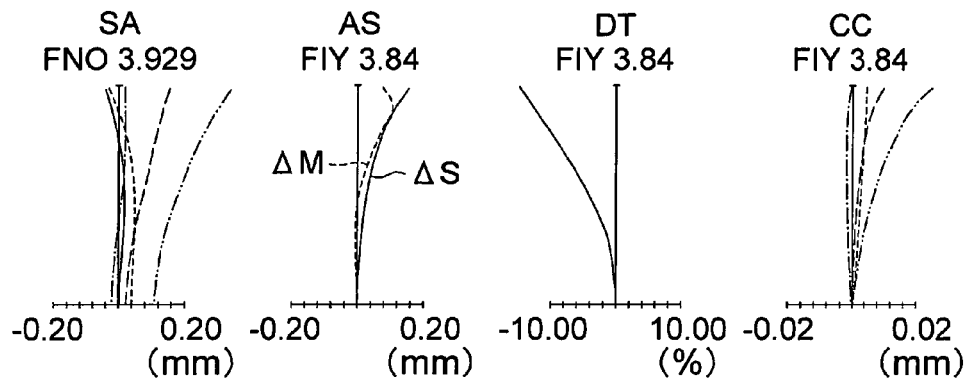
FIGS. 36A, 36B, and 36C are diagrams showing spherical aberration, astigmatism, distortion, and chromatic aberration of magnification of the zoom lens according to embodiment 18 in the state in which the zoom lens is focused on an object point at infinity, where
Figure 36B:
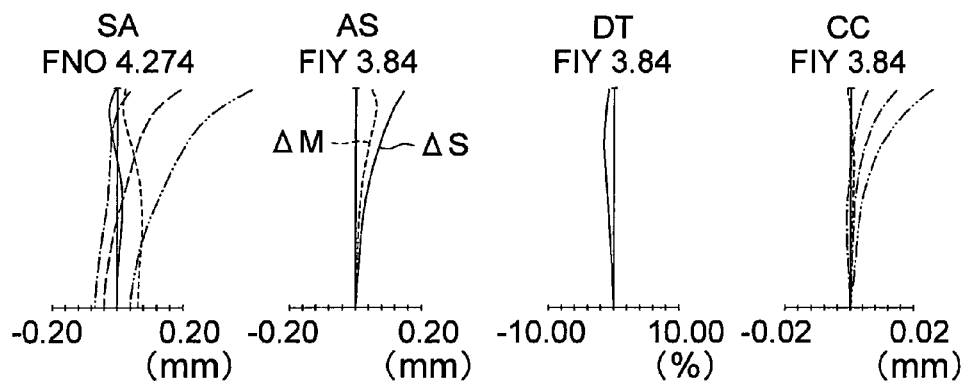
Figure 36C:
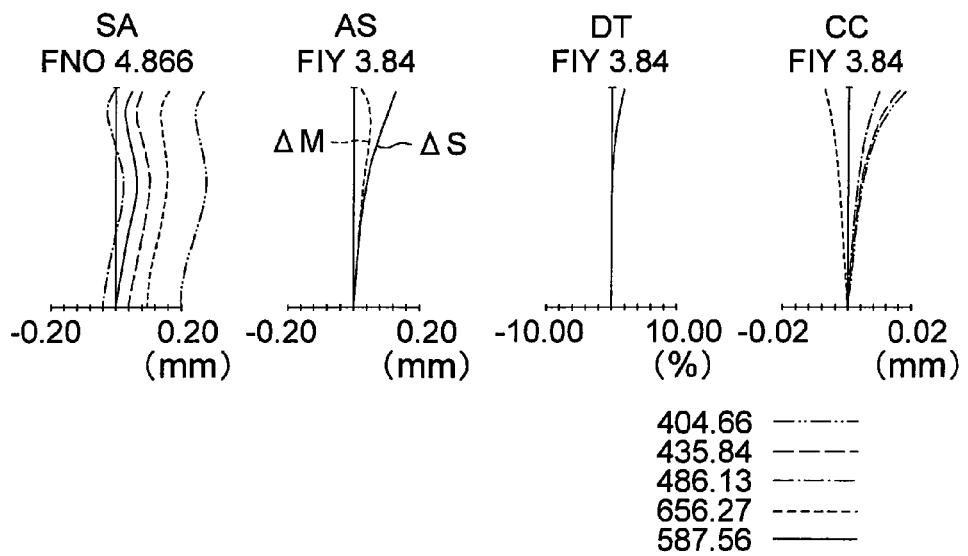

FIGS. 36A, 36B, and 36C are diagrams showing spherical aberration, astigmatism, distortion, and chromatic aberration of magnification of the zoom lens according to embodiment 18 in the state in which the zoom lens is focused on an object point at infinity, where FIG. 36A is for the wide angle end, FIG. 36B is for the intermediate focal length state, and FIG. 36C is for the telephoto end.

As shown in FIGS. 35A, 35B, and 35C, the zoom lens according to embodiment 18 includes a first lens group G1 having a positive refracting power, a second lens group G2 having a negative refracting power, an aperture stop S, a third lens group G3 having a positive refracting power, a fourth lens group G4 having a positive refracting power, and a fifth lens group G5 having a negative refracting power, which are arranged in order from the object side.

The first lens group G1 is composed of a negative meniscus lens L1 having a convex surface directed toward the object side, a prism L2 whose object side surface and image side surface are both planar, and a cemented lens (or lens component C1p) made up of a negative meniscus lens L3 having a convex surface directed toward the object side and a biconvex positive lens L4, and has a positive refracting power as a whole.

In this embodiment, what is referred to as "f12" is the combined focal length of lens L3 and lens L4. What is referred to as "the vertex Ct1" is the vertex of the image side surface of lens L1. What is referred to as "the vertex Ct2" is the vertex of the cemented surface of the cemented lens (lens L3 and lens L4).

The second lens group G2 is composed of a biconcave negative lens L5, a cemented lens made up of a biconcave negative lens L6 and a positive meniscus lens having a convex surface directed toward the object side, and a biconcave negative lens L8, and has a negative refracting power as a whole.

The third lens group G3 is composed of a biconvex positive lens L9, and has a positive refracting power.

The fourth lens group G4 is composed of a cemented lens made up of a biconvex positive lens L10 and a negative meniscus lens L11 having a convex surface directed toward the image side, and has a positive refracting power.

The fifth lens group G5 is composed of a biconcave negative lens L12 and a positive meniscus lens L13 having a convex surface directed toward the object side, and has a negative refracting power.

During zooming from the wide angle end to the telephoto end, the first lens group G1 is fixed, the second lens group G2 moves toward the image side, the third lens group G3 is fixed, the fourth lens group G4 moves toward the object side, and the fifth lens group G5 is fixed. The position of the aperture stop S is fixed. The light quantity is controlled by varying the aperture size of the aperture stop S.

There are six aspheric surfaces in total, which include the object side surface of the negative meniscus lens L3 having a convex surface directed toward the object side in the first lens group G1, both surfaces of the biconvex positive lens L4 in the first lens group G1, the object side surface of the convex positive lens L9 in the third lens group G3, the object side surface of the biconvex positive lens L10 in the fourth lens group G4, and the object side surface of the positive meniscus lens L13 having a convex surface directed toward the object side in the fifth lens group G5.

Furthermore, embodiments of the zoom lens and the image pickup apparatus according to the present invention will be described in detail with reference to the drawings. The present invention is not limited by the embodiments.

Figure 37A:
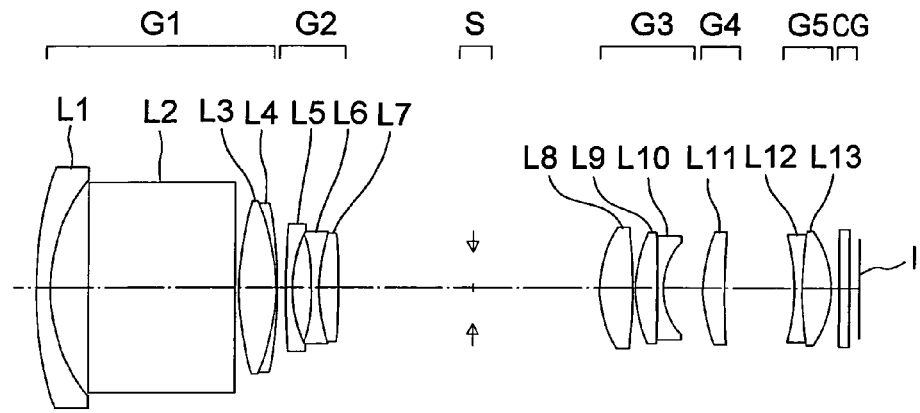
FIGS. 37A, 37B, and 37C are cross sectional views taken along the optical axis showing the optical configuration of a zoom lens according to embodiment 19 of the present invention in the state in which the zoom lens is focused on an object point at infinity, respectively at the wide angle end, at an intermediate focal length, and at the telephoto end.
Figure 37B:
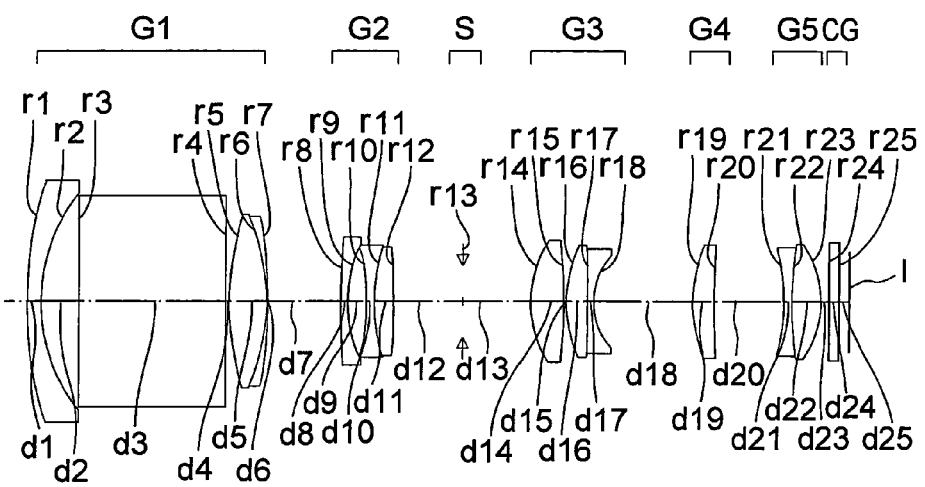
Figure 37C:
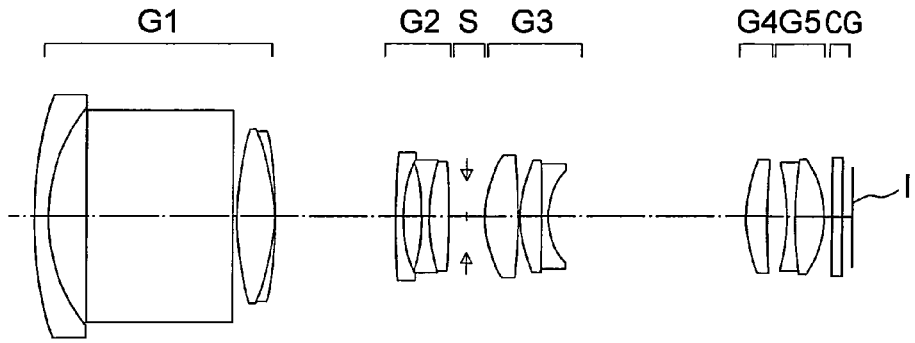

Next a zoom lens according to embodiment 19 of the present invention will be described. FIGS. 37A, 37B, and 37C are cross sectional views taken along the optical axis showing the optical configuration of the zoom lens according to embodiment 19 of the present invention in the state in which the zoom lens is focused on an object point at infinity, where FIG. 37A is a cross sectional view of the zoom lens at the wide angle end, FIG. 37B is a cross sectional view of the zoom lens in an intermediate focal length state, and FIG. 37C is a cross sectional view of the zoom lens at the telephoto end.

Figure 38A:
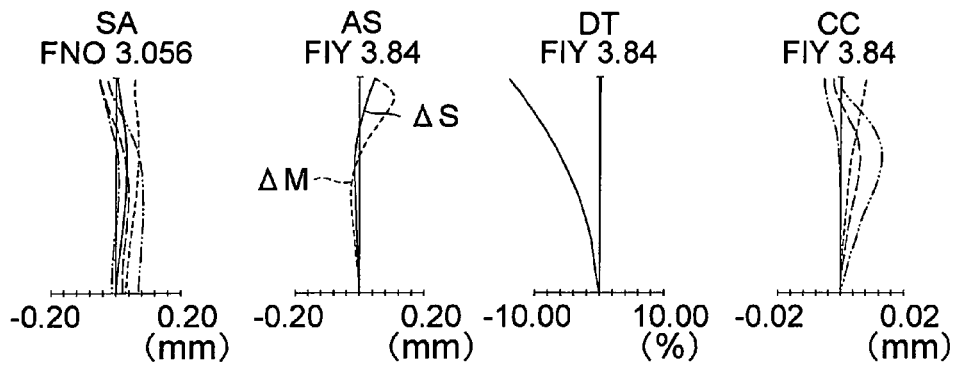
FIGS. 38A, 38B, and 38C are diagrams showing spherical aberration, astigmatism, distortion, and chromatic aberration of magnification of the zoom lens according to embodiment 19 in the state in which the zoom lens is focused on an object point at infinity, where
Figure 38B:
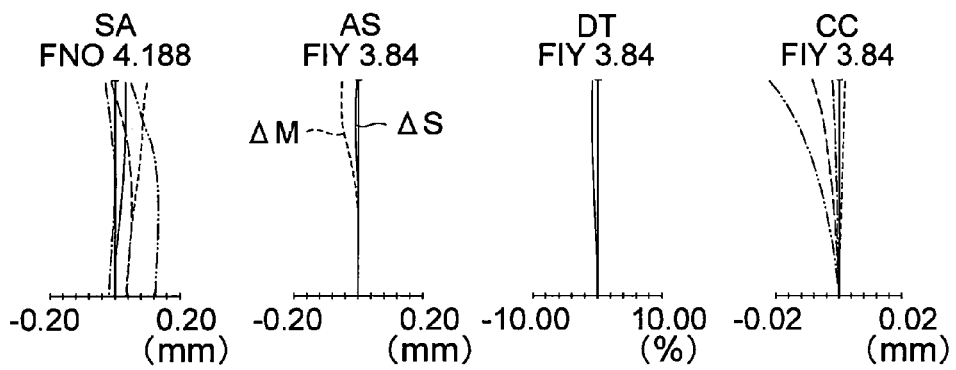
Figure 38C:
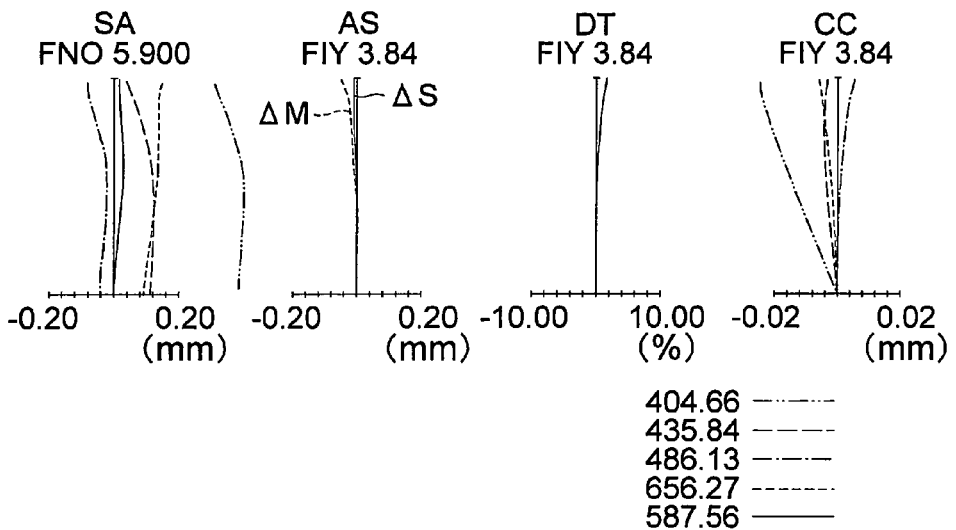

FIGS. 38A, 38B, and 38C are diagrams showing spherical aberration (SA), astigmatism (AS), distortion (DT), and chromatic aberration of magnification (CC) of the zoom lens according to embodiment 19 in the state in which the zoom lens is focused on an object point at infinity, where FIG. 38A is for the wide angle end, FIG. 38B is for the intermediate focal length state, and FIG. 38C is for the telephoto end. Sign "FIY" represents the image height. The signs in the aberration diagrams are commonly used also in the embodiments described in the following.

As shown in FIGS. 37A, 37B, and 37C, the zoom lens according to embodiment 19 includes a first lens group G1 having a positive refracting power, a second lens group G2 having a negative refracting power, an aperture stop S, a third lens group G3 having a positive refracting power, a fourth lens group G4 having a positive refracting power, and a fifth lens group G5 having a negative refracting power, which are arranged in order from the object side.

The first lens group G1 is composed of a negative meniscus lens L1 having a convex surface directed toward the object side, a prism L2 whose object side surface and image side surface are both planar, and a cemented lens (i.e. lens component C1$p$) made up of a biconvex positive lens L3 and a negative meniscus lens L4 having a convex surface directed toward the image side, and has a positive refracting power as a whole.

In this embodiment, what is referred to as "$D_{11}$" is the distance from the vertex of the image side surface of lens L1 to the vertex of the object side surface of lens L3. What is referred to as "$SD_1$" is the distance from the vertex of the object side surface of lens L1 to the vertex of the image side surface of lens L4. In this connection, the distance in the prism L2 is represented by the equivalent air distance.

The second lens group G2 is composed of a negative meniscus lens L5 having a convex surface directed toward the object side, and a cemented lens made up of a biconcave negative lens L6 and a biconvex positive lens L7, and has a negative refracting power as a whole.

The third lens group G3 is composed of an object side biconvex positive lens L8, and a cemented lens made up of a biconvex positive lens L9 and a biconcave negative lens L10, and has a positive refracting power as a whole.

The fourth lens group G4 is composed of a positive meniscus lens L11 having a convex surface directed toward the object side and has a positive refracting power.

The fifth lens group G5 is composed of a cemented lens made up of a biconcave negative lens L12 and a biconvex positive lens L13, and has a negative refracting power as a whole.

During zooming from the wide angle end to the telephoto end, the first lens group G1 is fixed, the second lens group G2 moves toward the image side, the third lens group G3 moves toward the object side, the fourth lens group G4 is kept nearly stationary during zooming from the wide angle end to an intermediate focal length position and moves toward the image side during zooming from the intermediate focal length position to the telephoto end, and the fifth lens group G5 is fixed. The position of the aperture stop S is fixed. The light quantity is controlled by varying the aperture size.

There are eight aspheric surfaces in total, which include both surfaces of the biconvex positive lens L3 in the first lens group G1, the image side surface of the negative meniscus lens L4 having a convex surface directed toward the image side in the first lens group G1, the image side surface of the negative meniscus lens L5 having a convex surface directed toward the object side in the second lens group G2, both surfaces of the object side biconvex positive lens L8 in the third lens group G3, the object side surface of the positive meniscus lens L11 having a convex surface directed toward the object side in the fourth lens group G4, and the object side surface of the biconcave negative lens L12 in the fifth lens group G5.

Figure 39A:
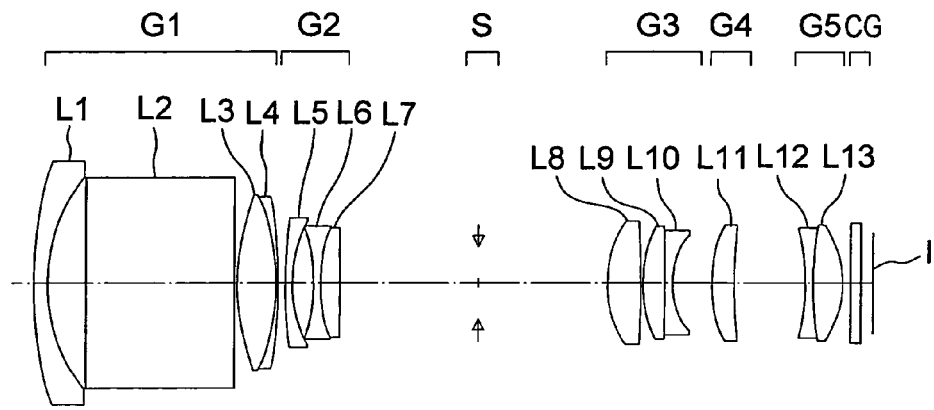
FIGS. 39A, 39B, and 39C are cross sectional views taken along the optical axis showing the optical configuration of a zoom lens according to embodiment 20 of the present invention in the state in which the zoom lens is focused on an object point at infinity, respectively at the wide angle end, at an intermediate focal length, and at the telephoto end.
Figure 39B:
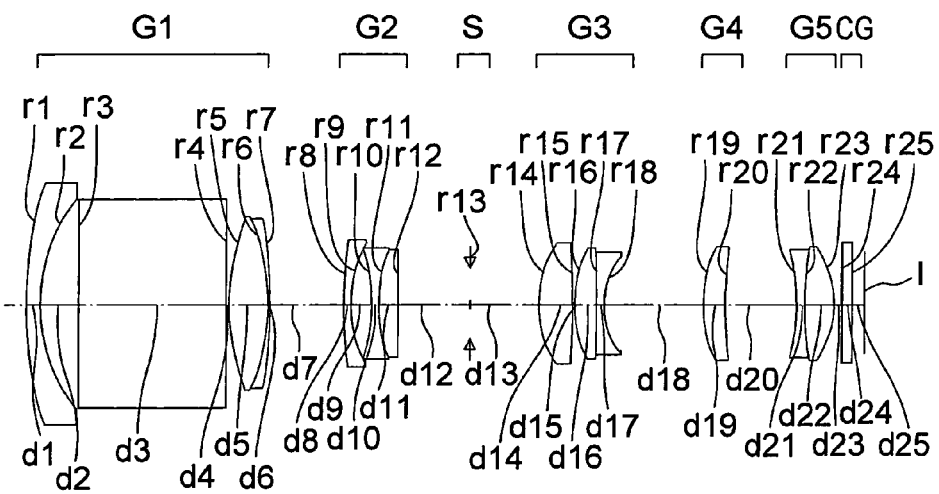
Figure 39C:
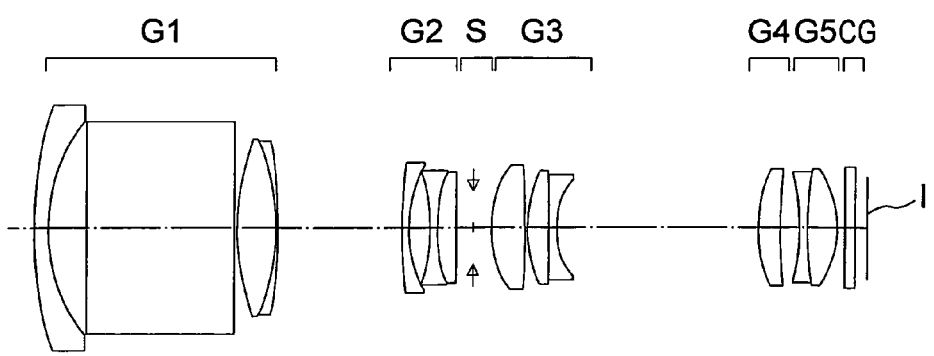

Next a zoom lens according to embodiment 20 of the present invention will be described. FIGS. 39A, 39B, and 39C are cross sectional views taken along the optical axis showing the optical configuration of the zoom lens according to embodiment 20 of the present invention in the state in which the zoom lens is focused on an object point at infinity, where FIG. 39A is a cross sectional view of the zoom lens at the wide angle end, FIG. 39B is a cross sectional view of the zoom lens in an intermediate focal length state, and FIG. 39C is a cross sectional view of the zoom lens at the telephoto end.

Figure 40A:
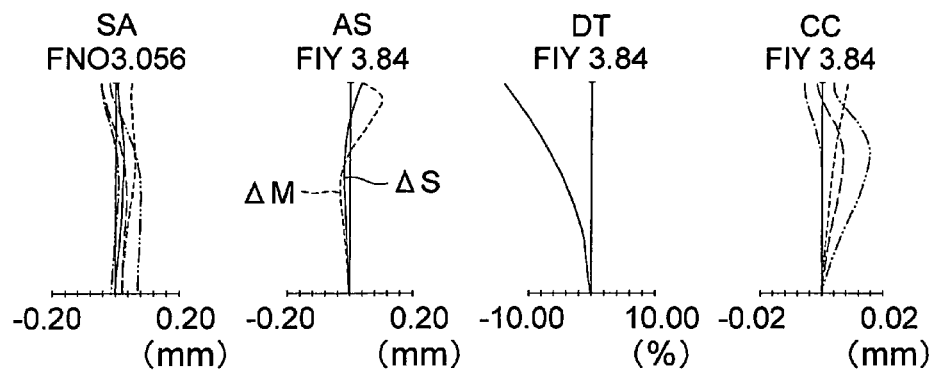
FIGS. 40A, 40B, and 40C are diagrams showing spherical aberration, astigmatism, distortion, and chromatic aberration of magnification of the zoom lens according to embodiment 20 in the state in which the zoom lens is focused on an object point at infinity, where
Figure 40B:
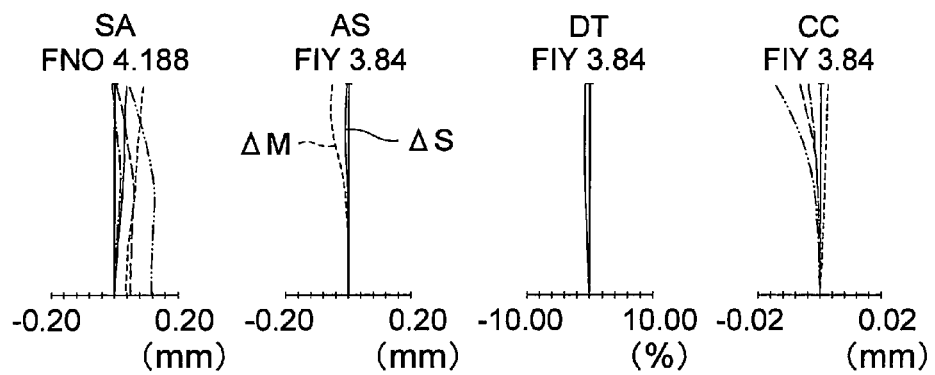
Figure 40C:
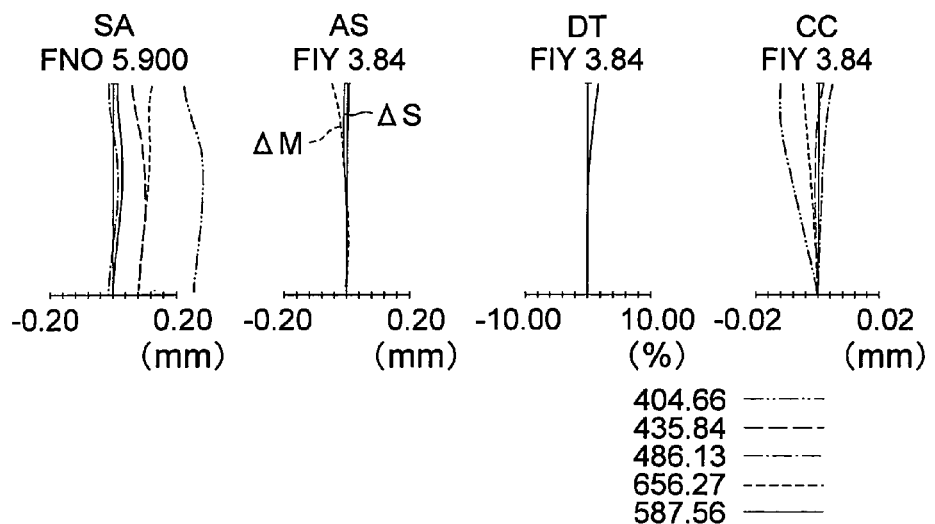

FIGS. 40A, 40B, and 40C are diagrams showing spherical aberration, astigmatism, distortion, and chromatic aberration of magnification of the zoom lens according to embodiment 20 in the state in which the zoom lens is focused on an object point at infinity, where FIG. 40A is for the wide angle end, FIG. 40B is for the intermediate focal length state, and FIG. 40C is for the telephoto end.

As shown in FIGS. 39A, 39B, and 39C, the zoom lens according to embodiment 20 includes a first lens group G1 having a positive refracting power, a second lens group G2 having a negative refracting power, an aperture stop S, a third lens group G3 having a positive refracting power, a fourth lens group G4 having a positive refracting power, and a fifth lens group G5 having a negative refracting power, which are arranged in order from the object side.

The first lens group G1 is composed of a negative meniscus lens L1 having a convex surface directed toward the object side, a prism L2 whose object side surface and image side surface are both planar, and a cemented lens (i.e. lens component C1$p$) made up of a biconvex positive lens L3 and a negative meniscus lens L4 having a convex surface directed toward the image side, and has a positive refracting power as a whole.

In this embodiment, what is referred to as "$D_{11}$" is the distance from the vertex of the image side surface of lens L1 to the vertex of the object side surface of lens L3. What is referred to as "$SD_1$" is the distance from the vertex of the object side surface of lens L1 to the vertex of the image side surface of lens L4. In this connection, the distance in the prism L2 is represented by the equivalent air distance.

The second lens group G2 is composed of a negative meniscus lens L5 having a convex surface directed toward the object side, and a cemented lens made up of a biconcave negative lens L6 and a biconvex positive lens L7, and has a negative refracting power as a whole.

The third lens group G3 is composed of a biconvex positive lens L8, and a cemented lens made up of a biconvex positive lens L9 and a biconcave negative lens L10, and has a positive refracting power as a whole.

The fourth lens group G4 is composed of a positive meniscus lens L11 having a convex surface directed toward the object side and has a positive refracting power.

The fifth lens group G5 is composed of a cemented lens made up of a biconcave negative lens L12 and a biconvex positive lens L13, and has a negative refracting power as a whole.

During zooming from the wide angle end to the telephoto end, the first lens group G1 is fixed, the second lens group G2 moves toward the image side, the third lens group G3 moves toward the object side, the fourth lens group G4 is kept nearly stationary during zooming from the wide angle end to an intermediate focal length position and moves toward the image side during zooming from the intermediate focal length position to the telephoto end, and the fifth lens group G5 is fixed. The position of the aperture stop S is fixed. The light quantity is controlled by varying the aperture size.

There are eight aspheric surfaces in total, which include both surfaces of the biconvex positive lens L3 in the first lens group G1, the image side surface of the negative meniscus lens L4 having a convex surface directed toward the image side in the first lens group G1, the image side surface of the negative meniscus lens L5 having a convex surface directed toward the object side in the second lens group G2, both surfaces of the object side biconvex positive lens L8 in the third lens group G3, the object side surface of the positive meniscus lens L11 having a convex surface directed toward the object side in the fourth lens group G4, and the object side surface of the biconcave negative lens L12 in the fifth lens group G5.

Figure 41A:
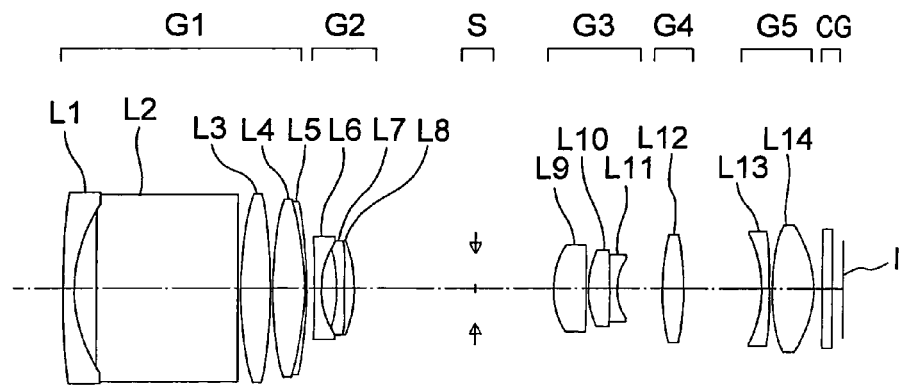
FIGS. 41A, 41B, and 41C are cross sectional views taken along the optical axis showing the optical configuration of a zoom lens according to embodiment 21 of the present invention in the state in which the zoom lens is focused on an object point at infinity, respectively at the wide angle end, at an intermediate focal length, and at the telephoto end.
Figure 41B:
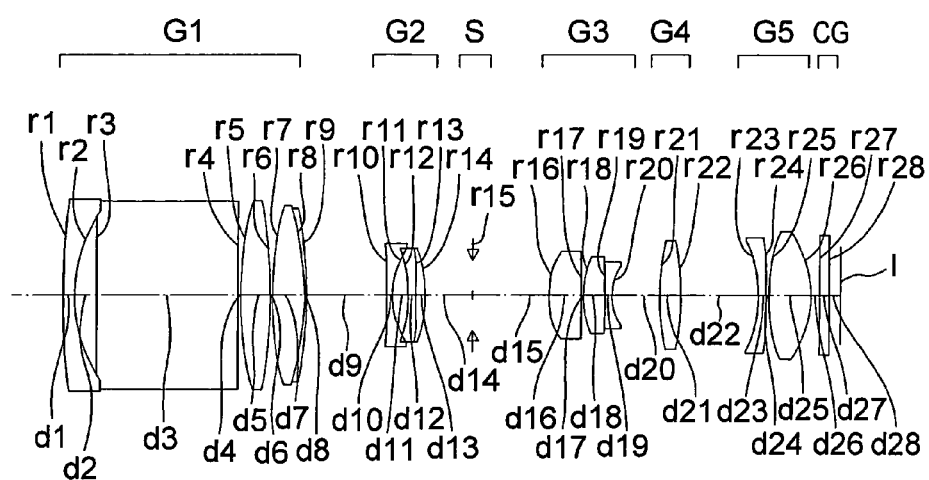
Figure 41C:
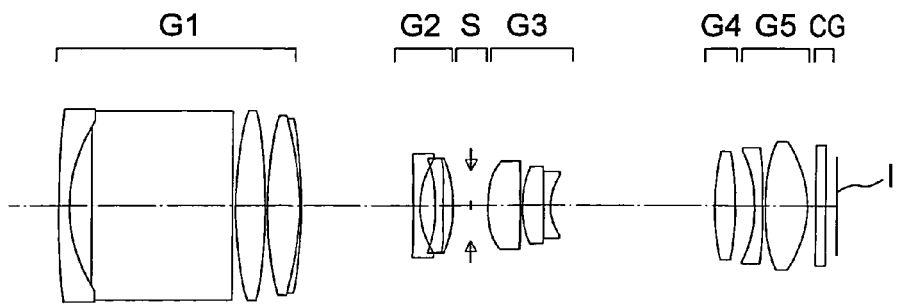

Next a zoom lens according to embodiment 21 of the present invention will be described. FIGS. 41A, 41B, and 41C are cross sectional views taken along the optical axis showing the optical configuration of the zoom lens according to embodiment 21 of the present invention in the state in which the zoom lens is focused on an object point at infinity, where FIG. 41A is a cross sectional view of the zoom lens at the wide angle end, FIG. 41B is a cross sectional view of the zoom lens in an intermediate focal length state, and FIG. 41C is a cross sectional view of the zoom lens at the telephoto end.

Figure 42A:
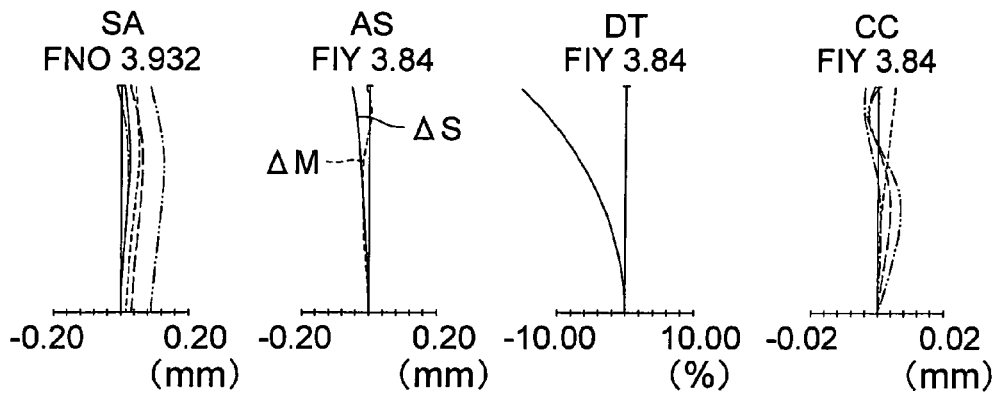
FIGS. 42A, 42B, and 42C are diagrams showing spherical aberration, astigmatism, distortion, and chromatic aberration of magnification of the zoom lens according to embodiment 21 in the state in which the zoom lens is focused on an object point at infinity, where
Figure 42B:
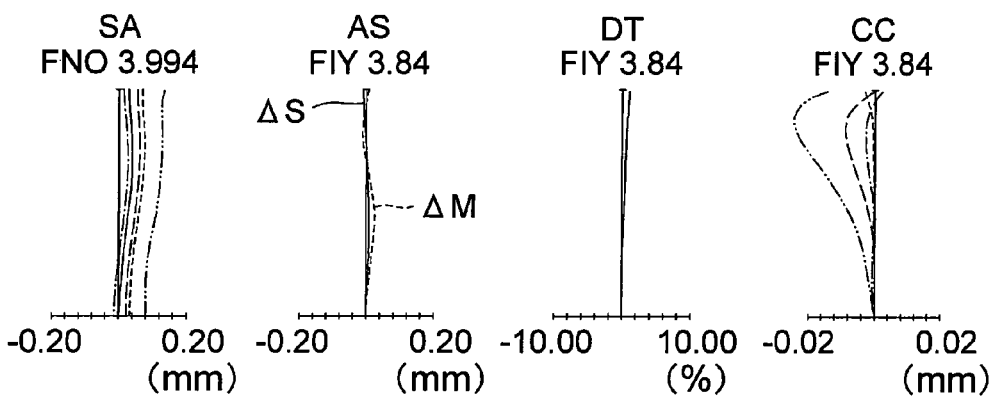
Figure 42C:
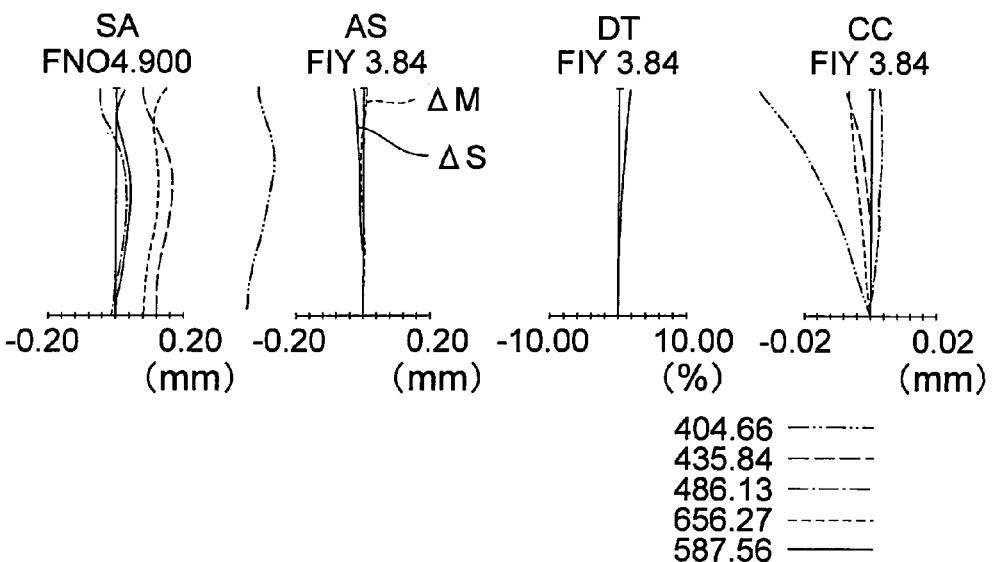

FIGS. 42A, 42B, and 42C are diagrams showing spherical aberration, astigmatism, distortion, and chromatic aberration of magnification of the zoom lens according to embodiment 21 in the state in which the zoom lens is focused on an object point at infinity, where FIG. 42A is for the wide angle end, FIG. 42B is for the intermediate focal length state, and FIG. 42C is for the telephoto end.

As shown in FIGS. 41A, 41B, and 41C, the zoom lens according to embodiment 21 includes a first lens group G1 having a positive refracting power, a second lens group G2 having a negative refracting power, an aperture stop S, a third lens group G3 having a positive refracting power, a fourth lens group G4 having a positive refracting power, and a fifth lens group G5 having a positive refracting power, which are arranged in order from the object side.

The first lens group G1 is composed of a negative meniscus lens L1 having a convex surface directed toward the object side, a prism L2 whose object side surface and image side surface are both planar, a biconvex positive lens L3, and a cemented lens (i.e. lens component C1p) made up of a biconvex positive lens L4 and a negative meniscus lens L5 having a convex surface directed toward the image side, and has a positive refracting power as a whole.

In this embodiment, what is referred to as "$D_{11}$" is the distance from the vertex of the image side surface of lens L1 to the vertex of the object side surface of lens L3. What is referred to as "$SD_1$" is the distance from the vertex of the object side surface of lens L1 to the vertex of the image side surface of lens L5. In this connection, the distance in the prism L2 is represented by the equivalent air distance.

The second lens group G2 is composed of a biconcave negative lens L6, and a cemented lens made up of a biconcave negative lens L7 and a biconvex positive lens L8, and has a negative refracting power as a whole.

The third lens group G3 is composed of a biconvex positive lens L9, and a cemented lens made up of a biconvex positive lens L10 and a biconcave negative lens L11, and has a positive refracting power as a whole.

The fourth lens group G4 is composed of a biconvex positive lens L12 and has a positive refracting power.

The fifth lens group G5 is composed of a negative meniscus lens L13 having a convex surface directed toward the image side and a biconvex positive lens L14, and has a positive refracting power as a whole.

During zooming from the wide angle end to the telephoto end, the first lens group G1 is fixed, the second lens group G2 moves toward the image side, the third lens group G3 is kept nearly stationary during zooming from the wide angle end to an intermediate focal length position and moves toward the object side during zooming from the intermediate focal length position to the telephoto end, the fourth lens group G4 is kept nearly stationary during zooming from the wide angle end to the intermediate focal length position and moves toward the image side during zooming from the intermediate focal length position to the telephoto end, and the fifth lens group G5 is fixed. The position of the aperture stop S is fixed. The light quantity is controlled by varying the aperture size.

There are nine aspheric surfaces in total, which include both surfaces of the biconvex positive lens L4 in the first lens group G1, the image side surface of the negative meniscus lens L5 having a convex surface directed toward the image side in the first lens group G1, both surfaces of the biconcave negative lens L7 in the second lens group G2, the image side surface of the biconvex positive lens L8 in the second lens group G2, both surfaces of the object side biconvex positive lens L9 in the third lens group G3, and the object side surface of the biconvex positive lens L12 in the fourth lens group G4.

Figure 43A:
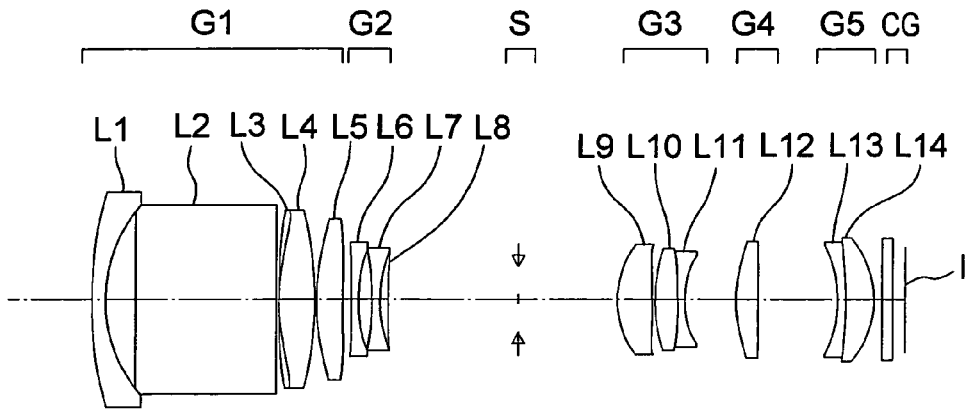
FIGS. 43A, 43B, and 43C are cross sectional views taken along the optical axis showing the optical configuration of a zoom lens according to embodiment 22 of the present invention in the state in which the zoom lens is focused on an object point at infinity, respectively at the wide angle end, at an intermediate focal length, and at the telephoto end.
Figure 43B:
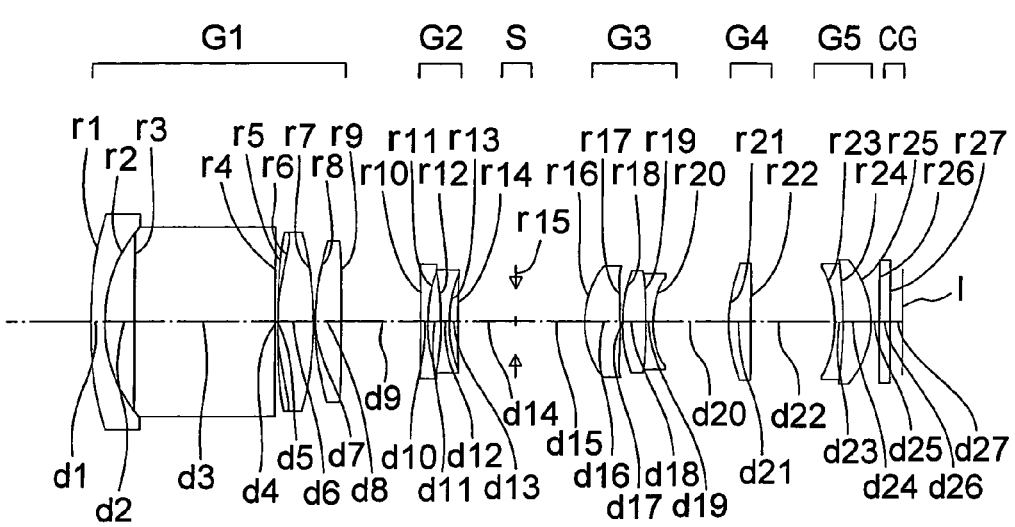
Figure 43C:
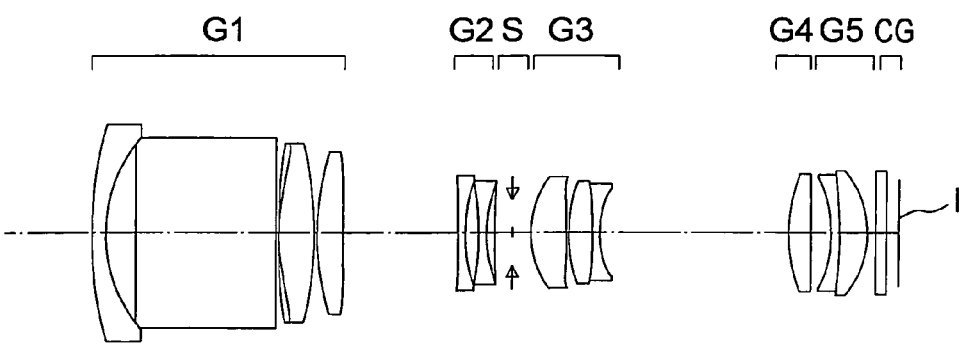

Next a zoom lens according to embodiment 22 of the present invention will be described. FIGS. 43A, 43B, and 43C are cross sectional views taken along the optical axis showing the optical configuration of the zoom lens according to embodiment 22 of the present invention in the state in which the zoom lens is focused on an object point at infinity, where FIG. 43A is a cross sectional view of the zoom lens at the wide angle end, FIG. 43B is a cross sectional view of the zoom lens in an intermediate focal length state, and FIG. 43C is a cross sectional view of the zoom lens at the telephoto end.

Figure 44A:
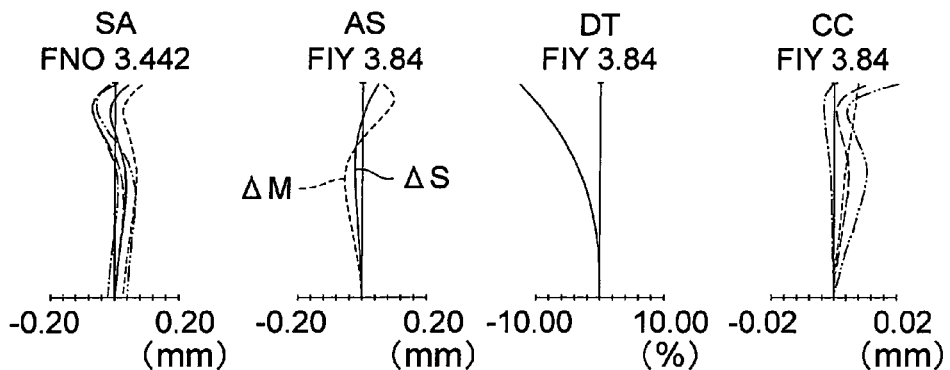
FIGS. 44A, 44B, and 44C are diagrams showing spherical aberration, astigmatism, distortion, and chromatic aberration of magnification of the zoom lens according to embodiment 22 in the state in which the zoom lens is focused on an object point at infinity, where
Figure 44B:
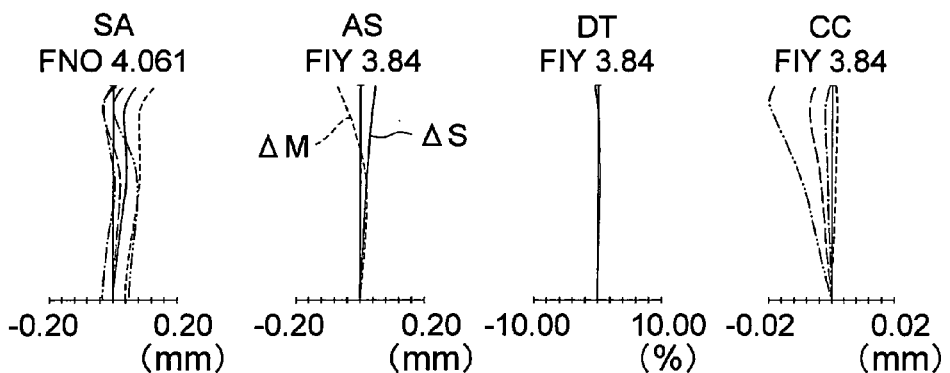
Figure 44C:
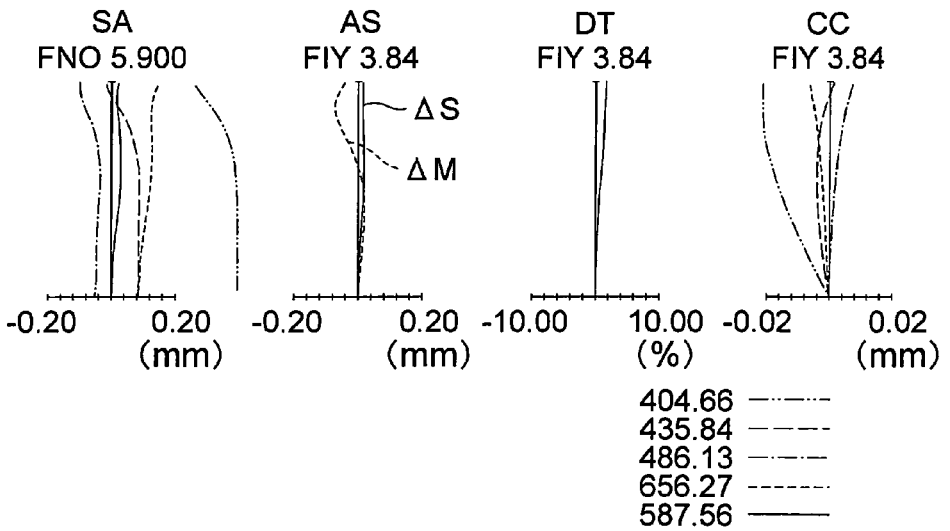

FIGS. 44A, 44B, and 44C are diagrams showing spherical aberration, astigmatism, distortion, and chromatic aberration of magnification of the zoom lens according to embodiment 22 in the state in which the zoom lens is focused on an object point at infinity, where FIG. 44A is for the wide angle end, FIG. 44B is for the intermediate focal length state, and FIG. 44C is for the telephoto end.

As shown in FIGS. 43A, 43B, and 43C, the zoom lens according to embodiment 22 includes a first lens group G1 having a positive refracting power, a second lens group G2 having a negative refracting power, an aperture stop S, a third lens group G3 having a positive refracting power, a fourth lens group G4 having a positive refracting power, and a fifth lens group G5 having a negative refracting power, which are arranged in order from the object side.

The first lens group G1 is composed of a negative meniscus lens L1 having a convex surface directed toward the object side, a prism L2 whose object side surface and image side surface are both planar, a cemented lens (i.e. lens component C1p) made up of a negative meniscus lens L3 having a convex surface directed toward the object side and a biconvex positive lens L4, and a biconvex positive lens L5 and has a positive refracting power as a whole.

In this embodiment, what is referred to as "$D_{11}$" is the distance from the vertex of the image side surface of lens L1 to the vertex of the object side surface of lens L3. What is referred to as "$SD_1$" is the distance from the vertex of the object side surface of lens L1 to the vertex of the image side surface of lens L5. In this connection, the distance in the prism L2 is represented by the equivalent air distance.

The second lens group G2 is composed of a biconcave negative lens L6, and a cemented lens made up of a biconcave negative lens L7 and a positive meniscus lens L8 having a convex surface directed toward the object side, and has a negative refracting power as a whole.

The third lens group G3 is composed of a biconvex positive lens L8, and a cemented lens made up of a biconvex positive lens L10 and a biconcave negative lens L11, and has a positive refracting power as a whole.

The fourth lens group G4 is composed of a biconvex positive lens L12 and has a positive refracting power.

The fifth lens group G5 is composed of a cemented lens made up of a negative meniscus lens L13 having a convex surface directed toward the image side and a positive meniscus lens L14 having a convex surface directed toward the image side, and has a negative refracting power as a whole.

During zooming from the wide angle end to the telephoto end, the first lens group G1 is fixed, the second lens group G2 moves toward the image side, the third lens group G3 moves toward the object side, the fourth lens group G4 is kept nearly stationary during zooming from the wide angle end to an intermediate focal length position and moves toward the image side during zooming from the intermediate focal length position to the telephoto end, and the fifth lens group G5 is fixed. The position of the aperture stop S is fixed. The light quantity is controlled by varying the aperture size.

There are nine aspheric surfaces in total, which include the object side surface of the negative meniscus lens L3 having a convex surface directed toward the object side in the first lens group G1, both surfaces of the biconvex positive lens L4 in the first lens group G1, both surfaces of the image side biconcave negative lens L7 in the second lens group G2, the image side surface of the positive meniscus lens L8 having a convex surface directed toward the object side in the second lens group G2, both surfaces of the object side biconvex positive lens L9 in the third lens group G3, and the object side surface of the biconvex positive lens L12 in the fourth lens group G4.

Figure 45A:
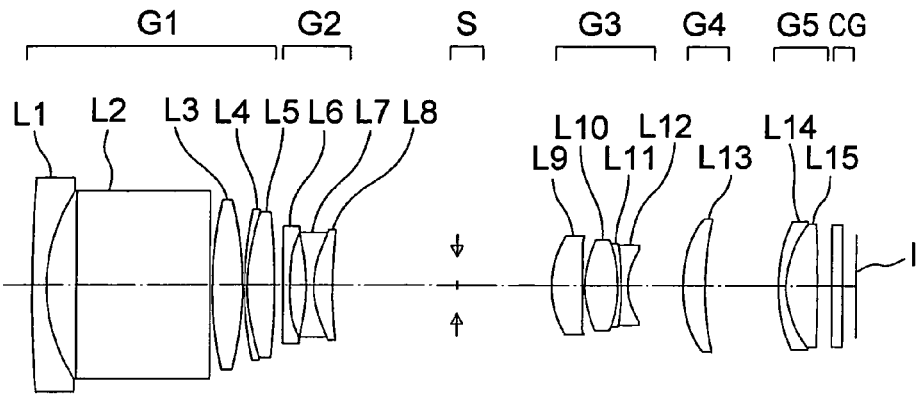
FIGS. 45A, 45B, and 45C are cross sectional views taken along the optical axis showing the optical configuration of a zoom lens according to embodiment 23 of the present invention in the state in which the zoom lens is focused on an object point at infinity, respectively at the wide angle end, at an intermediate focal length, and at the telephoto end.
Figure 45B:
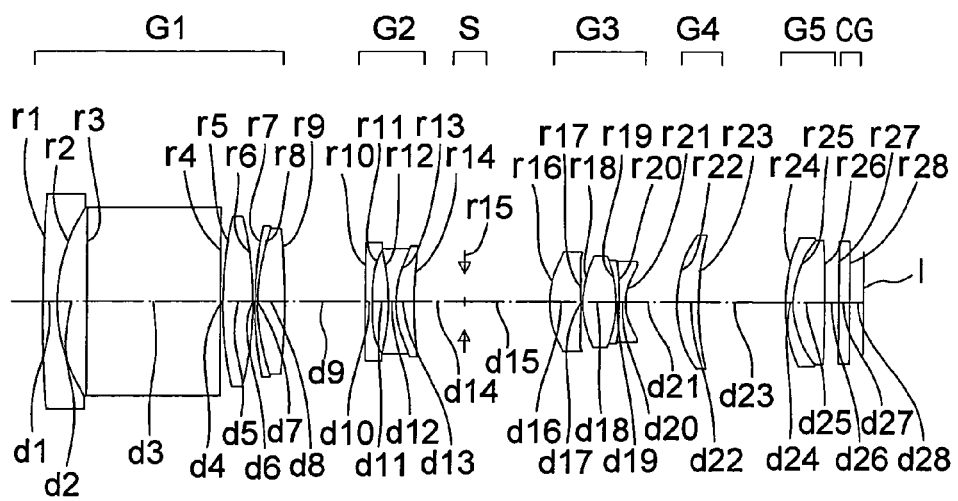
Figure 45C:
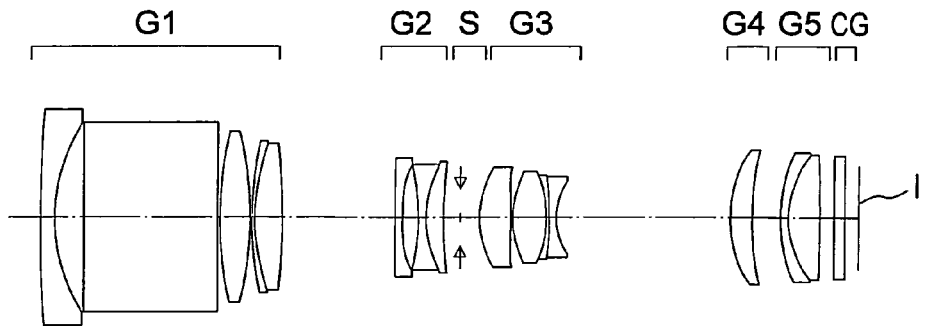

Next a zoom lens according to embodiment 23 of the present invention will be described. FIGS. 45A, 45B, and 45C are cross sectional views taken along the optical axis showing the optical configuration of the zoom lens according to embodiment 23 of the present invention in the state in which the zoom lens is focused on an object point at infinity, where FIG. 45A is a cross sectional view of the zoom lens at the wide angle end, FIG. 45B is a cross sectional view of the zoom lens in an intermediate focal length state, and FIG. 45C is a cross sectional view of the zoom lens at the telephoto end.

FIGS. 46A, 46B, and 46C are diagrams showing spherical aberration, astigmatism, distortion, and chromatic aberration of magnification of the zoom lens according to embodiment 23 in the state in which the zoom lens is focused on an object point at infinity, where FIG. 46A is for the wide angle end, FIG. 46B is for the intermediate focal length state, and FIG. 46C is for the telephoto end.

As shown in FIGS. 45A, 45B, and 45C, the zoom lens according to embodiment 23 includes a first lens group G1 having a positive refracting power, a second lens group G2 having a negative refracting power, an aperture stop S, a third lens group G3 having a positive refracting power, a fourth lens group G4 having a positive refracting power, and a fifth lens group G5 having a negative refracting power, which are arranged in order from the object side.

The first lens group G1 is composed of a negative meniscus lens L1 having a convex surface directed toward the object side, a prism L2 whose object side surface and image side surface are both planar, a biconvex positive lens L3, and a cemented lens (i.e. lens component C1p) made up of a negative meniscus lens L4 having a convex surface directed toward the object side and a biconvex positive lens L5, and has a positive refracting power as a whole.

In this embodiment, what is referred to as "$D_{11}$" is the distance from the vertex of the image side surface of lens L1 to the vertex of the object side surface of lens L3. What is referred to as "$SD_1$" is the distance from the vertex of the object side surface of lens L1 to the vertex of the image side surface of lens L5. In this connection, the distance in the prism L2 is represented by the equivalent air distance.

The second lens group G2 is composed of a biconcave negative lens L6, and a cemented lens made up of a biconcave negative lens L7 and a positive meniscus lens L8 having a convex surface directed toward the object side, and has a negative refracting power as a whole.

The third lens group G3 is composed of a biconvex positive lens L9, and a cemented lens made up of a biconvex positive lens L10, a negative meniscus lens L11 having a convex surface directed toward the image side, and a biconcave negative lens L12, and has a positive refracting power as a whole.

The fourth lens group G4 is composed of a positive meniscus lens L13 having a convex surface directed toward the object side and has a positive refracting power.

The fifth lens group G5 is composed of a cemented lens made up of a negative meniscus lens L14 having a convex surface directed toward the image side and a biconvex positive lens L15, and has a negative refracting power as a whole.

During zooming from the wide angle end to the telephoto end, the first lens group G1 is fixed, the second lens group G2 moves toward the image side, the third lens group G3 is kept nearly stationary during zooming from the wide angle end to an intermediate focal length position and moves toward the object side during zooming from the intermediate focal length position to the telephoto end, the fourth lens group G4 is kept nearly stationary during zooming from the wide angle end to the intermediate focal length position and moves toward the image side during zooming from the intermediate focal length position to the telephoto end, and the fifth lens group G5 is fixed. The position of the aperture stop S is fixed. The light quantity is controlled by varying the aperture size.

There are seven aspheric surfaces in total, which include the object side surface of the negative meniscus lens L4 having a convex surface directed toward the object side in the first lens group G1, both surfaces of the biconvex positive lens L5 in the first lens group G1, the image side surface of the object side biconcave negative lens L6 in the second lens group G2, both surfaces of the object side biconvex positive lens L9 in the third lens group G3, the object side surface of the positive meniscus lens L13 having a convex surface directed toward the object side in the fourth lens group G4.

Figure 47A:
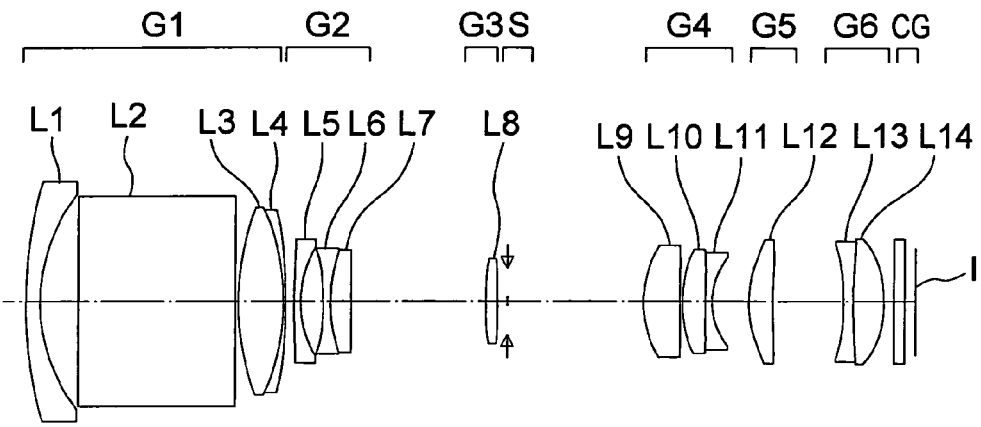
FIGS. 47A, 47B, and 47C are cross sectional views taken along the optical axis showing the optical configuration of a zoom lens according to embodiment 24 of the present invention in the state in which the zoom lens is focused on an object point at infinity, respectively at the wide angle end, at an intermediate focal length, and at the telephoto end.
Figure 47B:
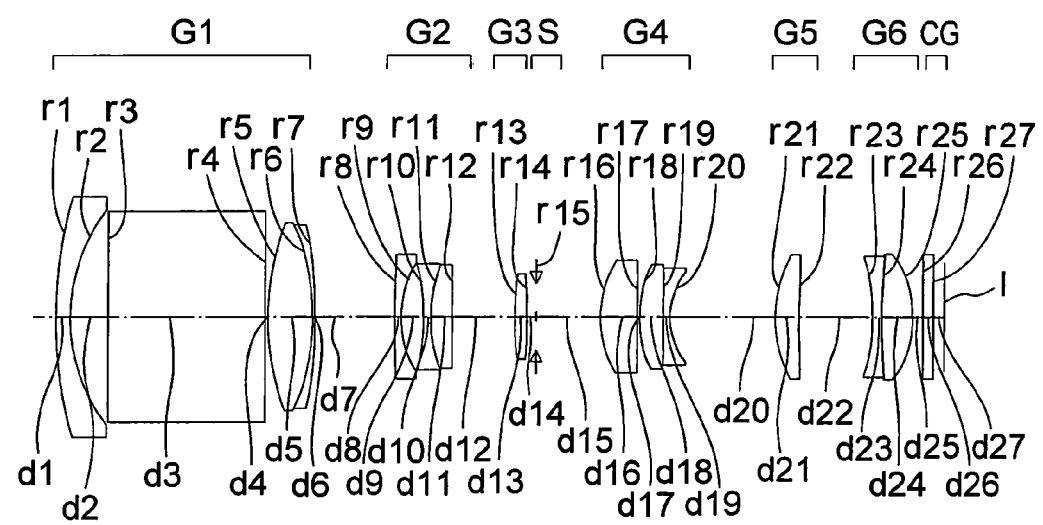
Figure 47C:
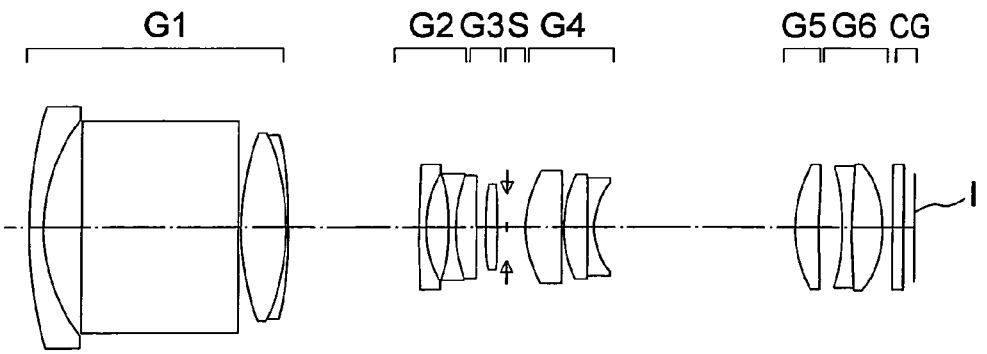

Next a zoom lens according to embodiment 24 of the present invention will be described. FIGS. 47A, 47B, and 47C are cross sectional views taken along the optical axis showing the optical configuration of the zoom lens according to embodiment 24 of the present invention in the state in which the zoom lens is focused on an object point at infinity, where FIG. 47A is a cross sectional view of the zoom lens at the wide angle end, FIG. 47B is a cross sectional view of the zoom lens in an intermediate focal length state, and FIG. 47C is a cross sectional view of the zoom lens at the telephoto end.

Figure 48A:
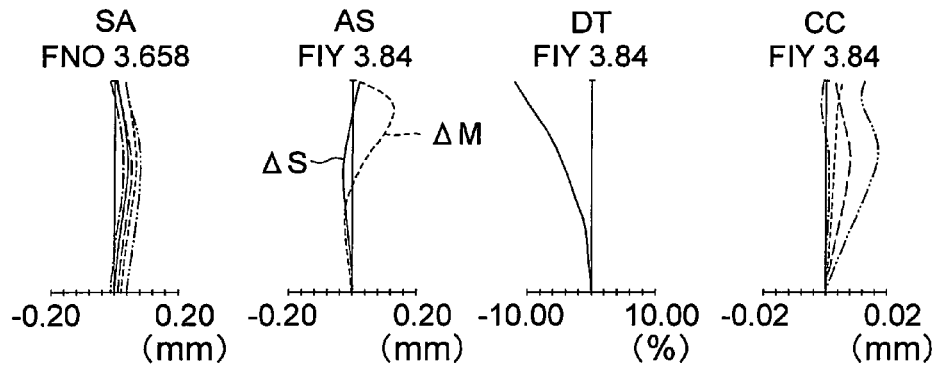
FIGS. 48A, 48B, and 48C are diagrams showing spherical aberration, astigmatism, distortion, and chromatic aberration of magnification of the zoom lens according to embodiment 24 in the state in which the zoom lens is focused on an object point at infinity, where
Figure 48B:
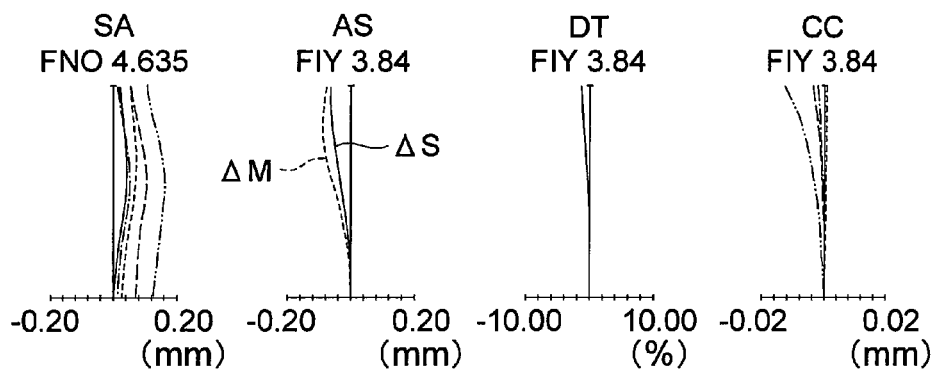
Figure 48C:
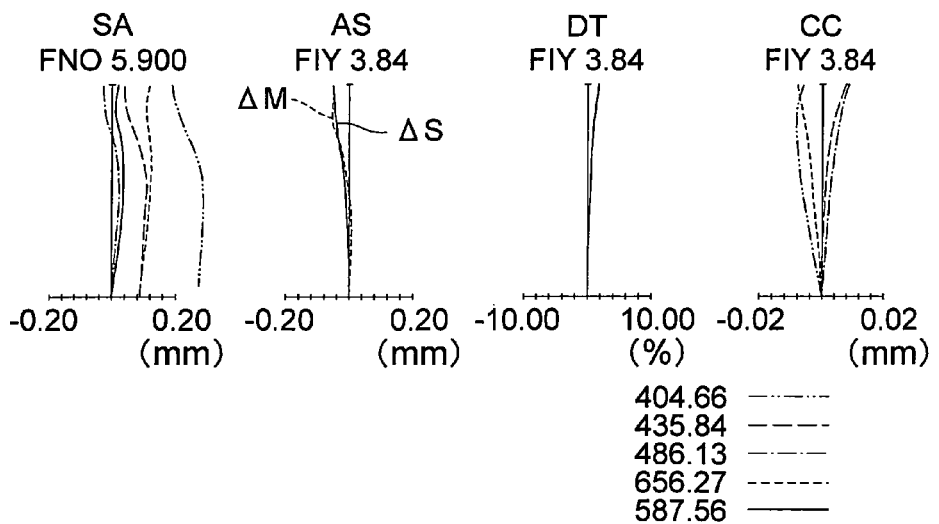

FIGS. 48A, 48B, and 48C are diagrams showing spherical aberration, astigmatism, distortion, and chromatic aberration of magnification of the zoom lens according to embodiment 24 in the state in which the zoom lens is focused on an object point at infinity, where FIG. 48A is for the wide angle end, FIG. 48B is for the intermediate focal length state, and FIG. 48C is for the telephoto end.

As shown in FIGS. 47A, 47B, and 47C, the zoom lens according to embodiment 24 includes a first lens group G1 having a positive refracting power, a second lens group G2 having a negative refracting power, an aperture stop S, a third lens group G3 having a positive refracting power, a fourth lens group G4 having a positive refracting power, and a fifth lens group G5 having a positive refracting power, and the sixth lens group G6 having a negative refracting power which are arranged in order from the object side.

The first lens group G1 is composed of a negative meniscus lens L1 having a convex surface directed toward the object side, a prism L2 whose object side surface and image side surface are both planar, and a cemented lens (i.e. lens component C1p) made up of a biconvex positive lens L3 and a negative meniscus lens L4 having a convex surface directed toward the image side, and has a positive refracting power as a whole.

In this embodiment, what is referred to as "$D_{11}$" is the distance from the vertex of the image side surface of lens L1 to the vertex of the object side surface of lens L3. What is referred to as "$SD_1$" is the distance from the vertex of the object side surface of lens L1 to the vertex of the image side surface of lens L4. In this connection, the distance in the prism L2 is represented by the equivalent air distance.

The second lens group G2 is composed of a negative meniscus lens L5 having a convex surface directed toward the object side, and a cemented lens made up of a biconcave negative lens L6 and a biconvex positive lens L7, and has a negative refracting power as a whole.

The third lens group G3 is composed of a biconvex positive lens L8 and has a positive refracting power.

The fourth lens group G4 is composed of a biconvex positive lens L9, and a cemented lens made up of a biconvex positive lens L10 and a biconcave negative lens L11, and has a positive refracting power as a whole.

The fifth lens group G5 is composed of a positive meniscus lens L12 having a convex surface directed toward the image side and has a positive refracting power.

The sixth lens group G6 is composed of a cemented lens made up of a biconcave negative lens L13 and a biconvex positive lens L14 and has a negative refracting power as a whole.

During zooming from the wide angle end to the telephoto end, the first lens group G1 is fixed, the second lens group G2 moves toward the image side, the third lens group G3 is fixed, the fourth lens group G4 moves toward the object side, the fifth lens group G5 is kept nearly stationary during zooming from the wide angle end to an intermediate focal length position and moves toward the image side during zooming from the intermediate focal length position to the telephoto end, and the sixth lens group G6 is fixed. The position of the aperture stop S is fixed. The light quantity is controlled by varying the aperture size.

There are eight aspheric surfaces in total, which include both surfaces of the biconvex positive lens L3 in the first lens group G1, the image side surface of a negative meniscus lens L4 having a convex surface directed toward the image side in the first lens group G1, the image side surface of a negative meniscus lens L5 having a convex surface directed toward the object side in the second lens group G2, both surfaces of the biconvex positive lens L9 in the fourth lens group G4, the object side surface of the positive meniscus lens L12 having a convex surface directed toward the object side in the fifth lens group G5, and the object side surface of the biconcave negative lens L13 in the sixth lens group G6.

Figure 49A:
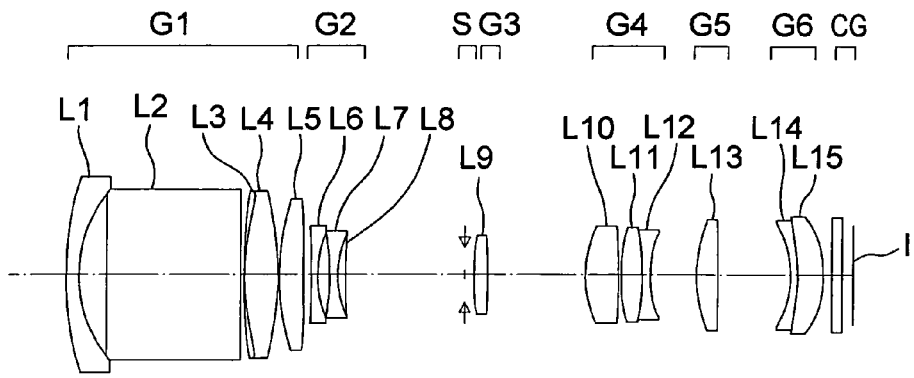
FIGS. 49A, 49B, and 49C are cross sectional views taken along the optical axis showing the optical configuration of a zoom lens according to embodiment 25 of the present invention in the state in which the zoom lens is focused on an object point at infinity, respectively at the wide angle end, at an intermediate focal length, and at the telephoto end.
Figure 49B:
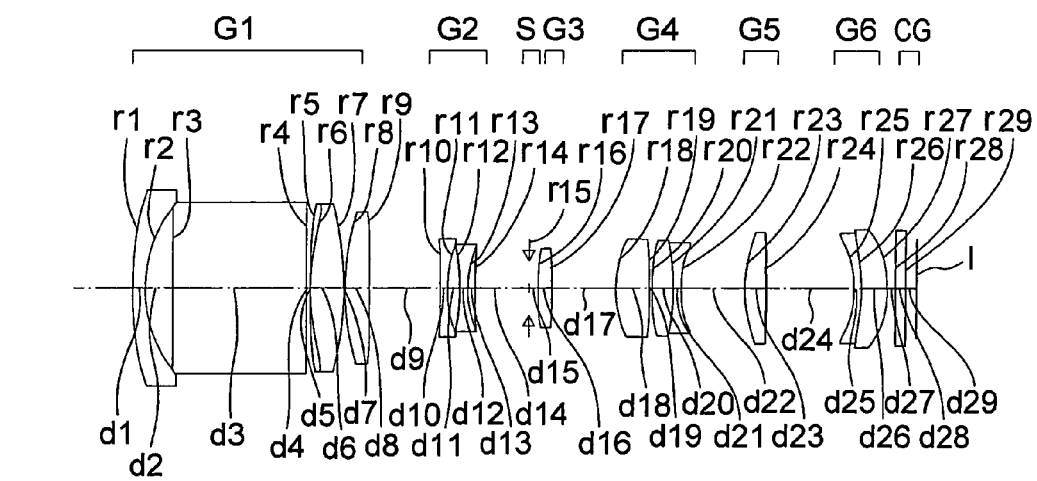
Figure 49C:
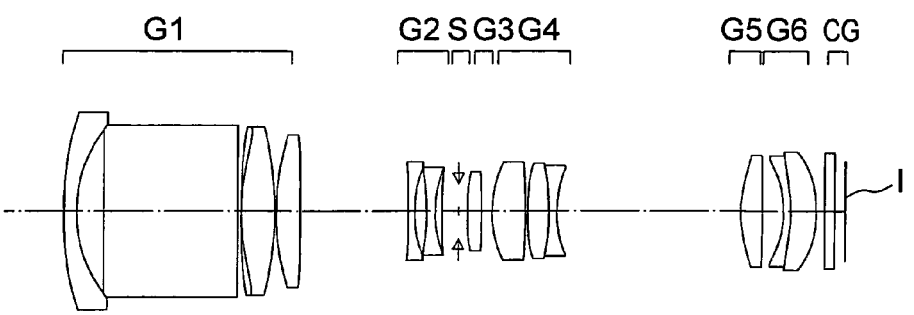

Next a zoom lens according to embodiment 25 of the present invention will be described. FIGS. 49A, 49B, and 49C are cross sectional views taken along the optical axis showing the optical configuration of the zoom lens according to embodiment 25 of the present invention in the state in which the zoom lens is focused on an object point at infinity, where FIG. 49A is a cross sectional view of the zoom lens at the wide angle end, FIG. 49B is a cross sectional view of the zoom lens in an intermediate focal length state, and FIG. 49C is a cross sectional view of the zoom lens at the telephoto end.

Figure 50A:
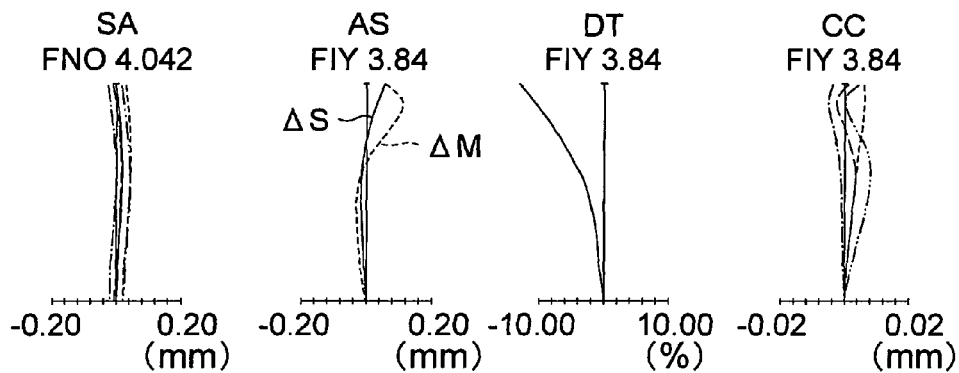
FIGS. 50A, 50B, and 50C are diagrams showing spherical aberration, astigmatism, distortion, and chromatic aberration of magnification of the zoom lens according to embodiment 25 in the state in which the zoom lens is focused on an object point at infinity, where
Figure 50B:
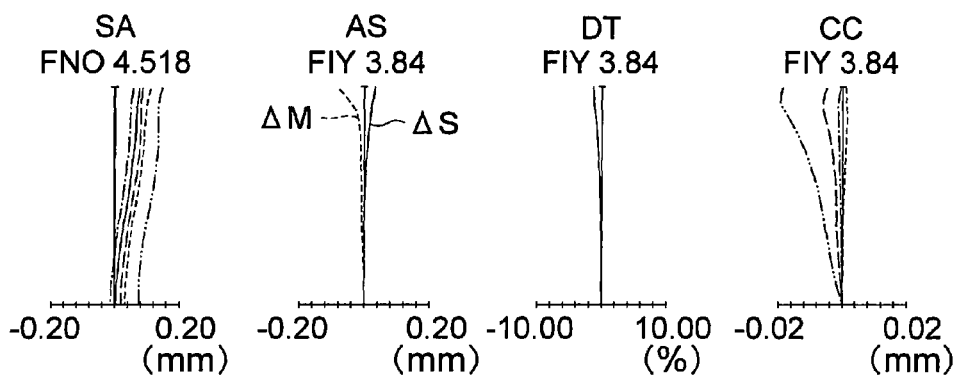
Figure 50C:
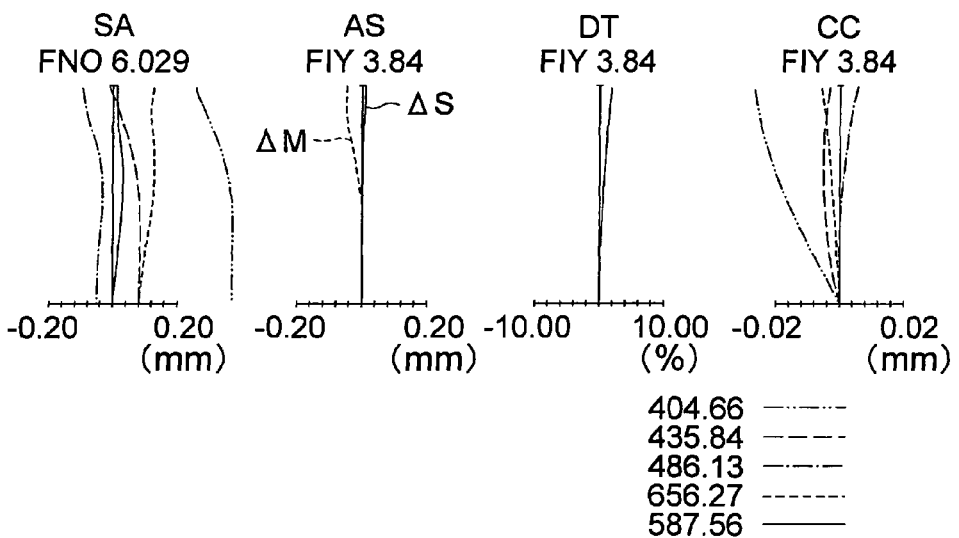

FIGS. 50A, 50B, and 50C are diagrams showing spherical aberration, astigmatism, distortion, and chromatic aberration of magnification of the zoom lens according to embodiment 25 in the state in which the zoom lens is focused on an object point at infinity, where FIG. 50A is for the wide angle end, FIG. 50B is for the intermediate focal length state, and FIG. 50C is for the telephoto end.

As shown in FIGS. 49A, 49B, and 49C, the zoom lens according to embodiment 25 includes a first lens group G1 having a positive refracting power, a second lens group G2 having a negative refracting power, an aperture stop S, a third lens group G3 having a positive refracting power, a fourth lens group G4 having a positive refracting power, a fifth lens group G5 having a positive refracting power, and a sixth lens group G6 having a negative refracting power, which are arranged in order from the object side.

The first lens group G1 is composed of a negative meniscus lens L1 having a convex surface directed toward the object side, a prism L2 whose object side surface and image side surface are both planar, a cemented lens (i.e. lens component C1p) made up of a negative meniscus lens L3 having a convex surface directed toward the object side and a biconvex positive lens L4, and a biconvex positive lens L5, and has a positive refracting power as a whole.

In this embodiment, what is referred to as "$D_{11}$" is the distance from the vertex of the image side surface of lens L1 to the vertex of the object side surface of lens L3. What is referred to as "$SD_1$" is the distance from the vertex of the object side surface of lens L1 to the vertex of the image side surface of lens L5. In this connection, the distance in the prism L2 is represented by the equivalent air distance.

The second lens group G2 is composed of a biconcave negative lens L6, and a cemented lens made up of a biconcave negative lens L7 and a positive meniscus lens L8 having a convex surface directed toward the object side, and has a negative refracting power as a whole.

The third lens group G3 is composed of a biconvex positive lens L9 and has a positive refracting power.

The fourth lens group G4 is composed of a biconvex positive lens L10, and a cemented lens made up of a biconvex positive lens L11 and a biconcave negative lens L12, and has a positive refracting power as a whole.

The fifth lens group G5 is composed of a biconvex positive lens L13 and has a positive refracting power.

The sixth lens group G6 is composed of a cemented lens made up of a negative meniscus lens L14 having a convex surface directed toward the image side and a positive meniscus lens L15 having a convex surface directed toward the image side, and has a negative refracting power as a whole.

During zooming from the wide angle end to the telephoto end, the first lens group G1 is fixed, the second lens group G2 moves toward the image side, the third lens group G3 is fixed, the fourth lens group G4 moves toward the object side, the fifth lens group G5 is kept nearly stationary during zooming from the wide angle end to an intermediate focal length position and moves toward the image side during zooming from the intermediate focal length position to the telephoto end, and the sixth lens group G6 is fixed. The position of the aperture stop S is fixed. The light quantity is controlled by varying the aperture size.

There are eight aspheric surfaces in total, which include the object side surface of the negative meniscus lens L3 having a convex surface directed toward the object side in the first lens group G1, both surfaces of the biconvex positive lens L4 in the first lens group G1, both surfaces of the biconcave negative lens L7 in the second lend group G2, the image side surface of the positive meniscus lens L8 having a convex surface directed toward the object side in the second lens group G2, the object side surface of the object side biconvex positive lens L10 in the fourth lens group G4, and the object side surface of the biconvex positive lens L13 in the fifth lens group G5.

NUMERICAL EXAMPLE 1

Unit mm

Surface data

| Surface number | r | d | nd | vd |
|---|---|---|---|---|
| Object plane | ∞ | ∞ | | |
| 1 | ∞ | 1.0000 | 2.14352 | 17.77 |
| 2 | 17.7707 | 1.7000 | | |
| 3 | ∞ | 9.8000 | 2.14352 | 17.77 |
| 4 | ∞ | 0.2000 | | |
| 5* | 36.7977 | 1.8000 | 1.74320 | 49.34 |
| 6 | −26.1139 | 0.1500 | | |
| 7 | 18.0524 | 1.8000 | 1.80610 | 40.92 |
| 8 | −225.8693 | Variable | | |
| 9 | −26.0381 | 0.5000 | 1.83481 | 42.71 |
| 10* | 12.3297 | 1.1000 | | |
| 11 | −15.8199 | 0.5000 | 1.80610 | 40.92 |
| 12 | 9.1954 | 1.5000 | 1.94595 | 17.98 |
| 13 | 175.4980 | Variable | | |

-continued

Surface data

| Surface number | r | d | nd | vd |
|---|---|---|---|---|
| 14(STOP) | ∞ | Variable | | |
| 15* | 6.2983 | 2.5000 | 1.83481 | 42.71 |
| 16* | −20.9769 | 0.1500 | | |
| 17 | 11.8057 | 1.6000 | 1.69680 | 55.53 |
| 18 | −25.4996 | 0.5000 | 2.00069 | 25.46 |
| 19 | 4.4488 | Variable | | |
| 20* | 13.7404 | 1.6000 | 1.52540 | 56.25 |
| 21 | −285.2486 | Variable | | |
| 22* | −36.6327 | 0.6000 | 2.14352 | 17.77 |
| 23 | 42.8739 | 2.0000 | 1.51633 | 64.14 |
| 24 | −9.1931 | 0.6000 | | |
| 25 | ∞ | 0.8000 | 1.51633 | 64.14 |
| 26 | ∞ | 0.9996 | | |
| Image plane | ∞ | | | |

Aspheric Surface Data
5th Surface
K=−0.3283,
A2=0.0000E+00,A4=−4.4000E−06,A6=6.0678E−08,A8=−8.9615E−10,
A10=0.0000E+00
10th Surface
K=−0.8898,
A2=0.0000E+00,A4=−9.6527E−06,A6=5.4330E−06,A8=−8.3037E−08,
A10=0.0000E+00
15th Surface
K=−0.5934,
A2=0.0000E+00,A4=−5.4855E−05,A6=4.0626E−06, A8=3.1128E−07,
A10=0.0000E+00
16th Surface
K=−0.7623,
A2=0.0000E+00,A4=4.8992E−04,A6=−2.6005E−06, A8=4.3095E−07,
A10=0.0000E+00
20th Surface
K=−0.7181,
A2=0.0000E+00,A4=2.4448E−04,A6=−9.1778E−06,A8=−3.2810E−07,
A10=0.0000E+00
22nd Surface
K=3.5846,
A2=0.0000E+00,A4=−3.4288E−04,A6=1.1625E−05, A8=1.7829E−07,
A10=0.0000E+00

Numenical data
Zoom ratio 4.95

| | Wideangle | Intermediate | Telephoto |
|---|---|---|---|
| Focal length | 6.04963 | 13.53497 | 29.95969 |
| F number | 3.5859 | 3.8812 | 5.9000 |
| Image angle | 38.6° | 15.7° | 7.2° |
| Image height | 3.84 | 3.84 | 3.84 |
| Total lens length | 57.0027 | 57.0030 | 57.0028 |
| BF | 0.99957 | 0.99957 | 0.99957 |
| d8 | 0.60022 | 5.80542 | 8.07375 |
| d13 | 8.86820 | 3.66202 | 1.39477 |
| d14 | 6.80942 | 5.86043 | 1.19818 |
| d19 | 4.27905 | 4.49257 | 12.93804 |
| d21 | 5.04621 | 5.78484 | 1.99849 |

| Zoom lens group data | | |
|---|---|---|
| Group | Initial surface | focal length |
| 1 | 1 | 13.26001 |
| 2 | 9 | −6.82368 |
| 3 | 15 | 12.08776 |
| 4 | 20 | 24.99641 |
| 5 | 22 | 70.97744 |

| Table of index of glass mateial | List of index per wavelength of medium used in the persent embodiment | | | | |
|---|---|---|---|---|---|
| GLA | 587.56 | 656.27 | 486.13 | 435.84 | 404.66 |
| L7 | 1.945950 | 1.931230 | 1.983830 | 2.018254 | 2.051063 |
| L1, L2, L12 | 2.143520 | 2.125601 | 2.189954 | 2.232324 | 2.273190 |
| L13, L14 | 1.516330 | 1.513855 | 1.521905 | 1.526213 | 1.529768 |
| L4, L6 | 1.806098 | 1.800248 | 1.819945 | 1.831173 | 1.840781 |
| L5, L8 | 1.834807 | 1.828975 | 1.848520 | 1.859547 | 1.868911 |
| L9 | 1.696797 | 1.692974 | 1.705522 | 1.712339 | 1.718005 |
| L3 | 1.743198 | 1.738653 | 1.753716 | 1.762046 | 1.769040 |
| L10 | 2.000690 | 1.989410 | 2.028720 | 2.052834 | 2.074603 |
| L11 | 1.525400 | 1.522460 | 1.531800 | 1.537220 | 1.543549 |

NUMERICAL EXAMPLE 2

Unit mm

| Surface data | | | | |
|---|---|---|---|---|
| Surface Uumber | r | d | nd | vd |
| Object plane | ∞ | ∞ | | |
| 1* | −22.3238 | 9.8000 | 2.14352 | 17.77 |
| 2 | ∞ | 0.2000 | | |
| 3 | 34.3707 | 1.8000 | 1.74320 | 49.34 |
| 4 | −27.6600 | 0.1500 | | |
| 5* | 16.2455 | 1.8000 | 1.80610 | 40.92 |
| 6 | 443.7227 | Variable | | |
| 7 | −36.4769 | 0.5000 | 1.83481 | 42.71 |
| 8* | 8.8033 | 1.1000 | | |
| 9 | −13.3508 | 0.5000 | 1.74320 | 49.34 |
| 10 | 9.6375 | 1.5000 | 1.94595 | 17.98 |
| 11 | 218.5437 | Variable | | |
| 12(STOP) | ∞ | Variable | | |
| 13* | 5.4139 | 2.5000 | 1.83481 | 42.71 |
| 14* | −13.4440 | 0.1500 | | |
| 15 | 13.3578 | 1.6000 | 1.69680 | 55.53 |
| 16 | −9.4078 | 0.5000 | 2.00069 | 25.46 |
| 17 | 3.7083 | Variable | | |
| 18* | 20.2513 | 1.6000 | 1.52540 | 56.25 |
| 19 | −35.3212 | Variable | | |
| 20 | 55.8049 | 0.6000 | 2.00069 | 25.46 |
| 21 | 14.7895 | 2.0000 | 1.51633 | 64.14 |
| 22 | −10.2755 | 0.6000 | | |
| 23 | ∞ | 0.8000 | 1.51633 | 64.14 |
| 24 | ∞ | 0.5012 | | |
| Image plane | ∞ | | | |

Aspherical Surface Data
1st Surface
K=−0.0410,
A2=0.0000E+00,A4=9.1093E−05,A6=−8.5914E−07, A8=4.4127E−09,
A10=0.0000E+00
5th Surface
K=−0.0773,
A2=0.0000E+00,A4=−9.7118E−05,A6=2.4199E−07,A8=−4.5197E−09,
A10=0.0000E+00
8th Surface
K=−0.8913,
A2=0.0000E+00,A4=−2.9868E−04,A6=4.4157E−05,A8=−1.4936E−06,
A10=0.0000E+00
13th Surface
K=−0.5894,
A2=0.0000E+00,A4=−1.9802E−04,A6=1.2496E−05,A8=−1.4038E−06,
A10=0.0000E+00
14th Surface
K=−0.7744,
A2=0.0000E+00,A4=8.1519E−04,A6=−1.5789E−05,A8=−8.8242E−07,
A10=0.0000E+00
18th Surface
K=−1.0392,
A2=0.0000E+00,A4=−1.5744E−04,A6=2.3284E−05,A8=−9.2861E−07,
A10=0.0000E+00

| Numenical data Zoom ratio 4.95 | | | |
|---|---|---|---|
| | Wideangle | Intermediate | Telephoto |
| Focal length | 6.05208 | 13.55155 | 29.94187 |
| F number | 3.6157 | 3.7189 | 5.9893 |
| Image angle | 37.7° | 14.7° | 7.2° |
| Image height | 3.84 | 3.84 | 3.84 |
| Total lens length | 50.1047 | 50.1695 | 50.1028 |
| BF | 0.50125 | 0.50125 | 0.50125 |
| d6 | 0.75667 | 5.82465 | 7.54587 |
| d11 | 8.07180 | 3.11695 | 1.28440 |
| d12 | 6.03497 | 5.73281 | 1.16377 |
| d17 | 2.84910 | 2.63714 | 10.40600 |
| d19 | 4.19091 | 4.62924 | 1.50508 |

| Zoom lens group data | | |
|---|---|---|
| Group | Initial surface | focal length |
| 1 | 1 | 14.17526 |
| 2 | 7 | −6.16416 |
| 3 | 13 | 10.22310 |
| 4 | 18 | 24.74377 |
| 5 | 20 | 27.54317 |

| Table of index of glass mateial | List of index per wavelength of medium used in the persent embodiment | | | |
|---|---|---|---|---|
| GLA | 587.56 | 656.27 | 486.13 | 435.84 | 404.66 |
| L6 | 1.945950 | 1.931230 | 1.983830 | 2.018254 | 2.051063 |
| L1 | 2.143520 | 2.125601 | 2.189954 | 2.232324 | 2.273190 |
| L12, L13 | 1.516330 | 1.513855 | 1.521905 | 1.526213 | 1.529768 |
| L3 | 1.806098 | 1.800248 | 1.819945 | 1.831173 | 1.840781 |
| L4, L7 | 1.834807 | 1.828975 | 1.848520 | 1.859547 | 1.868911 |
| L8 | 1.696797 | 1.692974 | 1.705522 | 1.712339 | 1.718005 |
| L2, L5 | 1.743198 | 1.738653 | 1.753716 | 1.762046 | 1.769040 |
| L9, L11 | 2.000690 | 1.989410 | 2.028720 | 2.052834 | 2.074603 |
| L10 | 1.525400 | 1.522460 | 1.531800 | 1.537220 | 1.543549 |

NUMERICAL EXAMPLE 3

Unit mm

Surface data

| Surface number | r | d | nd | vd |
|---|---|---|---|---|
| Object plane | ∞ | ∞ | | |
| 1 | 26.4822 | 1.0000 | 1.94595 | 17.98 |
| 2 | 10.7172 | 3.3000 | | |
| 3 | ∞ | 11.5000 | 1.77250 | 49.60 |
| 4 | −41.1907 | 0.2000 | | |
| 5* | 21.9544 | 2.8000 | 1.74320 | 49.34 |
| 6 | −33.1000 | Variable | | |
| 7 | 65.5477 | 0.5000 | 1.83481 | 42.71 |
| 8* | 11.1363 | 1.5000 | | |
| 9 | −13.5808 | 0.5000 | 1.80610 | 40.92 |
| 10 | 14.9640 | 1.7000 | 1.94595 | 17.98 |
| 11 | −189.2732 | Variable | | |
| 12(STOP) | ∞ | Variable | | |
| 13* | 7.7357 | 2.5000 | 1.83481 | 42.71 |
| 14* | −31.0488 | 0.1500 | | |
| 15 | 11.3642 | 1.3625 | 1.69680 | 55.53 |
| 16 | −469.2304 | 0.5000 | 2.00069 | 25.46 |
| 17 | 5.9089 | Variable | | |
| 18* | 11.3770 | 1.6000 | 1.52540 | 56.25 |
| 19 | 35.1726 | Variable | | |
| 20* | −16.1163 | 0.6000 | 2.14352 | 17.77 |
| 21 | 62.3403 | 2.0000 | 1.51633 | 64.14 |
| 22 | −8.4687 | 1.0000 | | |
| 23 | ∞ | 0.8675 | 1.51633 | 64.14 |
| 24 | ∞ | 1.2996 | | |
| Image plane | ∞ | | | |

Aspherical Surface Data
5th Surface
K=0.0593,
A2=0.0000E+00,A4=8.2003E−06,A6=1.6810E−08,A8=−3.7560E−10,
A10=0.0000E+00
8th Surface
K=−0.9593,
A2=0.0000E+00,A4=1.8122E−04,A6=−5.2384E−06, A8=5.9665E−07,
A10=0.0000E+00
13th Surface
K=−0.6152,
A2=0.0000E+00,A4=5.6835E−05,A6=−5.1648E−06, A8=3.7552E−07,
A10=0.0000E+00
14th Surface
K=−0.1858,
A2=0.0000E+00,A4=3.0748E−04,A6=−7.5365E−06, A8=4.0155E−07,
A10=0.0000E+00
18th Surface
K=0.0181,
A2=0.0000E+00,A4=−9.9657E−05,A6=4.9173E−06,A8=−1.8905E−06,
A10=0.0000E+00
20th Surface
K=0.2476,
A2=0.0000E+00,A4=−2.7484E−04,A6=2.0109E−05, A8=5.3740E−07,
A10=0.0000E+00

Numenical data
Zoom ratio 4.95

| | Wideangle | Intermediate | Telephoto |
|---|---|---|---|
| Focal length | 6.05491 | 13.53410 | 29.95934 |
| F number | 3.0554 | 4.2313 | 5.9000 |
| Image angle | 36.6° | 16.0° | 7.2 |
| Image height | 3.84 | 3.84 | 3.84 |
| Total lens length | 64.0008 | 63.9913 | 64.0009 |
| BF | 1.29963 | 1.29963 | 1.29963 |
| d6 | 0.59584 | 5.29416 | 9.23500 |
| d11 | 10.03824 | 5.33157 | 1.39909 |
| d12 | 9.95642 | 5.35436 | 1.19839 |
| d17 | 3.15969 | 7.87787 | 15.28821 |
| d19 | 5.37101 | 5.25294 | 2.00070 |

Zoom lens group data

| Group | Initial surface | focal length |
|---|---|---|
| 1 | 1 | 16.81972 |
| 2 | 7 | −9.09120 |
| 3 | 13 | 13.73697 |
| 4 | 18 | 31.28252 |
| 5 | 20 | −79.97634 |

| Table of index of glass mateial | List of index per wavelength of medium used in the persent embodiment | | | | |
|---|---|---|---|---|---|
| GLA | 587.56 | 656.27 | 486.13 | 435.84 | 404.66 |
| L1, L6 | 1.945950 | 1.931230 | 1.983830 | 2.018254 | 2.051063 |
| L11 | 2.143520 | 2.125601 | 2.189954 | 2.232324 | 2.273190 |
| L12, 13 | 1.516330 | 1.513855 | 1.521905 | 1.526213 | 1.529768 |
| L5 | 1.806098 | 1.800248 | 1.819945 | 1.831173 | 1.840781 |
| L4, L7 | 1.834807 | 1.828975 | 1.848520 | 1.859547 | 1.868911 |
| L2 | 1.772499 | 1.767798 | 1.783374 | 1.791971 | 1.799174 |
| L8 | 1.696797 | 1.692974 | 1.705522 | 1.712339 | 1.718005 |
| L3 | 1.743198 | 1.738653 | 1.753716 | 1.762046 | 1.769040 |
| L9 | 2.000690 | 1.989410 | 2.028720 | 2.052834 | 2.074603 |
| L10 | 1.525400 | 1.522460 | 1.531800 | 1.537220 | 1.543549 |

NUMERICAL EXAMPLE 4

Unit mm

| Surface data | | | | |
|---|---|---|---|---|
| Surface number | r | d | nd | vd |
| Object plane | ∞ | ∞ | | |
| 1 | 33.4710 | 1.0000 | 2.14352 | 17.77 |
| 2 | 12.9962 | 2.8000 | | |
| 3 | ∞ | 10.8000 | 1.80610 | 40.92 |
| 4 | ∞ | 0.2000 | | |
| 5* | 19.2835 | 2.8000 | 1.88300 | 40.76 |
| 6* | −16.8921 | 0.1000 | 1.63494 | 23.22 |
| 7* | −35.4351 | Variable | | |
| 8 | 75.9305 | 0.5000 | 1.83481 | 42.71 |
| 9* | 10.5861 | 1.5000 | | |
| 10 | −13.7278 | 0.5000 | 1.80610 | 40.92 |
| 11 | 13.0118 | 1.4000 | 1.94595 | 17.98 |
| 12 | −115.5205 | Variable | | |
| 13(STOP) | ∞ | Variable | | |
| 14* | 7.9132 | 2.5000 | 1.83481 | 42.71 |
| 15* | −30.7581 | 0.1500 | | |
| 16 | 9.7936 | 1.6000 | 1.69680 | 55.53 |
| 17 | −102.6373 | 0.5000 | 2.00069 | 25.46 |
| 18 | 5.4145 | Variable | | |
| 19* | 10.1411 | 1.6000 | 1.52540 | 56.25 |
| 20 | 59.8729 | Variable | | |
| 21* | −14.7089 | 0.600 | 2.14352 | 17.77 |
| 22 | 33.2642 | 2.2000 | 1.48749 | 70.23 |
| 23 | −7.5004 | 0.6000 | | |
| 24 | ∞ | 0.8000 | 1.51633 | 64.14 |
| 25 | ∞ | 0.8000 | | |
| Image plane | ∞ | | | |

Aspherical Surface Data
5th Surface
$K=0.0655$,
$A2=0.0000E+00, A4=-1.8786E-05, A6=-5.1022E-08, A8=-2.0153E-08$,
$A10=0.0000E+00$
6th Surface
$K=-0.0017$,
$A2=0.0000E+00, A4=-3.1676E-05, A6=-9.6311E-07, A8=2.1464E-08$,
$A10=0.0000E+00$
7th Surface
$K=-0.0518$,
$A2=0.0000E+00, A4=4.6312E-05, A6=3.3508E-08, A8=-3.3276E-08$,
$A10=0.0000E+00$
9th Surface
$K=-0.9593$,
$A2=0.0000E+00, A4=1.3237E-04, A6=4.4415E-06, A8=2.0304E-07$,
$A10=0.0000E+00$
14th Surface
$K=-0.6103$,
$A2=0.0000E+00, A4=-9.4698E-05, A6=5.3709E-06, A8=2.2063E-08$,
$A10=0.0000E+00$
15th Surface
$K=-0.2133$,
$A2=0.0000E+00, A4=7.8028E-05, A6=8.2038E-06, A8=-7.1469E-08$,
$A10=0.0000E+00$
19th Surface
$K=0.0476$,
$A2=0.0000E+00, A4=-2.6880E-04, A6=1.9804E-05, A8=-7.9341E-07$,
$A10=0.0000E+00$
21st Surface
$K=0.2918$,
$A2=0.0000E+00, A4=2.5142E-04, A6=-3.6396E-05, A8=1.2752E-06$,
$A10=0.0000E+00$

| Numenical data Zoom ratio 4.95 | | | |
|---|---|---|---|
| | Wideangle | Intermediate | Telephoto |
| Focal length | 6.05039 | 13.53414 | 29.95972 |
| F number | 3.0564 | 4.1881 | 5.9000 |
| Image angle | 36.4° | 16.0° | 7.2° |
| Image height | 3.84 | 3.84 | 3.84 |
| Total lens length | 61.0003 | 61.0024 | 61.0002 |
| BF | 0.79999 | 0.79999 | 0.79999 |
| d7 | 0.59926 | 5.32689 | 9.12350 |
| d12 | 9.92449 | 5.19984 | 1.40021 |
| d13 | 9.36940 | 5.00235 | 1.19989 |
| d18 | 2.93279 | 7.34767 | 14.82686 |
| d20 | 5.22433 | 5.17489 | 1.49978 |

| Zoom lens group data | | |
|---|---|---|
| Group | Initial surface | focal length |
| 1 | 1 | 16.42092 |
| 2 | 8 | −9.09682 |
| 3 | 14 | 13.68623 |

-continued

Zoom lens group data

| Group | Initial surface | focal length |
|---|---|---|
| 4 | 19 | 22.98277 |
| 5 | 21 | -45.30237 |

| Table of index of glass mateial | List of index per wavelength of medium used in the persent embodiment | | | | |
|---|---|---|---|---|---|
| GLA | 587.56 | 656.27 | 486.13 | 435.84 | 404.66 |
| L4 | 1.634937 | 1.627308 | 1.654649 | 1.672358 | 1.688770 |
| L7 | 1.945950 | 1.931230 | 1.983830 | 2.018254 | 2.051060 |
| L1, L12 | 2.143520 | 2.125601 | 2.189954 | 2.232324 | 2.273184 |
| L14 | 1.516330 | 1.513855 | 1.521905 | 1.526213 | 1.529768 |
| L13 | 1.487490 | 1.485344 | 1.492285 | 1.495963 | 1.498983 |
| L2, L6 | 1.806098 | 1.800248 | 1.819945 | 1.831173 | 1.840781 |
| L5, L8 | 1.834807 | 1.828975 | 1.848520 | 1.859547 | 1.868911 |
| L3 | 1.882997 | 1.876560 | 1.898221 | 1.910495 | 1.920919 |
| L9 | 1.696797 | 1.692974 | 1.705522 | 1.712339 | 1.718005 |
| L10 | 2.000690 | 1.989410 | 2.028720 | 2.052834 | 2.074600 |
| L11 | 1.525400 | 1.522460 | 1.531800 | 1.537220 | 1.543548 |

NUMERICAL EXAMPLE 5

Unit mm

Surface data

| Surface no. number | r | d | nd | vd |
|---|---|---|---|---|
| Object plane | ∞ | ∞ | | |
| 1 | 48.8438 | 1.0000 | 2.14352 | 17.77 |
| 2* | 11.8544 | 2.8000 | | |
| 3 | -29.7268 | 9.8000 | 2.14352 | 17.77 |
| 4 | ∞ | 0.2000 | | |
| 5 | 17.3005 | 2.7000 | 1.75520 | 27.51 |
| 6 | -47.1388 | 0.1500 | | |
| 7* | 13.0396 | 3.0000 | 1.80610 | 40.92 |
| 8* | -36.7988 | 0.1000 | 1.67000 | 19.30 |
| 9* | 91.5078 | Variable | | |
| 10 | -78.7741 | 0.5000 | 1.83481 | 42.71 |
| 11* | 10.2672 | 1.1000 | | |
| 12 | -14.0949 | 0.5000 | 1.72916 | 54.68 |
| 13 | 8.2918 | 1.3000 | 1.94595 | 17.98 |
| 14 | 27.2540 | Variable | | |
| 15(STOP) | ∞ | Variable | | |
| 16* | 7.6801 | 3.9828 | 1.83481 | 42.71 |
| 17* | -64.2740 | 0.1500 | | |
| 18 | 8.2756 | 2.1000 | 1.69680 | 55.53 |
| 19 | -14.4365 | 0.5000 | 2.00069 | 25.46 |
| 20 | 5.9078 | Variable | | |
| 21* | 8.7416 | 1.5000 | 1.52540 | 56.25 |
| 22 | 24.6527 | Variable | | |
| 23 | 81.0820 | 0.6000 | 2.14352 | 17.77 |
| 24 | 10.8703 | 3.1000 | 1.48749 | 70.23 |
| 25* | -8.3023 | 0.6000 | | |
| 26 | ∞ | 0.8000 | 1.51633 | 64.14 |
| 27 | ∞ | 0.4999 | | |
| Image plane | ∞ | | | |

Aspherical Surface Data
2nd Surface
K=0.0498,
A2=0.0000E+00,A4=-1.3925E-04,A6=2.8042E-07,A8=-1.1379E-08,
A10=0.0000E+00
7th Surface
K=0.0272,
A2=0.0000E+00,A4=-5.4638E-05,A6=1.9698E-06,A8=-1.6771E-08,
A10=0.0000E+00
8th Surface
K=0.0936,
A2=0.0000E+00,A4=-1.1220E-04,A6=1.6578E-06,A8=8.9828E-08,
A10=0.0000E+00
9th Surface
K=0.5504,
A2=0.0000E+00,A4=1.1911E-04,A6=4.6910E-06,A8=-9.1582E-08,
A10=0.0000E+00
11th Surface
K=-0.8331,
A2=0.0000E+00,A4=2.2507E-04,A6=-7.1701E-07,A8=1.4359E-06,
A10=0.0000E+00
16th Surface
K=-0.5705,
A2=0.0000E+00,A4=2.6285E-04,A6=1.6592E-05,A8=-1.1215E-07,
A10=0.0000E+00
17th Surface
K=-0.7197,
A2=0.0000E+00,A4=6.4343E-04,A6=2.1920E-05,A8=8.2869E-07,
A10=0.0000E+00
21th Surface
K=-0.7247,
A2=0.0000E+00,A4=-3.4170E-04,A6=1.6958E-05,A8=-1.9597E-06,
A10=0.0000E+00
25th Surface
K=0.0433,
A2=0.0000E+00,A4=-9.4693E-04,A6=9.5646E-05,A8=-4.1316E-06,
A10=0.0000E+00

| Numenical data Zoom ratio 4.99 | | | |
|---|---|---|---|
| | Wideangle | Intermediate | Telephoto |
| Focal length | 5.00516 | 11.17413 | 24.99304 |
| F number | 3.6331 | 3.9510 | 5.9000 |
| Image angle | 43.4° | 19.0° | 8.6° |
| Image height | 3.84 | 3.84 | 3.84 |
| Total lens length | 59.9108 | 59.9147 | 59.9110 |

-continued

Numenical data
Zoom ratio 4.99

|  | Wideangle | Intermediate | Telephoto |
|---|---|---|---|
| BF | 0.49986 | 0.49986 | 0.49986 |
| d9 | 0.79553 | 5.59358 | 7.88345 |
| d14 | 8.47749 | 3.69199 | 1.38960 |
| d15 | 6.09817 | 5.31356 | 1.19254 |
| d20 | 3.18290 | 2.98040 | 10.95933 |
| d22 | 4.37407 | 5.31520 | 1.50350 |

Zoom lens group data

| Group | Initial surface | focal length |
|---|---|---|
| 1 | 1 | 10.60778 |
| 2 | 10 | −6.17835 |
| 3 | 16 | 11.19498 |
| 4 | 21 | 24.96809 |
| 5 | 23 | 55.22906 |

| Table of index of glass mateial | List of index per wavelength of medium used in the persent embodiment | | | | |
|---|---|---|---|---|---|
| GLA | 587.56 | 656.27 | 486.13 | 435.84 | 404.66 |
| L5 | 1.669997 | 1.660518 | 1.695229 | 1.715500 | 1.733133 |
| L8 | 1.945950 | 1.931230 | 1.983830 | 2.018254 | 2.051063 |
| L1, L2, L13 | 2.143520 | 2.125601 | 2.189954 | 2.232324 | 2.273190 |
| L15 | 1.516330 | 1.513855 | 1.521905 | 1.526213 | 1.529768 |
| L14 | 1.487490 | 1.485344 | 1.492285 | 1.495963 | 1.498983 |
| L4 | 1.806098 | 1.800248 | 1.819945 | 1.831173 | 1.840781 |
| L6, L9 | 1.834807 | 1.828975 | 1.848520 | 1.859547 | 1.868911 |
| L10 | 1.696797 | 1.692974 | 1.705522 | 1.712339 | 1.718005 |
| L7 | 1.729157 | 1.725101 | 1.738436 | 1.745696 | 1.751731 |
| L3 | 1.755199 | 1.747295 | 1.774745 | 1.791495 | 1.806556 |
| L11 | 2.000690 | 1.989410 | 2.028720 | 2.052834 | 2.074603 |
| L12 | 1.525400 | 1.522460 | 1.531800 | 1.537220 | 1.543549 |

NUMERICAL EXAMPLE 6

Unit mm

Surface data

| Surface number | r | d | nd | vd |
|---|---|---|---|---|
| Object plane | ∞ | ∞ | | |
| 1 | −819.5878 | 0.8000 | 2.14352 | 17.77 |
| 2 | 14.9834 | 1.7000 | | |
| 3 | ∞ | 10.5000 | 2.14352 | 17.77 |
| 4 | ∞ | 0.2000 | | |
| 5 | 32.6307 | 2.3000 | 1.88300 | 40.76 |
| 6* | −34.8939 | 0.1500 | | |
| 7* | 24.7787 | 2.5000 | 1.80610 | 40.92 |
| 8* | −26.9185 | 0.1000 | 1.63494 | 23.22 |
| 9* | −46.7965 | Variable | | |
| 10 | −82.3288 | 0.5000 | 1.83481 | 42.71 |
| 11* | 10.6980 | 1.2000 | | |
| 12 | −16.2705 | 0.5000 | 1.81600 | 46.62 |
| 13 | 6.3195 | 1.4000 | 1.92286 | 20.88 |
| 14 | 35.7854 | Variable | | |
| 15(STOP) | ∞ | Variable | | |
| 16* | 5.8621 | 2.5000 | 1.83481 | 42.71 |
| 17* | −91.4272 | 0.1500 | | |
| 18 | 9.2790 | 1.6000 | 1.69680 | 55.53 |
| 19 | −18.8886 | 0.2000 | 1.63494 | 23.22 |
| 20 | −49.2783 | 0.5000 | 2.00069 | 25.46 |
| 21 | 4.2057 | Variable | | |
| 22* | 16.6942 | 1.6000 | 1.52540 | 56.25 |
| 23 | −27.2535 | Variable | | |
| 24 | −11.0525 | 0.600 | 2.14352 | 17.77 |
| 25 | −36.9413 | 0.1500 | | |
| 26 | 38.1188 | 3.4000 | 1.48749 | 70.23 |
| 27* | −7.0763 | 0.7000 | | |
| 28 | ∞ | 0.8000 | 1.51633 | 64.14 |
| 29 | ∞ | 0.7999 | | |
| Image plane | ∞ | | | |

Aspherical Surface Data

7th Surface

K=−0.0484,

A2=0.0000E+00,A4=1.4563E−05,A6=−7.6488E−07, A8=4.4586E−09,

A10=0.0000E+00

8th Surface

K=0.0031,

A2=0.0000E+00,A4=−1.3425E−04,A6=2.6003E−06, A8=6.4483E−09,

A10=0.0000E+00

9th Surface

K=−0.0028,

A2=0.0000E+00,A4=1.0040E−04,A6=−2.1816E−06, A8=9.3935E−09,

A10=0.0000E+00

11th Surface

K=−0.9165,

A2=0.0000E+00,A4=8.7967E−05,A6=6.6746E−06, A8=1.7677E−07,

A10=0.0000E+00

16th Surface

K=−0.6217,

A2=0.0000E+00,A4=3.4602E−04,A6=2.3472E−05, A8=1.9916E−06,

A10=0.0000E+00

17th Surface
K=1.5587,
A2=0.0000E+00,A4=9.2867E−04,A6=2.5002E−05,
  A8=4.2526E−06,
A10=0.0000E+00
22th Surface
K=−0.5835,
A2=0.0000E+00,A4=−1.1710E−04,A6=−3.2496E−06,
  A8=−6.5599E−07,
A10=0.0000E+00
27th Surface
K=−0.0556,
A2=0.0000E+00,A4=1.3775E−03,A6=−9.2249E−05,
  A8=1.7867E−06,
A10=0.0000E+00

Numenical data
Zoom ratio 4.94

|  | Wideangle | Intermediate | Telephoto |
|---|---|---|---|
| Focal length | 6.06430 | 13.52278 | 29.95434 |
| F number | 3.9605 | 4.0905 | 4.9000 |
| Image angle | 37.3° | 15.7° | 7.2° |
| Image height | 3.84 | 3.84 | 3.84 |
| Total lens length | 58.0735 | 58.0555 | 58.0733 |
| BF | 0.79985 | 0.79985 | 0.79985 |
| d9 | 0.59281 | 5.69004 | 8.08420 |
| d14 | 8.89327 | 3.78953 | 1.40190 |
| d15 | 5.61102 | 5.14474 | 1.20110 |
| d21 | 3.04769 | 2.83493 | 11.03702 |
| d23 | 5.07890 | 5.73353 | 1.49967 |

Zoom lens group data

| Group | Initial surface | focal length |
|---|---|---|
| 1 | 1 | 11.84782 |
| 2 | 10 | −6.38831 |
| 3 | 16 | 11.74568 |
| 4 | 22 | 19.95454 |
| 5 | 24 | 44.45692 |

NUMERICAL EXAMPLE 7

Unit mm

Surface data

| Surface no. number | r | d | nd | νd |
|---|---|---|---|---|
| Object plane | ∞ | ∞ | | |
| 1 | 70.9333 | 1.0000 | 2.14352 | 17.77 |
| 2 | 13.8272 | 1.7000 | | |
| 3 | ∞ | 9.8000 | 2.14352 | 17.77 |
| 4 | ∞ | 0.2000 | | |
| 5* | 40.8010 | 2.2000 | 1.74320 | 49.34 |
| 6 | −23.9074 | 0.1500 | | |
| 7 | 17.1132 | 1.8000 | 1.80610 | 40.92 |
| 8 | −518.0523 | Variable | | |
| 9 | −27.8003 | 0.5000 | 1.81600 | 46.62 |
| 10 | 12.0815 | 0.9000 | | |
| 11* | −15.4460 | 0.6000 | 1.69350 | 53.21 |
| 12* | 10.8240 | 0.5000 | 1.73000 | 16.50 |
| 13* | 141.6381 | Variable | | |
| 14(STOP) | ∞ | Variable | | |
| 15* | 6.2230 | 2.5000 | 1.83481 | 42.71 |
| 16* | −23.3251 | 0.1500 | | |
| 17 | 10.1846 | 1.6000 | 1.69680 | 55.53 |
| 18 | −24.9318 | 0.5000 | 2.00069 | 25.46 |
| 19 | 4.3329 | Variable | | |
| 20* | 8.9455 | 1.6000 | 1.52540 | 56.25 |
| 21 | 26.3255 | Variable | | |
| 22 | −49.4362 | 0.6000 | 2.14352 | 17.77 |
| 23 | 20.0790 | 2.0000 | 1.51633 | 64.14 |
| 24 | −9.8555 | 0.6000 | | |
| 25 | ∞ | 0.8000 | 1.51633 | 64.14 |
| 26 | ∞ | 0.5010 | | |
| Image plane | ∞ | | | |

Aspherical Surface Data

5th Surface
K=−0.3202,
A2=0.0000E+00,A4=1.2174E−05,A6=6.3672E−08,A8=−6.8681E−10,
A10=0.0000E+00

| Table of index of glass mateial | List of index per wavelength of medium used in the persent embodiment | | | | |
|---|---|---|---|---|---|
| GLA | 587.56 | 656.27 | 486.13 | 435.84 | 404.66 |
| L5, L11 | 1.634937 | 1.627308 | 1.654649 | 1.670343 | 1.683846 |
| L8 | 1.922860 | 1.910380 | 1.954570 | 1.982810 | 2.009190 |
| L1, L2, L14 | 2.143520 | 2.125601 | 2.189954 | 2.232324 | 2.273184 |
| L16 | 1.516330 | 1.513855 | 1.521905 | 1.526213 | 1.529768 |
| L15 | 1.487490 | 1.485344 | 1.492285 | 1.495963 | 1.498983 |
| L4 | 1.806098 | 1.800248 | 1.819945 | 1.831173 | 1.840781 |
| L6, L9 | 1.834807 | 1.828975 | 1.848520 | 1.859547 | 1.868911 |
| L3 | 1.882997 | 1.876560 | 1.898221 | 1.910495 | 1.920919 |
| L7 | 1.816000 | 1.810749 | 1.828252 | 1.837996 | 1.846185 |
| L10 | 1.696797 | 1.692974 | 1.705522 | 1.712339 | 1.718005 |
| L12 | 2.000690 | 1.989410 | 2.028720 | 2.052834 | 2.074600 |
| L13 | 1.525400 | 1.522460 | 1.531800 | 1.537220 | 1.543548 |

11th Surface
K=−0.2788,
A2=0.0000E+00,A4=3.9206E−04,A6=−5.7360E−05,
  A8=2.8799E−06,
A10=0.0000E+00
12th Surface
K=−1.0000,
A2=0.0000E+00,A4=2.0000E−04,A6=0.0000E+00,
  A8=0.0000E+00,
A10=0.0000E+00
13th Surface
K=0.0225,

| Zoom lens group data | | |
|---|---|---|
| Group | Initial surface | focal length |
| 1 | 1 | 12.99315 |
| 2 | 9 | −6.71608 |
| 3 | 15 | 11.50294 |
| 4 | 20 | 24.99695 |
| 5 | 22 | 517.96939 |

| Table of index of glass mateial | List of index per wavelength of medium used in the persent embodiment | | | | |
|---|---|---|---|---|---|
| GLA | 587.56 | 656.27 | 486.13 | 435.84 | 404.66 |
| L7 | 1.729996 | 1.718099 | 1.762336 | 1.793147 | 1.822977(LA) |
| L1, L2, L12 | 2.143520 | 2.125601 | 2.189954 | 2.232324 | 2.273190 |
| L13, L14 | 1.516330 | 1.513855 | 1.521905 | 1.526213 | 1.529768 |
| L4 | 1.806098 | 1.800248 | 1.819945 | 1.831173 | 1.840781 |
| L8 | 1.834807 | 1.828975 | 1.848520 | 1.859547 | 1.868911 |
| L5 | 1.816000 | 1.810749 | 1.828252 | 1.837996 | 1.846185 |
| L6 | 1.693501 | 1.689548 | 1.702582 | 1.709715 | 1.715662(LB) |
| L9 | 1.696797 | 1.692974 | 1.705522 | 1.712339 | 1.718005 |
| L3 | 1.743198 | 1.738653 | 1.753716 | 1.762046 | 1.769040 |
| L10 | 2.000690 | 1.989410 | 2.028720 | 2.052834 | 2.074603 |
| L11 | 1.525400 | 1.522460 | 1.531800 | 1.537220 | 1.543549 |

A2=0.0000E+00,A4=3.0156E−04,A6=−4.7185E−05,
  A8=2.8163E−06,
A10=0.0000E+00
15th Surface
K=−0.5926,
A2=0.0000E+00,A4=−3.5989E−05,A6=−7.2139E−07,
  A8=1.1710E−06,
A10=0.0000E+00
16th Surface
K=−0.7618,
A2=0.0000E+00,A4=4.1404E−04,A6=−1.0699E−06,
  A8=1.5036E−06,
A10=0.0000E+00
20th Surface
K=−0.7017,
A2=0.0000E+00,A4=−1.5674E−04,A6=6.6734E−06,A8=−
  3.1995E−07,
A10=0.0000E+00

NUMERICAL EXAMPLE 8

Unit mm

| Surface data | | | | |
|---|---|---|---|---|
| Surface no. number | r | d | nd | vd |
| Object plane | ∞ | ∞ | | |
| 1 | 65.8684 | 1.0000 | 2.14352 | 17.77 |
| 2 | 13.6116 | 1.7000 | | |
| 3 | ∞ | 9.8000 | 2.14352 | 17.77 |
| 4 | ∞ | 0.2000 | | |
| 5* | 38.9623 | 2.2000 | 1.74320 | 49.34 |
| 6 | −24.3905 | 0.1500 | | |
| 7 | 17.3836 | 1.8000 | 1.80610 | 40.92 |
| 8 | −314.9651 | Variable | | |
| 9 | −24.6323 | 0.5000 | 1.81600 | 46.62 |
| 10 | 12.4982 | 0.9000 | | |
| 11* | −16.0731 | 0.5000 | 1.73000 | 16.50 |
| 12* | −6.8351 | 0.6000 | 1.69350 | 53.21 |
| 13 | 113.3352 | Variable | | |
| 14(STOP) | ∞ | Variable | | |
| 15* | 6.1962 | 2.5000 | 1.83481 | 42.71 |
| 16* | −18.9117 | 0.1500 | | |
| 17 | 11.5005 | 1.6000 | 1.69680 | 55.53 |
| 18 | −22.0689 | 0.5000 | 2.00069 | 25.46 |
| 19 | 4.3037 | Variable | | |
| 20* | 9.1414 | 1.6000 | 1.52540 | 56.25 |
| 21 | 28.3468 | Variable | | |
| 22 | −231.7696 | 0.6000 | 2.14352 | 17.77 |
| 23 | 15.7331 | 2.0000 | 1.51633 | 64.14 |
| 24 | −12.2434 | 0.6000 | | |
| 25 | ∞ | 0.8000 | 1.51633 | 64.14 |
| 26 | ∞ | 0.5005 | | |
| Image plane | ∞ | | | |

| Numenical data Zoom ratio 4.95 | | | |
|---|---|---|---|
| | Wideangle | Intermediate | Telephoto |
| Focal length | 6.05384 | 13.53302 | 29.95922 |
| F number | 3.5818 | 3.9354 | 5.9000 |
| Image angle | 36.7° | 15.5° | 7.1° |
| Image height | 3.84 | 3.84 | 3.84 |
| Lens total length | 54.9923 | 54.9985 | 54.9920 |
| BF | 0.50095 | 0.50095 | 0.50095 |
| d8 | 0.69744 | 5.70509 | 8.03620 |
| d13 | 8.75348 | 3.75399 | 1.41439 |
| d14 | 6.58723 | 5.51434 | 1.20483 |
| d19 | 3.86314 | 4.16093 | 12.63108 |
| d21 | 4.89004 | 5.66351 | 1.50446 |

Aspherical Surface Data
5th Surface
K=−0.3197,
A2=0.0000E+00,A4=1.0806E−05,A6=7.9986E−08,A8=−9.7084E−10,
A10=0.0000E+00
11th Surface
K=−0.2811,
A2=0.0000E+00,A4=1.6037E−04,A6=−1.8892E−05, A8=8.0861E−07,
A10=0.0000E+00
12th Surface
K=−1.0000,
A2=0.0000E+00,A4=−1.0000E−04,A6=0.0000E+00, A8=0.0000E+00,
A10=0.0000E+00
15th Surface
K=−0.5926,
A2=0.0000E+00,A4=−2.0163E−04,A6=1.1143E−05,A8=−2.2744E−07,
A10=0.0000E+00
16th Surface
K=−0.7610,
A2=0.0000E+00,A4=3.2549E−04,A6=8.9816E−06,A8=−2.7426E−07,
A10=0.0000E+00
20th Surface
K=−0.7014,
A2=0.0000E+00,A4=−5.2357E−05,A6=8.5324E−06,A8=−2.7757E−07,
A10=0.0000E+00

Numerical data
Zoom ratio 4.95

|  | Wideangle | Intermediate | Telephoto |
|---|---|---|---|
| Focal length | 6.05811 | 13.53447 | 29.96037 |
| F number | 3.6049 | 3.9258 | 5.9000 |
| Image angle | 36.7° | 15.5° | 7.1° |
| Image height | 3.84 | 3.84 | 3.84 |
| Lens total length | 54.9971 | 54.9961 | 54.9970 |
| BF | 0.50053 | 0.50053 | 0.50053 |
| d8 | 0.70330 | 5.73038 | 8.03038 |
| d13 | 8.73335 | 3.70646 | 1.40616 |
| d14 | 6.49635 | 5.53905 | 1.20249 |
| d19 | 3.94810 | 4.12049 | 12.65643 |
| d21 | 4.91546 | 5.69788 | 1.50090 |

Zoom lens group data

| Group | Initial surface | focal length |
|---|---|---|
| 1 | 1 | 12.91644 |
| 2 | 9 | −6.66266 |
| 3 | 15 | 11.50228 |
| 4 | 20 | 24.96428 |
| 5 | 22 | −7808.43386 |

Table of index of glass mateial
List of index per wavelength of medium used in the persent embodiment

| GLA | 587.56 | 656.27 | 486.13 | 435.84 | 404.66 |
|---|---|---|---|---|---|
| L6 | 1.729996 | 1.718099 | 1.762336 | 1.793147 | 1.822977(LA) |
| L1, L2, L12 | 2.143520 | 2.125601 | 2.189954 | 2.232324 | 2.273190 |
| L13, L14 | 1.516330 | 1.513855 | 1.521905 | 1.526213 | 1.529768 |
| L4 | 1.806098 | 1.800248 | 1.819945 | 1.831173 | 1.840781 |
| L8 | 1.834807 | 1.828975 | 1.848520 | 1.859547 | 1.868911 |
| L5 | 1.816000 | 1.810749 | 1.828252 | 1.837996 | 1.846185 |
| L7 | 1.693501 | 1.689548 | 1.702582 | 1.709715 | 1.715662(LB) |
| L9 | 1.696797 | 1.692974 | 1.705522 | 1.712339 | 1.718005 |
| L3 | 1.743198 | 1.738653 | 1.753716 | 1.762046 | 1.769040 |
| L10 | 2.000690 | 1.989410 | 2.028720 | 2.052834 | 2.074603 |
| L11 | 1.525400 | 1.522460 | 1.531800 | 1.537220 | 1.543549 |

NUMERICAL EXAMPLE 9

Unit mm

Surface data

| Surface no. number | r | d | nd | vd |
|---|---|---|---|---|
| Object plane | ∞ | ∞ |  |  |
| 1 | 183.3282 | 1.0000 | 2.00069 | 25.46 |
| 2 | 12.9429 | 2.2000 |  |  |
| 3 | ∞ | 9.5000 | 2.14352 | 17.77 |
| 4 | ∞ | 0.2000 |  |  |
| 5 | 31.8226 | 2.1000 | 1.74320 | 49.34 |
| 6 | −27.8686 | 0.1500 |  |  |
| 7* | 25.7898 | 0.1000 | 1.66000 | 20.00 |
| 8 | 14.2746 | 2.0000 | 1.80610 | 40.92 |
| 9 | −57.4157 | Variable |  |  |
| 10 | −305.8191 | 0.5000 | 1.83481 | 42.71 |
| 11* | 12.1796 | 1.2000 |  |  |
| 12 | −14.2400 | 0.5000 | 1.83481 | 42.71 |
| 13 | 8.2434 | 1.3000 | 1.94595 | 17.98 |
| 14 | 39.4168 | Variable |  |  |
| 15(STOP) | ∞ | Variable |  |  |
| 16* | 7.6683 | 2.3000 | 1.80610 | 40.92 |
| 17* | −33.7722 | 0.1500 |  |  |
| 18 | 8.7575 | 2.4000 | 1.69680 | 55.53 |
| 19 | −9.0483 | 0.2000 | 1.66000 | 20.00 |
| 20 | −18.2673 | 0.5000 | 2.09500 | 29.40 |
| 21 | 5.4018 | Variable |  |  |
| 22* | 10.1788 | 1.6000 | 1.52540 | 56.25 |
| 23 | 42.8427 | Variable |  |  |
| 24 | 18.7890 | 0.6000 | 2.09500 | 29.40 |
| 25 | 8.7150 | 2.3000 | 1.51742 | 52.43 |
| 26 | −33.2050 | 1.0000 |  |  |
| 27 | ∞ | 0.8675 | 1.51633 | 64.14 |
| 28 | ∞ | 0.9995 |  |  |
| Image plane | ∞ |  |  |  |

Aspherical Surface Data

7th Surface

K=−0.0280,

A2=0.0000E+00,A4=−1.0789E−05,A6=6.7761E−08,A8=−1.1595E−09,

A10=0.0000E+00

11th Surface

K=−0.8917,

A2=0.0000E+00,A4=5.5318E−05,A6=1.1312E−05,A8=−1.5162E−07,

A10=0.0000E+00

16th Surface

K=−0.6055,

A2=0.0000E+00,A4=2.0776E−04,A6=2.3572E−06,A8=1.7315E−06,

A10=0.0000E+00

17th Surface

K=−0.8693,

A2=0.0000E+00,A4=4.6319E−04,A6=−3.8045E−06,A8=2.8622E−06,

A10=0.0000E+00

22th Surface

K=−0.6715,

A2=0.0000E+00,A4=−9.5864E−05,A6=1.1837E−06,A8=−7.0698E−08,

A10=0.0000E+00

| Numenical data Zoom ratio 4.95 | | | |
|---|---|---|---|
| | Wideangle | Intermediate | Telephoto |
| Focal length | 6.05257 | 13.53379 | 29.95890 |
| F number | 3.7268 | 4.1350 | 5.9000 |
| Image angle | 36.7° | 15.5° | 7.0° |
| Image height | 3.84 | 3.84 | 3.84 |
| Lens total length | 59.0023 | 59.0024 | 59.0021 |
| BF | 0.99949 | 0.99949 | 0.99949 |
| d9 | 0.59951 | 5.55504 | 8.16832 |
| d14 | 8.96358 | 4.00669 | 1.39485 |
| d15 | 6.84353 | 5.63867 | 1.19768 |
| d21 | 3.78753 | 3.73038 | 12.57587 |
| d23 | 5.14120 | 6.40501 | 1.99875 |

| Zoom lens group data | | |
|---|---|---|
| Group | Initial surface | focal length |
| 1 | 1 | 12.61627 |
| 2 | 10 | −6.72317 |
| 3 | 16 | 12.54941 |
| 4 | 22 | 24.98887 |
| 5 | 24 | 116.33338 |

| Table of index of glass mateial | List of index per wavelength of medium used in the persent embodiment | | | | |
|---|---|---|---|---|---|
| GLA | 587.56 | 656.27 | 486.13 | 435.84 | 404.66 |
| L12, L14 | 2.094997 | 2.084179 | 2.121419 | 2.143451 | 2.162629 |
| L4, L11 | 1.659997 | 1.650951 | 1.683947 | 1.703411 | 1.720477 |
| L8 | 1.945950 | 1.931230 | 1.983830 | 2.018254 | 2.051063 |
| L2 | 2.143520 | 2.125601 | 2.189954 | 2.232324 | 2.273190 |
| L16 | 1.516330 | 1.513855 | 1.521905 | 1.526213 | 1.529768 |
| L5, L9 | 1.806098 | 1.800248 | 1.819945 | 1.831173 | 1.840781 |
| L6, L7 | 1.834807 | 1.828975 | 1.848520 | 1.859547 | 1.868911 |
| L10 | 1.696797 | 1.692974 | 1.705522 | 1.712339 | 1.718005 |
| L3 | 1.743198 | 1.738653 | 1.753716 | 1.762046 | 1.769040 |
| L15 | 1.517417 | 1.514444 | 1.524313 | 1.529804 | 1.534439 |
| L1 | 2.000690 | 1.989410 | 2.028720 | 2.052834 | 2.074603 |
| L13 | 1.525400 | 1.522460 | 1.531800 | 1.537220 | 1.543549 |

NUMERICAL EXAMPLE 10

Unit mm

| Surface data | | | | |
|---|---|---|---|---|
| Surface no. number | r | d | nd | vd |
| Object plane | ∞ | ∞ | | |
| 1 | 35.6078 | 1.0000 | 2.14352 | 17.77 |
| 2 | 13.3707 | 2.8000 | | |
| 3 | ∞ | 10.8000 | 1.80610 | 40.92 |
| 4 | ∞ | 0.2000 | | |
| 5* | 18.8067 | 2.8000 | 1.88300 | 40.76 |
| 6* | −17.6140 | 0.1000 | 1.63494 | 23.22 |
| 7* | −36.1413 | Variable | | |
| 8 | 85.6702 | 0.5000 | 1.83481 | 42.71 |
| 9* | 10.5788 | 1.5000 | | |
| 10 | −13.5398 | 0.5000 | 1.80610 | 40.92 |
| 11 | 14.0475 | 1.4000 | 1.94595 | 17.98 |
| 12 | −98.7614 | Variable | | |
| 13(STOP) | ∞ | Variable | | |
| 14* | 8.0967 | 2.5000 | 1.83481 | 42.71 |
| 15* | −33.6397 | 0.1500 | | |
| 16 | 9.2703 | 1.6000 | 1.69680 | 55.53 |
| 17 | −180.4104 | 0.5000 | 2.00069 | 25.46 |
| 18 | 5.4518 | Variable | | |
| 19* | 9.3913 | 1.6000 | 1.52540 | 56.25 |
| 20 | 36.3345 | Variable | | |
| 21* | −15.8203 | 0.6000 | 2.14352 | 17.77 |
| 22 | 26.9859 | 2.2000 | 1.48749 | 70.23 |
| 23 | −7.5455 | 0.6000 | | |
| 24 | ∞ | 0.8000 | 1.51633 | 64.14 |
| 25 | ∞ | 0.7999 | | |
| Image plane | ∞ | | | |

Aspherical Surface Data

5th Surface

K=0.0656,

A2=0.0000E+00,A4=−2.0793E−05,A6=−2.2718E−07, A8=−1.4970E−08,
A10=0.0000E+00
6th Surface
K=0.0281,
A2=0.0000E+00,A4=−1.6543E−05,A6=−1.9504E−06, A8=4.1524E−08,
A10=0.0000E+00
7th Surface
K=−0.0404,
A2=0.0000E+00,A4=3.7765E−05,A6=2.1488E−07,A8=−3.4001E−08,
A10=0.0000E+00
9th Surface
K=−0.9588,
A2=0.0000E+00,A4=1.4918E−04,A6=3.3691E−06, A8=2.7367E−07,
A10=0.0000E+00
14th Surface
K=−0.6078,
A2=0.0000E+00,A4=−7.2844E−05,A6=4.9099E−06, A8=5.9322E−08, A10=0.0000E+00
15th Surface
K=−0.1929,
A2=0.0000E+00,A4=7.6881E−05,A6=7.5157E−06,A8=−1.3516E−08,
A10=0.0000E+00
19th Surface
K=0.0285,
A2=0.0000E+00,A4=−2.5544E−04,A6=1.4559E−05,A8=−6.7788E−07,
A10=0.0000E+00
21th Surface
K=0.2758,
A2=0.0000E+00,A4=1.6010E−04,A6=−2.5583E−05, A8=9.6944E−07,
A10=0.0000E+00

| Numenical data Zoom ratio 4.95 | | | |
|---|---|---|---|
| | Wideangle | Intermediate | Telephoto |
| Focal length | 6.05071 | 13.53489 | 29.95978 |
| F number | 3.0985 | 4.1877 | 5.9000 |
| Image angle | 36.8° | 16.0° | 7.2° |
| Image height | 3.84 | 3.84 | 3.84 |

| Numenical data Zoom ratio 4.95 | | | |
|---|---|---|---|
| | Wideangle | Intermediate | Telephoto |
| Lens total length | 61.0001 | 61.0005 | 61.0000 |
| BF | 0.79995 | 0.79995 | 0.79995 |
| d7 | 0.59941 | 5.39336 | 9.12734 |
| d12 | 9.92807 | 5.13508 | 1.40013 |
| d13 | 9.23970 | 5.05720 | 1.19996 |
| d18 | 3.05832 | 7.23901 | 14.82278 |
| d20 | 5.22463 | 5.22595 | 1.49990 |

| Zoom lens group data | | |
|---|---|---|
| Group | Initial surface | focal length |
| 1 | 1 | 16.31490 |
| 2 | 8 | −8.97530 |
| 3 | 14 | 13.65900 |
| 4 | 19 | 23.62172 |
| 5 | 21 | −45.67590 |

| Table of index of glass mateial | List of index per wavelength of medium used in the persent embodiment | | | | |
|---|---|---|---|---|---|
| GLA | 587.56 | 656.27 | 486.13 | 435.84 | 404.66 |
| L4 | 1.634937 | 1.627308 | 1.654649 | 1.671136 | 1.685842(LA) |
| L7 | 1.945950 | 1.931230 | 1.983830 | 2.018254 | 2.051060 |
| L1, L12 | 2.143520 | 2.125601 | 2.189954 | 2.232324 | 2.273184 |
| L14 | 1.516330 | 1.513855 | 1.521905 | 1.526213 | 1.529768 |
| L13 | 1.487490 | 1.485344 | 1.492285 | 1.495963 | 1.498983 |
| L2, L6 | 1.806098 | 1.800248 | 1.819945 | 1.831173 | 1.840781 |
| L5, L8 | 1.834807 | 1.828975 | 1.848520 | 1.859547 | 1.868911 |
| L3 | 1.882997 | 1.876560 | 1.898221 | 1.910495 | 1.920919(LB) |
| L9 | 1.696797 | 1.692974 | 1.705522 | 1.712339 | 1.718005 |
| L10 | 2.000690 | 1.989410 | 2.028720 | 2.052834 | 2.074600 |
| L11 | 1.525400 | 1.522460 | 1.531800 | 1.537220 | 1.543548 |

NUMERICAL EXAMPLE 11

Unit mm

| Surface data | | | | |
|---|---|---|---|---|
| Surface no. number | r | d | nd | vd |
| Object plane | ∞ | ∞ | | |
| 1 | 157.7080 | 1.0000 | 2.00330 | 28.27 |
| 2 | 13.4226 | 1.7000 | | |
| 3 | ∞ | 9.8000 | 2.14352 | 17.7 |
| 4 | ∞ | 0.2000 | | |
| 5* | 35.3820 | 2.5000 | 1.74320 | 49.34 |
| 6* | −13.8568 | 0.1000 | 1.63494 | 23.22 |
| 7* | −24.8919 | 0.1500 | | |
| 8 | 18.7117 | 1.8000 | 1.81600 | 46.62 |
| 9 | −989.9236 | Variable | | |
| 10 | −35.1124 | 0.5000 | 1.83481 | 42.71 |
| 11* | 11.2710 | 1.1000 | | |
| 12 | −16.1577 | 0.5000 | 1.80610 | 40.92 |
| 13 | 9.1476 | 1.3000 | 1.94595 | 17.98 |
| 14 | 137.0310 | Variable | | |
| 15(STOP) | ∞ | Variable | | |
| 16* | 6.0346 | 2.5000 | 1.83481 | 42.71 |
| 17* | −20.8366 | 0.1500 | | |
| 18 | 13.2227 | 1.6000 | 1.69680 | 55.53 |

-continued

Surface data

| Surface no. number | r | d | nd | vd |
|---|---|---|---|---|
| 19 | −21.0493 | 0.5000 | 2.00069 | 25.46 |
| 20* | 4.2655 | Variable | | |
| 21* | 10.9804 | 1.6000 | 1.52540 | 56.25 |
| 22 | −232.4414 | Variable | | |
| 23 | −362.5642 | 0.6000 | 2.04300 | 39.00 |
| 24 | 14.2643 | 3.0000 | 1.51742 | 52.43 |
| 25 | −10.6048 | 0.6000 | | |
| 26 | ∞ | 0.8000 | 1.51633 | 64.14 |
| 27 | ∞ | 0.7993 | | |
| Image plane | ∞ | | | |

Aspherical Surface Data
5th Surface
$K=-0.3278$,
$A2=0.0000E+00, A4=2.9173E-06, A6=-2.0925E-06$,
$A8=4.2530E-08$,
$A10=0.0000E+00$
6th Surface
$K=0.0479$,
$A2=0.0000E+00, A4=4.8113E-05, A6=-1.1149E-05$,
$A8=3.7818E-07$,
$A10=-0.0000E+00$
7th Surface
$K=-0.0187$,
$A2=0.0000E+00, A4=-7.3529E-06, A6=-6.6541E-07$,
$A8=-1.3661E-08$,
$A10=0.0000E+00$
11th Surface
$K=-0.8871$,
$A2=0.0000E+00, A4=5.3951E-05, A6=5.7536E-06$,
$A8=6.4825E-09$,
$A10=0.0000E+00$
16th Surface
$K=-0.5942$,
$A2=0.0000E+00, A4=-6.8115E-05, A6=1.0907E-07$,
$A8=7.4120E-08$,
$A10=0.0000E+00$
17th Surface
$K=-0.7628$,
$A2=0.0000E+00, A4=4.5611E-04, A6=-1.0355E-05$,
$A8=3.5572E-07$,
$A10=0.0000E+00$
21th Surface
$K=-0.7169$,
$A2=0.0000E+00, A4=2.7279E-05, A6=-5.1868E-06$,
$A8=1.8491E-08$,
$A10=0.0000E+00$ Numenical data
Zoom ratio 4.94

| | Wideangle | Intermediate | Telephoto |
|---|---|---|---|
| Focal length | 6.06124 | 13.53624 | 29.95741 |
| F number | 3.6364 | 3.9517 | 5.9000 |
| Image angle | 36.7° | 15.5° | 7.2° |
| Image height | 3.84 | 3.84 | 3.84 |
| Lens total length | 58.0640 | 58.0714 | 58.0645 |
| BF | 0.79928 | 0.79928 | 0.79928 |
| d9 | 0.59769 | 5.73203 | 8.08721 |
| d14 | 8.88866 | 3.77014 | 1.39890 |
| d15 | 6.82073 | 5.76455 | 1.19484 |
| d20 | 3.98911 | 4.58771 | 13.08294 |
| d22 | 4.96853 | 5.41533 | 1.50088 |

Zoom lens group data

| Group | Initial surface | focal length |
|---|---|---|
| 1 | 1 | 12.81116 |
| 2 | 10 | −6.90346 |
| 3 | 16 | 12.76421 |
| 4 | 21 | 20.00160 |
| 5 | 23 | 77.44170 |

| Table of index of glass mateial | List of index per wavelength of medium used in the persent embodiment | | | | |
|---|---|---|---|---|---|
| GLA | 587.56 | 656.27 | 486.13 | 435.84 | 404.66 |
| L4 | 1.634937 | 1.627308 | 1.654649 | 1.672358 | 1.688773(LA) |
| L13 | 2.042998 | 2.035064 | 2.061804 | 2.076930 | 2.089693 |
| L8 | 1.945950 | 1.931230 | 1.983830 | 2.018254 | 2.051063 |
| L2 | 2.143520 | 2.125601 | 2.189954 | 2.232324 | 2.273190 |
| L15 | 1.516330 | 1.513855 | 1.521905 | 1.526213 | 1.529768 |
| L7 | 1.806098 | 1.800248 | 1.819945 | 1.831173 | 1.840781 |
| L6, L9 | 1.834807 | 1.828975 | 1.848520 | 1.859547 | 1.868911 |
| L5 | 1.816000 | 1.810749 | 1.828252 | 1.837996 | 1.846185 |
| L1 | 2.003300 | 1.993011 | 2.028497 | 2.049714 | 2.068441 |
| L10 | 1.696797 | 1.692974 | 1.705522 | 1.712339 | 1.718005 |
| L3 | 1.743198 | 1.738653 | 1.753716 | 1.762046 | 1.769040(LB) |
| L14 | 1.517417 | 1.514444 | 1.524313 | 1.529804 | 1.534439 |
| L11 | 2.000690 | 1.989410 | 2.028720 | 2.052834 | 2.074603 |
| L12 | 1.525400 | 1.522460 | 1.531800 | 1.537220 | 1.543549 |

NUMERICAL EXAMPLE 12

Unit mm

Surface data

| Surface no. number | r | d | nd | vd |
|---|---|---|---|---|
| Object plane | ∞ | ∞ | | |
| 1 | 48.8438 | 1.0000 | 2.14352 | 17.77 |
| 1 | 42.7993 | 1.0000 | 2.14352 | 17.77 |
| 2 | 14.3967 | 3.0000 | | |
| 3 | ∞ | 11.5000 | 1.80610 | 40.92 |
| 4 | −33.4852 | 0.2000 | | |
| 5* | 41.1895 | 0.1000 | 1.63494 | 23.22 |
| 6* | 14.8052 | 2.8000 | 2.04300 | 39.00 |
| 7* | −77.3252 | Variable | | |
| 8 | 28.7788 | 0.5000 | 1.83481 | 42.71 |
| 9* | 11.1439 | 1.5000 | | |
| 10 | −13.1774 | 0.5000 | 1.80610 | 40.92 |
| 11 | 7.5542 | 1.7000 | 1.94595 | 17.98 |
| 12 | 29.7930 | Variable | | |
| 13(STOP) | ∞ | Variable | | |
| 14* | 7.0815 | 2.5000 | 1.83481 | 42.71 |
| 15* | −26.0758 | 0.1500 | | |
| 16 | 9.8333 | 1.6000 | 1.69680 | 55.53 |
| 17 | −52.8726 | 0.5000 | 2.00069 | 25.46 |
| 18 | 4.7458 | Variable | | |
| 19* | 8.0689 | 1.6000 | 1.52540 | 56.25 |
| 20 | 19.5088 | Variable | | |
| 21 | −21.4768 | 0.6000 | 2.14352 | 17.77 |
| 22 | 29.6499 | 2.5000 | 1.48749 | 70.23 |
| 23* | −6.3895 | 0.6000 | | |
| 24 | ∞ | 0.8000 | 1.51633 | 64.14 |
| 25 | ∞ | 0.7998 | | |
| Image plane | ∞ | | | |

Aspherical Surface Data

5th Surface
K=−0.1513,
A2=0.0000E+00,A4=−3.7050E−05,A6=1.0839E−07, A8=1.1477E−08,
A10=0.0000E+00

6th Surface
K=0.0263,
A2=0.0000E+00,A4=8.6520E−05,A6=4.5524E−07,A8=−1.3742E−08,
A10=0.0000E+00

7th Surface
K=−0.0789,
A2=0.0000E+00,A4=1.3315E−05,A6=1.7773E−07, A8=1.4417E−09,
A10=0.0000E+00

9th Surface
K=−0.9593,
A2=0.0000E+00,A4=1.3958E−04,A6=3.2451E−06, A8=2.3083E−07,
A10=0.0000E+00

14th Surface
K=−0.6063,
A2=0.0000E+00,A4=−1.1098E−04,A6=3.2759E−06,A8=−2.4822E−07,
A10=0.0000E+00

15th Surface
K=−0.2754,
A2=0.0000E+00,A4−=1.4957E−04,A6=1.3647E−06,A8=−2.3821E−07,
A10=0.0000E+00

19th Surface
K=0.1053,
A2=0.0000E+00,A4=−3.5906E−04,A6=7.5775E−06,A8=−7.2931E−07,
A10=0.0000E+00

23th Surface
K=−0.0104,
A2=0.0000E+00,A4=8.9487E−04,A6=−2.2954E−05, A8=4.3482E−08,
A10=0.0000E+00

Numenical data
Zoom ratio 5.00

| | Wideangle | Intermediate | Telephoto |
|---|---|---|---|
| Focal length | 6.20326 | 13.89999 | 30.99937 |
| F number | 3.2355 | 3.8924 | 5.9000 |
| Image angle | 36.1° | 15.4° | 7.0° |
| Image height | 3.84 | 3.84 | 3.84 |
| Lens total length | 60.6722 | 60.6724 | 60.6722 |
| BF | 0.79981 | 0.79981 | 0.79981 |
| d7 | 0.59924 | 5.69519 | 8.45116 |
| d12 | 9.25207 | 4.15538 | 1.40014 |
| d13 | 8.59216 | 6.20722 | 1.19945 |
| d18 | 2.57430 | 4.59337 | 13.17083 |
| d20 | 5.20465 | 5.56496 | 2.00091 |

Zoom lens group data

| Group | Initial surface | focal length |
|---|---|---|
| 1 | 1 | 15.12158 |
| 2 | 8 | −7.86841 |
| 3 | 14 | 12.90647 |
| 4 | 19 | 24.98639 |
| 5 | 21 | 87.42192 |

| Table of index of glass mateial | List of index per wavelength of medium used in the persent embodiment | | | | |
|---|---|---|---|---|---|
| | 587.56 | 656.27 | 486.13 | 435.84 | 404.66 |
| GLA | | | | | |
| L4 | 2.042998 | 2.035064 | 2.061804 | 2.076930 | 2.089691(LB) |
| L3 | 1.634937 | 1.627308 | 1.654649 | 1.670616 | 1.684505(LA) |
| L7 | 1.945950 | 1.931230 | 1.983830 | 2.018254 | 2.051060 |
| L1, L12 | 2.143520 | 2.125601 | 2.189954 | 2.232324 | 2.273184 |
| L14 | 1.516330 | 1.513855 | 1.521905 | 1.526213 | 1.529768 |
| L13 | 1.487490 | 1.485344 | 1.492285 | 1.495963 | 1.498983 |
| L2, L6 | 1.806098 | 1.800248 | 1.819945 | 1.831173 | 1.840781 |
| L5, L8 | 1.834807 | 1.828975 | 1.848520 | 1.859547 | 1.868911 |
| L9 | 1.696797 | 1.692974 | 1.705522 | 1.712339 | 1.718005 |

-continued

| Table of index of glass mateial | List of index per wavelength of medium used in the persent embodiment | | | | |
|---|---|---|---|---|---|
| L10 | 2.000690 | 1.989410 | 2.028720 | 2.052834 | 2.074600 |
| L11 | 1.525400 | 1.522460 | 1.531800 | 1.537220 | 1.543548 |

NUMERICAL EXAMPLE 13

Unit mm

Surface data

| Surface no. number | r | d | nd | vd |
|---|---|---|---|---|
| Object plane | ∞ | ∞ | | |
| 1 | 48.8438 | 1.0000 | 2.14352 | 17.77 |
| 2* | 11.8544 | 2.8000 | | |
| 3 | −29.7268 | 9.8000 | 2.14352 | 17.77 |
| 4 | ∞ | 0.2000 | | |
| 5 | 17.3005 | 2.7000 | 1.75520 | 27.51 |
| 6 | −47.1388 | 0.1500 | | |
| 7* | 13.0396 | 3.0000 | 1.80610 | 40.92 |
| 8* | −36.7988 | 0.1000 | 1.67000 | 19.30 |
| 9* | 91.5078 | Variable | | |
| 10 | −78.7741 | 0.5000 | 1.83481 | 42.71 |
| 11* | 10.2672 | 1.1000 | | |
| 12 | −14.0949 | 0.5000 | 1.72916 | 54.68 |
| 13 | 8.2918 | 1.3000 | 1.94595 | 17.98 |
| 14 | 27.2540 | Variable | | |
| 15(STOP) | ∞ | Variable | | |
| 16* | 7.6801 | 3.9828 | 1.83481 | 42.71 |
| 17* | −64.2740 | 0.1500 | | |
| 18 | 8.2756 | 2.1000 | 1.69680 | 55.53 |
| 19 | −14.4365 | 0.5000 | 2.00069 | 25.46 |
| 20 | 5.9078 | Variable | | |
| 21* | 8.7416 | 1.5000 | 1.52540 | 56.25 |
| 22 | 24.6527 | Variable | | |
| 23 | 81.0820 | 0.6000 | 2.14352 | 17.77 |
| 24 | 10.8703 | 3.1000 | 1.48749 | 70.23 |
| 25* | −8.3023 | 0.6000 | | |
| 26 | ∞ | 0.8000 | 1.51633 | 64.14 |
| 27 | ∞ | 0.4999 | | |
| Image plane | ∞ | | | |

Aspherical Surface Data
2nd Surface
$K=0.0498$,
$A2=0.0000E+00, A4=-1.3925E-04, A6=2.8042E-07, A8=-1.1379E-08$,
$A10=0.0000E+00$
7th Surface
$K=0.0272$,
$A2=0.0000E+00, A4=-5.4638E-05, A6=1.9698E-06, A8=-1.6771E-08$,
$A10=0.0000E+00$
8th Surface
$K=0.0936$,
$A2=0.0000E+00, A4=-1.1220E-04, A6=1.6578E-06, A8=8.9828E-08$,
$A10=0.0000E+00$
9th Surface
$K=0.5504$,
$A2=0.0000E+00, A4=1.1911E-04, A6=4.6910E-06, A8=-9.1582E-08$,
$A10=0.0000E+00$ 11th Surface
$K=-0.8331$,
$A2=0.0000E+00, A4=2.2507E-04, A6=-7.1701E-07, A8=1.4359E-06$,
$A10=0.0000E+00$
16th Surface
$K=-0.5705$,
$A2=0.0000E+00, A4=2.6285E-04, A6=1.6592E-05, A8=-1.1215E-07$,
$A10=0.0000E+00$
17th Surface
$K=-0.7197$,
$A2=0.0000E+00, A4=6.4343E-04, A6=2.1920E-05, A8=8.2869E-07$,
$A10=0.0000E+00$
21th Surface
$K=-0.7247$,
$A2=0.0000E+00, A4=-3.4170E-04, A6=1.6958E-05, A8=-1.9597E-06$,
$A10=0.0000E+00$
25th Surface
$K=0.0433$,
$A2=0.0000E+00, A4=-9.4693E-04, A6=9.5646E-05, A8=-4.1316E-06$,
$A10=0.0000E+00$

| | Numenical data Zoom ratio 4.99 | | |
|---|---|---|---|
| | Wideangle | Intermediate | Telephoto |
| Focal length | 5.00516 | 11.17413 | 24.99304 |
| F number | 3.6331 | 3.9510 | 5.9000 |
| Image angle | 43.4° | 19.0° | 8.6° |
| Image height | 3.84 | 3.84 | 3.84 |
| Lens total length | 59.9108 | 59.9147 | 59.9110 |
| BF | 0.49986 | 0.49986 | 0.49986 |
| d9 | 0.79553 | 5.59358 | 7.88345 |
| d14 | 8.47749 | 3.69199 | 1.38960 |
| d15 | 6.09817 | 5.31356 | 1.19254 |
| d20 | 3.18290 | 2.98040 | 10.95933 |
| d22 | 4.37407 | 5.31520 | 1.50350 |

| Zoom lens group data | | |
|---|---|---|
| Group | Initial surface | focal length |
| 1 | 1 | 10.60778 |
| 2 | 10 | −6.17835 |
| 3 | 16 | 11.19498 |
| 4 | 21 | 24.96809 |
| 5 | 23 | 55.22906 |

| Table of index of glass mateial | List of index per wavelength of medium used in the persent embodiment | | | | |
|---|---|---|---|---|---|
| GLA | 587.56 | 656.27 | 486.13 | 435.84 | 404.66 |
| L5 | 1.669997 | 1.660518 | 1.695229 | 1.714216 | 1.732297(LA) |
| L8 | 1.945950 | 1.931230 | 1.983830 | 2.018254 | 2.051063 |
| L1, L2, L13 | 2.143520 | 2.125601 | 2.189954 | 2.232324 | 2.273190 |
| L15 | 1.516330 | 1.513855 | 1.521905 | 1.526213 | 1.529768 |
| L14 | 1.487490 | 1.485344 | 1.492285 | 1.495963 | 1.498983 |
| L4 | 1.806098 | 1.800248 | 1.819945 | 1.831173 | 1.840781(LB) |
| L6, L9 | 1.834807 | 1.828975 | 1.848520 | 1.859547 | 1.868911 |
| L10 | 1.696797 | 1.692974 | 1.705522 | 1.712339 | 1.718005 |
| L7 | 1.729157 | 1.725101 | 1.738436 | 1.745696 | 1.751731 |
| L3 | 1.755199 | 1.747295 | 1.774745 | 1.791495 | 1.806556 |
| L11 | 2.000690 | 1.989410 | 2.028720 | 2.052834 | 2.074603 |
| L12 | 1.525400 | 1.522460 | 1.531800 | 1.537220 | 1.543549 |

NUMERICAL EXAMPLE 14

Unit mm

Surface data

| Surface no. number | r | d | nd | vd |
|---|---|---|---|---|
| Object plane | ∞ | ∞ | | |
| 1* | −17.1748 | 10.3000 | 2.14352 | 17.77 |
| 2 | ∞ | 0.200 | | |
| 3* | 16.7286 | 2.3000 | 1.80610 | 40.92 |
| 4* | −53.6680 | 0.1000 | 1.63494 | 23.22 |
| 5 | 3204.9577 | 0.1500 | | |
| 6 | 14.7128 | 1.6000 | 1.90366 | 31.32 |
| 7 | 82.2131 | Variable | | |
| 8 | −1.984E+04 | 0.5000 | 1.83481 | 42.71 |
| 9 | 11.0784 | 1.6000 | | |
| 10 | −9.1210 | 0.5000 | 1.72916 | 54.68 |
| 11 | 13.2632 | 1.2000 | 1.94595 | 17.98 |
| 12 | 281.7281 | Variable | | |
| 13(STOP) | ∞ | Variable | | |
| 14* | 5.7953 | 2.5000 | 1.83481 | 42.71 |
| 15* | −18.0769 | 0.1500 | | |
| 16 | 11.1053 | 1.7000 | 1.69680 | 55.53 |
| 17 | −16.6710 | 0.5000 | 2.00069 | 25.46 |
| 18 | 3.7744 | Variable | | |
| 19* | 9.8539 | 1.6000 | 1.52540 | 56.25 |
| 20 | 37.3912 | Variable | | |
| 21 | 16.0798 | 0.6000 | 2.00330 | 28.27 |
| 22 | 5.6360 | 3.0000 | 1.51633 | 64.14 |
| 23 | −10.5926 | 0.6000 | | |
| 24 | ∞ | 0.8000 | 1.51633 | 64.14 |
| 25 | ∞ | 0.5016 | | |
| Image plane | ∞ | | | |

Aspherical Surface Data
1st Surface
K=−0.0366,
A2=0.0000E+00,A4=2.3100E−04,A6=−2.3544E−06, A8=2.5544E−08,
A10=−1.1763E−10
3rd Surface
K=−0.0300,
A2=0.0000E+00,A4=−2.7534E−04,A6=3.1374E−06,A8=− 8.4181E−09,
A10=0.0000E+00
4th Surface
K=0.0011,
A2=0.0000E+00,A4=−4.5516E−04,A6=9.8020E−06,A8=− 8.5631E−09,
A10=0.0000E+00

14th Surface
K=−0.5838,
A2=0.0000E+00,A4=−1.2310E−04,A6=−1.3763E−06, A8=2.1745E−07,
A10=0.0000E+00
15th Surface
K=−0.7838,
A2=0.0000E+00,A4=5.7429E−04,A6=−1.3882E−05, A8=4.2336E−07,
A10=0.0000E+00
19th Surface
K=−1.0645,
A2=0.0000E+00,A4=5.9099E−04,A6=−1.7414E−05, A8=3.6786E−07,
A10=0.0000E+00

| Numenical data Zoom ratio 4.93 | | | |
|---|---|---|---|
| | Wideangle | Intermediate | Telephoto |
| Focal length | 6.07178 | 13.52809 | 29.95461 |
| F number | 3.3875 | 4.0537 | 5.9000 |
| Image angle | 37.7° | 15.5° | 7.4° |
| Image height | 3.84 | 3.84 | 3.84 |
| Lens total length | 52.9041 | 52.9251 | 52.9047 |
| BF | 0.50159 | 0.50159 | 0.50159 |
| d7 | 0.69477 | 5.06088 | 7.57328 |
| d12 | 8.26624 | 3.90348 | 1.38895 |
| d13 | 7.25378 | 5.35083 | 1.19238 |
| d18 | 2.21643 | 3.17585 | 10.84933 |
| d20 | 4.07132 | 5.06226 | 1.49915 |

| Zoom lens group data | | |
|---|---|---|
| Group | Initial surface | focal length |
| 1 | 1 | 14.32686 |
| 2 | 8 | −6.66166 |
| 3 | 14 | 11.14998 |
| 4 | 19 | 24.96668 |
| 5 | 21 | 36.23308 |

| Table of index of glass mateial | List of index per wavelength of medium used in the persent embodiment | | | | |
|---|---|---|---|---|---|
| GLA | 587.56 | 656.27 | 486.13 | 435.84 | 404.66 |
| L3 | 1.634937 | 1.627308 | 1.654649 | 1.670616 | 1.684505(LA) |
| L7 | 1.945950 | 1.931230 | 1.983830 | 2.018254 | 2.051063 |
| L1 | 2.143520 | 2.125601 | 2.189954 | 2.232324 | 2.273190 |
| L13, L14 | 1.516330 | 1.513855 | 1.521905 | 1.526213 | 1.529768 |
| L2 | 1.806098 | 1.800248 | 1.819945 | 1.831173 | 1.840781(LB) |
| L5, L8 | 1.834807 | 1.828975 | 1.848520 | 1.859547 | 1.868911 |
| L12 | 2.003300 | 1.993011 | 2.028497 | 2.049714 | 2.068441 |
| L9 | 1.696797 | 1.692974 | 1.705522 | 1.712339 | 1.718005 |
| L6 | 1.729157 | 1.725101 | 1.738436 | 1.745696 | 1.751731 |
| L4 | 1.903660 | 1.895260 | 1.924120 | 1.941280 | 1.956428 |
| L10 | 2.000690 | 1.989410 | 2.028720 | 2.052834 | 2.074603 |
| L11 | 1.525400 | 1.522460 | 1.531800 | 1.537220 | 1.543549 |

NUMERICAL EXAMPLE 15

Unit mm

Surface data

| Surface no. number | r | d | nd | vd |
|---|---|---|---|---|
| Object plane | ∞ | ∞ | | |
| 1 | 26.8861 | 1.0000 | 2.14352 | 17.77 |
| 2 | 10.4019 | 2.0000 | | |
| 3 | ∞ | 9.8000 | 2.14352 | 17.77 |
| 4 | ∞ | 0.2000 | | |
| 5* | 43.1266 | 0.1000 | 1.63494 | 23.22 |
| 6* | 23.3838 | 2.4000 | 1.80610 | 40.92 |
| 7* | −29.3975 | 0.1500 | | |
| 8 | 19.1461 | 1.8000 | 1.80610 | 40.92 |
| 9 | −118.3339 | Variable | | |
| 10 | −33.0995 | 0.5000 | 1.81600 | 46.62 |
| 11 | 11.0007 | 0.9000 | | |
| 12* | −14.1728 | 0.6000 | 1.69350 | 53.21 |
| 13* | 8.6979 | 0.5000 | 1.73000 | 16.50 |
| 14* | 41.5907 | Variable | | |
| 15(STOP) | ∞ | 0.7000 | | |
| 16 | 23.2704 | 1.0000 | 1.58913 | 61.14 |
| 17 | −39.5668 | Variable | | |
| 18* | 9.3228 | 2.5000 | 1.83481 | 42.71 |
| 19* | −35.2849 | 0.1500 | | |
| 20 | 16.5137 | 1.6000 | 1.69680 | 55.53 |
| 21 | −18.9795 | 0.5000 | 2.00069 | 25.46 |
| 22 | 7.8715 | Variable | | |
| 23* | 11.9382 | 1.6000 | 1.52540 | 56.25 |
| 24 | −81.9589 | Variable | | |
| 25 | −7.8192 | 0.6000 | 2.14352 | 17.77 |
| 26 | −15.1015 | 2.0000 | 1.51633 | 64.14 |
| 27 | −7.1048 | 0.6000 | | |
| 28 | ∞ | 0.8000 | 1.51633 | 64.14 |
| 29 | ∞ | 0.8002 | | |
| Image plane | ∞ | | | |

Aspherical Surface Data
5th Surface
K=−0.3198,
A2=0.0000E+00,A4=7.0812E−05,A6=−3.7266E−06, A8=5.5289E−08,
A10=0.0000E+00
6th Surface
K=0.0895,
A2=0.0000E+00,A4=−1.2037E−04,A6=9.9952E−06,A8=− 2.5704E−07,
A10=0.0000E+00
7th Surface
K=−0.0600,
A2=0.0000E+00,A4=9.3083E−06,A6=−8.5596E−07,A8=− 1.1449E−08,
A10=0.0000E+00
12th Surface
K=−0.3180,
A2=0.0000E+00,A4=1.0698E−03,A6=−1.4595E−04, A8=7.0190E−06,
A10=0.0000E+00
13th Surface
K=−1.0000,
A2=0.0000E+00,A4=2.0000E−04,A6=0.0000E+00, A8=0.0000E+00,
A10=0.0000E+00
14th Surface
K=2.4959,
A2=0.0000E+00,A4=7.8292E−04,A6=−1.1366E−04, A8=6.5409E−06,
A10=0.0000E+00
18th Surface
K=−0.5894,
A2=0.0000E+00,A4=7.7905E−05,A6=1.1782E−05,A8=− 2.0278E−07,
A10=0.0000E+00
19th Surface
K=−0.7348,
A2=0.0000E+00,A4=2.8188E−04,A6=9.8333E−06,A8=− 1.0652E−07,
A10=0.0000E+00
23th Surface
K=−0.6984,
A2=0.0000E+00,A4=−1.3174E−05,A6=9.8051E−06,A8=− 2.7387E−07,
A10=0.0000E+00

Numenical data
Zoom ratio 4.95

| | Wideangle | Intermediate | Telephoto |
|---|---|---|---|
| Focal length | 6.05277 | 13.53390 | 29.95828 |
| F number | 4.0425 | 4.5176 | 6.0291 |
| Image angle | 38.4° | 16.0° | 7.2° |
| Image height | 3.84 | 3.84 | 3.84 |
| Lens total length | 58.2782 | 58.2843 | 58.2778 |
| BF | 0.80017 | 0.80017 | 0.80017 |
| d9 | 0.59649 | 5.36101 | 8.15085 |
| d14 | 8.84912 | 4.09680 | 1.29474 |
| d17 | 7.14286 | 4.64410 | 0.69974 |

-continued

Numenical data
Zoom ratio 4.95

|  | Wideangle | Intermediate | Telephoto |
|---|---|---|---|
| d22 | 3.54736 | 4.87106 | 13.83328 |
| d24 | 5.34215 | 6.51258 | 1.49937 |

Zoom lens group data

| Group | Initial surface | focal length |
|---|---|---|
| 1 | 1 | 12.85253 |
| 2 | 10 | −5.91408 |
| 3 | 15 | 25.01936 |
| 4 | 18 | 21.07605 |
| 5 | 23 | 19.95023 |
| 6 | 25 | −57.17262 |

| Table of index of glass mateial | List of index per wavelength of medium used in the persent embodiment | | | | |
|---|---|---|---|---|---|
| GLA | 587.56 | 656.27 | 486.13 | 435.84 | 404.66 |
| L3 | 1.634937 | 1.627308 | 1.654649 | 1.672358 | 1.688773(LA) |
| L8 | 1.729996 | 1.718099 | 1.762336 | 1.793147 | 1.822977 |
| L1, L2, L14 | 2.143520 | 2.125601 | 2.189954 | 2.232324 | 2.273190 |
| L9 | 1.589130 | 1.586188 | 1.595824 | 1.601033 | 1.605348 |
| L15, L16 | 1.516330 | 1.513855 | 1.521905 | 1.526213 | 1.529768 |
| L4, L5 | 1.806098 | 1.800248 | 1.819945 | 1.831173 | 1.840781(LB) |
| L10 | 1.834807 | 1.828975 | 1.848520 | 1.859547 | 1.868911 |
| L6 | 1.816000 | 1.810749 | 1.828252 | 1.837996 | 1.846185 |
| L7 | 1.693501 | 1.689548 | 1.702582 | 1.709715 | 1.715662 |
| L11 | 1.696797 | 1.692974 | 1.705522 | 1.712339 | 1.718005 |
| L12 | 2.000690 | 1.989410 | 2.028720 | 2.052834 | 2.074603 |
| L13 | 1.525400 | 1.522460 | 1.531800 | 1.537220 | 1.543549 |

NUMERICAL EXAMPLE 16

Unit mm

Surface data

| Surface no. number | r | d | nd | vd |
|---|---|---|---|---|
| Object plane | ∞ | ∞ | | |
| 1 | 26.3279 | 1.0000 | 2.14352 | 17.77 |
| 2 | 14.5172 | 1.8000 | | |
| 3 | ∞ | 9.5000 | 2.14352 | 17.77 |
| 4 | ∞ | 0.2000 | | |
| 5* | 11.2902 | 3.1000 | 1.74320 | 49.34 |
| 6* | −40.1582 | 0.1000 | 1.63494 | 23.22 |
| 7 | −55.9920 | Variable | | |
| 8 | −53.2497 | 0.5000 | 1.83481 | 42.71 |
| 9 | 6.4066 | 1.0000 | | |
| 10 | −8.9690 | 0.5000 | 1.80610 | 40.92 |
| 11 | 5.7354 | 1.4000 | 1.80810 | 22.76 |
| 12 | −89.8331 | Variable | | |
| 13(STOP) | ∞ | 0.8000 | | |
| 14* | 9.6873 | 1.5000 | 1.51633 | 64.14 |
| 15 | −40.2680 | Variable | | |
| 16* | 22.9449 | 1.8000 | 1.74320 | 49.34 |
| 17 | −8.4669 | 0.5000 | 1.80810 | 22.76 |
| 18 | −12.3980 | Variable | | |
| 19* | −11.2318 | 0.6000 | 2.14352 | 17.77 |
| 20 | 89.5111 | 5.7315 | | |
| 21* | 5.3980 | 2.2000 | 1.48749 | 70.23 |
| 22 | 8.2670 | Variable | | |
| 23 | ∞ | 0.8000 | 1.51633 | 64.14 |
| 24 | ∞ | 0.7994 | | |
| Image plane | ∞ | | | |

Aspherical Surface Data

5th Surface

K=0.0562,

A2=0.0000E+00,A4=−1.0635E−04,A6=−3.3073E−07, A8=−3.5038E−09,

A10=0.0000E+00

6th Surface

K=0.6015,

A2=0.0000E+00,A4=−3.1085E−04,A6=3.6175E−06,A8=− 1.5913E−08,

A10=0.0000E+00

14th Surface

K=0.0653,

A2=0.0000E+00,A4=−2.9532E−04,A6=−3.6675E−06, A8=2.7757E−07,

A10=0.0000E+00

16th Surface

K=−0.0724,

A2=0.0000E+00,A4=−3.3421E−04,A6=5.5697E−06,A8=− 4.4877E−07,

A10=0.0000E+00

19th Surface

K=0.0658,

A2=0.0000E+00,A4=5.3557E−04,A6=−1.9173E−05, A8=1.3380E−06,

A10=0.0000E+00

21th Surface

K=−0.0668,

A2=0.0000E+00,A4=−7.2957E−04,A6=−1.1862E−05, A8=−1.0182E−06,

A10=0.0000E+00

Numenical data
Zoom ratio 4.95

| | Wideangle | Intermediate | Telephoto |
|---|---|---|---|
| Focal length | 6.04854 | 13.53462 | 29.95479 |
| F number | 3.9500 | 4.2520 | 4.6745 |
| Image angle | 36.8° | 16.1° | 7.2° |
| Image height | 3.84 | 3.84 | 3.84 |
| Lens total length | 56.0119 | 55.9997 | 56.0110 |
| BF | 0.79942 | 0.79942 | 0.79942 |
| d7 | 0.60676 | 5.42276 | 8.83870 |
| d12 | 9.63307 | 4.79110 | 1.40123 |
| d15 | 5.10636 | 3.03570 | 1.28066 |
| d18 | 4.37904 | 6.46010 | 8.20476 |
| d22 | 2.45578 | 2.45578 | 2.45578 |

Zoom lens group data

| Group | Initial surface | focal length |
|---|---|---|
| 1 | 1 | 16.48040 |
| 2 | 8 | -4.22240 |
| 3 | 13 | 15.27984 |
| 4 | 16 | 11.42447 |
| 5 | 19 | -17.00590 |

Table of index of glass mateial
List of index per wavelength of medium used in the persent embodiment

| GLA | 587.56 | 656.27 | 486.13 | 435.84 | 404.66 |
|---|---|---|---|---|---|
| L4 | 1.634937 | 1.627308 | 1.654649 | 1.670903 | 1.685230(LA) |
| L1, L2, L11 | 2.143520 | 2.125601 | 2.189954 | 2.232324 | 2.273184 |
| L8, L13 | 1.516330 | 1.513855 | 1.521905 | 1.526213 | 1.529768 |
| L12 | 1.487490 | 1.485344 | 1.492285 | 1.495963 | 1.498983 |
| L6 | 1.806098 | 1.800248 | 1.819945 | 1.831173 | 1.840781 |
| L5 | 1.834807 | 1.828975 | 1.848520 | 1.859547 | 1.868911 |
| L3, L9 | 1.743198 | 1.738653 | 1.753716 | 1.762046 | 1.769040(LB) |
| L7, L10 | 1.808095 | 1.798009 | 1.833513 | 1.855902 | 1.876580 |

NUMERICAL EXAMPLE 17

Unit mm

Surface data

| Surface no. number | r | d | nd | vd |
|---|---|---|---|---|
| Object plane | ∞ | ∞ | | |
| 1 | 31.5550 | 1.0000 | 2.00069 | 25.46 |
| 2 | 14.3812 | 1.9000 | | |
| 3 | ∞ | 9.5000 | 2.14352 | 17.77 |
| 4 | ∞ | 0.2000 | | |
| 5* | 13.3840 | 0.1000 | 1.63494 | 23.22 |
| 6* | 9.5949 | 2.8000 | 1.74320 | 49.34 |
| 7* | -33.9738 | Variable | | |
| 8 | -110.3976 | 0.5000 | 1.80400 | 46.57 |
| 9 | 13.9738 | 0.4000 | | |
| 10 | -42.2586 | 0.5000 | 1.78800 | 47.37 |
| 11 | 21.6286 | 0.4000 | | |
| 12 | -14.6928 | 0.5000 | 1.77250 | 49.60 |
| 13 | 4.6945 | 1.0000 | 1.80810 | 22.76 |
| 14 | 16.5493 | Variable | | |
| 15(STOP) | ∞ | 0.8000 | | |
| 16* | 11.7378 | 1.5000 | 1.51633 | 64.14 |
| 17 | -40.2680 | Variable | | |
| 18* | 14.7240 | 2.2000 | 1.74320 | 49.34 |
| 19 | -6.4219 | 0.5000 | 1.80810 | 22.76 |
| 20 | -12.4275 | Variable | | |
| 21 | -86.9726 | 0.6000 | 2.09500 | 29.40 |
| 22 | 8.1530 | 6.9787 | | |
| 23* | 7.8706 | 3.0000 | 1.52540 | 56.25 |
| 24 | -31.6596 | Variable | | |
| 25 | ∞ | 0.8000 | 1.51633 | 64.14 |
| 26 | ∞ | 0.7994 | | |
| Image plane | ∞ | | | |

Aspherical Surface Data
5th Surface
$K=0.0342$,
$A2=0.0000E+00, A4=-5.1096E-05, A6=3.9696E-08, A8=-1.1548E-08$,
$A10=0.0000E+00$ 6th Surface
$K=0.2138$,
$A2=0.0000E+00, A4=-8.0734E-05, A6=-1.9246E-06$,
$A8=0.0000E+00$,
$A10=0.0000E+00$ 7th Surface
$K=0.0411$,
$A2=0.0000E+00, A4=2.5206E-05, A6=-3.6405E-07$,
$A8=0.0000E+00$,
$A10=0.0000E+00$ 16th Surface
$K=0.1251$,
$A2=0.0000E+00, A4=-2.2276E-04, A6=-4.1935E-06$,
$A8=1.3656E-07$,
$A10=0.0000E+00$ 18th Surface
$K=-0.0925$,
$A2=0.0000E+00, A4=-3.2272E-04, A6=4.4236E-06, A8=-2.4013E-07$,
$A10=0.0000E+00$ 23th Surface
$K=-0.1594$,
$A2=0.0000E+00, A4=8.6051E-06, A6=-5.3997E-06$,
$A8=2.9886E-08$,
$A10=0.0000E+00$

| Numenical data Zoom ratio 4.95 | | | |
|---|---|---|---|
| | Wideangle | Intermediate | Telephoto |
| Focal length | 6.04738 | 13.53474 | 29.95923 |
| F number | 3.9288 | 4.2410 | 4.8167 |
| Image angle | 36.8° | 16.0° | 7.2° |
| Image height | 3.84 | 3.84 | 3.84 |
| Lens total length | 58.0060 | 58.0110 | 58.0044 |
| BF | 0.79940 | 0.79940 | 0.79940 |
| d7 | 0.60051 | 5.39340 | 8.67990 |
| d14 | 9.46571 | 4.67549 | 1.38634 |
| d17 | 5.22371 | 3.31714 | 1.36251 |
| d20 | 4.17404 | 6.08801 | 8.03548 |
| d24 | 2.56393 | 2.56393 | 2.56393 |

| Zoom lens group data | | |
|---|---|---|
| Group | Initial surface | focal length |
| 1 | 1 | 16.49250 |
| 2 | 8 | −4.30301 |
| 3 | 15 | 17.77685 |
| 4 | 18 | 9.88546 |
| 5 | 21 | 44.68218 |

| Table of index of glass mateial | List of index per wavelength of medium used in the persent embodiment | | | |
|---|---|---|---|---|
| GLA | 587.56 | 656.27 | 486.13 | 435.84 | 404.66 |
| L13 | 1.525399 | 1.522577 | 1.531916 | 1.537043 | 1.541302 |
| L12 | 2.094997 | 2.084179 | 2.121419 | 2.143451 | 2.162626 |
| L3 | 1.634937 | 1.627308 | 1.654649 | 1.670838 | 1.685096(LA) |
| L2 | 2.143520 | 2.125601 | 2.189954 | 2.232324 | 2.273184 |
| L9, L14 | 1.516330 | 1.513855 | 1.521905 | 1.526213 | 1.529768 |
| L6 | 1.788001 | 1.782998 | 1.799634 | 1.808881 | 1.816664 |
| L5 | 1.804000 | 1.798815 | 1.816080 | 1.825698 | 1.833800 |
| L7 | 1.772499 | 1.767798 | 1.783374 | 1.791971 | 1.799174 |
| L4, L10 | 1.743198 | 1.738653 | 1.753716 | 1.762046 | 1.769040(LB) |
| L8, L11 | 1.808095 | 1.798009 | 1.833513 | 1.855902 | 1.876580 |
| L1 | 2.000690 | 1.989410 | 2.028720 | 2.052834 | 2.074600 |

NUMERICAL EXAMPLE 18

Unit mm

| Surface data | | | | |
|---|---|---|---|---|
| Surface no. number | r | d | nd | vd |
| Object plane | ∞ | ∞ | | |
| 1 | 27.6145 | 1.0000 | 2.00069 | 25.46 |
| 2 | 13.0239 | 2.1000 | | |
| 3 | ∞ | 9.5000 | 2.14352 | 17.77 |
| 4 | ∞ | 0.2000 | | |
| 5* | 13.1656 | 0.1000 | 1.63494 | 23.22 |
| 6* | 9.5250 | 2.8000 | 1.74320 | 49.34 |
| 7* | −32.7902 | Variable | | |
| 8 | −32.8022 | 0.5000 | 1.80400 | 46.57 |
| 9 | 11.6063 | 0.6000 | | |
| 10 | −31.9837 | 0.5000 | 1.77250 | 49.60 |
| 11 | 4.9153 | 1.0000 | 1.80810 | 22.76 |
| 12 | 18.1580 | 0.4000 | | |

-continued

| Surface data | | | | |
|---|---|---|---|---|
| Surface no. number | r | d | nd | vd |
| 13 | −25.1963 | 0.5000 | 1.78800 | 47.37 |
| 14 | 36.1464 | Variable | | |
| 15(STOP) | ∞ | 0.8000 | | |
| 16* | 12.5130 | 1.5000 | 1.51633 | 64.14 |
| 17 | −43.0156 | Variable | | |
| 18* | 15.0982 | 2.2000 | 1.74320 | 49.34 |
| 19 | −6.5686 | 0.5000 | 1.80810 | 22.76 |
| 20 | −12.4845 | Variable | | |
| 21 | −60.8709 | 0.6000 | 2.09500 | 29.40 |
| 22 | 10.3767 | 7.3472 | | |
| 23* | 7.4713 | 2.3000 | 1.52540 | 56.25 |
| 24 | 40.1581 | Variable | | |
| 25 | ∞ | 0.8000 | 1.51633 | 64.14 |
| 26 | ∞ | 0.8001 | | |
| Image plane | ∞ | | | |

Aspherical Surface Data

5th Surface

K=0.0291,

A2=0.0000E+00,A4=−4.4047E−05,A6=1.3091E−07,A8=−1.1089E−08,

A10=0.0000E+00

6th Surface

K=0.1497,

A2=0.0000E+00,A4=−1.2063E−04,A6=−2.7557E−06, A8=0.0000E+00,

A10=0.0000E+00

7th Surface

K=0.0325,

A2=0.0000E+00,A4=2.2798E−05,A6=−3.3627E−07, A8=0.0000E+00,

A10=0.0000E+00

16th Surface

K=0.1348,

A2=0.0000E+00,A4=−1.8990E−04,A6=−6.2525E−06, A8=3.0401E−07,

A10=0.0000E+00

18th Surface

K=−0.1035,

A2=0.0000E+00,A4=−3.0165E−04,A6=4.9551E−06,A8=−2.7005E−07,

A10=0.0000E+00

23th Surface
K=−0.1697,
A2=0.0000E+00,A4=1.7420E−05,A6=−6.7687E−06,
    A8=7.0760E−08,
A10=0.0000E+00

Numenical data
Zoom ratio 4.96

|  | Wideangle | Intermediate | Telephoto |
|---|---|---|---|
| Focal length | 6.04558 | 13.53353 | 29.95661 |
| F number | 3.9288 | 4.2737 | 4.8656 |
| Image angle | 36.8° | 16.0° | 7.2° |
| Image height | 3.84 | 3.84 | 3.84 |
| Lens total length | 58.0136 | 58.0246 | 58.0135 |
| BF | 0.80009 | 0.80009 | 0.80009 |
| d7 | 0.60348 | 5.37422 | 8.66850 |
| d14 | 9.44247 | 4.67824 | 1.37750 |
| d17 | 5.11648 | 3.19734 | 1.25573 |
| d20 | 4.13795 | 6.06764 | 7.99887 |
| d24 | 2.66593 | 2.66593 | 2.66593 |

Zoom lens group data

| Group | Initial surface | focal length |
|---|---|---|
| 1 | 1 | 16.14071 |
| 2 | 8 | −4.35163 |
| 3 | 15 | 18.94768 |
| 4 | 18 | 10.00503 |
| 5 | 21 | −70.71964 |

| Table of index of glass mateial | List of index per wavelength of medium used in the persent embodiment | | | | |
|---|---|---|---|---|---|
| GLA | 587.56 | 656.27 | 486.13 | 435.84 | 404.66 |
| L13 | 1.525399 | 1.522577 | 1.531916 | 1.537043 | 1.541302 |
| L12 | 2.094997 | 2.084179 | 2.121419 | 2.143451 | 2.162626 |
| L3 | 1.634937 | 1.627308 | 1.654649 | 1.670838 | 1.685096(LA) |
| L2 | 2.143520 | 2.125601 | 2.189954 | 2.232324 | 2.273184 |
| L9, L14 | 1.516330 | 1.513855 | 1.521905 | 1.526213 | 1.529768 |
| L8 | 1.788001 | 1.782998 | 1.799634 | 1.808881 | 1.816664 |
| L5 | 1.804000 | 1.798815 | 1.816080 | 1.825698 | 1.833800 |
| L6 | 1.772499 | 1.767798 | 1.783374 | 1.791971 | 1.799174 |
| L4, L10 | 1.743198 | 1.738653 | 1.753716 | 1.762046 | 1.769040(LB) |
| L7, L11 | 1.808095 | 1.798009 | 1.833513 | 1.855902 | 1.876580 |
| L1 | 2.000690 | 1.989410 | 2.028720 | 2.052834 | 2.074600 |

NUMERICAL EXAMPLE 19

Unit mm

Surface data

| Surface no. number | r | d | nd | vd |
|---|---|---|---|---|
| Object plane | ∞ | ∞ | | |
| 1 | 33.4710 | 1.0000 | 2.14352 | 17.77 |
| 2 | 12.9962 | 2.8000 | | |
| 3 | ∞ | 10.8000 | 1.80610 | 40.92 |
| 4 | ∞ | 0.2000 | | |
| 5* | 19.2835 | 2.8000 | 1.88300 | 40.76 |
| 6* | −16.8921 | 0.1000 | 1.63494 | 23.22 |
| 7* | −35.4351 | Variable | | |
| 8 | 75.9305 | 0.5000 | 1.83481 | 42.71 |
| 9* | 10.5861 | 1.5000 | | |
| 10 | −13.7278 | 0.5000 | 1.80610 | 40.92 |
| 11 | 13.0118 | 1.4000 | 1.94595 | 17.98 |
| 12 | −115.5205 | Variable | | |
| 13(STOP) | ∞ | Variable | | |
| 14 | 7.9132 | 2.5000 | 1.83481 | 42.71 |
| 15* | −30.7581 | 0.1500 | | |
| 16 | 9.7936 | 1.6000 | 1.69680 | 55.53 |
| 17 | −102.6373 | 0.5000 | 2.00069 | 25.46 |
| 18 | 5.4145 | Variable | | |
| 19* | 10.1411 | 1.6000 | 1.52540 | 56.25 |
| 20 | 59.8729 | Variable | | |
| 21* | −14.7089 | 0.6000 | 2.14352 | 17.77 |
| 22 | 33.2642 | 2.2000 | 1.48749 | 70.23 |
| 23 | −7.5004 | 0.6000 | | |
| 24 | ∞ | 0.8000 | 1.51633 | 64.14 |
| 25 | ∞ | 0.8000 | | |
| Image plane | ∞ | | | |

Aspherical Surface Data

5th Surface
K=0.0655,
A2=0.0000E+00,A4=−1.8786E−05,A6=−5.1022E−08,
    A8=−2.0153E−08,
A10=0.0000E+00

6th Surface
K=−0.0017,
A2=0.0000E+00,A4=−3.1676E−05,A6=−9.6311E−07,
    A8=2.1464E−08,
A10=0.0000E+00

7th Surface
K=−0.0518,
A2=0.0000E+00,A4=4.6312E−05,A6=3.3508E−08,A8=−
    3.3276E−08,
A10=0.0000E+00

9th Surface
K=−0.9593,
A2=0.0000E+00,A4=1.3237E−0,A6=4.4415E−06,
    A8=2.0304E−07,
A10=0.0000E+00

14th Surface
K=−0.6103,
A2=0.0000E+00,A4=−9.4698E−05,A6=5.3709E−06,
   A8=2.2063E−08,
A10=0.0000E+00
15th Surface
K=−0.2133,
A2=0.0000E+00,A4=7.8028E−05,A6=8.2038E−06,A8=−
   7.1469E−08,
A10=0.0000E+00
19th Surface
K=0.0476,
A2=0.0000E+00,A4=−2.6880E−04,A6=1.9804E−05,A8=−
   7.9341E−07,
A10=0.0000E+00
21th Surface
K=0.2918,
A2=0.0000E+00,A4=2.5142E−04,A6=−3.6396E−05,
   A8=1.2752E−06,
A10=0.0000E+00

Numenical data
Zoom ratio 4.95

|  | Wideangle | Intermediate | Telephoto |
|---|---|---|---|
| Focal length | 6.05039 | 13.53414 | 29.95972 |
| F number | 3.0564 | 4.1881 | 5.9000 |
| Image angle | 36.4° | 16.0° | 7.2° |
| Image height | 3.84 | 3.84 | 3.84 |
| Lens total length | 61.0003 | 61.0024 | 61.0002 |
| BF | 0.79999 | 0.79999 | 0.79999 |
| d7 | 0.59926 | 5.32689 | 9.12350 |
| d12 | 9.92449 | 5.19984 | 1.40021 |
| d13 | 9.36940 | 5.00235 | 1.19989 |
| d18 | 2.93279 | 7.34767 | 14.82686 |
| d20 | 5.22433 | 5.17489 | 1.49978 |

Zoom lens group data

| Group | Initial surface | focal length |
|---|---|---|
| 1 | 1 | 16.42092 |
| 2 | 8 | −9.09682 |
| 3 | 14 | 13.68623 |
| 4 | 19 | 22.98277 |
| 5 | 21 | −45.30237 |

NUMERICAL EXAMPLE 20

Unit mm

Surface data

| Surface no. number | r | d | nd | νd |
|---|---|---|---|---|
| Object plane | ∞ | ∞ | | |
| 1 | 33.4776 | 1.0000 | 2.14352 | 17.77 |
| 2 | 12.9936 | 2.8000 | | |
| 3 | ∞ | 10.8000 | 1.80610 | 40.92 |
| 4 | ∞ | 0.2000 | | |
| 5* | 19.2816 | 2.8000 | 1.88300 | 40.76 |
| 6* | −16.7752 | 0.1000 | 1.63494 | 23.22 |
| 7* | −35.6383 | Variable | | |
| 8 | 75.4657 | 0.5000 | 1.83481 | 42.71 |
| 9* | 10.5985 | 1.5000 | | |
| 10 | −13.7400 | 0.5000 | 1.80610 | 40.92 |
| 11 | 13.1537 | 1.4000 | 1.94595 | 17.98 |
| 12 | −116.2215 | Variable | | |
| 13(STOP) | ∞ | Variable | | |
| 14* | 7.9152 | 2.5000 | 1.83481 | 42.71 |
| 15* | −30.6505 | 0.1500 | | |
| 16 | 9.7769 | 1.6000 | 1.69680 | 55.53 |
| 17 | −92.2177 | 0.5000 | 2.00069 | 25.46 |
| 18 | 5.4154 | Variable | | |
| 19* | 10.1327 | 1.6000 | 1.52540 | 56.25 |
| 20 | 60.0607 | Variable | | |
| 21* | −14.7118 | 0.6000 | 2.14352 | 17.77 |
| 22 | 32.3991 | 2.2000 | 1.48749 | 70.23 |
| 23 | −7.4149 | 0.6000 | | |
| 24 | ∞ | 0.8000 | 1.51633 | 64.14 |
| 25 | ∞ | 0.8000 | | |
| Image plane | ∞ | | | |

Aspherical Surface Data

5th Surface

K=0.0654,

A2=0.0000E+00,A4=−1.7912E−05,A6=−8.4099E−08,
   A8=−2.2301E−08,

A10=0.0000E+00

6th Surface

K=−0.0010,

A2=0.0000E+00,A4=−5.2983E−05,A6=−1.1913E−06,
   A8=2.5781E−08,

A10=0.0000E+00

| Table of index of glass mateial | List of index per wavelength of medium used in the persent embodiment | | | | |
|---|---|---|---|---|---|
| GLA | 587.56 | 656.27 | 486.13 | 435.84 | 404.66 |
| L4 | 1.634937 | 1.627308 | 1.654649 | 1.672358 | 1.688770(LA) |
| L7 | 1.945950 | 1.931230 | 1.983830 | 2.018254 | 2.051060 |
| L1, L12 | 2.143520 | 2.125601 | 2.189954 | 2.232324 | 2.273184 |
| L14 | 1.516330 | 1.513855 | 1.521905 | 1.526213 | 1.529768 |
| L13 | 1.487490 | 1.485344 | 1.492285 | 1.495963 | 1.498983 |
| L2, L6 | 1.806098 | 1.800248 | 1.819945 | 1.831173 | 1.840781 |
| L5, L8 | 1.834807 | 1.828975 | 1.848520 | 1.859547 | 1.868911 |
| L3 | 1.882997 | 1.876560 | 1.898221 | 1.910495 | 1.920919(LB) |
| L9 | 1.696797 | 1.692974 | 1.705522 | 1.712339 | 1.718005 |
| L10 | 2.000690 | 1.989410 | 2.028720 | 2.052834 | 2.074600 |
| L11 | 1.525400 | 1.522460 | 1.531800 | 1.537220 | 1.543548 |

7th Surface
K=−0.0517,
A2=0.0000E+00,A4=5.6310E−05,A6=8.1948E−08,A8=−3.8424E−08,
A10=0.0000E+00
9th Surface
K=−0.9593,
A2=0.0000E+00,A4=1.3082E−04,A6=4.2714E−06, A8=2.1363E−07,
A10=0.0000E+00
14th Surface
K=−0.6103,
A2=0.0000E+00,A4=−9.2630E−05,A6=5.1937E−06, A8=1.9358E−08,
A10=0.0000E+00
15th Surface
K=−0.2133,
A2=0.0000E+00,A4=8.0160E−05,A6=7.8952E−06,A8=−7.1791E−08,
A10=0.0000E+00
19th Surface
K=0.0476,
A2=0.0000E+00,A4=−2.6270E−04,A6=1.9142E−05,A8=−7.7815E−07,
A10=0.0000E+00
21th Surface
K=0.2918,
A2=0.0000E+00,A4=2.2001E−04,A6=−3.3663E−05, A8=1.1928E−06,
A10=0.0000E+00

Numenical data
Zoom ratio 4.95

|  | Wideangle | Intermediate | Telephoto |
|---|---|---|---|
| Focal length | 6.05138 | 13.53442 | 29.95981 |
| F number | 3.0564 | 4.1881 | 5.9000 |
| Image angle | 36.4° | 16.0° | 7.2° |
| Image height | 3.84 | 3.84 | 3.84 |
| Lens total length | 61.0004 | 61.0037 | 61.0004 |
| BF | 0.79997 | 0.79997 | 0.79997 |
| d7 | 0.59933 | 5.32720 | 9.12347 |
| d12 | 9.92451 | 5.20083 | 1.40034 |
| d13 | 9.36966 | 5.00255 | 1.20007 |
| d18 | 2.93283 | 7.34773 | 14.82672 |
| d20 | 5.22409 | 5.17494 | 1.49982 |

Zoom lens group data

| Group | Initial surface | focal length |
|---|---|---|
| 1 | 1 | 16.42083 |
| 2 | 8 | −9.09966 |
| 3 | 14 | 13.69037 |
| 4 | 19 | 22.94628 |
| 5 | 21 | −46.14132 |

| Table of index of glass mateial | List of index per wavelength of medium used in the persent embodiment | | | | |
|---|---|---|---|---|---|
| GLA | 587.56 | 656.27 | 486.13 | 435.84 | 404.66 |
| L4 | 1.634937 | 1.627308 | 1.654649 | 1.670903 | 1.685230(LA) |
| L7 | 1.945950 | 1.931230 | 1.983830 | 2.018254 | 2.051060 |
| L1, L12 | 2.143520 | 2.125601 | 2.189954 | 2.232324 | 2.273184 |
| L14 | 1.516330 | 1.513855 | 1.521905 | 1.526213 | 1.529768 |
| L13 | 1.487490 | 1.485344 | 1.492285 | 1.495963 | 1.498983 |
| L2, L6 | 1.806098 | 1.800248 | 1.819945 | 1.831173 | 1.840781 |
| L5, L8 | 1.834807 | 1.828975 | 1.848520 | 1.859547 | 1.868911 |
| L3 | 1.882997 | 1.876560 | 1.898221 | 1.910495 | 1.920919(LB) |
| L9 | 1.696797 | 1.692974 | 1.705522 | 1.712339 | 1.718005 |
| L10 | 2.000690 | 1.989410 | 2.028720 | 2.052834 | 2.074600 |
| L11 | 1.525400 | 1.522460 | 1.531800 | 1.537220 | 1.543548 |

NUMERICAL EXAMPLE 21

Unit mm

Surface data

| Surface no. number | r | d | nd | vd |
|---|---|---|---|---|
| Object plane | ∞ | ∞ | | |
| 1 | 67.5141 | 0.8000 | 2.14352 | 17.77 |
| 2 | 12.4629 | 1.7000 | | |
| 3 | ∞ | 10.5000 | 2.14352 | 17.77 |
| 4 | ∞ | 0.2000 | | |
| 5 | 28.3077 | 2.3000 | 1.88300 | 40.76 |
| 6 | −42.1221 | 0.1500 | | |
| 7* | 26.4718 | 2.5000 | 1.80610 | 40.92 |
| 8* | −24.2438 | 0.1000 | 1.63494 | 23.22 |
| 9* | −42.8986 | Variable | | |
| 10 | −41.5701 | 0.5000 | 1.83481 | 42.71 |
| 11 | 6.7905 | 1.2000 | | |
| 12* | −16.3859 | 0.5000 | 1.81600 | 46.62 |
| 13 | 25.3970 | 0.7500 | 1.70000 | 17.00 |
| 14* | −15.4254 | Variable | | |
| 15(STOP) | ∞ | Variable | | |
| 16* | 6.4966 | 2.5000 | 1.83481 | 42.71 |
| 17* | −47.8593 | 0.1500 | | |
| 18 | 8.7182 | 1.6000 | 1.69680 | 55.53 |
| 19 | −81.2701 | 0.5000 | 2.00069 | 25.46 |
| 20 | 4.3478 | Variable | | |
| 21* | 17.8837 | 1.6000 | 1.52540 | 56.25 |
| 22 | −24.7081 | Variable | | |
| 23 | −8.9832 | 0.6000 | 2.14352 | 17.77 |
| 24 | −34.0351 | 0.1500 | | |
| 25 | 13.3837 | 3.2000 | 1.48749 | 70.23 |
| 26 | −8.3263 | 0.7000 | | |
| 27 | ∞ | 0.8000 | 1.51633 | 64.14 |
| 28 | ∞ | 0.7998 | | |
| Image plane | ∞ | | | |

Aspherical Surface Data
7th Surface
K=−0.0776,
A2=0.0000E+00,A4=−4.9141E−05,A6=−1.7160E−07, A8=−1.3616E−09,
A10=0.0000E+00
8th Surface
K=−0.0823,
A2=0.0000E+00,A4=−7.7052E−05,A6=2.0957E−06,A8=−9.2575E−09,
A10=0.0000E+00
9th Surface
K=0.1349,
A2=0.0000E+00,A4=−2.2956E−05,A6=−5.7365E−07, A8=2.2042E−09,
A10=0.0000E+00
12th Surface
K=−0.0767,
A2=0.0000E+00,A4=−1.7182E−03,A6=−3.8733E−05, A8=−8.4406E−07,
A10=0.0000E+00
13th Surface
K=−0.2183,
A2=0.0000E+00,A4=−1.8719E−03,A6=−9.1285E−05, A8=4.4244E−06,
A10=0.0000E+00
14th Surface
K=0.0761,
A2=0.0000E+00,A4=−1.5810E−03,A6=−1.4913E−05, A8=−3.0111E−07,
A10=0.0000E+00
16th Surface
K=−0.6292,
A2=0.0000E+00,A4=−2.2132E−05,A6=3.7419E−06, A8=1.4581E−07,
A10=0.0000E+00
17th Surface
K=10.3737,
A2=0.0000E+00,A4=2.1824E−04,A6=2.3661E−06, A8=1.7479E−07,
A10=0.0000E+00
21th Surface
K=−1.4069,
A2=0.0000E+00,A4=1.7760E−05,A6=−3.9515E−06,A8=−6.1963E−07,
A10=0.0000E+00

| Numenical data Zoom ratio 4.95 | | | |
|---|---|---|---|
| | Wideangle | Intermediate | Telephoto |
| Focal length | 6.05258 | 13.53416 | 29.95986 |
| F number | 3.9319 | 3.9936 | 4.9005 |
| Image angle | 36.7° | 15.7° | 7.2° |
| Image height | 3.84 | 3.84 | 3.84 |
| Lens total length | 58.8084 | 58.8092 | 58.8085 |
| BF | 0.79979 | 0.79979 | 0.79979 |
| d9 | 0.59813 | 6.03720 | 8.33540 |
| d14 | 9.13911 | 3.70289 | 1.40179 |
| d15 | 5.89781 | 5.58816 | 1.20014 |
| d20 | 3.43477 | 3.58672 | 12.57052 |
| d22 | 5.93878 | 6.09094 | 1.50072 |

| Zoom lens group data | | |
|---|---|---|
| Group | Initial surface | focal length |
| 1 | 1 | 12.03169 |
| 2 | 10 | −6.76403 |
| 3 | 16 | 13.04885 |
| 4 | 21 | 20.00489 |
| 5 | 23 | 71.37788 |

| Table of index of glass mateial | List of index per wavelength of medium used in the persent embodiment | | | | |
|---|---|---|---|---|---|
| GLA | 587.56 | 656.27 | 486.13 | 435.84 | 404.66 |
| L8 | 1.699996 | 1.688919 | 1.730090 | 1.758753 | 1.786496 |
| L5 | 1.634937 | 1.627308 | 1.654649 | 1.670343 | 1.683846(LA) |
| L1, L2, L13 | 2.143520 | 2.125601 | 2.189954 | 2.232324 | 2.273184 |
| L15 | 1.516330 | 1.513855 | 1.521905 | 1.526213 | 1.529768 |
| L14 | 1.487490 | 1.485344 | 1.492285 | 1.495963 | 1.498983 |
| L4 | 1.806098 | 1.800248 | 1.819945 | 1.831173 | 1.840781(LB) |
| L6, L9 | 1.834807 | 1.828975 | 1.848520 | 1.859547 | 1.868911 |
| L3 | 1.882997 | 1.876560 | 1.898221 | 1.910495 | 1.920919 |
| L7 | 1.816000 | 1.810749 | 1.828252 | 1.837996 | 1.846185 |
| L10 | 1.696797 | 1.692974 | 1.705522 | 1.712339 | 1.718005 |
| L11 | 2.000690 | 1.989410 | 2.028720 | 2.052834 | 2.074600 |
| L12 | 1.525400 | 1.522460 | 1.531800 | 1.537220 | 1.543548 |

NUMERICAL EXAMPLE 22

Unit mm

| Surface data | | | | |
|---|---|---|---|---|
| Surface no. number | r | d | nd | νd |
| Object plane | ∞ | ∞ | | |
| 1 | 29.7801 | 1.0000 | 2.14352 | 17.77 |
| 2 | 10.4674 | 2.0000 | | |
| 3 | ∞ | 9.8000 | 2.14352 | 17.77 |
| 4 | ∞ | 0.2000 | | |
| 5* | 57.5878 | 0.1000 | 1.63494 | 23.22 |

-continued

Surface data

| Surface no. number | r | d | nd | vd |
|---|---|---|---|---|
| 6* | 24.4109 | 2.4000 | 1.80610 | 40.92 |
| 7* | −25.9249 | 0.1500 | | |
| 8 | 19.6941 | 1.8000 | 1.80610 | 40.92 |
| 9 | −104.0816 | Variable | | |
| 10 | −46.5255 | 0.5000 | 1.81600 | 46.62 |
| 11 | 11.8487 | 0.9000 | | |
| 12* | −15.9173 | 0.6000 | 1.69350 | 53.21 |
| 13* | 10.1569 | 0.5000 | 1.73000 | 16.50 |
| 14* | 102.1849 | Variable | | |
| 15(STOP) | ∞ | Variable | | |
| 16* | 7.5583 | 2.5000 | 1.83481 | 42.71 |
| 17* | −23.9703 | 0.1500 | | |
| 18 | 15.0114 | 1.6000 | 1.69680 | 55.53 |
| 19 | −21.1796 | 0.5000 | 2.00069 | 25.46 |
| 20 | 6.7941 | Variable | | |
| 21* | 11.3456 | 1.6000 | 1.52540 | 56.25 |
| 22 | −132.5592 | Variable | | |
| 23 | −8.3919 | 0.6000 | 2.14352 | 17.77 |
| 24 | −29.5410 | 2.0000 | 1.51633 | 64.14 |
| 25 | −6.6963 | 0.6000 | | |
| 26 | ∞ | 0.8000 | 1.51633 | 64.14 |
| 27 | ∞ | 0.8005 | | |
| Image plane | ∞ | | | |

Aspherical Surface Data
5th Surface
K=−0.3349,
A2=0.0000E+00,A4=1.1045E−04,A6=−3.9973E−06,
 A8=6.1093E−08,
A10=0.0000E+00
6th Surface
K=−0.0180,
A2=0.0000E+00,A4=−8.0112E−05,A6=1.0261E−05,A8=−
 2.8958E−07,
A10=0.0000E+00
7th Surface
K=−0.0596,
A2=0.0000E+00,A4=4.4889E−05,A6=−8.9801E−07,A8=−
 1.4756E−08,
A10=0.0000E+00
12th Surface
K=−0.3292,
A2=0.0000E+00,A4=9.0701E−04,A6=−1.0864E−04,
 A8=4.3549E−06,
A10=0.0000E+00
13th Surface
K=−1.0000,
A2=0.0000E+00,A4=2.0000E−04,A6=0.0000E+00,
 A8=0.0000E+00,
A10=0.0000E+00
14th Surface
K=2.5284,
A2=0.0000E+00,A4=6.5779E−04,A6=−7.5772E−05,
 A8=3.5817E−06,
A10=0.0000E+00
16th Surface
K=−0.5897,
A2=0.0000E+00,A4=1.8059E−04,A6=1.6350E−05,
 A8=1.5709E−06,
A10=0.0000E+00
17th Surface
K=−0.7459,
A2=0.0000E+00,A4=6.0932E−04,A6=1.3233E−05,
 A8=3.0884E−06,
A10=0.0000E+00
21th Surface
K=−0.6970,
A2=0.0000E+00,A4=−1.8793E−04,A6=2.4704E−05,A8=−
 8.8962E−07,
A10=0.0000E+00

Numenical data
Zoom ratio 4.95

| | Wideangle | Intermediate | Telephoto |
|---|---|---|---|
| Focal length | 6.05246 | 13.53342 | 29.95794 |
| F number | 3.4418 | 4.0614 | 5.9000 |
| Image angle | 36.1° | 15.9° | 7.2° |
| Image height | 3.84 | 3.84 | 3.84 |
| Lens total length | 56.7638 | 56.7689 | 56.7627 |
| BF | 0.80053 | 0.80053 | 0.80053 |
| d9 | 0.59837 | 5.38111 | 8.10776 |
| d14 | 8.90529 | 4.13335 | 1.39591 |
| d15 | 6.97823 | 4.84538 | 1.19776 |
| d20 | 3.60819 | 5.34088 | 13.46137 |
| d22 | 5.57320 | 5.95709 | 1.50052 |

Zoom lens group data

| Group | Initial surface | focal length |
|---|---|---|
| 1 | 1 | 12.97602 |
| 2 | 10 | −7.23579 |
| 3 | 16 | 12.81998 |
| 4 | 21 | 19.96820 |
| 5 | 23 | −44.32565 |

| Table of index of glass mateial | List of index per wavelength of medium used in the persent embodiment | | | | |
|---|---|---|---|---|---|
| GLA | 587.56 | 656.27 | 486.13 | 435.84 | 404.66 |
| L3 | 1.634937 | 1.627308 | 1.654649 | 1.672358 | 1.688773(LA) |
| L8 | 1.729996 | 1.718099 | 1.762336 | 1.793147 | 1.822977 |
| L1, L2, L13 | 2.143520 | 2.125601 | 2.189954 | 2.232324 | 2.273190 |
| L14, L15 | 1.516330 | 1.513855 | 1.521905 | 1.526213 | 1.529768 |
| L4, L5 | 1.806098 | 1.800248 | 1.819945 | 1.831173 | 1.840781(LB) |
| L9 | 1.834807 | 1.828975 | 1.848520 | 1.859547 | 1.868911 |
| L6 | 1.816000 | 1.810749 | 1.828252 | 1.837996 | 1.846185 |
| L7 | 1.693501 | 1.689548 | 1.702582 | 1.709715 | 1.715662 |
| L10 | 1.696797 | 1.692974 | 1.705522 | 1.712339 | 1.718005 |
| L11 | 2.000690 | 1.989410 | 2.028720 | 2.052834 | 2.074603 |
| L12 | 1.525400 | 1.522460 | 1.531800 | 1.537220 | 1.543549 |

NUMERICAL EXAMPLE 23

Unit mm

Surface data

| Surface no. number | r | d | nd | vd |
|---|---|---|---|---|
| Object plane | ∞ | ∞ | | |
| 1 | 146.1701 | 1.0000 | 2.00069 | 25.46 |
| 2 | 12.7259 | 2.2000 | | |
| 3 | ∞ | 9.5000 | 2.14352 | 17.77 |
| 4 | ∞ | 0.2000 | | |
| 5 | 33.2166 | 2.1000 | 1.74320 | 49.34 |
| 6 | −26.5534 | 0.1500 | | |
| 7* | 27.0559 | 0.1000 | 1.66000 | 20.00 |
| 8* | 14.6905 | 2.0000 | 1.80610 | 40.92 |
| 9* | −50.6585 | Variable | | |
| 10 | −601.9754 | 0.5000 | 1.83481 | 42.71 |
| 11* | 12.3070 | 1.2000 | | |
| 12 | −13.7650 | 0.5000 | 1.83481 | 42.71 |
| 13 | 8.0593 | 1.3000 | 1.94595 | 17.98 |
| 14 | 34.8494 | Variable | | |
| 15(STOP) | ∞ | Variable | | |
| 16* | 7.2533 | 2.3000 | 1.80610 | 40.92 |
| 17* | −40.8368 | 0.1500 | | |
| 18 | 8.7261 | 2.4000 | 1.69680 | 55.53 |
| 19 | −8.3759 | 0.2000 | 1.66000 | 20.00 |
| 20 | −18.4148 | 0.5000 | 2.09500 | 29.40 |
| 21* | 5.1627 | Variable | | |
| 22* | 8.8983 | 1.6000 | 1.52540 | 56.25 |
| 23 | 25.9180 | Variable | | |
| 24 | 12.9331 | 0.6000 | 2.09500 | 29.40 |
| 25 | 7.2378 | 2.3000 | 1.51742 | 52.43 |
| 26 | −83.6666 | 1.0000 | | |
| 27 | ∞ | 0.8675 | 1.51633 | 64.14 |
| 28 | ∞ | 0.9998 | | |
| Image plane | ∞ | | | |

Aspherical Surface Data
7th Surface
K=−0.0313,
A2=0.0000E+00,A4=1.2722E−05,A6=−1.0302E−06,A8=−2.5692E−08,
A10=0.0000E+00
8th Surface
K=−0.1603,
A2=0.0000E+00,A4=5.6960E−05,A6=−3.1938E−06,A8=5.5804E−08,
A10=0.0000E+00
9th Surface
K=0.1383,
A2=0.0000E+00,A4=4.2020E−05,A6=−2.4211E−06,A8=5.7280E−09,
A10=0.0000E+00
11th Surface
K=−0.8907,
A2=0.0000E+00,A4=−4.3081E−05,A6=2.0637E−05,A8=−4.6555E−07,
A10=0.0000E+00
16th Surface
K=−0.6054,
A2=0.0000E+00,A4=4.4377E−04,A6=6.5556E−06, A8=2.8980E−06,
A10=0.0000E+00
17th Surface
K=−0.9025,
A2=0.0000E+00,A4=8.4799E−04,A6=−8.1763E−06, A8=5.9727E−06,
A10=0.0000E+00
22th Surface
K=−0.6752,
A2=0.0000E+00,A4=2.9479E−05,A6=3.8672E−06,A8=−4.5181E−08,
A10=0.0000E+00

Numenical data
Zoom ratio 4.95

| | Wideangle | Intermediate | Telephoto |
|---|---|---|---|
| Focal length | 6.05085 | 13.53484 | 29.95876 |
| F number | 3.8054 | 4.0571 | 5.9000 |
| Image angle | 36.7° | 15.5° | 7.2° |
| Image height | 3.84 | 3.84 | 3.84 |
| Lens total length | 59.0021 | 59.0058 | 59.0021 |
| BF | 0.99981 | 0.99981 | 0.99981 |
| d9 | 0.59913 | 5.71699 | 8.15818 |
| d14 | 8.95504 | 3.84264 | 1.39602 |
| d15 | 6.66833 | 5.97666 | 1.19734 |
| d21 | 3.90240 | 3.58864 | 12.58401 |
| d23 | 5.20992 | 6.21400 | 1.99936 |

Zoom lens group data

| Group | Initial surface | focal length |
|---|---|---|
| 1 | 1 | 12.43533 |
| 2 | 10 | −6.57552 |
| 3 | 16 | 12.53800 |
| 4 | 22 | 24.98205 |
| 5 | 24 | 78.30348 |

| Table of index of glass mateial | List of index per wavelength of medium used in the persent embodiment | | | | |
|---|---|---|---|---|---|
| GLA | 587.56 | 656.27 | 486.13 | 435.84 | 404.66 |
| L12, 14 | 2.094997 | 2.084179 | 2.121419 | 2.143451 | 2.162629 |
| L4, L11 | 1.659997 | 1.650951 | 1.683947 | 1.703411 | 1.720477(LA) |
| L8 | 1.945950 | 1.931230 | 1.983830 | 2.018254 | 2.051063 |
| L2 | 2.143520 | 2.125601 | 2.189954 | 2.232324 | 2.273190 |
| L16 | 1.516330 | 1.513855 | 1.521905 | 1.526213 | 1.529768 |
| L5, L9 | 1.806098 | 1.800248 | 1.819945 | 1.831173 | 1.840781(LB) |
| L6, L7 | 1.834807 | 1.828975 | 1.848520 | 1.859547 | 1.868911 |
| L10 | 1.696797 | 1.692974 | 1.705522 | 1.712339 | 1.718005 |
| L3 | 1.743198 | 1.738653 | 1.753716 | 1.762046 | 1.769040 |
| L15 | 1.517417 | 1.514444 | 1.524313 | 1.529804 | 1.534439 |

| Table of index of glass mateial | List of index per wavelength of medium used in the persent embodiment | | | | |
|---|---|---|---|---|---|
| L1 | 2.000690 | 1.989410 | 2.028720 | 2.052834 | 2.074603 |
| L13 | 1.525400 | 1.522460 | 1.531800 | 1.537220 | 1.543549 |

NUMERICAL EXAMPLE 24

Unit mm

| Surface data | | | | |
|---|---|---|---|---|
| Surface no. number | r | d | nd | vd |
| Object plane | ∞ | ∞ | | |
| 1 | 33.4900 | 1.0000 | 2.14352 | 17.77 |
| 2 | 12.9588 | 2.5000 | | |
| 3 | ∞ | 10.8000 | 1.80610 | 40.92 |
| 4 | ∞ | 0.2000 | | |
| 5* | 18.0459 | 3.1000 | 1.88300 | 40.76 |
| 6* | −16.4288 | 0.1000 | 1.63494 | 23.22 |
| 7* | −32.5464 | Variable | | |
| 8 | 252.3490 | 0.5000 | 1.83481 | 42.71 |
| 9* | 9.3166 | 1.5000 | | |
| 10 | −12.3324 | 0.5000 | 1.80610 | 40.92 |
| 11 | 11.2980 | 1.4000 | 1.94595 | 17.98 |
| 12 | −441.8492 | Variable | | |
| 13 | 30.1763 | 0.8000 | 1.51633 | 64.14 |
| 14 | −28.7546 | 0.6000 | | |
| 15(STOP) | ∞ | Variable | | |
| 16* | 8.3928 | 2.5000 | 1.83481 | 42.71 |
| 17* | −70.8081 | 0.1500 | | |
| 18 | 10.3484 | 1.6000 | 1.69680 | 55.53 |
| 19 | −66.3933 | 0.5000 | 2.00069 | 25.46 |
| 20 | 5.5866 | Variable | | |
| 21* | 9.7104 | 1.6000 | 1.52540 | 56.25 |
| 22 | 345.4467 | Variable | | |
| 23* | −14.3490 | 0.6000 | 2.14352 | 17.77 |
| 24 | 58.074 | 2.2000 | 1.48749 | 70.23 |
| 25 | −7.1885 | 0.6000 | | |
| 26 | ∞ | 0.8000 | 1.51633 | 64.14 |
| 27 | ∞ | 0.7998 | | |
| Image plane | ∞ | | | |

Aspherical Surface Data
5th Surface
K=0.0658,
A2=0.0000E+00,A4=−4.3392E−06,A6=−5.9564E−07, A8=−1.4972E−08,
A10=0.0000E+00
6th Surface
K=−0.0150,
A2=0.0000E+00,A4=−3.5062E−06,A6=−1.7952E−06, A8=2.2143E−08,
A10=0.0000E+00
7th Surface
K=−0.0527,
A2=0.0000E+00,A4=8.2245E−05,A6=−7.4191E−07,A8=−2.2285E−08,
A10=0.0000E+00
9th Surface
K=−0.9594,
A2=0.0000E+00,A4=9.4440E−05,A6=1.6312E−05,A8=−4.2650E−08,
A10=0.0000E+00
16th Surface
K=−0.6101,
A2=0.0000E+00,A4=−4.7649E−05,A6=1.3800E−05,A8=−5.9754E−07,
A10=0.0000E+00
17th Surface
K=−0.1855,
A2=0.0000E+00,A4=3.0502E−05,A6=1.4902E−05,A8=−7.8633E−07,
A10=0.0000E+00
21th Surface
K=0.0493,
A2=0.0000E+00,A4=−2.1455E−04,A6=1.6827E−05,A8=−6.3363E−07,
A10=0.0000E+00
23th Surface
K=0.2922,
A2=0.0000E+00,A4=2.5810E−05,A6=−1.7186E−05, A8=5.9855E−07,
A10=0.0000E+00

| Numenical data Zoom ratio 4.95 | | | |
|---|---|---|---|
| | Wideangle | Intermediate | Telephoto |
| Focal length | 6.05046 | 13.53723 | 29.95923 |
| F number | 3.6576 | 4.6355 | 5.9000 |
| Image angle | 35.8° | 16.0° | 7.2° |
| Image height | 3.84 | 3.84 | 3.84 |
| Lens total length | 61.0012 | 60.9969 | 61.0008 |
| BF | 0.79977 | 0.79977 | 0.79977 |
| d7 | 0.59947 | 5.27803 | 9.03111 |
| d12 | 9.13020 | 4.44018 | 0.69854 |
| d15 | 9.43961 | 4.42137 | 1.29819 |
| d20 | 2.56981 | 7.35360 | 14.12437 |
| d22 | 4.91232 | 5.12296 | 1.49941 |

| Zoom lens group data | | |
|---|---|---|
| Group | Initial surface | focal length |
| 1 | 1 | 15.00168 |
| 2 | 8 | −7.00658 |
| 3 | 13 | 28.64936 |
| 4 | 16 | 21.19258 |
| 5 | 21 | 18.98539 |
| 6 | 23 | −78.35886 |

| Table of index of glass mateial | List of index per wavelength of medium used in the persent embodiment | | | | |
|---|---|---|---|---|---|
| GLA | 587.56 | 656.27 | 486.13 | 435.84 | 404.66 |
| L4 | 1.634937 | 1.627308 | 1.654649 | 1.670903 | 1.685230(LA) |
| L7 | 1.945950 | 1.931230 | 1.983830 | 2.018254 | 2.051060 |
| L1, L13 | 2.143520 | 2.125601 | 2.189954 | 2.232324 | 2.273184 |
| L8, L15 | 1.516330 | 1.513855 | 1.521905 | 1.526213 | 1.529768 |
| L14 | 1.487490 | 1.485344 | 1.492285 | 1.495963 | 1.498983 |
| L2, L6 | 1.806098 | 1.800248 | 1.819945 | 1.831173 | 1.840781 |
| L5, L9 | 1.834807 | 1.828975 | 1.848520 | 1.859547 | 1.868911 |
| L3 | 1.882997 | 1.876560 | 1.898221 | 1.910495 | 1.920919(LB) |
| L10 | 1.696797 | 1.692974 | 1.705522 | 1.712339 | 1.718005 |
| L11 | 2.000690 | 1.989410 | 2.028720 | 2.052834 | 2.074600 |
| L12 | 1.525400 | 1.522460 | 1.531800 | 1.537220 | 1.543548 |

NUMERICAL EXAMPLE 25

Unit mm

| Surface data | | | | |
|---|---|---|---|---|
| Surface no. number | r | d | nd | vd |
| Object plane | ∞ | ∞ | | |
| 1 | 26.8861 | 1.0000 | 2.14352 | 17.77 |
| 2 | 10.4019 | 2.0000 | | |
| 3 | ∞ | 9.8000 | 2.14352 | 17.77 |
| 4 | ∞ | 0.2000 | | |
| 5* | 43.1266 | 0.1000 | 1.63494 | 23.22 |
| 6* | 23.3838 | 2.4000 | 1.80610 | 40.92 |
| 7* | −29.3975 | 0.1500 | | |
| 8 | 19.1461 | 1.8000 | 1.80610 | 40.92 |
| 9 | −118.3339 | Variable | | |
| 10 | −33.0995 | 0.5000 | 1.81600 | 46.62 |
| 11 | 11.0007 | 0.9000 | | |
| 12* | −14.1728 | 0.6000 | 1.69350 | 53.21 |
| 13* | 8.6979 | 0.5000 | 1.73000 | 16.50 |
| 14* | 41.5907 | Variable | | |
| 15(STOP) | ∞ | 0.7000 | | |
| 16 | 23.2704 | 1.0000 | 1.58913 | 61.14 |
| 17 | −39.5668 | Variable | | |
| 18* | 9.3228 | 2.5000 | 1.83481 | 42.71 |
| 19 | −35.2849 | 0.1500 | | |
| 20 | 16.5137 | 1.6000 | 1.69680 | 55.53 |
| 21 | −18.9795 | 0.5000 | 2.00069 | 25.46 |
| 22 | 7.8715 | Variable | | |
| 23* | 11.9382 | 1.6000 | 1.52540 | 56.25 |
| 24 | −81.9589 | Variable | | |
| 25 | −7.8192 | 0.6000 | 2.14352 | 17.77 |
| 26 | −15.1015 | 2.0000 | 1.51633 | 64.14 |
| 27 | −7.1048 | 0.6000 | | |
| 28 | ∞ | 0.8000 | 1.51633 | 64.14 |
| 29 | ∞ | 0.8002 | | |
| Image plane | ∞ | | | |

Aspherical Surface Data
5th Surface
K=−0.3198,
A2=0.0000E+00,A4=7.0812E−05,A6=−3.7266E−06,
 A8=5.5289E−08,
A10=0.0000E+00
6th Surface
K=0.0895,
A2=0.0000E+00,A4=−1.2037E−04,A6=9.9952E−06,A8=−
 2.5704E−07,
A10=0.0000E+00
7th Surface
K=−0.0600,
A2=0.0000E+00,A4=9.3083E−06,A6=−8.5596E−07,A8=−
 1.1449E−08,
A10=0.0000E+00
12th Surface
K=−0.3180,
A2=0.0000E+00,A4=1.0698E−03,A6=−1.4595E−04,
 A8=7.0190E−06,
A10=0.0000E+00
13th Surface
K=−1.0000,
A2=0.0000E+00,A4=2.0000E−04,A6=0.0000E+00,
 A8=0.0000E+00,
A10=0.0000E+00
14th Surface
K=2.4959,
A2=0.0000E+00,A4=7.8292E−04,A6=−1.1366E−04,
 A8=6.5409E−06,
A10=0.0000E+00
18th Surface
K=−0.5894,
A2=0.0000E+00,A4=7.7905E−05,A6=1.1782E−05,A8=−
 2.0278E−07,
A10=0.0000E+00
19th Surface
K=−0.7348,
A2=0.0000E+00,A4=2.8188E−04,A6=9.8333E−06,A8=−
 1.0652E−07,
A10=0.0000E+00
23th Surface
K=−0.6984,
A2=0.0000E+00,A4=−1.3174E−05,A6=9.8051E−06,A8=−
 2.7387E−07,
A10=0.0000E+00

| Numenical data Zoom ratio 4.95 | | | |
|---|---|---|---|
| | Wideangle | Intermediate | Telephoto |
| Focal length | 6.05277 | 13.53390 | 29.95828 |
| F number | 4.0425 | 4.5176 | 6.0291 |
| Image angle | 36.1° | 16.0° | 7.2° |
| Image height | 3.84 | 3.84 | 3.84 |
| Lens total length | 58.2782 | 58.2843 | 58.2778 |
| BF | 0.80017 | 0.80017 | 0.80017 |
| d9 | 0.59649 | 5.36101 | 8.15085 |
| d14 | 8.84912 | 4.09680 | 1.29474 |
| d17 | 7.14286 | 4.64410 | 0.69974 |
| d22 | 3.54736 | 4.87106 | 13.83328 |
| d24 | 5.34215 | 6.51258 | 1.49937 |

| Zoom lens group data | | |
|---|---|---|
| Group | Initial surface | focal length |
| 1 | 1 | 12.85253 |
| 2 | 10 | −5.91408 |
| 3 | 15 | 25.01936 |
| 4 | 18 | 21.07605 |

-continued

| Zoom lens group data | | |
|---|---|---|
| Group | Initial surface | focal length |
| 5 | 23 | 19.95023 |
| 6 | 25 | −57.17262 |

| Table of index of glass mateial | List of index per wavelength of medium used in the persent embodiment | | | | |
|---|---|---|---|---|---|
| GLA | 587.56 | 656.27 | 486.13 | 435.84 | 404.66 |
| L3 | 1.634937 | 1.627308 | 1.654649 | 1.672358 | 1.688773(LA) |
| L8 | 1.729996 | 1.718099 | 1.762336 | 1.793147 | 1.822977 |
| L1, L2, L14 | 2.143520 | 2.125601 | 2.189954 | 2.232324 | 2.273190 |
| L9 | 1.589130 | 1.586188 | 1.595824 | 1.601033 | 1.605348 |
| L15, L16 | 1.516330 | 1.513855 | 1.521905 | 1.526213 | 1.529768 |
| L4, L5 | 1.806098 | 1.800248 | 1.819945 | 1.831173 | 1.840781(LB) |
| L10 | 1.834807 | 1.828975 | 1.848520 | 1.859547 | 1.868911 |
| L6 | 1.816000 | 1.810749 | 1.828252 | 1.837996 | 1.846185 |
| L7 | 1.693501 | 1.689548 | 1.702582 | 1.709715 | 1.715662 |
| L11 | 1.696797 | 1.692974 | 1.705522 | 1.712339 | 1.718005 |
| L12 | 2.000690 | 1.989410 | 2.028720 | 2.052834 | 2.074603 |
| L13 | 1.525400 | 1.522460 | 1.531800 | 1.537220 | 1.543549 |

Next, values of parameters, values of conditional expressions are shown as below. Further, symbol "***" denotes that the conditional expression is not satisfied.

| | Example 1 | Example 2 | Example 3 | Example 4 | Example 5 |
|---|---|---|---|---|---|
| fw | 6.050 | 6.052 | 6.055 | 6.050 | 5.005 |
| $y_{10}$ | 3.84 | 3.84 | 3.84 | 3.84 | 3.84 |
| βRw | 1.039 | 0.955 | 1.163 | 1.209 | 1.062 |
| NRn − NRp | 0.62719 | 0.48436 | 0.62719 | 0.65603 | 0.65603 |
| νRp − νRn | 46.37 | 38.68 | 46.37 | 52.46 | 52.46 |
| $R_{GRF}$ | −36.633 | 55.805 | −16.116 | −14.709 | 81.082 |
| $R_{GRR}$ | −9.193 | −10.276 | −8.469 | −7.500 | −8.302 |
| $(R_{GRF} + R_{GRR})/(R_{GRF} − R_{GRR})$ | 1.670 | 0.689 | 3.215 | 3.081 | 0.814 |
| β2w | −0.6575 | −0.6460 | −0.6629 | −0.6957 | −0.6399 |
| β3w | −1.0743 | −1.0326 | −0.7029 | −0.7387 | −1.1166 |
| nd(LA3) | *** | *** | *** | *** | *** |
| νd(LA3) | *** | *** | *** | *** | *** |
| θgF(lA3) | *** | *** | *** | *** | *** |
| β'(LA3) | *** | *** | *** | *** | *** |
| Δνd(C1) | *** | *** | *** | 17.54 | 21.62 |
| Δnd(C1) | *** | *** | *** | 0.24806 | 0.13610 |
| θgF(LA1) | *** | *** | *** | 0.6477 | 0.5840 |
| νd(LA1) | *** | *** | *** | 23.22 | 19.30 |
| β'(LA1) | *** | *** | *** | 0.6855 | 0.6155 |
| θhg(LA1) | *** | *** | *** | 0.6003 | 0.5080 |
| βhg'(LA1) | *** | *** | *** | 0.6525 | 0.5514 |
| β'(LB1) | *** | *** | *** | 0.6333 | 0.6370 |
| νd(LB1) | *** | *** | *** | 40.76 | 40.92 |
| θgF(LB1) | *** | *** | *** | 0.5669 | 0.5703 |
| βhg'(LB1) | *** | *** | *** | 0.5728 | 0.5802 |
| θhg(LB1) | *** | *** | *** | 0.4811 | 0.4881 |
| Δνd(C2) | 22.94 | 31.36 | 22.94 | 22.94 | 36.70 |
| Δnd(C2) | −0.13985 | −0.20275 | −0.13985 | −0.13985 | −0.21679 |
| θgF(LA2) | 0.6543 | 0.6543 | 0.6543 | 0.6543 | 0.6543 |
| θhg(LA2) | 0.6238 | 0.6238 | 0.6238 | 0.6238 | 0.6238 |
| β'(LA2) | 0.6836 | 0.6836 | 0.6836 | 0.6836 | 0.6836 |
| βhg'(LA2) | 0.6643 | 0.6643 | 0.6643 | 0.6643 | 0.6643 |
| νd(LA2) | 17.98 | 17.98 | 17.98 | 17.98 | 17.98 |
| $y_{07}$ | 2.688 | 2.688 | 2.688 | 2.688 | 2.688 |
| $\tan\omega_{07w}$ | 0.4867 | 0.4746 | 0.4707 | 0.4784 | 0.5851 |
| $y_{07}/(fw \times \tan\omega_{07w})$ | 0.9129 | 0.9358 | 0.9431 | 0.9287 | 0.9181 |

|  | Example 6 | Example 7 | Example 8 | Example 9 |
|---|---|---|---|---|
| fw | 6.064 | 6.054 | 6.058 | 6.053 |
| $y_{10}$ | 3.84 | 3.84 | 3.84 | 3.84 |
| βRw | 1.127 | 1.075 | 1.061 | 0.972 |
| NRn − NRp | 0.65603 | 0.62719 | 0.62719 | 0.57758 |
| νRp − νRn | 52.46 | 46.37 | 46.37 | 23.03 |
| $R_{GRF}$ | *** | −49.436 | −231.77 | 18.789 |
| $R_{GRR}$ | *** | −9.856 | −12.243 | −33.205 |
| $(R_{GRF} + R_{GRR})/(R_{GRF} − R_{GRR})$ | *** | 1.498 | 1.112 | −0.277 |
| β2w | −0.6474 | −0.6589 | −0.6578 | −0.6606 |
| β3w | −1.3460 | −1.0490 | −1.0775 | −1.3351 |
| nd(LA3) | 1.63494 | *** | *** | 1.66000 |
| νd(LA3) | 23.22 | *** | *** | 20.00 |
| θgF(LA3) | 0.5740 | *** | *** | 0.5899 |
| β'(LA3) | 0.6118 | *** | *** | 0.6225 |
| Δνd(C1) | 17.70 | *** | *** | 20.92 |
| Δnd(C1) | 0.17116 | *** | *** | 0.14610 |
| θgF(LA1) | 0.5740 | *** | *** | 0.5899 |
| νd(LA1) | 23.22 | *** | *** | 20.00 |
| β'(LA1) | 0.6118 | *** | *** | 0.6225 |
| θhg(LA1) | 0.4939 | *** | *** | 0.5172 |
| βhg'(LA1) | 0.5461 | *** | *** | 0.5622 |
| β'(LB1) | 0.6370 | *** | *** | 0.6370 |
| νd(LB1) | 40.92 | *** | *** | 40.92 |
| θgF(LB1) | 0.5703 | *** | *** | 0.5703 |
| βhg'(LB1) | 0.5802 | *** | *** | 0.5802 |
| θhg(LB1) | 0.4881 | *** | *** | 0.4881 |
| Δνd(C2) | 52.25 | 36.71 | 36.71 | 24.73 |
| Δnd(C2) | −0.45846 | −0.03650 | −0.03650 | −0.11114 |
| θgF(LA2) | 0.6543 | 0.6965 | 0.6965 | 0.6543 |
| θhg(LA2) | 0.6238 | 0.6743 | 0.6743 | 0.6238 |
| β'(LA2) | 0.6836 | 0.7234 | 0.7234 | 0.6836 |
| βhg'(LA2) | 0.6643 | 0.7114 | 0.7114 | 0.6643 |
| νd(LA2) | 17.98 | 16.50 | 16.50 | 17.98 |
| $y_{07}$ | 2.688 | 2.688 | 2.688 | 2.688 |
| $\tan\omega_{07w}$ | 0.4727 | 0.4788 | 0.4777 | 0.4786 |
| $y_{07}/(fw \times \tan\omega_{07w})$ | 0.9377 | 0.9273 | 0.9288 | 0.9279 |

Next, values of parameters, values of conditional expressions are shown as below. Further, symbol "***" denotes that the conditional expression is not satisfied.

|  | Example 10 | Example 11 | Example 12 | Example 13 | Example 14 |
|---|---|---|---|---|---|
| fw(wide angle end) | 6.051 | 6.061 | 6.203 | 5.005 | 6.072 |
| ft(telephoto end) | 29.960 | 29.957 | 30.999 | 24.993 | 29.955 |
| γ | 4.951 | 4.943 | 4.997 | 4.994 | 4.933 |
| $y_{10}$ | 3.84 | 3.84 | 3.84 | 3.84 | 3.84 |
| E | 10.466 | 7.906 | 9.628 | 10.921 | 6.278 |
| f12 | 13.101 | 10.432 | 12.669 | 8.840 | 10.123 |
| E/f12 | 0.799 | 0.758 | 0.760 | 1.235 | 0.620 |
| nd(LB) | 1.88300 | 1.74320 | 2.04300 | 1.80610 | 1.80610 |
| νd(LA) | 23.22 | 23.22 | 23.22 | 19.30 | 23.22 |
| $R_C$ | −17.614 | −13.857 | 14.805 | −36.799 | −53.668 |
| $\Delta_{zA}(h)$ | 0.00988 | −0.00742 | −0.00952 | 0.12547 | 0 |
| $\Delta_{zB}(h)$ | −0.00910 | −0.00692 | 0.00500 | −0.00871 | −0.07001 |
| $\{\Delta_{zA}(h) + \Delta_{zB}(h)\}/2$ | 0.00039 | −0.00717 | −0.00226 | 0.05838 | −0.03501 |
| $\Delta_{zC}(h)$ | −0.01246 | −0.01047 | 0.02716 | −0.00397 | −0.08914 |
| h | 4.232 | 4.221 | 4.152 | 5.144 | 4.208 |
| a | 1.693 | 1.688 | 1.661 | 2.058 | 1.683 |
| θgF(LA) | 0.6030 | 0.6477 | 0.5840 | 0.5840 | 0.5840 |
| β'(LA) | 0.6408 | 0.6855 | 0.6218 | 0.6155 | 0.6155 |
| θhg(LA) | 0.5379 | 0.6003 | 0.5080 | 0.5080 | 0.5080 |
| βhg'(LA) | 0.5901 | 0.6525 | 0.5602 | 0.5514 | 0.5514 |
| νD(LB) | 40.76 | 49.34 | 39.00 | 40.92 | 40.92 |
| θgF(LB) | 0.5669 | 0.5528 | 0.5657 | 0.5703 | 0.5703 |
| β'(LB) | 0.6333 | 0.6332 | 0.6293 | 0.6370 | 0.6370 |
| θhg(LB) | 0.4811 | 0.4638 | 0.4772 | 0.4881 | 0.4881 |
| βhg'(LB) | 0.5728 | 0.5748 | 0.5650 | 0.5802 | 0.5802 |
| θgF(LA) − θgF(LB) | 0.0361 | 0.0949 | 0.0183 | 0.0137 | 0.0137 |
| θhg(LA) − θhg(LB) | 0.0568 | 0.1365 | 0.0308 | 0.0199 | 0.0199 |
| νd(LA) − νd(LB) | −17.54 | −26.12 | −15.78 | −21.62 | −17.70 |
| $\beta_{2w}$ | −0.691 | −0.685 | −0.692 | −0.640 | −0.680 |
| $\beta_{34w}$ | −0.445 | −0.655 | −0.529 | −0.694 | −0.636 |
| $\beta_{5w}$ | 1.206 | 1.055 | 1.120 | 1.062 | 0.981 |
| $N_{5n} − N_{5p}$ | 0.65603 | 0.52558 | 0.65603 | 0.65603 | 0.48697 |
| $\nu_{5p} − \nu_{5n}$ | 52.46 | 13.43 | 52.46 | 52.46 | 35.87 |
| $R_{G5F}$ | −15.820 | −362.564 | −21.477 | 81.082 | 16.080 |
| $R_{G5R}$ | −7.546 | −10.605 | −6.390 | −8.302 | −10.593 |
| $(R_{G5F} + R_{G5R})/(R_{G5F} − R_{G5R})$ | 0.3541 | 0.9434 | 0.5414 | 1.229 | 4.854 |
| t1 | 0.1 | 0.1 | 0.1 | 0.1 | 0.1 |
| $y_{07}$ | 2.688 | 2.688 | 2.688 | 2.688 | 2.688 |
| $\tan\omega_{07w}$ | 0.4814 | 0.4803 | 0.4632 | 0.5851 | 0.4960 |
| $y_{07}/(fw \times \tan\omega_{07w})$ | 0.9228 | 0.9234 | 0.9355 | 0.9181 | 0.8925 |
| nd(LA) | 1.63494 | 1.63494 | 1.63494 | 1.67000 | 1.63494 |

|  | Example 15 | Example 16 | Example 17 | Example 18 |
|---|---|---|---|---|
| fw(wide angle end) | 6.053 | 6.049 | 6.047 | 6.046 |
| ft(telephoto end) | 29.958 | 29.955 | 29.959 | 29.957 |

-continued

|  | Example 15 | Example 16 | Example 17 | Example 18 |
|---|---|---|---|---|
| γ | 4.949 | 4.952 | 4.954 | 4.955 |
| $y_{10}$ | 3.84 | 3.84 | 3.84 | 3.84 |
| E | 6.835 | 8.210 | 6.593 | 6.793 |
| f12 | 10.515 | 12.792 | 12.749 | 12.502 |
| E/f12 | 0.650 | 0.642 | 0.517 | 0.543 |
| nd(LB) | 1.80610 | 1.74320 | 1.74320 | 1.74320 |
| vd(LA) | 23.22 | 23.22 | 23.22 | 23.22 |
| $R_C$ | 23.384 | −40.158 | 9.595 | 9.525 |
| $\Delta_{zA}(h)$ | 0.00683 | 0 | −0.01681 | −0.01403 |
| $\Delta_{zB}(h)$ | −0.00300 | −0.03462 | 0.00598 | 0.00537 |
| $\{\Delta_{zA}(h) + \Delta_{zB}(h)\}/2$ | 0.00192 | −0.01731 | −0.00542 | −0.00433 |
| $\Delta_{zC}(h)$ | −0.00734 | −0.08108 | −0.02479 | −0.04604 |
| h | 4.230 | 4.234 | 4.238 | 4.238 |
| a | 1.692 | 1.694 | 1.695 | 1.695 |
| θgF(LA) | 0.6477 | 0.5945 | 0.5921 | 0.5921 |
| β'(LA) | 0.6855 | 0.6323 | 0.6299 | 0.6299 |
| θhg(LA) | 0.6003 | 0.5240 | 0.5215 | 0.5215 |
| βhg'(LA) | 0.6525 | 0.5762 | 0.5737 | 0.5737 |
| vd(LB) | 40.92 | 49.34 | 49.34 | 49.34 |
| θgF(LB) | 0.5703 | 0.5528 | 0.5528 | 0.5528 |
| β'(LB) | 0.6370 | 0.6332 | 0.6332 | 0.6332 |
| θhg(LB) | 0.4881 | 0.4638 | 0.4638 | 0.4638 |
| βhg'(LB) | 0.5802 | 0.5748 | 0.5748 | 0.5748 |
| θgF(LA) − θgF(LB) | 0.0774 | 0.0417 | 0.0393 | 0.0393 |
| θhg(LA) − θhg(LB) | 0.1122 | 0.0602 | 0.0577 | 0.0577 |
| vd(LA) − vd(LB) | −17.70 | −26.12 | −26.12 | −26.12 |
| $\beta_{2w}$ | −0.544 | −0.325 | −0.323 | −0.330 |
| $\beta_{34w}$ | −0.715 | −0.608 | −0.576 | −0.581 |
| $\beta_{5w}$ | 1.211 | 1.854 | 1.968 | 1.957 |
| $N_{5n} - N_{5p}$ | 0.62720 | 0.65603 | 0.56960 | 0.56960 |
| $\nu_{5p} - \nu_{5n}$ | 46.37 | 52.46 | 26.85 | 26.85 |
| $R_{G5F}$ | −7.819 | *** | *** | *** |
| $R_{G5R}$ | −7.105 | *** | *** | *** |
| $(R_{G5F} + R_{G5R})/(R_{G5F} - R_{G5R})$ | 0.04784 | *** | *** | *** |
| t1 | 0.1 | 0.1 | 0.1 | 0.1 |
| $y_{07}$ | 2.688 | 2.688 | 2.688 | 2.688 |
| $\tan\omega_{07w}$ | 0.4702 | 0.4882 | 0.4861 | 0.4851 |
| $y_{07}/(fw \times \tan\omega_{07w})$ | 0.9444 | 0.9102 | 0.9145 | 0.9165 |
| nd(LA) | 1.63494 | 1.63494 | 1.63494 | 1.63494 |

Next, values of parameters, values of conditional expressions are shown as below. Further, symbol "***" denotes that the conditional expression is not satisfied.

|  | Example 19 | Example 20 | Example 21 | Example 22 |
|---|---|---|---|---|
| fw | 6.050 | 6.051 | 6.053 | 6.052 |
| $y_{10}$ | 3.84 | 3.84 | 3.84 | 3.84 |
| $D_{11}/SD_1$ | 0.780 | 0.780 | 0.679 | 0.688 |
| vd(LA) | 23.22 | 23.22 | 23.22 | 23.22 |
| θgF(LA) | 0.6477 | 0.5945 | 0.5740 | 0.6477 |
| β'(LA) | 0.6855 | 0.6323 | 0.6119 | 0.6855 |
| θhg(LA) | 0.6003 | 0.5240 | 0.4939 | 0.6003 |
| βhg'(LA) | 0.6525 | 0.5762 | 0.5461 | 0.6525 |
| vd(LB) | 40.76 | 40.76 | 40.92 | 40.92 |
| θgF(LB) | 0.5669 | 0.5669 | 0.5703 | 0.5703 |
| β'(LB) | 0.6333 | 0.6333 | 0.6370 | 0.6370 |
| θhg(LB) | 0.4811 | 0.4811 | 0.4881 | 0.4881 |
| βhg'(LB) | 0.5728 | 0.5728 | 0.5802 | 0.5802 |
| θgF(LA) − θgF(LB) | 0.0808 | 0.0276 | 0.0037 | 0.0774 |
| θhg(LA) − θhg(LB) | 0.1192 | 0.0429 | 0.0058 | 0.1122 |
| vd(LA) − vd(LB) | −17.54 | −17.54 | −17.70 | −17.70 |
| $\beta_{Rw}$ | 1.209 | 1.209 | 1.138 | 1.232 |
| $N_{Rn} - N_{Rp}$ | 0.65603 | 0.65603 | 0.65603 | 0.62720 |
| vRp − vRn | 52.46 | 52.46 | 52.46 | 46.37 |
| $R_{GRF}$ | −14.709 | −14.712 | *** | −8.392 |
| $R_{GRR}$ | −7.500 | −7.415 | *** | −6.696 |
| $(R_{GRF} + R_{GRR})/(R_{GRF} - R_{GRR})$ | 3.081 | 3.032 | *** | 8.896 |
| $\beta_{2w}$ | −0.6957 | −0.6961 | −0.6711 | −0.7017 |
| $\beta_{34w}$ | −0.4380 | −0.4379 | −0.6588 | −0.5394 |
| E/f12 | 0.797 | 0.797 | 0.944 | 0.648 |
| t1 | 0.1 | 0.1 | 0.1 | 0.1 |
| nd(LA) | 1.63494 | 1.63494 | 1.63494 | 1.63494 |

-continued

|  | Example 19 | Example 20 | Example 21 | Example 22 |
|---|---|---|---|---|
| $y_{07}$ | 2.688 | 2.688 | 2.688 | 2.688 |
| $\tan\omega_{07w}$ | 0.4784 | 0.4781 | 0.4773 | 0.4679 |
| $y_{07}/(fw \times \tan\omega_{07w})$ | 0.9287 | 0.9291 | 0.9304 | 0.9492 |

|  | Example 23 | Example 24 | Example 25 |
|---|---|---|---|
| fw | 6.051 | 6.050 | 6.053 |
| $y_{10}$ | 3.84 | 3.84 | 3.84 |
| $D_{11}/SD_1$ | 0.690 | 0.763 | 0.688 |
| vd(LA) | 20.00 | 23.22 | 23.22 |
| θgF(LA) | 0.5899 | 0.5945 | 0.6477 |
| β'(LA) | 0.6225 | 0.6323 | 0.6855 |
| θhg(LA) | 0.5172 | 0.5240 | 0.6003 |
| βhg'(LA) | 0.5622 | 0.5762 | 0.6525 |
| vd(LB) | 40.92 | 40.76 | 40.92 |
| θgF(LB) | 0.5703 | 0.5669 | 0.5703 |
| β'(LB) | 0.6370 | 0.6333 | 0.6370 |
| θhg(LB) | 0.4881 | 0.4811 | 0.4881 |
| βhg'(LB) | 0.5802 | 0.5728 | 0.5802 |
| θgF(LA) − θgF(LB) | 0.0196 | 0.0276 | 0.0774 |
| θhg(LA) − θhg(LB) | 0.0291 | 0.0429 | 0.1122 |
| vd(LA) − vd(LB) | −20.92 | −17.54 | −17.70 |
| $\beta_{Rw}$ | 0.933 | 1.182 | 1.211 |
| $N_{Rn} - N_{Rp}$ | 0.57758 | 0.65603 | 0.62720 |
| $v_{Rp} - v_{Rn}$ | 23.03 | 52.46 | 46.37 |
| $R_{GRF}$ | *** | −14.349 | −7.819 |
| $R_{GRR}$ | *** | −7.189 | −7.105 |
| $(R_{GRF} + R_{GRR})/(R_{GRF} - R_{GRR})$ | *** | 3.008 | 20.902 |
| $\beta_{2w}$ | −0.6551 | −0.5487 | −0.5442 |
| $\beta_{34w}$ | −0.7964 | −0.6220 | −0.7148 |
| E/f12 | 0.796 | 0.833 | 0.650 |
| t1 | 0.1 | 0.1 | 0.1 |
| nd(LA) | 1.66000 | 1.63494 | 1.63494 |
| $y_{07}$ | 2.688 | 2.688 | 2.688 |
| $\tan\omega_{07w}$ | 0.4757 | 0.4709 | 0.4702 |
| $y_{07}/(fw \times \tan\omega_{07w})$ | 0.9338 | 0.9435 | 0.9444 |

Thus, it is possible to use such image forming optical system of the present invention in a photographic apparatus in which an image of an object is photographed by an electronic image pickup element such as a CCD and a CMOS, particularly a digital camera and a video camera, a personal computer, a telephone, and a portable terminal which are examples of an information processing unit, particularly a portable telephone which is easy to carry. Embodiments thereof will be exemplified below.

Figure 51:
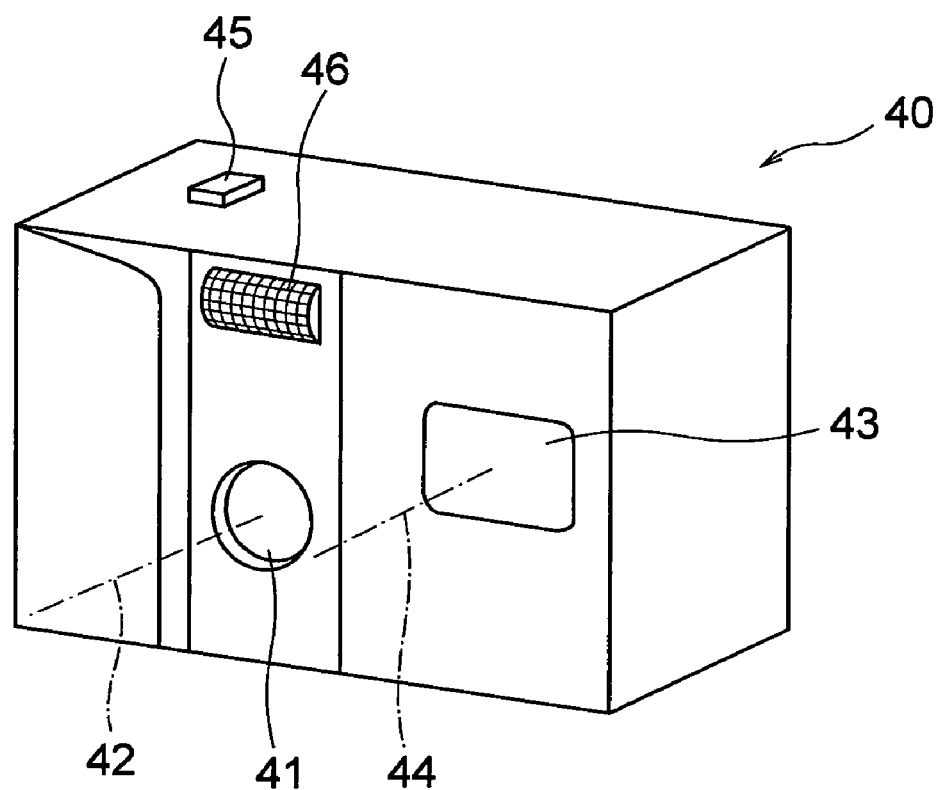
FIG. 51 is a front perspective view showing an outer appearance of a digital camera 40 equipped with a zoom optical system according to the present invention.
Figure 52:
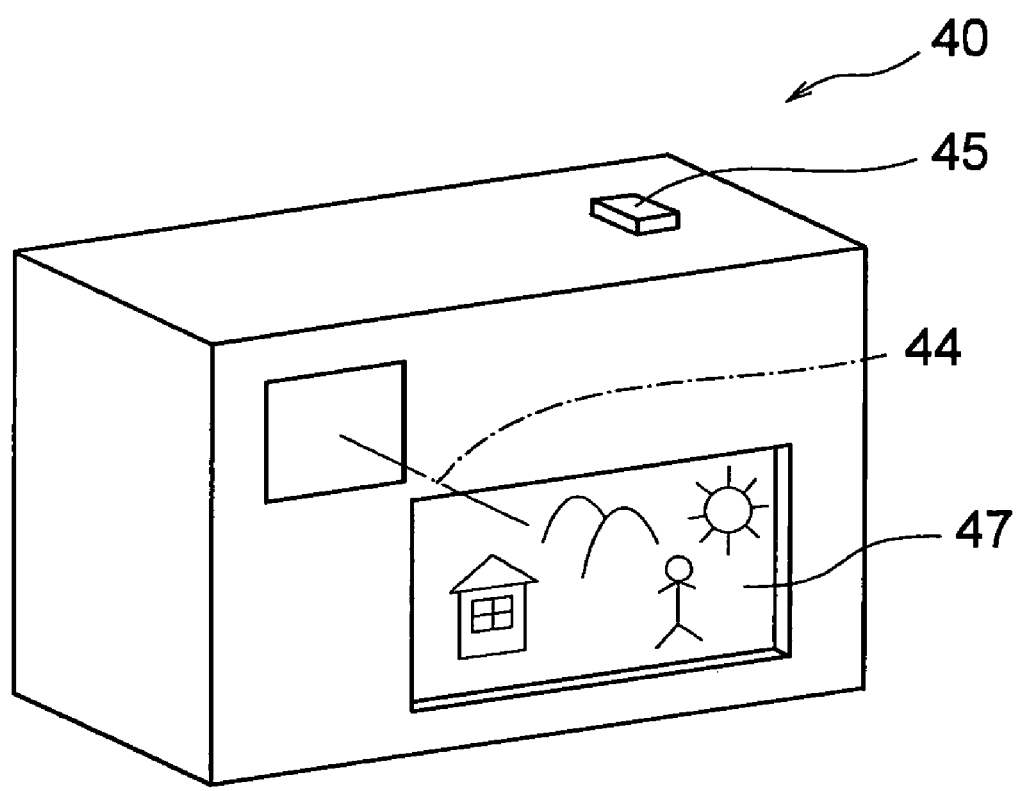
FIG. 52 is a rear perspective view of the digital camera 40.
Figure 53:
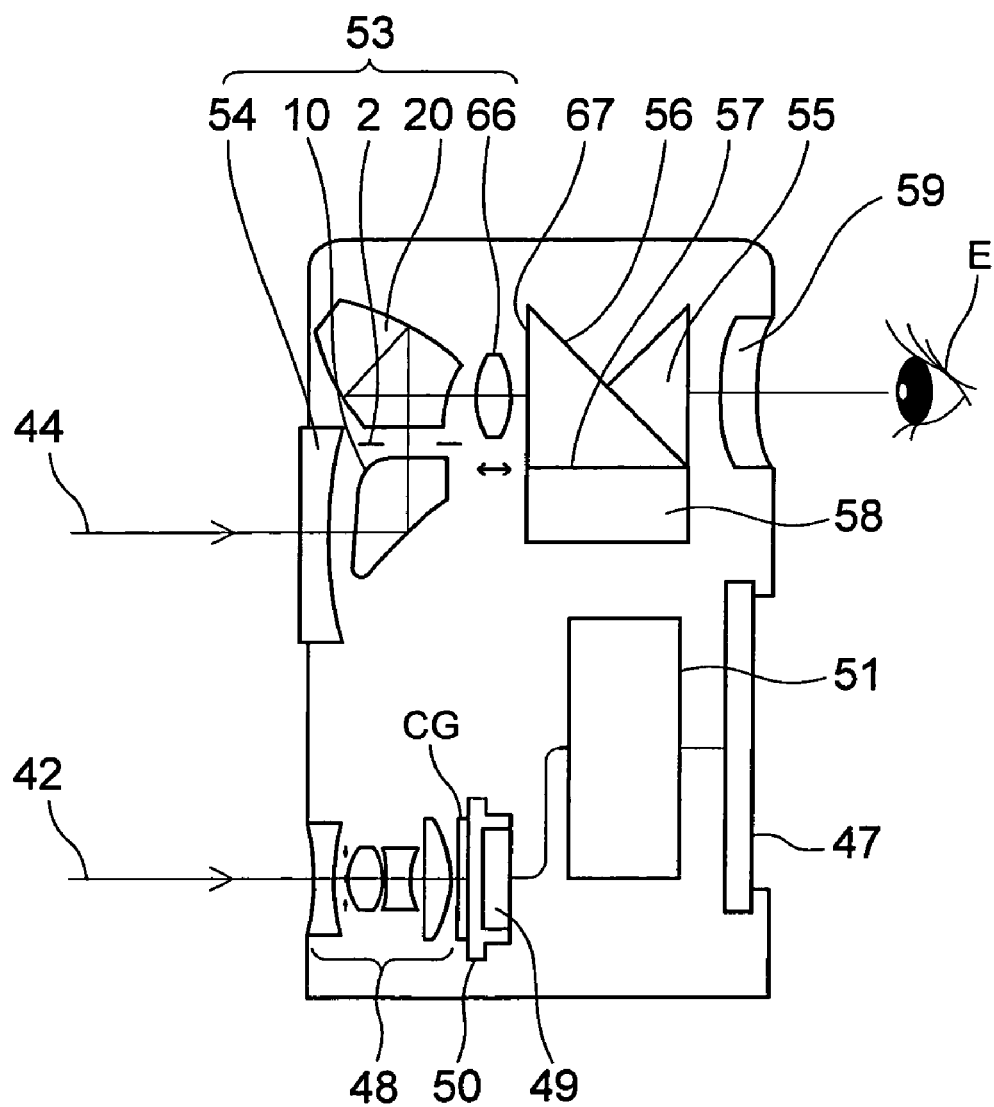
FIG. 53 is a cross sectional view showing the optical construction of the digital camera 40.

In FIG. 51 to FIG. 53 show conceptual diagrams of structures in which the image forming optical system according to the present invention is incorporated in a photographic optical system 41 of a digital camera. FIG. 51 is a frontward perspective view showing an appearance of a digital camera 40, FIG. 52 is a rearward perspective view of the same, and FIG. 53 is a cross-sectional view showing an optical arrangement of the digital camera 40.

The digital camera 40, in a case of this example, includes the photographic optical system 41 (an objective optical system for photography 48) having an optical path for photography 42, a finder optical system 43 having an optical path for finder 44, a shutter 45, a flash 46, and a liquid-crystal display monitor 47. Moreover, when the shutter 45 disposed at an upper portion of the camera 40 is pressed, in conjugation with this, a photograph is taken through the photographic optical system 41 (objective optical system for photography 48) such as the zoom lens in the first embodiment.

An object image formed by the photographic optical system 41 (photographic objective optical system 48) is formed on an image pickup surface 50 of a CCD 49. The object image photoreceived at the CCD 49 is displayed on the liquid-crystal display monitor 47 which is provided on a camera rear surface as an electronic image, via an image processing means 51. Moreover, a memory etc. is disposed in the image processing means 51, and it is possible to record the electronic image photographed. This memory may be provided separately from the image processing means 51, or may be formed by carrying out by writing by recording (recorded writing) electronically by a floppy (registered trademark) disc, memory card, or an MO etc.

Furthermore, an objective optical system for finder 53 is disposed in the optical path for finder 44. This objective optical system for finder 53 includes a cover lens 54, a first prism 10, an aperture stop 2, a second prism 20, and a lens for focusing 66. An object image is formed on an image forming surface 67 by this objective optical system for finder 53. This object image is formed in a field frame of a Porro prism which is an image erecting member equipped with a first reflecting surface 56 and a second reflecting surface 58. On a rear side of this Porro prism, an eyepiece optical system 59 which guides an image formed as an erected normal image is disposed.

By the digital camera 40 structured in such manner, it is possible to realize an optical image pickup apparatus having a zoom lens with a reduced size and thickness, in which the number of structural components is reduced. Further, the present invention could be applied to a digital camera having a reflecting optical system that bends the optical path as well as the above mentioned collapsible digital camera.

Figure 54:
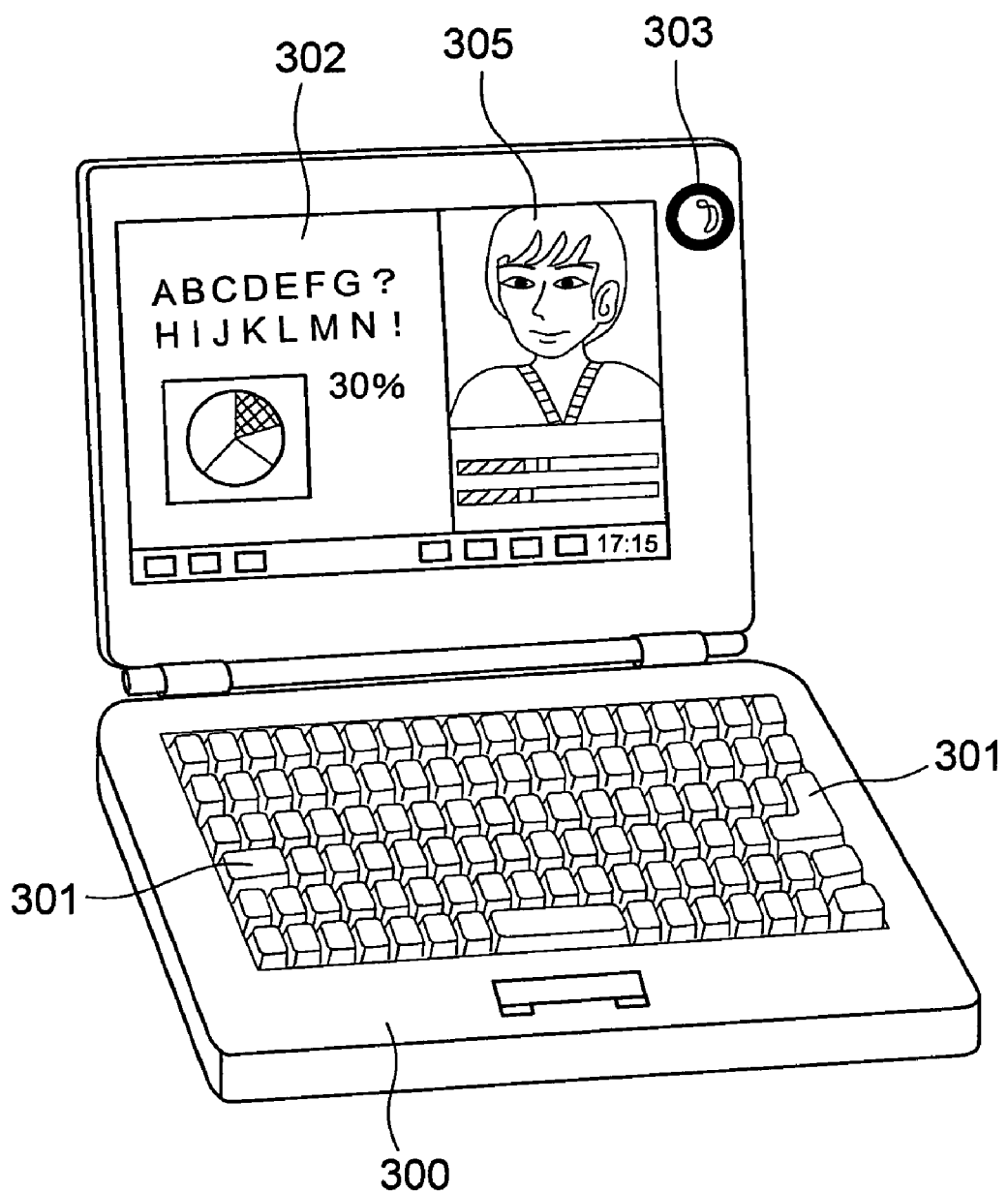
FIG. 54 a front perspective view showing a personal computer 300 as an example of an information processing apparatus in which a zoom optical system according to the present invention is provided as an objective optical system, in a state in which the cover is open.
Figure 55:
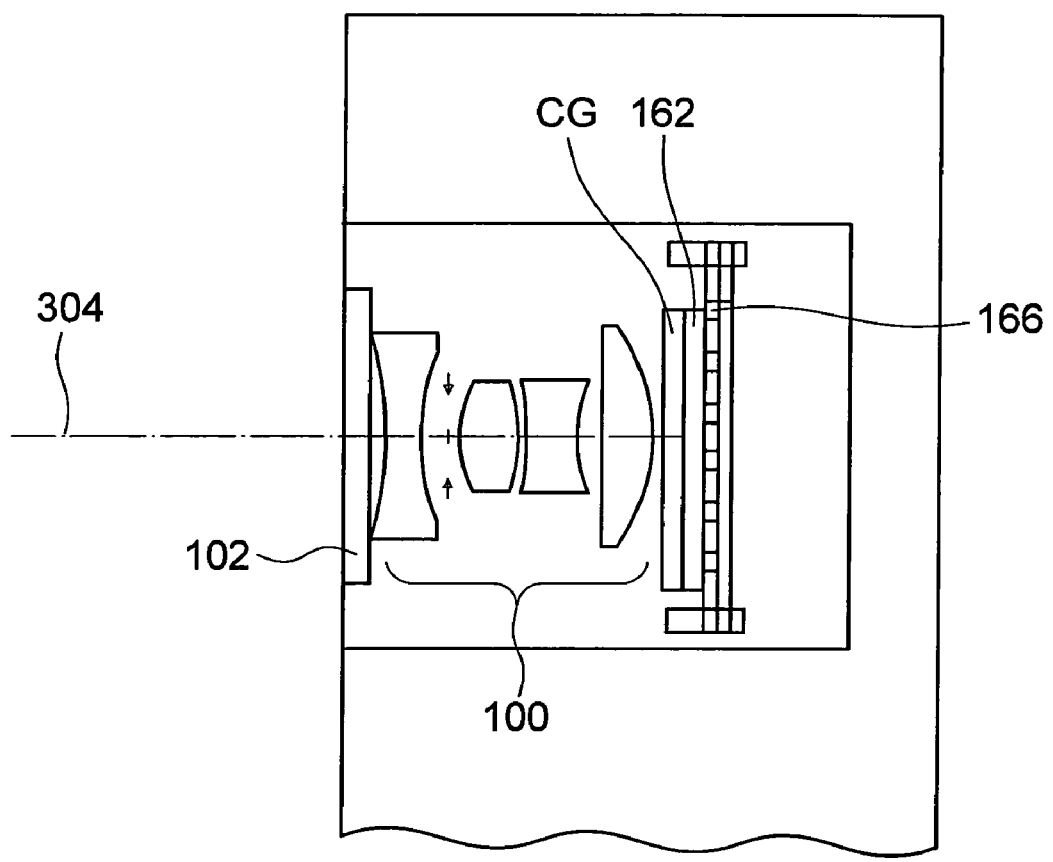
FIG. 55 is a cross sectional view of a taking optical system 303 of the personal computer 300.
Figure 56:
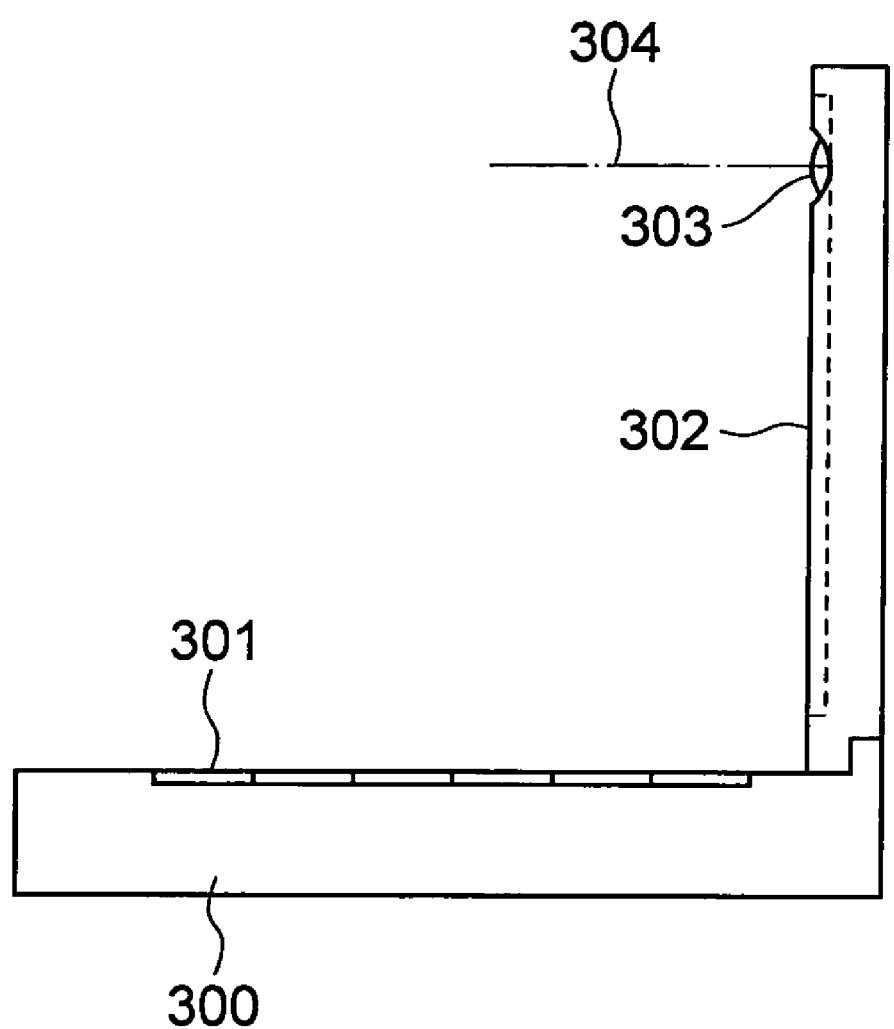
FIG. 56 is a side view of the personal computer 300.

Next, a personal computer which is an example of an information processing apparatus with a built-in image forming system as an objective optical system is shown in FIG. 54 to FIG. 56. FIG. 54 is a frontward perspective view of a personal computer 300 with its cover opened, FIG. 55 is a cross-sectional view of a photographic optical system 303 of the personal computer 300, and FIG. 56 is a side view of FIG. 54. As it is shown in FIG. 80 to FIG. 82, the personal computer 300 has a keyboard 301, an information processing means and a recording means, a monitor 302, and a photographic optical system 303.

Here, the keyboard 301 is for an operator to input information from an outside. The information processing means and the recording means are omitted in the diagram. The monitor 302 is for displaying the information to the operator. The photographic optical system 303 is for photographing an image of the operator or a surrounding. The monitor 302 may be a display such as a liquid-crystal display or a CRT display. As the liquid-crystal display, a transmission liquid-crystal display device which illuminates from a rear surface by a backlight not shown in the diagram, and a reflection liquid-crystal display device which displays by reflecting light from a front surface are available. Moreover, in the diagram, the photographic optical system 303 is built-in at a right side of the monitor 302, but without restricting to this location, the photographic optical system 303 may be anywhere around the monitor 302 and the keyboard 301.

This photographic optical system 303 has an objective optical system 100 which includes the zoom lens in the first embodiment for example, and an electronic image pickup element chip 162 which receives an image. These are built into the personal computer 300.

At a front end of a mirror frame, a cover glass 102 for protecting the objective optical system 100 is disposed.

An object image received at the electronic image pickup element chip 162 is input to a processing means of the personal computer 300 via a terminal 166. Further, the object image is displayed as an electronic image on the monitor 302. In FIG. 56, an image 305 photographed by the user is displayed as an example of the electronic image. Moreover, it is also possible to display the image 305 on a personal computer of a communication counterpart from a remote location via a processing means. For transmitting the image to the remote location, the Internet and telephone are used.

Next, a telephone which is an example of an information processing apparatus in which the image forming optical system of the present invention is built-in as a photographic optical system, particularly a portable telephone which is easy to carry is shown in FIG. 57A, FIG. 57B, and FIG. 57C. FIG. 57A is a front view of a portable telephone 400, FIG. 57B is a side view of the portable telephone 400, and FIG. 57C is a cross-sectional view of a photographic optical system 405. As shown in FIG. 57A to FIG. 57C, the portable telephone 400 includes a microphone section 401, a speaker section 402, an input dial 403, a monitor 404, the photographic optical system 405, an antenna 406, and a processing means.

Here, the microphone section 401 is for inputting a voice of the operator as information. The speaker section 402 is for outputting a voice of the communication counterpart. The input dial 403 is for the operator to input information. The monitor 404 is for displaying a photographic image of the operator himself and the communication counterpart, and information such as a telephone number. The antenna 406 is for carrying out a transmission and a reception of communication electric waves. The processing means (not shown in the diagram) is for carrying out processing of image information, communication information, and input signal etc.

Here, the monitor 404 is a liquid-crystal display device. Moreover, in the diagram, a position of disposing each structural element is not restricted in particular to a position in the diagram. This photographic optical system 405 has an objective optical system 100 which is disposed in a photographic optical path 407 and an image pickup element chip 162 which receives an object image. As the objective optical system 100, the zoom lens in the first embodiment for example, is used. These are built into the portable telephone 400.

At a front end of a mirror frame, a cover glass 102 for protecting the objective optical system 100 is disposed.

An object image received at the electronic image pickup element chip 162 is input to an image processing means which is not shown in the diagram, via a terminal 166. Further, the object image finally displayed as an electronic image on the monitor 404 or a monitor of the communication counterpart, or both. Moreover, a signal processing function is included in the processing means. In a case of transmitting an image to the communication counterpart, according to this function, information of the object image received at the electronic image pickup element chip 162 is converted to a signal which can be transmitted.

Various modifications can be made to the present invention without departing from its spirit.

What is claimed is:

1. An image forming optical system comprising, in order from the object side:
a first lens group G1 that is fixed during zooming and includes a reflecting optical element for bending an optical path;
a second lens group G2 having a negative refracting power and movable during zooming;
a third lens group G3 having a positive refracting power;
a fourth lens group G4 having a positive refracting power, and
a rearmost lens group GR, wherein
during zooming from the wide angle end to the telephoto end, the third lens group G3 moves on the optical axis toward the object side, characterized in that the rearmost lens group GR satisfies the following condition:

$$0.95 < \beta Rw < 2.5 \quad (1\text{-}1),$$

where $\beta Rw$ is the imaging magnification of the rearmost lens group GR in a state in which the image forming optical system is focused on a certain object point for which the imaging magnification of the entire image forming optical system is equal to or lower than 0.01 at the wide angle end, the rearmost lens group GR consists only of a lens component that is at a substantially constant distance from the image plane during zooming, and the image forming optical system satisfies the following condition:

$$0.3 < NRn - NRp < 0.9 \quad (1\text{-}2),$$

where NRp and NRn are the refractive indices for the d-line of the materials of which a positive lens and a negative lens in the rearmost lens group GR are made respectively.

2. An image forming optical system comprising, in order from the object side:
a first lens group G1 that is fixed during zooming and includes a reflecting optical element for bending an optical path;
a second lens group G2 having a negative refracting power and movable during zooming;
a third lens group G3 having a positive refracting power;
a fourth lens group G4 having a positive refracting power; and
a rearmost lens group GR, wherein
during zooming from the wide angle end to the telephoto end, the third lens group G3 moves on the optical axis toward the object side, characterized in that the rearmost lens group GR satisfies the following condition:

$$0.95 < \beta Rw < 2.5 \quad (1\text{-}1),$$

where $\beta Rw$ is the imaging magnification of the rearmost lens group GR in a state in which the image forming optical system is focused on a certain object point for which the imaging magnification of the entire image forming optical system is equal to or lower than 0.01 at the wide angle end, the rearmost lens group GR consists only of a lens component that is at a substantially constant distance from the image plane during zooming, and the image forming optical system satisfies the following condition:

$$10 < \nu Rp - \nu Rn < 90 \quad (1\text{-}3),$$

where $\nu Rp$ and $\nu Rn$ are the Abbe constants for the d-line of the materials of which a positive lens and a negative lens in the rearmost lens group GR are made respectively.

3. An image forming optical system comprising, in order from the object side:
a first lens group G1 that is fixed during zooming and includes a reflecting optical element for bending an optical path;

a second lens group G2 having a negative refracting power and movable during zooming;

a third lens group G3 having a positive refracting power;

a fourth lens group G4 having a positive refracting power; and a rearmost lens group GR, wherein during zooming from the wide angle end to the telephoto end, the third lens group G3 moves on the optical axis toward the object side, characterized in that the rearmost lens group GR satisfies the following condition:

$$0.95 < \beta Rw < 2.5 \quad (1\text{-}1),$$

where $\beta Rw$ is the imaging magnification of the rearmost lens group GR in a state in which the image forming optical system is focused on a certain object point for which the imaging magnification of the entire image forming optical system is equal to or lower than 0.01 at the wide angle end, the rearmost lens group GR consists of a lens component made up of a positive lens and a negative lens that are cemented together.

4. The image forming optical system according to claim 3, characterized in that the rearmost lens group GR satisfies the following conditions:

$$1/R_{GRF} > 1/R_{GRR} \quad (1\text{-}4), \text{ and}$$

$$-0.5 < (R_{GRF} + R_{GRR})/(R_{GRF} - R_{GRR}) < 6.5 \quad (1\text{-}5),$$

where $R_{GRF}$ is the paraxial radius of curvature of the surface closest to the object side in the rearmost lens group GR, and $R_{GRR}$ is the paraxial radius of curvature of the surface closest to the image side in the rearmost lens group GR.

5. An image forming optical system comprising, in order from the object side:

a first lens group G1 that is fixed during zooming and includes a reflecting optical element for bending an optical path;

a second lens group G2 having a negative refracting power and movable during zooming;

a third lens group G3 having a positive refracting power;

a fourth lens group G4 having a positive refracting power; and a rearmost lens group GR, wherein during zooming from the wide angle end to the telephoto end, the third lens group G3 moves on the optical axis toward the object side, characterized in that the rearmost lens group GR satisfies the following condition:

$$0.95 < \beta Rw < 2.5 \quad (1\text{-}1),$$

where $\beta Rw$ is the imaging magnification of the rearmost lens group GR in a state in which the image forming optical system is focused on a certain object point for which the imaging magnification of the entire image forming optical system is equal to or lower than 0.01 at the wide angle end, focusing on a closer object can be performed by advancing the fourth lens group G4 toward the object side, when zooming from the wide angle end to the telephoto end is performed in a state in which the image forming optical system is focused on a certain object point for which the absolute value of the imaging magnification of the entire image forming optical system is equal to or lower than 0.01 at the wide angle end, the fourth lens group G4 moves in such a way that it is located relatively closer to the rearmost lens group GR at the telephoto end than at the wide angle end, and the image forming optical system satisfies the following conditions:

$$-1.2 \leq \beta 2w \leq -0.40 \quad (1\text{-}6), \text{ and}$$

$$-1.8 \leq \beta 3w \leq -0.40 \quad (1\text{-}7),$$

where $\beta 2w$ is the imaging magnification of the second lens group G2, and $\beta 3w$ is the imaging magnification of the third lens group G3, in a state in which the image forming optical system is focused on a certain object point for which the imaging magnification of the entire image forming optical system is equal to or lower than 0.01 at the wide angle end.

\* \* \* \* \*